(12) United States Patent
Anderson et al.

(10) Patent No.: US 10,815,320 B2
(45) Date of Patent: Oct. 27, 2020

(54) FUNCTIONALIZED RESIN HAVING A POLAR LINKER

(71) Applicant: Eastman Chemical Company, Kingsport, TN (US)

(72) Inventors: Emily Baird Anderson, Kingsport, TN (US); John Dayton Baker, Jr., Kingsport, TN (US); Terri Roxanne Carvagno, Church Hill, TN (US); Judicael Jacques Chapelet, Akron, OH (US); Wei Min Cheng, Pittsburgh, PA (US); Liu Deng, Kingsport, TN (US); Jacobus Gillis De Hullu, Wolphartsdijk (NL); Sebastian Finger, Hannover (DE); Hubert Hirschlag, Laatzen (DE); Christopher Lee Lester, Danville, VA (US); Wentao Li, Kingsport, TN (US); Mutombo Joseph Muvundamina, Johnson City, TN (US); Mark Stanley Pavlin, Kingsport, TN (US); Fabian Peters, Hannover (DE); Carla Recker, Hannover (DE); Christopher Thomas Scilla, Akron, OH (US)

(73) Assignee: Eastman Chemical Company, Kingsport, TN (US)

( * ) Notice: Subject to any disclaimer, the term of this patent is extended or adjusted under 35 U.S.C. 154(b) by 40 days.

(21) Appl. No.: 15/949,919

(22) Filed: Apr. 10, 2018

(65) Prior Publication Data
US 2018/0291125 A1 Oct. 11, 2018

Related U.S. Application Data

(63) Continuation of application No. PCT/US2018/026752, filed on Apr. 9, 2018.
(Continued)

(51) Int. Cl.
| *C08F 30/08* | (2006.01) |
| *C08L 7/00* | (2006.01) |
| *C09J 107/00* | (2006.01) |
| *C08F 12/08* | (2006.01) |
| *C08F 20/16* | (2006.01) |
| *C08L 31/04* | (2006.01) |
| *C09J 123/08* | (2006.01) |
| *C09J 131/04* | (2006.01) |
| *C08L 23/20* | (2006.01) |
| *C09J 123/20* | (2006.01) |
(Continued)

(52) U.S. Cl.
CPC .............. *C08F 30/08* (2013.01); *C08F 2/38* (2013.01); *C08F 8/02* (2013.01); *C08F 8/10* (2013.01); *C08F 8/12* (2013.01); *C08F 8/14* (2013.01); *C08F 8/42* (2013.01); *C08F 12/08* (2013.01); *C08F 12/22* (2013.01); *C08F 12/24* (2013.01); *C08F 20/16* (2013.01); *C08F 20/26* (2013.01); *C08F 212/08* (2013.01); *C08K 5/5419* (2013.01); *C08L 7/00* (2013.01); *C08L 9/00* (2013.01); *C08L 9/06* (2013.01); *C08L 23/0853* (2013.01); *C08L 23/20* (2013.01); *C08L 31/04* (2013.01); *C08L 33/10* (2013.01); *C08L 35/06* (2013.01); *C09J 7/383* (2018.01); *C09J 107/00* (2013.01); *C09J 123/0853* (2013.01); *C09J 123/20* (2013.01); *C09J 125/18* (2013.01); *C09J 131/04* (2013.01); *C08F 220/18* (2013.01); *C08F 2800/10* (2013.01); *C08F 2810/40* (2013.01); *C08F 2810/50* (2013.01); *C08L 2205/03* (2013.01); *C09J 2409/00* (2013.01); *C09J 2425/00* (2013.01); *Y02T 10/862* (2013.01)

(58) Field of Classification Search
CPC .... C08F 30/08; C08F 8/02; C08F 8/10; C08F 8/42; C08K 5/5419; C08L 33/10; C08L 35/06
USPC ......................................................... 524/322
See application file for complete search history.

(56) References Cited

U.S. PATENT DOCUMENTS

| 4,755,560 A | 7/1988 | Ito et al. |
| 4,975,488 A | 12/1990 | Furukawa et al. |
| (Continued) | | |

FOREIGN PATENT DOCUMENTS

| CN | 108026206 A | 5/2018 |
| WO | 9909036 A1 | 2/1999 |
| (Continued) | | |

OTHER PUBLICATIONS

Written Opinion and International Search Report dated Sep. 12, 2018 of international application PCT/US2018/026752 on which this application is based.
(Continued)

*Primary Examiner* — Doris L Lee
(74) *Attorney, Agent, or Firm* — Walter Ottesen, P.A.

(57) ABSTRACT

Polar silane linkers are provided that attach to resins to form silane-functionalized resins. The functionalized resins can be bound to hydroxyl groups on the surface of silica particles to improve the dispersibility of the silica particles in rubber mixtures. Further disclosed are synthetic routes to provide the silane-functionalized resins, as well as various uses and end products that benefit from the unexpected properties of the silane-functionalized resins. Silane-functionalized resins impart remarkable properties on various rubber compositions, such as tires, belts, hoses, brakes, and the like. Automobile tires incorporating the silane-functionalized resins are shown to possess excellent results in balancing the properties of rolling resistance, tire wear, and wet braking performance.

20 Claims, 71 Drawing Sheets

Related U.S. Application Data

(60) Provisional application No. 62/483,835, filed on Apr. 10, 2017.

(51) Int. Cl.

| | | |
|---|---|---|
| *C08L 23/08* | (2006.01) |
| *C08F 8/12* | (2006.01) |
| *C08F 8/14* | (2006.01) |
| *C08F 8/10* | (2006.01) |
| *C08F 8/42* | (2006.01) |
| *C08F 12/24* | (2006.01) |
| *C08F 8/02* | (2006.01) |
| *C08L 9/00* | (2006.01) |
| *C09J 7/38* | (2018.01) |
| *C08F 12/22* | (2006.01) |
| *C08F 20/26* | (2006.01) |
| *C08L 9/06* | (2006.01) |
| *C09J 125/18* | (2006.01) |
| *C08F 2/38* | (2006.01) |
| *C08F 212/08* | (2006.01) |
| *C08K 5/5419* | (2006.01) |
| *C08L 33/10* | (2006.01) |
| *C08L 35/06* | (2006.01) |
| *C08F 220/18* | (2006.01) |

(56) References Cited

U.S. PATENT DOCUMENTS

| | | | |
|---|---|---|---|
| 5,134,194 A | 7/1992 | Inoue et al. | |
| 5,177,156 A | 1/1993 | Aritomi et al. | |
| 6,375,789 B1 | 4/2002 | Katz et al. | |
| 6,380,307 B1 | 4/2002 | Brennan et al. | |
| 7,968,633 B2 | 6/2011 | York et al. | |
| 7,968,634 B2 | 6/2011 | York et al. | |
| 7,968,635 B2 | 6/2011 | York et al. | |
| 7,968,636 B2 | 6/2011 | York et al. | |
| 8,227,538 B2 | 7/2012 | York et al. | |
| 8,252,863 B2 | 8/2012 | Hasse et al. | |
| 8,689,381 B2 | 4/2014 | Shiue | |
| 9,273,195 B2 | 3/2016 | Basu et al. | |
| 2004/0241331 A1* | 12/2004 | Durairaj | C08L 61/06 427/387 |
| 2008/0125541 A1 | 5/2008 | Hattemer et al. | |
| 2008/0161452 A1 | 7/2008 | York et al. | |
| 2008/0161462 A1 | 7/2008 | York et al. | |
| 2008/0161486 A1 | 7/2008 | York et al. | |
| 2011/0252671 A1 | 10/2011 | Maron et al. | |
| 2013/0020025 A1 | 1/2013 | Li et al. | |
| 2013/0167965 A1 | 7/2013 | Cheney et al. | |
| 2013/0171367 A1 | 7/2013 | Kusinski et al. | |
| 2013/0274410 A1 | 10/2013 | Miyafuji et al. | |
| 2013/0291409 A1 | 11/2013 | Reinhardt et al. | |
| 2013/0296475 A1 | 11/2013 | Simon et al. | |
| 2014/0288263 A1 | 9/2014 | Kanomata et al. | |
| 2016/0200141 A1 | 7/2016 | Herzog et al. | |
| 2016/0222197 A1 | 8/2016 | Peters et al. | |
| 2016/0264689 A1 | 9/2016 | Blok et al. | |
| 2018/0291124 A1 | 10/2018 | Anderson et al. | |
| 2018/0291181 A1 | 10/2018 | Anderson et al. | |

FOREIGN PATENT DOCUMENTS

| | | |
|---|---|---|
| WO | 2005044909 A1 | 5/2005 |
| WO | 2007033720 A1 | 3/2007 |
| WO | 2008083242 A1 | 7/2008 |
| WO | 2010059402 A1 | 5/2010 |
| WO | 2012050666 A1 | 4/2012 |
| WO | 2015153055 A2 | 10/2015 |
| WO | WO 2015/153059 * | 10/2015 |
| WO | 2018191186 A1 | 10/2018 |
| WO | 2018191187 A1 | 10/2018 |

OTHER PUBLICATIONS

Written Opinion and International Search Report dated Sep. 18, 2018 of corresponding international application PCT/US2018/026755.
Written Opinion and International Search Report dated Sep. 18, 2018 of corresponding international application PCT/US2018/026758.
Murray, H.H., "Clays, Survey" in Encyclopedia of Chemical Technology, Kirk-Othmer, John Wiley & Sons, Inc., 2006, pp. 1 to 29.
Murray, H.H., "Clays, Uses" in Encyclopedia of Chemical Technology, Kirk-Othmer, John Wiley & Sons, Inc., 2006, pp. 1 to 19.
Uhrland, S., "Silica" in Encyclopedia of Chemical Technology, Kirk-Othmer, John Wiley & Sons, Inc., 2006, pp. 1 to 17.
"Thermal Solutions Characterization of Polyurethane by TGA and Hi-ResTM TGA", TA Instruments Thermal Analysis & Rheology, http://www.tainst.com, downloaded on Nov. 14, 2018, one page.
International preliminary report on patentability dated Oct. 15, 2019 of international application PCT/US2018/026752 on which this application is based.
International preliminary report on patentability dated Oct. 15, 2019 of corresponding international application PCT/US2018/026755.
International preliminary report on patentability dated Oct. 15, 2019 of corresponding international application PCT/US2018/026758.
D395-18, Standard Test Methods for Rubber Property-Compression Set, ASTM Int'l, Sep. 2018, pp. 1 to 8.
D412-16, Standard Test Methods for Vulcanized Rubber and Thermoplastic Elastomers-Tension1, ASTM Int'l, Dec. 2016, pp. 1 to 14.
D624-00 (Reapproved 2012), Standard Test Method for Tear Strength of Conventional Vulcanized Rubber and Thermoplastic Elastomers, ASTM Int'l, Mar. 2012, pp. 1 to 9.
D638-14, Standard Test Method for Tensile Properties of Plastics, ASTM Int'l, Mar. 2015, pp. 1 to 17. Replaces E638-78.
D1510-19a, Standard Test Method for Carbon Black-Iodine Adsorption Number, ASTM Int'l, Sep. 2019, pp. 1 to 10.
D2240-15e1, Standard Test Method for Rubber Property-Durometer Hardness, ASTM Int'l, Jan. 2016, pp. 1 to 13. Replaces D2240-05 (pp. 1 to 13).
D2414-19, Standard Test Method for Carbon Black-Oil Absorption No. (OAN), ASTM Int'l, Aug. 2019, pp. 1 to 9.
D3236-15, Standard Test Method for Apparent Viscosity of Hot Melt Adhesives and Coating Materials, ASTM Int'l, May 2015, pp. 1 to 6.
D3765-04, Standard Test Method for Carbon Black-CTAB (Cetyltrimethylammonium Bromide) Surface Area, ASTM Int'l, Jun. 2004, pp. 1 to 6. Superseded or withdrawn.
D6493-11 (Reapproved 2015), Standard Test Methods for Softening Point of Hydrocarbon Resins and Rosin Based Resins by Automated Ring-and-Ball Apparatus, ASTM Int'l, Dec. 2015, pp. 1 to 5.
E7756-05 (Reapproved 2017), Standard Test Method for Measuring Vibration-Damping Properties of Materials, ASTM Int'l, Dec. 2017, pp. 1 to 14.
F88/F88M-15, Standard Test Method for Seal Strength of Flexible Barrier Materials, ASTM Int'l, Dec. 2015, pp. 1 to 11.
PSTC-16, "Loop Tack", Oct. 2000, revised Oct. 2003 and May 2007, pp. 16-1 to 16-8.
PSTC 101, "Peel Adhesion of Pressure Sensitive Tape", Harmonized International Standard, Oct. 2000, revised Oct. 2003 and May 2007, pp. 101-1 to 101-10.
Aldrich Chemical Co., "Applications: Free Radical Initiators". Retrieved from web.archive.org on Apr. 19, 2020 in co-pending U.S. Appl. No. 15/949,908. Archived on Jun. 11, 2014 (Year 2014).

\* cited by examiner r = number of units
q = 1
R = H or CH$_3$
Z = -Ph-
k = 1
X = OCOCH$_2$
n = 1
R$^1$ = CH$_2$CONH
m = 3
R$^2$ = OEt
p = 3 r = number of units
R = H or CH$_3$ r = number of units
q = 1
R = H or CH$_3$
Z = -Ph-
k = 1
X = O
n = 1
R$^1$ = CH$_2$
m = 2
R$^2$ = OEt
p = 3 r = number of units
R = H or CH$_3$ r = number of units
q = 1
R = H or CH$_3$
Z = -Ph-
k = 1
X = OCH$_2$COO
n = 1
R$^1$ = CH$_2$CH(OH)CH$_2$O
m = 3
R$^2$ = OEt
p = 3 r = number of units
R = H or CH$_3$

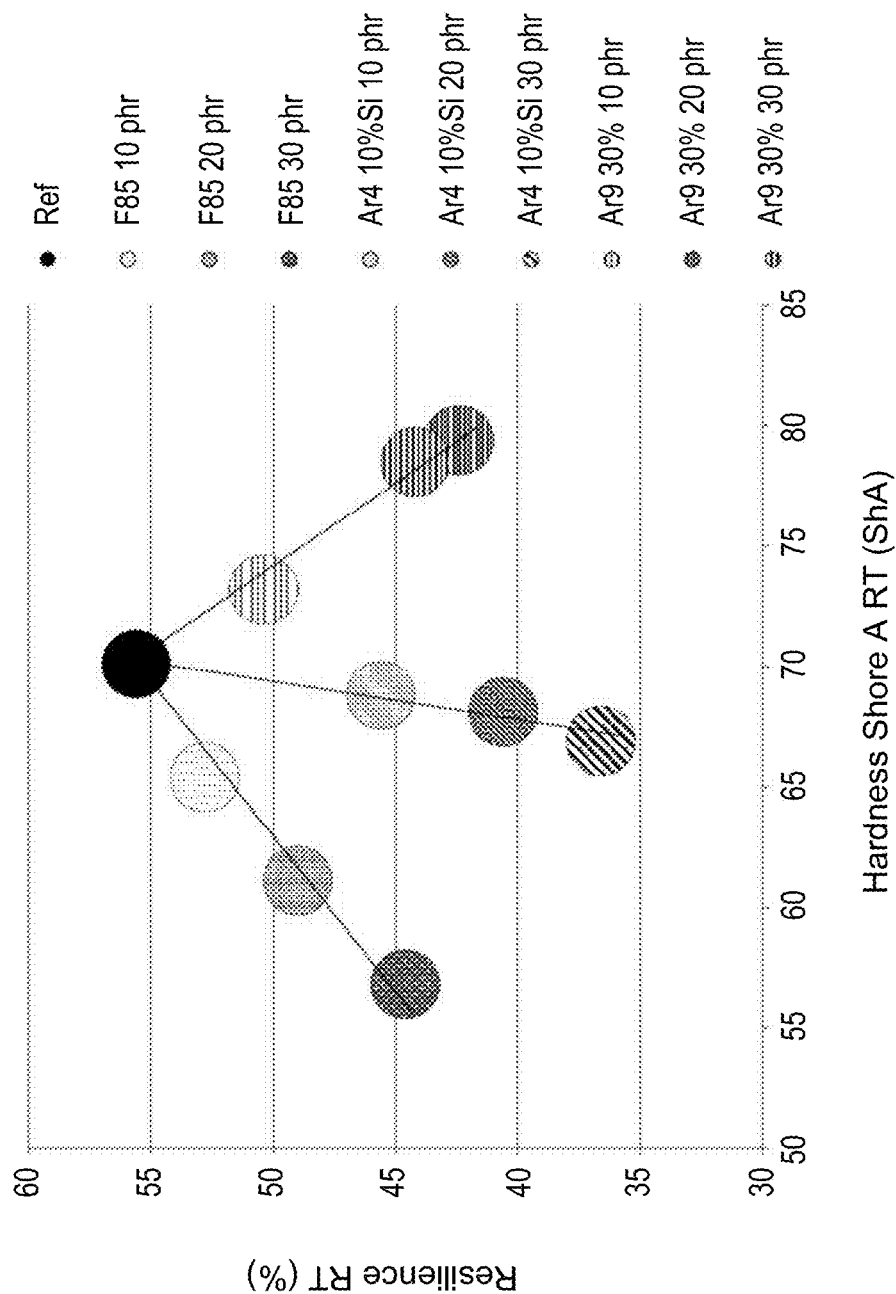

FUNCTIONALIZED RESIN HAVING A POLAR LINKER

CROSS-REFERENCE TO RELATED APPLICATIONS

This application claims priority to and the benefit of U.S. Provisional Patent Application Ser. No. 62/483,835, filed Apr. 10, 2017, and International Patent Application No. PCT/US2018/26752, filed Apr. 9, 2018, both of which are entitled, "Functionalized Resin Having A Polar Linker," both which are incorporated herein by reference in their entirety.

PARTIES TO A JOINT RESEARCH AGREEMENT

This disclosure was created pursuant to a joint development agreement between Eastman Chemical Company, a Delaware corporation, and Continental Reifen Deutschland GmbH, a German corporation, that was in effect on or before the date the claimed invention was made, and the claimed invention was made as a result of activities undertaken within the scope of the joint development agreement.

FIELD

Silane functionalized resins are disclosed that contain a polar silane linker as the functionalizing group. The functionalized resins can be bound to hydroxyl groups on the surface of silica particles to improve the dispersibility of the silica particles in rubber mixtures that alter the viscoelastic and performance properties of the cured rubber compounds. Further, synthetic routes to prepare the polar or amphiphilic silane linker and to attach the linker to a resin are disclosed, as well as synthetic routes to copolymerize a silane functionalized monomer. Various uses and end products that impart excellent performance due to the unexpected properties of these functionalized resins are also disclosed.

BACKGROUND

Rubber mixtures typically contain filler material to improve technical requirements of the tire compositions, such as high wear resistance, low rolling resistance, or wet grip. However, the technical requirements are often in conflict with each other, as, for example, a change in composition to lower rolling resistance of a tire can in turn decrease the wet grip.

Silica is a widely-used filler material for rubber mixtures. In particular, silica is often included in rubber mixtures for vehicle tires. However, the surface of silica particles is hydrophilic due to the presence of polar hydroxyl groups, whereas the rubber material in a tire is typically more hydrophobic, which can make it difficult to disperse the silica particles in the rubber mixture during the manufacture of the tire.

Current resin technology for tires uses high glass transition resins to modify the rubber glass transition temperature Tg and viscoelastic properties to improve wet grip and rolling resistance performance balance. The wet grip performance must be balanced with other tire properties including rolling resistance and wear that are affected by the introduction of resin.

Lately, resins have increasingly been used in rubber mixtures for vehicle tire applications, in particular in rubber mixtures for tire treads. U.S. Patent Application Publication No. 2016/0222197 discloses tire treads containing resins in amounts exceeding 50 phr. A good compatibility between rubber and resin is a prerequisite for achieving high resin loadings in the polymer matrix.

Commercially available resins are not functionalized to achieve a specific attachment to the surface of the filler material. Thus, commercially available resins are distributed throughout the polymer matrix and do not target the silica interface with rubber.

International Patent Application Publication No. WO 2015/153055 discloses dicyclopentadiene (DCPD)-based polymers that are functionalized with a functional group of Formula P—S—X, where S is an aliphatic or aromatic spacer, P is a polymer backbone, and X is a silane. However, DCPD-based resins exhibit a reduced solubility in at least some rubber mixtures for tires.

Further, from U.S. Patent Application Publication No. 2013/0296475 it is known to provide thermoplastic polymers with a terminal functional group. In some of the examples therein resins with a relatively high molecular weight of Mn (number average molecular weight) of 2,500 to 10,000 g/mol are used. However, with increasing molecular weight of a hydrocarbon resin, the compatibility with the polymer matrix may decrease.

Thus, disclosed are functionalized resins that are employed as processing aids or are used to prevent damping or energy dissipation effects provided by unbound resin in a vehicle tire. Specifically, the damping properties of the rubber mixtures can be modified in a site-specific manner. The functionalized resins disclosed herein attach to the surface of a filler material, preferably silica, through a reactive group, preferably a reactive silane group that is bound to a polar linker. Surprisingly, the functionalized resin can efficiently modify the polymer-filler interface, such that the viscoelastic properties of the rubber mixture are improved. Conflicting technical requirements of the tire compositions, such as improved wet grip and lower rolling resistance can be effectively resolved at a higher level.

SUMMARY

Provided herein are resin compositions functionalized with silane. It has been discovered that functionalization of resins with silane as disclosed herein confer superior unexpected properties, such that products, such as rubber products, adhesive, tires, belts, gaskets, hoses, and the like, possess superior properties as compared to similar products without the disclosed functionalized resins. Disclosed are also methods of obtaining, manufacturing, synthesizing, or creating such resins, as well as various end-use products incorporating the disclosed functionalized resins.

The resin compositions have the general structure of Formula I, where "resin" represents the backbone of the resin:

$$\text{resin-}[Z_k\text{—}X_n\text{—}R^1\text{—}(CH_2)_n\text{—}Si(R^2)_p]_q \quad (I)$$

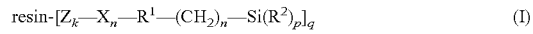

wherein Z is an aromatic group or an aliphatic group optionally comprising a heteroatom;

wherein X is a linker comprising a heteroatom selected from sulfur, oxygen, nitrogen, a carbonyl group, or a combination thereof;

wherein $R^1$ comprises one or more of an aliphatic and/or aromatic $C_1$ to $C_{18}$ and/or a linkage group comprising a heteroatom;

wherein each $R^2$ is the same or different and is independently selected from a $C_1$ to $C_{18}$ alkoxy, aryloxy, alkyl, aryl, or H, or OH, and is optionally branched, and wherein at least one $R^2$ is $C_1$ to $C_{18}$ alkoxy, aryloxy, or H, or OH;

wherein q is an integer from of at least 1;
wherein k is an integer of 0 or 1;
wherein n is an integer from 1 to 10;
wherein m is an integer from 0 to 10; and,
wherein p is 1, 2, or 3.

End-use compositions comprising the described functionalized resins include various components. In one embodiment, the end-use composition comprises about 10 to about 90 weight percent of at least one polymer, about 4 to about 70 weight percent of at least one functionalized resin as described by Formula I, above, about 0 to about 70 weight percent of at least one thermoplastic tackifying resin, about 0 to about 50 weight percent of at least one wax, about 0 to about 60 weight percent of at least one oil or plasticizer, about 0.5 to about 3 weight percent of at least one stabilizer, and about 0 to about 70 weight percent of at least one filler. In such embodiments, the composition is non-vulcanized.

In another embodiment, the end-use compositions comprises about 30 to about 90 weight percent of the at least one polymer, about 4 to about 60 weight percent of the at least one functionalized resin as described by Formula I, above, about 0 to about 70 weight percent of the at least one thermoplastic tackifying resin, about 0 to about 30 weight percent of the at least one wax, and about 0 to about 20 weight percent of the at least one oil or plasticizer.

In such embodiments of the disclosed end-use compositions, the compositions possess a lower Brookfield viscosity at 160° C., equivalent percent fiber tear at −15° C. on corrugated cardboard, a shorter set time as compared with an equivalent composition comprising a corresponding non-silane-functionalized resin, and/or an at least 200% greater percent fiber tear at −7° C. and/or at −15° C. on corrugated cardboard and maintained within one standard deviation the Brookfield viscosity at 160° C. and shear adhesion failure temperature (SAFT) on corrugated cardboard as measured by JAI Method 7-A with 500 g, as compared with the same composition comprising a corresponding non-silane-functionalized resin.

In another embodiment, the end-use composition comprises about 15 to about 70 weight percent, or about 40 to about 55 weight percent, of the at least one polymer, wherein greater than about 15 weight percent of the at least one polymer is an elastomeric polymer, about 4 to about 60 weight percent of the functionalized resin described by Formula I, above, about 0 to about 70 weight percent of the at least one thermoplastic tackifying resin, about 5 to about 35 weight percent of the at least one oil or plasticizer, about 0.5 to about 3 weight percent of the at least one stabilizer, and about 0 to about 70 weight percent of the at least one filler. Such compositions are pressure sensitive adhesive (PSA) compositions. In other embodiments, such compositions comprise about 20 to about 60 weight percent, or about 20 to about 35 weight percent, of the at least one polymer, about 4 to about 30 weight percent of the functionalized resin described by Formula I, above, about 35 to about 60 weight percent of the at least one thermoplastic tackifying resin, and about 25 to about 35 weight percent of the at least one one oil or plasticizer. In certain embodiments, such compositions possess a lower Brookfield viscosity at 160° C. and maintained within one standard deviation the loop tack, 180° peel and 40° C. hold power as tested by PSTC 16, 101 and 17 modified, respectively, as compared with an equivalent composition comprising a corresponding non-silane-functionalized resin.

In some embodiments, compositions comprising the functionalized resin defined by Formula I possess a viscosity at 177° C. of about 50 to about 10,000 cP, and a ring and ball softening point of about 60° C. to about 180° C. In other such embodiments, the compositions comprise about 10 to about 80 weight percent of at least one polymer, wherein the at least one polymer is an elastomer, about 5 to about 20 weight percent of the at least one thermoplastic polymer, wherein the thermoplastic polymer is a polyolefin polymer or copolymer, about 5 to about 25 weight percent of the functionalized resin, about 0 to about 15 weight percent of at least one thermoplastic tackifying resin, about 2 to about 60 weight percent of at least one oil or plasticizer, and about 10 to about 70 weight percent of at least one filler. In certain embodiments, such compositions possess a 70° C. compression set value as measured by ASTM D395-14 that is lower than the same composition with equivalent room temperature compression set value that was prepared without silane-functionalized resin; and/or a lower room temperature compression set as measured by ASTM D395-14, and higher tear strength measured in compliance with ASTM D624 (die C), and a higher melt flow rate at 230° C./2.16 kg as compared to the composition without silane-functionalized resin.

In embodiments of the end-use compositions comprising a polymer, the polymer is one or more of natural rubber, polyisoprene, styrene-butadiene copolymer, styrene-butadiene rubber (SBR), butadiene rubber (BR), nitrile rubber, liquid rubbers, polynorbornene copolymer, isoprene-isobutylene copolymer, ethylene-propylene-diene rubber, chloroprene rubber, acrylate rubber, fluorine rubber, silicone rubber, polysulfide rubber, epichlorohydrin rubber, styrene-isoprene-butadiene terpolymer, hydrated acrylonitrile butadiene rubber, isoprene-butadiene copolymer, butyl rubber, hydrogenated styrene-butadiene rubber, butadiene acrylonitrile rubber, a terpolymer formed from ethylene monomers, propylene monomers, and/or ethylene propylene diene monomer (EPDM), isoprene-based block copolymers, butadiene-based block copolymers, styrenic block copolymers, styrene-butadiene-styrene block copolymer (SBS), styrene-ethylene/butylene-styrene block copolymer (SEBS), styrene-[ethylene-(ethylene/propylene)]-styrene block copolymer (SEEPS), styrene-isoprene-styrene block copolymer (SIS), random styrenic copolymers, hydrogenated styrenic block copolymers, styrene butadiene copolymers, polyisobutylene, ethylene vinyl acetate (EVA) polymers, ethylene-butyl-acrylate, polyolefins, amorphous polyolefins, semi-crystalline polyolefins, alpha-polyolefins, reactor-ready polyolefins, acrylates, metallocene-catalyzed polyolefin polymers and elastomers, semi-crystalline single-site catalyzed (metallocene) polyolefin, reactor-made thermoplastic polyolefin elastomers, amorphous poly alpha-olefin, olefin block copolymer, co-polyester block copolymer, polyurethane block copolymer, polyamide block copolymer, thermoplastic polyolefins, thermoplastic vulcanizates, ethylene vinyl acetate copolymer, ethylene n-butyl acrylate copolymer, ethylene methyl acrylate copolymer, neoprene, acrylics, urethane, poly(acrylate), ethylene acrylic acid copolymer, polyether ether ketone, polyamide, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, $C_4$-$C_{10}$ alpha-olefin monomers, polypropylene polymers, maleated polyolefins, polyester copolymers, copolyester polymers, ethylene acrylic acid copolymer, and/or polyvinyl acetate, and/or wherein the polymer optionally comprises a modification and/or functionalization selected from one or more of hydroxyl-, ethoxy-, epoxy-, siloxane-, amine-, aminesiloxane-, carboxy-, phthalocyanine-, and silane-sulfide-groups, at the polymer chain ends or pendant positions within the polymer.

In another embodiment of the described end-use compositions comprising one or more functionalized resins as described in Formula I, the functionalized resin(s) is/are obtained by polymerizing or co-polymerizing one or more of an unsaturated aliphatic monomer, terpenes, rosin acid, unsaturated cycloaromatic monomers, unsaturated cycloaliphatic monomers, unsaturated fatty acids, methacrylates, unsaturated aromatic monomers, vinyl aromatic monomers, and/or an unsaturated aliphatic/aromatic monomer mixture. In another such embodiment, the functionalized resin(s) is/are hydrogenated, partially hydrogenated, or non-hydrogenated. In such embodiments, the aromatic monomers and/or vinyl aromatic monomer comprises one or more of styrene, vinyl toluene, alpha-methyl styrene, and/or diisopropylbenzene, or the aliphatic monomer comprises one or more of C5 piperylenes, coumarone, indene, and/or dicyclopentadiene.

In another embodiment of the end-use compositions, in Formula I describing the functionalized resins, q is an integer from 2 to 8, and/or n is an integer from 1 to 4. In other embodiments, the $-[Z_k-X_n-R^1-(CH_2)_m-Si(R^2)_p]_q$ moiety of Formula I describing the functionalized resins is positioned at one or more ends of the functionalized resin, is distributed randomly throughout the functionalized resin, is present in blocks throughout the functionalized resin, is present in segments of the functionalized resin, is present at least once per functionalized resin, is present at least twice per functionalized resin, and/or is present in the middle of each functionalized resin.

In another embodiment of the end-use compositions comprising one or more functionalized resins described by Formula I, X is a phenol, a hydroxyl, an amine, an imidazole, an amide, a polysulfide, a sulfoxide, a sulfone, a sulfonamide, a sulfonium, an ammonium, a carboxylic acid, an ester, a thioester, an ether, a maleimide, a carbamate, cyanate, isocyanate, thiocyanate, a pyridinium, or combinations thereof. In another such embodiment, $R^1$ is a $C_1$ to $C_{10}$ carbon chain or a $C_1$ to $C_5$ carbon chain. In a further embodiment, $R^2$ is a $C_1$ to $C_{10}$ alkoxy, aryloxy, alkyl, or aryl group, or a $C_1$ to $C_5$ alkoxy, aryloxy, alkyl, or aryl group, and is optionally branched. In an additional embodiment, Z is a 6-membered aromatic group, or a saturated or unsaturated cyclo-aliphatic group.

In another embodiment of the end-use compositions comprising one or more functionalized resins described by Formula I, X is oxygen or carbonyl. In another such embodiment, each $R_2$ is independently selected from a hydroxy, a methoxy, ethoxy, and a propoxy group. In an additional embodiment, $R^1$ is one or more of $-O-CO-NH-R^1-(CH_2)_2-$, $-O-CO-R^3-(CH_2)_2-$, $-O-CH_2-R^3-(CH_2)_2-$, $-CO-R^3-(CH_2)_2-$, and $-CO-NH-R^3-(CH_2)_2-$. In a further embodiment, $R^3$ is an aliphatic or aromatic $C_1$ to $C_8$ carbon chain, optionally branched, and/or optionally comprises one or more heteroatoms.

In another embodiment of the end-use compositions comprising one or more functionalized resins described by Formula I, the amount of silane-containing groups grafted onto the functionalized resin is about 0.001 to about 100 mol %, about 0.1 to about 50 mol %, or about 5 to about 50 mol %. In an alternative embodiment, the functionalized resin has a molecular weight of about 200 g/mol to about 200,000 g/mol, about 200 g/mol to about 175,000 g/mol, or about 200 g/mol to about 150,000 g/mol. In a further embodiment of the described end-use compositions, the functionalized resin has a polydispersity index (PDI) of about 1 to 10. In another such embodiment, the functionalized resin has a glass transition temperature Tg of below about 200° C. or less than about 160° C. In an alternative embodiment of the described end-use compositions, the amount of silane groups grafted onto the functionalized resin is from about 0.01 to about 30 mol %. In an additional embodiment of the described compositions, the functionalized resin is present in an amount of from 5 to 400 phr, from 5 to 120 phr, from 5 to 100 phr, from 5 to 40 phr, from 5 to 30 phr, or from 5 to 10 phr.

In a particular embodiment of the described compositions, the functionalized resin has the molecular weight of from about 400 to about 2,000 g/mol. In a further such embodiment, the polydispersity index (PDI) of the resin is of about 1 to about 5, or from 1 to 2.

In other embodiments of the described compositions, the functionalized resin is bound to a silicate filler particle by a Si—O—Si moiety following hydrolysis of at least one $-R^2$ group. Alternatively, in a further embodiment, the functionalized resin molecule is bound to a second functionalized resin molecule by a Si—O—Si moiety following hydrolysis of at least one $-R^2$ group. Further, embodiments are contemplated wherein the functionalized resin is covalently attached to a surface of the silicate filler material through a reactive group, preferably a reactive silane group, which is bound to a polar linker.

Also described herein are products made from or comprising the described end-use compositions. Such products or articles include, but are not limited to, an adhesive, a laminate, a tape, a heat seal coating, a heat seal lidding, a disposable hygiene article, a mastic, a caulk, an insulating glass (IG) unit, bridge decking, a water proofing membrane, a waterproofing compound, an underlayment, a cable flooding/filling compound, a low shrinkage sheet molded compound, a dough molded compound, an overmolded compound, a polyester composite, a glass composite, a fiberglass reinforced plastic, a coupling agent for wood-plastic composites, a polyvinyl chloride extruded compound, a polyacrylic blended compound, a lost-wax precision casting, an investment casting wax composition, a candle, a window, a film, a gasket, a seal, an o-ring, a motor vehicle molded part, a motor vehicle extruded part, a sealant, a clothing article, a low profile additive for sheet molding compounds (SMCs) and dough molding compounds (DMCs), a woven textile sizing, a nonwoven textile sizing, a rubber additive/processing aid. In such end-use embodiments, the adhesive is a packaging adhesive, food contact grade adhesive, indirect food contact packaging adhesive, product assembly adhesive, woodworking adhesive, flooring adhesive, automotive assembly adhesive, structural adhesive, pressure sensitive adhesive (PSA), PSA tape, PSA label, PSA protective film, laminating adhesive, flexible packaging adhesive, heat seal adhesive, industrial adhesive, hygiene nonwoven construction adhesive, hygiene core integrity adhesive, or hygiene elastic attachment adhesive.

BRIEF DESCRIPTION OF THE DRAWINGS

The invention will now be described with reference to the drawings. The accompanying drawings, which are incorporated in and constitute a part of this specification, illustrate certain embodiments, and together with the written description, serve to explain certain principles of the constructs and methods disclosed herein.

FIG. 1A shows synthesis of pendant silane-containing resins via acetoxystyrene functionalization. FIG. 1B shows synthesis of end-capped silane-containing resin via phenol functionalization. FIG. 1C shows synthesis of pendant silane-containing resins via phenol functionalization with anhydride silane. FIG. 1D shows synthesis of pendant silane-containing resin via succinic anhydride grafting onto resin. FIG. 1E shows synthesis of pendant silane-containing resin via free radical copolymerization. FIG. 1F shows various architecture embodiments surrounding the variable group Z. FIG. 1G shows synthesis of end-capped silane-containing resins by phenol functionalization through succinic anhydride. FIG. 1H shows synthesis of end-capped silane-containing resins by phenol functionalization with chloro-silane. FIG. 1I shows synthesis of pendant silane-containing resins by copolymerization of isobornylmethacrylate and 3-(trimethoxysilyl)propylmethacrylate. FIG. 1J shows synthesis of end-capped silane-containing resins via phenol functionalization with glycidoxy silane. FIG. 1K shows synthesis of end-capped silane-containing resin via acid functionalization with glycidoxy silane. FIG. 1L shows synthesis of end-capped silane-containing resin via phenol functionalization with glycidoxy silane. FIG. 1M shows synthesis of end-capped silane-containing resin via phenol functionalization with phthalic anhydride and glycidoxy silane.

FIG. 60 shows a graph of resilience vs. Shore A hardness for each of the samples tested in Example 3.

DETAILED DESCRIPTION

Figure 1A:
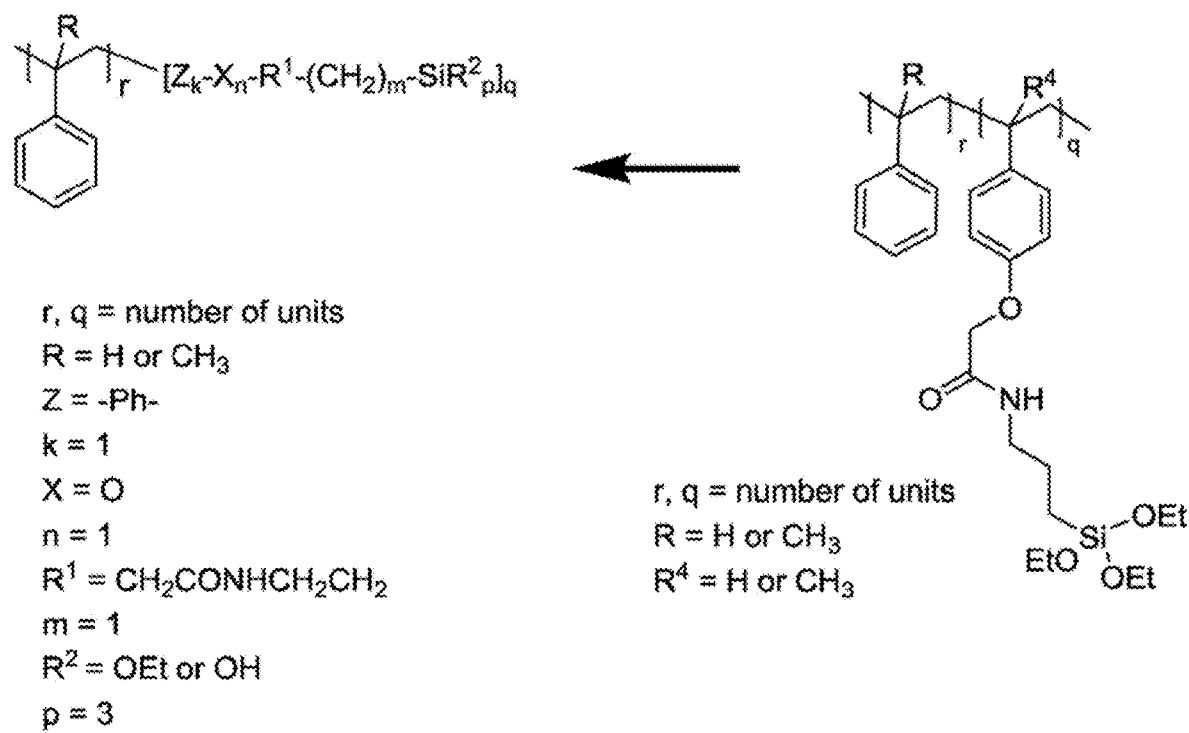
FIG. 1A through FIG. 1M show aspects of synthetic routes and architectures for silane-functionalizing resins.

It is to be understood that the following detailed description is provided to give the reader a fuller understanding of certain embodiments, features, and details of aspects of the invention, and should not be interpreted as a limitation of the scope of the invention.

Definitions

Certain terms used throughout this disclosure are defined hereinbelow so that the present invention may be more readily understood. Additional definitions are set forth throughout the disclosure.

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this context, the term "about" is meant to encompass the stated value ±a deviation of 1%, 2%, 3%, 4%, or not more than 5% of the stated value. In this manner, slight variations above and below the stated ranges can be used to achieve substantially the same results as the values within the ranges. In addition, the disclosure of these ranges is intended as a continuous range including every value between the minimum and maximum values.

Unless otherwise indicated, % solids or weight % (wt %) are stated in reference to the total weight of a specific Formulation, emulsion, or solution.

Unless otherwise indicated, the terms "polymer" and "resin" mean the same thing, and include both homopolymers having the same recurring unit along the backbone, as well as copolymers having two or more different recurring units along the backbone. Such polymers or resins include but are not limited to, materials prepared by either condensation, cationic, anionic, Ziegler-Natta, reversible addition-fragmentation chain-transfer (RAFT), or free radical polymerization.

The term "comprising" (and its grammatical variations) as used herein is used in the inclusive sense of "having" or "including" and not in the exclusive sense of "consisting only of."

The terms "a" and "the" as used herein are understood to encompass one or more of the components, i.e., the plural as well as the singular.

The stated "phr" means parts per hundred parts of rubber by weight, and is used in this specification to mean the conventional stated amount in the rubber industry for blend recipes. The dosage of the parts by weight of the individual substances in this context is always based on 100 parts by weight of the total weight of all the rubbers present in the blend. The abovementioned resins are not considered to be a rubber in the context of this disclosure.

A "thermoplastic polymer" refers to a polymer that has no covalently crosslinked sites between individual polymer macromolecules and becomes liquid, pliable, or moldable above a specific temperature, and then it returns to a solid state upon cooling. In many instances, the thermoplastic polymers are also soluble in appropriate organic solvent media.

Unless otherwise indicated, the term "mol %" when used in reference to recurring units in polymers, refers to either the nominal (theoretical) amount of a recurring unit based on the molecular weight of ethylenically unsaturated polymerizable monomer used in the polymerization process, or to the actual amount of recurring unit in the resulting polymer as determined using suitable analytical techniques and equipment.

The term "vulcanized" as used herein means subjecting a chemical composition, such as a polymer, for example an elastomeric and/or thermoplastic polymer composition, to a chemical process including addition of sulfur or other similar curatives, activators, and/or accelerators at a high temperature. (See, for example, WO 2007/033720, WO 2008/083242, and PCT/EP2004/052743). The curatives and accelerators act to form crosslinks, or chemical bridges, between individual polymer chains. Curing agents collectively refer to sulfur vulcanizing agents and vulcanization accelerators. Suitable sulfur vulcanizing agents include, for example, elemental sulfur (free sulfur) or sulfur donating vulcanizing agents that make sulfur available for vulcanization at a temperature of about 140° C. to about 190° C. Suitable examples of sulfur donating vulcanizing agents include amino disulfide, polymeric polysulfide, and sulfur olefin adducts. The polymer compositions described herein that are capable of being vulcanized can in some embodiments also include one or more vulcanizing accelerators. Vulcanizing accelerators control the time and/or temperature required for vulcanization and affect the properties of the vulcanizate. Vulcanization accelerators include primary accelerators and secondary accelerators. Suitable accelerators include, for example, one or more of mercapto benzothiazole, tetramethyl thiuram disulfide, benzothiazole disulfide, diphenyl guanidine, zinc dithiocarbamate, alkylphenol disulfide, zinc butyl xanthate, N-dicyclohexyl-2-benzothiazolesulfenamide, N-cyclohexyl-2-benzothiazole sulfenamide, N-oxydiethylene benzothiazole-2-sulfenamide, N,N-diphenyl thiourea, dithiocarbamyl sulfenamide, N,N-diisopropyl benzothiozole-2-sulfenamide, zinc-2-mercapto toluimidazole, dithio bis(N-methyl piperazine), dithio bis (N-beta-hydroxy ethyl piperazine), and dithio bis(dibenzyl amine). Other vulcanizing accelerators include, for example, thiuram, and/or morpholine derivatives. Further, vulcanized compounds also in some embodiments include one or more silane coupling agents such as, for example, bifunctional organosilanes possessing at least one alkoxy, cycloalkoxy, or phenoxy group on the silicon atom as a leaving group, and as the other functionality, having a group that can optionally undergo a chemical reaction with the double bonds of the polymer after splitting. The latter group may, for example, constitute the following chemical groups: SCN, —SH, —NH2 or —Sx- (where x is from 2 to 8). Thus, vulcanizates, i.e. mixtures to be vulcanized include in some embodiments various combinations of exemplary silane coupling agents such as 3-mercaptopropyltriethoxysilane, 3-thiocyanato-propyl-trimethoxysilane, or 3,3'-bis(triethoxysilylpropyl)-polysulfide with 2 to 8 sulfur atoms such as, for example, 3,3'-bis(triethoxysilylpropyl)tetrasulfide (TESPT), the corresponding disulfide (TESPD), or mixtures of the sulfides with 1 to 8 sulfur atoms having a differing content of the various sulfides, as described in further detail below.

"Weight-average molecular weight (Mn)" is determined using gel permeation chromatography (GPC). Values reported herein are reported as polystyrene equivalent weights.

The term "Mn" when used herein means the number average molecular weight in g/mol, i.e. the statistical average molecular weight of all polymer chains in the sample, or the total weight of all the molecules in a polymer sample divided by the total number of molecules present.

The term "Mz" when used herein means the z-average molecular weight in g/mol and is determined typically by sedimentation equilibrium (ultracentrifugation) and light scattering. Here Mz is determined by gel permeation chromatography (GPC) according to methods described below. Mz is the thermodynamic equilibrium position of a polymer where the polymer molecule becomes distributed according to its molecular size. This value is used in some instances as an indication of the high molecular weight tail in the thermoplastic resin.

"Glass transition temperature (Tg)" is a second order transition and is the temperature range at which amorphous material reversibly changes from a hard, rigid, or "glassy" solid state to a more pliable, compliant, or "rubbery" viscous state, and is measured in degrees Celsius or degrees Fahrenheit. Tg is not the same as melting temperature. Tg can be determined using Differential Scanning calorimetry (DSC) as disclosed below at Example 2.

The terms "end-capped" and "terminally capped" are used interchangeably herein to refer to a terminal or end point of a polymer having a silane group located at the end point or terminus of the polymer. Silane molecules of Formula I can be located at the end point or terminus of a resin polymer, creating an end-capped or terminally capped resin polymer.

The term "pendant" is used herein to indicate that the silane molecule of Formula I can be grafted or attached to, or co-polymerized into a non-terminal position of a polymer, i.e., a position on the backbone of the polymer, not an end-point, to create a multi-derivatized polymer resin. Silane-functionalized moieties of Formula I are attached to pendant positions of a polymer when the polymer chain unit to which the silane-functionalized moiety is attached occupies an internal position from either end of the polymer backbone, whereas end-capped or end-point silane moieties are attached to the ultimate chain unit at either end of the polymer (resin). Polymer types suitable for silane functionalization according to the described methods include, but are not limited to, pure monomer thermoplastic resin (PMR), C5 thermoplastic resin, C5/C9 thermoplastic resin, C9 thermoplastic resin, terpene thermoplastic resin, indene-coumarone (IC) thermoplastic resin, dicyclopentadiene (DCPD) thermoplastic resin, hydrogenated or partially hydrogenated pure monomer (PMR) thermoplastic resin, hydrogenated or partially hydrogenated C5 thermoplastic resin, hydrogenated or partially hydrogenated C5/C9 thermoplastic resin, hydrogenated or partially hydrogenated C9 thermoplastic resin, hydrogenated or partially hydrogenated dicyclopentadiene (DCPD) thermoplastic resin, terpene thermoplastic resin, modified indene-coumarone (IC) thermoplastic resin.

Silane Functionalization of Resins

Disclosed are resins that are functionalized to include silane molecules comprising various appendages. The functionalized resins disclosed herein possess different structures and can be manufactured or synthesized using numerous methodologies, approaches, and strategies. For instance, several possible synthetic routes to the functionalized resins disclosed herein are schematically shown in FIGS. 1A through 1M. That is, FIG. 1A through FIG. 1M provide schematic descriptions of several exemplary embodiments of synthesis strategies to derive the silane-containing resins disclosed herein.

As a non-limiting example thereof, phenol-containing resins with either in-chain pendant functionality from co-polymerization with acetoxystyrene or functional monomers can be used to provide the starting material for silane functionalization. Resins employed as starting material can include any one or more of known styrene-based resins or poly(alpha-methyl)styrene (AMS) resins, for example. Other resins that are employed as starting materials and that are functionalized according to the disclosed embodiments herein include any known to one of skill, including fully hydrogenated resins, partially hydrogenated resins, and resins that are not hydrogenated. For example, suitable resins known in the art and useful as starting material for the disclosed processes for manufacturing silane-functionalized resins include, but are not limited to, pure monomer thermoplastic resin (PMR), C5 thermoplastic resin, C5/C9 thermoplastic resin, C9 thermoplastic resin, hydrogenated or partially hydrogenated pure monomer (PMR) thermoplastic resin, hydrogenated or partially hydrogenated C5 thermoplastic resin, hydrogenated or partially hydrogenated C5/C9 thermoplastic resin, hydrogenated or partially hydrogenated C9 thermoplastic resin, hydrogenated or partially hydrogenated dicyclopentadiene (DCPD) thermoplastic resin, terpene thermoplastic resin, and indene-coumarone (IC) thermoplastic resin.

As a further non-limiting example of the general synthetic strategies that can be employed to obtain the disclosed silane-functionalized resins, end-capped resins with phenol end groups can be used in these same synthetic reactions, leading to resins having one or multiple terminal functionalization groups. As another exemplary embodiment, phenol groups can be reacted in a Williamson ether synthetic route followed by a mixed anhydride reaction to yield silane-containing resins as in FIG. 1C. Reaction of phenol-based resins with an anhydride-containing silane was also successful. Other synthetic strategies yield pendant functionalized resins that can yield the desired degree of functionalization at internal positions.

Functionalized resins can be in the form of block copolymer and alternatively, silane moieties of the functionalized resin can occur randomly throughout the polymer, distributed more or less evenly throughout the resin backbone. That is, non-limiting examples of functionalized resins disclosed herein includes resins formed by a block copolymer method, as well as functionalization of already formed resins, thereby creating a resin that has random monomers functionalized throughout the resin backbone. Further, functionalized resins disclosed herein can be synthesized starting from resin monomers, where the resin monomers are reacted with silane moieties directly to form functionalized resin in one step, as depicted in Scheme 5. Functionalized resins can also be synthesized by starting with fully formed resins, such as those disclosed in Schemes 1-4, Examples 1 and 2, below.

The silane-functionalized resins disclosed herein possess the following general chemical structure of Formula I, where "resin" represents the backbone of the resin, as shown for example in FIGS. 1A to 1E and FIG. 1G to 1M:

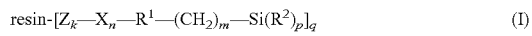

$$\text{resin-}[Z_k\text{—}X_n\text{—}R^1\text{—}(CH_2)_m\text{—}Si(R^2)_p]_q \quad (I)$$

wherein Z is an aromatic group or an aliphatic group optionally containing a heteroatom;

wherein X is a linker comprising a heteroatom selected from sulfur, oxygen, nitrogen, a carbonyl group, or a combination thereof;

wherein $R^1$ comprises one or more of an aliphatic and/or aromatic $C_1$ to $C_{18}$ and/or a linkage group comprising a heteroatom;

wherein each $R^2$ is the same or different and is independently selected from a $C_1$ to $C_{18}$ alkoxy, aryloxy, alkyl, aryl, or H, or OH, and is optionally branched, and wherein at least one $R^2$ is $C_1$ to $C_{18}$ alkoxy, aryloxy, or H, or OH;

wherein q is an integer from of at least 1;
wherein k is an integer of 0 or 1;
wherein n is an integer from 1 to 10;
wherein m is an integer from 0 to 10; and,
wherein p is 1, 2, or 3.

Typically, the carbon chain linker between heteroatom group $R^1$ and the silane group $Si(R^2)_p$ is a methylene group, but a shorter or longer carbon chain linker can also be used. Urethane linkages are formed by reaction of phenol or hydroxyl group containing resins with silane based isocyanates (triethoxysilylpropyl isocyanate) producing a functionalized resin with the Formula: resin-OCONH—$(CH_2)_3$—$Si(OCH_2CH_3)_3$. Reacting phenol or hydroxyl based resins with anhydride silanes, for example, 3-(triethoxysilyl)propyl succinic anhydride, results in the formation of ester linkages to form a functionalized resin having the formula: resin-O—CO—CH($CH_2$COOH)(($CH_2$)$_3$—Si($OCH_2CH_3$)$_3$). Ester linkages to the resin may also be obtained through esterification or transesterification. Ether linkages with oxygen to the backbone can be derived via a Williamson ether synthesis of resin-OH directly with alkylhalide functionalized silanes, for example, Cl—$(CH_2)_3$Si$(OCH_2CH_3)_3$, to form resin-O—$(CH_2)_3$—Si$(OCH_2CH_3)_3$. With other reagents, such as sodium chloroacetate, postmodification after the Williamson ether synthesis is required to obtain silane functionalized resins, for example by resin-O—$CH_2$COOH reaction with ethyl chloroformate and 3-(aminopropyl)triethoxysilane to form resin-O—$CH_2$CO—NH—$(CH_2)_3$—Si$(OCH_2CH_3)_3$. Any rosin acid-resin copolymers or any resin-COOH can be functionalized with ethyl chloroformate and 3-(aminopropyl)triethoxysilane to form resin-CO—NH—$(CH_2)_3$—Si$(OCH_2CH_3)_3$. For example, resin-COOH can be obtained by grafting of succinic anhydride onto styrene or alpha-methyl styrene using a Lewis acid catalyst to form resin-CO—$(CH_2)_2$—COOH. Further functionalization yields resin-CO—$(CH_2)_2$—CO—NH—$(CH_2)_3$—Si$(OCH_2CH_3)_3$. Maleic anhydride can be grafted onto resins containing unsaturation to obtain resin-CO—NH—$(CH_2)_3$—Si$(OCH_2CH_3)_3$ through ring-opening of the anhydride with triethoxysilylpropyl amine.

The copolymers could include any number of other comonomers but most likely include either a resin of styrene or alpha-methyl styrene, or mixtures thereof. This is a preferred embodiment that the resin includes styrene and/or alpha-methyl styrene, or mixtures thereof. The phenol attachment to the resin can be at any location on the ring, such as and including, para, ortho, and meta.

In a typical embodiment, Z is an aromatic group, more typically a 6-membered aromatic group. In another typical embodiment, Z is a saturated or unsaturated cyclo-aliphatic group. Further, the variable Z can contain one or more heteroatoms as disclosed in the scheme presented in FIG. 1F. The heteroatom can be one or more of oxygen, sulfur, and/or nitrogen.

In yet another typical embodiment, X is oxygen or a carbonyl. In a further embodiment, X can be sulfur. In a particular embodiment, the vinylaromatic monomer can be a styrene or alpha-methylstyrene, or mixtures thereof. In another particular embodiment, the heteroatom-containing linkage group X is comprises a para-, meta-, or ortho-attached phenol, a hydroxyl, an amine, an imidazole, an amide, a carboxylic acid, an isocyanate, a urethane, a urea, a ketone, an anhydride, an ester, an ether, a thioether, a sulfoxide, a sulfone, a sulfonamide, a sulfonium, an ammonium, a maleimide, or pyridinium linkers to covalently attach a silane group, and/or a carbonate ester. In yet another particular embodiment, $X_nR^1$—$(CH_2)_m$ comprises one or more groups containing a urethane, an ester, an ether, a ketone, an amide, and a propyl.

Typically, each $R^2$ is the same or different and is independently selected from a $C_1$ to $C_{18}$ alkoxy, aryloxy, alkyl, aryl, or H, or OH, and is optionally branched, and wherein at least one $R^2$ is $C_1$ to $C_{18}$ alkoxy, aryloxy, or H, or OH.

Silane-containing groups grafted onto the resins disclosed herein can be located at the ends of the polymer resin units, i.e. end-capped, or randomly distributed along the polymer backbone, i.e. at a pendant position within the polymer resin, or any combination thereof, i.e. both end-capped and pendant. In an end-capped functionalized resin embodiment, the amount of silane-containing groups grafted onto the functionalized resin is from 0.001 to 100 mol %, more commonly 0.1 to 50 mol %, and most commonly 0.1 to 30 mol %, from 0.1 to 25 mol %, 0.1 to 20 mol %, 0.1 to 15 mol %, 0.1 to 10 mol %, or 0.1 to 9 mol %. In one embodiment, the amount of silane-containing groups grafted onto the resin is of from 0.01 to 30 mol %.

In another embodiment, the silane-containing group of Formula I is located at one or more pendant positions within the polymer. In such embodiments, an amount of silane-containing groups grafted onto the resins is about 0.0001 to about 100 mol %, about 0.1 to about 30 mol %, about 0.1 to about 50 mol %, or about 0.1 to about 100 mol %.

In another non-limiting embodiment, more than one silane functional group, i.e., —$R^1$—$(CH_2)_m$—Si$(R^2)_p$, is attached to the same linker group X, or The silane groups on the same linker group can be the same or different. Further, the functionalized resins disclosed herein encompass $R^1$ and X moieties that contain branch points that can also contain one or more silane functionalizations (see, for example, Scheme 3 of Example 1.3, below).

With particularity, the resin can have a molecular weight (Mw) of from 200 to 200,000 g/mol, more commonly 200 to 175,000 g/mol, more commonly 200 to 150,000 g/mol, from 200 to 125,000 g/mol, from 200 to 100,000 g/mol, from 200 to 75,000 g/mol, and most commonly from 200 to 50,000 g/mol. In another typical embodiment, the resin has a molecular weight of from 400 g/mol to 200,000 g/mol, more commonly 400 to 175,000 g/mol, more commonly 400 to 150,000 g/mol, from 400 to 125,000 g/mol, from 400 to 100,000 g/mol, from 400 to 75,000 g/mol, and most commonly 400 to 50,000 g/mol. In yet another typical embodiment, the resin has a molecular weight of from 400 to 25,000 g/mol.

In another embodiment, the resin can have any polydispersity index (PDI) of from 1 to 10, 1 to 9, 1 to 8, 1 to 7, 1 to 6, 1 to 5, 1 to 4, 1 to 3, or 1 to 2. In another typical embodiment, the resin can have any molecular weight or PDI but must have a Tg low enough to compound with rubber formulations at 150 to 160° C. and must compound with various rubbers or mixtures of rubbers and other additives at this temperature.

In an embodiment, the resin has a glass transition temperature Tg below 200° C. In another embodiment, the Tg is under 190° C., 180° C., 170° C., 160° C., 150° C., 140° C., 130° C., 120° C., 110° C., 100° C., 90° C., 80° C., 70° C., 60° C., 50° C., 40° C., 30° C., 20° C., 10° C., 0° C., −5° C., −10° C., −15° C., −20° C., −25° C., or −30° C. More particularly, in one embodiment, the Tg is no less than −10° C. In another embodiment, the Tg is not higher than 70° C.

In another embodiment, the resin comprises one or more terminal functional groups —[$Z_k$—$X_n$—$R^1$—$(CH_2)_m$—Si$(R^2)_p$]$_q$. Moreover, the resin is typically functionalized with one or multiple (q) moieties $Z_k$—$X_n$—$R^1$—$(CH_2)_m$—Si$(R^2)_p$ bound pendant to a backbone of the resin in a random, segmented, or block structure. In another embodiment, the side chains are end-capped. In yet another embodiment, the side chains are a mixture of end-capped and pendant.

With particularity, the functionalized resin is bound to a silica particle via a Si—O—Si link following hydrolysis of at least one —$R^2$ group. Also with particularity, a functionalized resin molecule is linked to a second functionalized resin molecule via a Si—O—Si link following hydrolysis of at least one —$R^2$ group. Further, bridged side chains can be formed in which the Si group is covalently bound to itself through the one, two, or three $R^2$ groups.

In a typical embodiment, $R^1$ is —O—CO—NH—$R^3$—$(CH_2)_2$—, O—CO—$R^3$—$(CH_2)_2$—, —O—$CH_2$—$R^3$—$(CH_2)_2$—, —CO—$R^3$—$(CH_2)_2$—, —CO—NH—$R^3$—$(CH_2)_2$—, or a mixture thereof, and $R^3$ is an aliphatic or aromatic $C_1$ to $C_8$ carbon chain, optionally branched, and/or optionally comprising one or more heteroatoms. Preferably, $R^3$ is an aliphatic or aromatic $C_1$ to $C_8$ carbon chain.

In general Formula I, n can be an integer from 1 to 10, 1 to 9, 1 to 7, 1 to 6, 1 to 5, 1 to 4, 1 to 3, or 1 to 2. Furthermore, the variable m can be any integer from 0 to 10, 1 to 10, 2 to 10, 3 to 10, 4 to 10, 5 to 10, 6 to 10, 7 to 10, 8 to 10, or 9 to 10. The variables n and m can separate by any range of integers between these as well, such as 1 to 2, 2 to 3, 3 to 4, 4 to 5, 5 to 6, 6 to 7, 7 to 8, 8 to 9, or 9 to 10, or any other range therein. Particularly, m can be from 0 to 3, from 1 to 3, or from 2 to 3.

Formula I encompasses several preferred embodiments. As an example, a few non-limiting embodiments of the functionalized resin comprise the following structures:

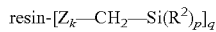

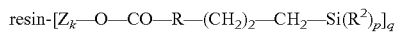

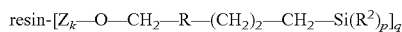

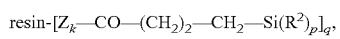

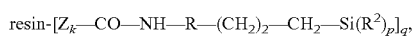

where Z is an aromatic or aliphatic containing group and the number of silane attachments, and "q" can be any integer of at least 1, but typically is 1 to 20, 1 to 19, 1 to 18, 1 to 17, 1 to 16, 1 to 15, 1 to 14, 1 to 13, 1 to 12, 1 to 11, 1 to 10, 1 to 9, 1 to 8, 1 to 7, 1 to 6, 1 to 5, 1 to 4, 1 to 3, or 1 to 2, and where the silane functional groups are attached at the end or pendant to the resin chain, or a mixture thereof. In these embodiments, k can be an integer of 0 or 1.

Other non-limiting embodiments of functionalized resins can include, for instance, the following structures:

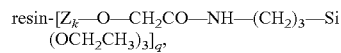

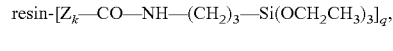

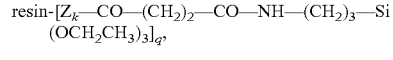

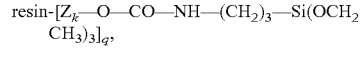

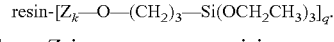

where Z is a group comprising an aliphatic or aromatic group, for example a styrene or a benzene ring structure or alternatively containing a long $C_1$ to $C_{18}$ aliphatic chain, and where the number of silane attachments "q" can be any number but typically 1 to 20, 1 to 19, 1 to 18, 1 to 17, 1 to 16, 1 to 15, 1 to 14, 1 to 13, 1 to 12, 1 to 11, 1 to 10, 1 to 9, 1 to 8, 1 to 7, 1 to 6, 1 to 5, 1 to 4, 1 to 3, or 1 to 2, attached at the end, or pendant to the resin chain, or a mixture thereof. In these embodiments, k can be an integer of 0 or 1.

Additional preferred, non-limiting, exemplary embodiments of the disclosed silane functionalized resins possess the following general structure: resin-[$Z_k$—$X_n$—$R^1$—$(CH_2)_m$—Si$(R^2)_p$]$_q$:

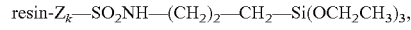

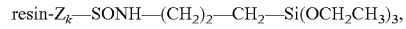

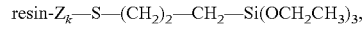

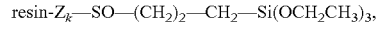

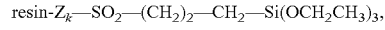

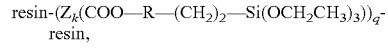

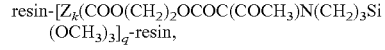

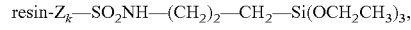

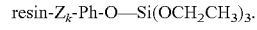

Further exemplary silane structures can be obtained, and thereby provide further silane-functionalized resins, resulting from sol-gel chemistry with hydrolysis or substitution of Si$(R^2)_p$ with Si$(OH)_n$, where n is an integer from 1 to 3 for one or more of the silane $R^2$ groups. After hydrolysis, condensation of any two Si$(OH)_n$ groups can occur to form Si—O—Si structures linking resin-to-resin, resin-to-other commercial silanes, resin to functionalized rubber grades, or resin-to-filler. The $R^2$ group on —Si$(R^2)_p$ can be selected, for example, as a heteroatom containing or carbon chain linker to another similar resin, a linker to another type of silane-functionalized resin, a linker to an additional small molecule silane or a silane polysulfide can be used, for example, bis[3-(triethoxysilyl)propyl]tetrasulfide (for instance, Si69®, Evonik Industries AG, Essen, Germany) or bis[3-(triethoxysilyl)propyl] disulfide (for instance, Si266®, Evonik Industries AG, Essen, Germany), a linkage to a filler particle, or a linkage to a functionalized rubber grade. These non-limiting exemplary structures include Si—O—Si bonds. Any known combination of condensed resin to resin is possible, i.e. inter-chain bond formation between two different silane-containing groups, and/or intra-chain bond formation within the same silane-containing group, resin to other silane, resin to functionalized rubber grade, or resin to filler structures are possible whereby Si(OH) condenses to Si—O—Si to connect two Si-containing groups. In another embodiment, the functionalized resins can include an aromatic group (Ar) as the Z-group, for example, resulting in the structures resin-Ar—O—$R^1$—$(CH_2)_m$—$Si(R^2)_p$ or resin-Ar—CO—$R^1$—$(CH_2)_m$—$Si(R^2)_p$.

In another non-limiting embodiment, X is an oxygen atom and the phenol group comes from the resin synthesis with phenol as a chain terminating reagent, or use of acetoxystyrene co-monomer to derive hydroxystyrene-containing resins. The carbonyl (C=O) group attachment can come from, for example, a group grafted onto a styrene or alpha-methyl styrene using succinic anhydride, or another anhydride and a Lewis acid catalyst, such as aluminum chloride. Exemplary embodiments in which X is a carbonyl (C=O) can be obtained from several possible methods, for instance grafting maleic anhydride onto the backbone of an unsaturated C5 or C5 copolymerized resin.

Compositions Comprising Silane-Functionalized Resins

The functionalized resins described above can be incorporated into various chemical compositions with numerous applications. The chemical compositions are, for example, solvent borne, waterborne, emulsions, 100% solids, or hot melt compositions/adhesives. For instance, the alkoxy silane low molecular weight polymers (Mw <30000) can be blended with other polymers. More specifically, in one embodiment, various thermoplastic polymers and elastomers, such as ethylene-vinyl acetate (EVA) or poly(ethylene-vinyl) acetate (PEVA) compounds, various polyolefins and alpha-polyolefins, reactor-ready polyolefins, thermoplastic polyolefins, elastomers (such as styrene-butadiene rubber (SBR), butadiene rubber (BR), and natural rubber), polyesters, styrene block copolymers, acrylics, and acrylates can be blended with the disclosed functionalized resins. Provided below are several non-limiting examples of how the disclosed functionalized resins can be incorporated into various products to impart on these products beneficial and useful properties not previously available.

In one embodiment, the functionalized resin is blended with an alkoxysilane low molecular weight polymer that can be used as an additive to be utilized in the same way a typical low molecular weight polymer would be used. The presence of the functionalized resins disclosed herein in a composition with an alkoxysilane low molecular weight polymer enhances processability (higher melt flow rate, lower viscosity), and promotes adhesion. The alkoxysilane low molecular weight polymer further reacts after processing, thereby resulting in a cross-linked polymer that increases performance of a final article incorporating such a blended resin with regards to temperature resistance and chemical resistance. If the polymer being modified has alkoxysilane functionality, the low molecular weight polymer can graft to the polymer being modified in addition to cross-linking with itself. Additionally, the ability to further react is beneficial in filled systems (particles, fibers, etc.) where the alkoxysilane chemically bonds to surface groups on the various fillers.

In another embodiment, a styrene-ethylene/butylene-styrene block copolymer (e.g., Kraton® G1650, Kraton Polymers U.S., LLC, Houston, Tex., US) is blended/processed with about 20% by weight of an alkoxysilane functionalized polystyrene at a temperature below activation of the hydrolysis and crosslinking of the alkoxysilane. The blend can optionally include other additives, such as, for instance, thermoplastic polymers, oils, and fillers. After processing into an article (film, fiber, profile, gasket, PSA tapes, molded handles, sealants, etc.), the article is exposed to temperatures sufficient to induce hydrolysis and subsequent reaction of the alkoxysilane. For thermoplastic elastomer applications like film, fiber profiles, and gaskets, there is an improvement in high temperature compression set and chemical resistance. For tape applications, the chemical crosslinking can be triggered in the same way with an increase in shear resistance, shear adhesive failure temperature, and chemical resistance.

In another embodiment, disclosed are disposable hygiene articles comprising an adhesive comprising the disclosed silane-functionalized resins that exhibit improved adhesive strength and cohesive strength by improved values in peel adhesion testing of the laminate construction, improved peel adhesion after aging at body temperature, reduced creep of elastic strands over time, and improved core stability in a final hygiene article, as compared to such articles without the disclosed silane-functionalized resins. Said articles possess improved chemical resistance and barrier properties, particularly regarding exposure to fluids such as body fluids.

The polymer compositions further optionally include polyolefins comprising amorphous or crystalline homopolymers or copolymers of two or more different monomers derived from alpha-mono-olefins having from 2 to about 12 carbon atoms, or from 2 to about 8 carbon atoms. Non-limiting examples of suitable olefins include ethylene, propylene, 1-butene, 1-pentene, 1-hexene, 2-methyl-i-propene, 3-methyl-i-pentene, 4-methyl-i-pentene, 5-methyl-i-hexene, and combinations thereof. Additional suitable polyolefins include, but are not limited to, low density polyethylene, high-density polyethylene, linear-low-density polyethylene, poly-propylene (isotactic and syndiotactic), ethylene/propylene copolymers, polybutene, and olefinic block copolymers. Polyolefin copolymers also include the greater part by weight of one or more olefin monomers and a lesser amount of one or more non-olefin monomers, such as vinyl monomers including vinyl acetate, or a diene monomer, EPDM, and the like. Generally, a polyolefin copolymer includes less than about 30 weight percent of a non-olefin monomer, less than 20 weight percent, or less than about 10 weight percent of a non-olefin monomer. Polyolefin polymers and copolymers are commercially available from sources including, but not limited to, Chevron, Dow Chemical, DuPont, Exxon Mobil, REXtac, LLC, Ticona, and Westlake Polymer under various designations.

Migration and volatilization of low molecular weight components of currently commercially available thermoplastic resins used to modify elastomeric compounds such as adhesives, thermoplastic elastomer (TPE) compounds, molding compounds, mastics, etc. causes release of unpleasant odors, volatiles, fogging, product defects, reduced product cohesive strength, reduced adhesion, and degradation of performance over time.

TPE compositions incorporating the silane-functionalized, or modified, resins described herein are in some embodiments formed into a variety of articles as well understood by those of ordinary skill in the art. For example, TPE compositions are reprocessed, such as by being pressed, compression molded, injection molded, calendared, thermoformed, blow-molded, or extruded into final articles and embodiments thereof. When reprocessing TPE compositions, the composition is generally heated to a temperature of at least the softening or melting point of the thermoplastic component of the TPE composition in order to facilitate further forming into desired articles of various shapes and sizes. The end user of the TPE compositions will benefit by the processing advantages described throughout this disclosure.

Any polymer known in the art can be mixed with the silane-functionalized resins described herein to create compositions useful in various end products such as adhesives, described herein. For instance, in one embodiment, TPEs include, but are not limited to, block copolymers thermoplastic/elastomer blends and alloys, such as styrenic block copolymers (TPE-S), metallocene-catalyzed polyolefin polymers and elastomers, and reactor-made thermoplastic polyolefin elastomers. Block copolymers include, but are not limited to, styrenic block copolymer, olefin block copolymer, co-polyester block copolymer, polyurethane block copolymer and polyamide block copolymer. Thermoplastic/elastomer blends and alloys include, but are not limited to, thermoplastic polyolefins and thermoplastic vulcanizates. Two-phase TPEs are in some embodiments combined with the disclosed modified thermoplastic resins in these end use applications described herein. TPE-S copolymers include, but are not limited to, styrene-butadiene-styrene block copolymer (SBS), styrene-ethylene/butylene-styrene block copolymer (SEBS), styrene-ethylene-ethylene/propylene-styrene block copolymer (SEEPS), and styrene-isoprene-styrene block copolymer (SIS).

That is, the disclosed modified silane resins are used in some embodiments to modify the properties of thermoplastic elastomer (TPE) compositions. Embodiments therefore include TPE compositions comprising at least one thermoplastic elastomer and at least one modified silane resin. Earlier versions of TPEs are thermoset rubbers that can also be utilized in such compositions. TPEs are known to be widely used in various industries to modify the properties of rigid thermoplastics, imparting improvements in impact strength. This is quite common for sheet goods and general molding TPEs. Thus, addition of the modified silane resins described herein to these compositions imparts further excellent properties to these compositions and their standard end uses.

The TPE compositions comprising the disclosed silane-functionalized resins incorporate any TPE known in the art. In one embodiment, TPEs include at least one or a combination of block copolymers, thermoplastic/elastomer blends and alloys thereof, metallocene-catalyzed polyolefin polymers and elastomers, and reactor-made thermoplastic polyolefin elastomers. Block copolymers include, but are not limited to, styrenic block copolymer, copolyester block copolymer, polyurethane block copolymer, and polyamide block copolymer. Thermoplastic/elastomer blends and alloys useful in such compositions include, but are not limited to, thermoplastic polyolefins and thermoplastic vulcanizates.

Various known TPE types, such as block copolymers and thermoplastic/elastomer blends and alloys, are known as two-phase systems. In such systems, a hard thermoplastic phase is coupled mechanically or chemically with a soft elastomer phase, resulting in a TPE that has the combined properties of the two phases.

Styrenic block copolymers (TPE-S) are based on a two-phase block copolymer with hard and soft segments. Exemplary styrenic block copolymers include, but are not limited to, styrene-butadiene-styrene block copolymer (SBS), styrene-ethylene/butylene-styrene block copolymer (SEBS), styrene-ethylene-ethylene/propylene-styrene block copolymer (SEEPS), styrene-isoprene-styrene block copolymer (SIS). Styrene-butadiene-styrene is known to be commonly incorporated into compositions for use in footwear, adhesives, bitumen modification, and lower specification seals and grips, where resistance to chemicals and aging is not a focus of the end use. Monoprene®, Tekron®, and Elexar® products from Teknor Apex Company (Pawtucket, R.I., US) are examples of fully formulated TPE-S compounds that are hydrogenated styrenic block copolymers. Styrene-[ethylene-(ethylene/propylene)]-styrene (SEEPS) block copolymer is available from Kuraray Co., Ltd, Tokyo, Japan. Styrene-ethylene/butylene-styrene (SEBS) block copolymer is commercially available from Kraton Performance Polymers.

Table 1 presents expected performance enhancements from incorporation of silane functionalized resins in various applications where such attributes are likely to be advantageous. Upper case "X" in Table 1 indicates an attribute that is likely achievable by incorporation of the silane functionalized resins disclosed herein into indicated compositions and that are desirable in each application.

TABLE 1

| Applications | Attributes | | | | | | | | | | | |
|---|---|---|---|---|---|---|---|---|---|---|---|---|
| | Adhesive strength | Cohesive strength | Enhanced process-ability | Heat resis-tance | Compat-ibility with filled systems | Chemical resistance | Barrier proper-ties | Fire resis-tant | Noise and vibration damping | Dimensional stability | different electrical properties | Different radiation absorptive properties |
| TPE compounds | X | X | X | X | X | X | X | X | X | X | X | X |
| Pressure sensitive adhesives | X | X | X | X | X | X | | X | X | | X | X |
| Disposable (Hygiene particularly elastic adhesives) | X | X | X | | | X | X | | | | | |
| Packaging adhesives | X | X | X | X | | X | | | | | | |
| Laminating adhesives | X | X | X | X | | X | X | | | | X | X |

TABLE 1-continued

| Applications | Adhesive strength | Cohesive strength | Enhanced processability | Heat resistance | Compatibility with filled systems | Chemical resistance | Barrier properties | Fire resistant | Noise and vibration damping | Dimensional stability | different electrical properties | Different radiation absorptive properties |
|---|---|---|---|---|---|---|---|---|---|---|---|---|
| Heat seal coatings/adhesives | X | X | X | X |  | X | X |  |  |  |  |  |
| Sealants/gaskets | X | X | X | X | X | X | X | X | X | X | X | X |
| Investment casting wax |  |  | X | X | X |  |  |  |  | X |  |  |
| Structural adhesives | X | X | X | X | X | X | X | X | X | X | X | X |
| Cementitious adhesives | X | X | X | X | X | X | X |  | X | X |  | X |
| Textile sizing (woven, nonwoven) | X | X | X | X |  | X |  | X |  |  |  |  |

Polymer modification applications for thermoplastic elastomers using the described silane-functionalized resins include, but are not limited to, roofing applications (especially asphalt modifiers in modified bitumen roofing), water proofing membranes/compounds, underlayments, cable flooding/filling compounds, caulks and sealants, polymer compounds/blends, films, e.g., cling films, TPE films, and the like, molded articles, rubber additive/processing aids, carpet backing, e.g., high performance precoat, thermoplastic compound, and the like, wire and cables, power and hand tools, pen grips, airbag covers, grips and handles, seals, and laminated articles, e.g., paper lamination, water activated, hot melt gummed, scrim reinforced tape, and the like. When the silane-functionalized resins described herein are incorporated into such end-use applications, the silane-functionalized resin is in some instances the sole resin in the composition. In other embodiments, the silane-functionalized resin is combined with other resins, elastomers/polymers, and/or additives. In such end-use embodiments, the aforementioned compositions comprise at least 1, 2, 3, 4, 5, 10, 15, 20, 25, 30, 35, 40, 45, 50, 55, or 60 and/or not more than 99, 95, 90, 85, 80, 75, 70, or 65 weight percent of at least one silane-functionalized resin.

Thus, other embodiments include adhesives used in packaging, product assembly, woodworking, automotive assembly, and other applications that are composed of ethylene vinyl acetate, ethylene-butyl-acrylate, semi-crystalline single-site catalyzed (metallocene) polyolefins, amorphous poly alpha-olefins such as Ziegler-Natta catalyzed polymers, acrylics, and styrene block copolymers. These products can exhibit improved adhesive and cohesive strength as measured by peel adhesion failure temperature (PAFT) testing, fiber tear testing, peel testing on adhered structures, shear adhesion failure temperature (SAFT) testing, IoPP (Institute of Packaging Professionals) test T-3006 Heat Stress Resistance of Hot Melt Adhesives, and shear hold power. Said adhesive embodiments comprising the disclosed functionalized resins can exhibit improved heat resistance as evidenced by fiber tear or peel adhesion testing at elevated temperatures such as 60° C. Improved chemical resistance may be shown by reduced degradation of adhesive and cohesive strength after exposure to selected chemicals.

Compositions comprising the disclosed functionalized resins can act as barriers to plasticizer migration, as evidenced to adhesion characteristics over time, as compared to compositions not including the disclosed functionalized resins, particularly after heat aging, as evidenced by any of the test methods above: PAFT, SAFT, peel, fiber tear, and shear hold power at and above room temperature. Similarly, said compositions adhere well to difficult surfaces or to substrates with migratory components (e.g. slip aids or plasticizers), as evidenced by the above listed adhesion tests, as compared with adhesives that do not contain the disclosed functionalized resins.

Investment casting wax compositions comprising the disclosed functionalized resins possess excellent rheology for consistent production of parts, as evidenced by the composition rheology (stress-strain curves). Outstanding performance in dimensional stability of the wax casting composition and casting composition stability during mold making are evidenced by improved tolerances on the cast product.

In another embodiment, compositions comprising the functionalized resins include heat seal coatings and adhesives that exhibit excellent heat resistance according to peel adhesion testing at temperatures near and above the sealing temperatures using ASTM F88.

In a further embodiment, disclosed are sealant compositions comprising the disclosed functionalized resins that exhibit reduced fogging of sealed windows after aging as compared with the performance of sealants not comprising the disclosed functionalized resins.

The excellent structural stability of sealants and gaskets and other rubber-based materials comprising the disclosed functionalized resins is evidenced by dimensional stability measurements following compression or elongation, as compared with sealants and gaskets and other rubber-based materials not comprising the disclosed functionalized resins.

Vibration and sound damping improvement can be measured by ASTM E756 for sealants, gaskets, structural adhesives, cementitious, bitumen and asphalt adhesives, thermoplastic elastomer (TPE) compounds and pressure sensitive adhesives.

Also provided are compositions such as mastics containing bitumen, asphalt, or similar materials, that contain the disclosed functionalized resins. Such compositions have lower viscosity than compositions not comprising the disclosed functionalized resins, thereby allowing easier processing, while exhibiting excellent adhesion to aggregate components, fillers, and substrates, such as stone or cement, as evidenced by tensile testing on adhered stone or cement samples. Such mastics find application in the production of bridge decking, flooring, road construction, and roofing.

In another embodiment, pressure sensitive adhesives (PSAs, tape, label, graphics protective films, window film) are provided that comprise the disclosed functionalized resins.

One problem associated with pressure-sensitive adhesives (PSAs) based on tackified elastomeric blends is diffusion and migration of tackifiers and other species from the adhesive composition or article components into the facestock or substrate. As a result, the facestock or substrate may become stained over time and the construction may lose some adhesion. This migration or bleed through of some or all components of an adhesive, compounded film, or other composition comprising thermoplastic resins can also leave a residue on the bonded surface upon removal, such as with protective films, or can cause undesired surface contamination, skin irritation, etc. More critical to adhesive applications, compounds comprising thermoplastic resins or multilayer films, the migration or "bleed through" of chemical components towards the bonded interfaces, e.g. adhesive-substrate or film-adhesive-nonwoven, can cause immediate or delayed reduction or elimination of bond strength, damage to the bonded or laminated article, and/or reduction of adhesion with aging.

The aforementioned compositions comprising the silane-functionalized thermoplastic resins in some embodiments further comprise at least one polymer and about 0 to about 75 wt % un-modified thermoplastic tackifying resin. In another embodiment, the adhesive composition comprises at least one thermoplastic elastomer and at least one thermoplastic resin, in addition to the silane-functionalized resin. The thermoplastic elastomer can, for instance be one or more of hydrogenated and/or nonhydrogenated styrenic block copolymers including, but not limited to, styrene-butadiene-styrene block copolymer (SBS), styrene-ethylene/butylene-styrene block copolymer (SEBS), styrene-[ethylene-(ethylene/propylene)]-styrene block copolymer (SEEPS), and/or styrene-isoprene-styrene block copolymer (SIS). In another embodiment, the adhesive compositions described herein exhibit a viscosity at 177° C. of about 50 to about 10,000 cP, and a softening point of about 60 to about 180° C. and are suitable adhesives.

In the composition embodiments described herein, the adhesive compositions can comprise at least 1, 2, 3, 4, 5, 10, 15, 20, 25, 30, 35, 40, 45, 50, 55, or 60 and/or not more than 99, 95, 90, 85, 80, 75, 70, or 65 weight percent of at least one modified thermoplastic resin.

In various embodiments, the compositions comprise 10, 20, 30, or 40 and/or not more than 90, 80, 70, or 55 weight percent of at least one polymer component. Exemplary polymer components of the disclosed compositions include, but are not limited to, ethylene vinyl acetate copolymer, ethylene n-butyl acrylate copolymer, ethylene methyl acrylate copolymer, polyester, neoprene, acrylics, urethane, poly(acrylate), ethylene acrylic acid copolymer, polyether ether ketone, polyamide, styrenic block copolymers, random styrenic copolymers, hydrogenated styrenic block copolymers, styrene butadiene copolymers, natural rubber, polyisoprene, polyisobutylene, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, and various C4-C10 alpha-olefin monomers, polypropylene polymers, functional polymers such as maleated polyolefins, butyl rubber, polyester copolymers, copolyester polymers, isoprene, the terpolymer formed from the monomers ethylene, propylene, and a bicyclic olefin (known as "EPDM"), isoprene-based block copolymers, butadiene-based block copolymers, acrylate copolymers such as ethylene acrylic acid copolymer, butadiene acrylonitrile rubber, and/or polyvinyl acetate.

The compositions disclosed herein, in various embodiments, contain polymer, tackifier resin, and other additives such as, but not limited to, oils, waxes, plasticizers, antioxidants, and fillers, depending on the end use application. In various embodiments, the compositions comprise at least about 5, 10, 15, 20, 25, 30, 35, 40, 45, or 50, and/or not more than 500, 450, 400, 350, or 300 parts of polymer, tackifier resin, and/or other additives per 100 parts of modified thermoplastic resin. For example, in one embodiment, the compositions disclosed herein contain about 50 to about 300 parts of elastomer per 100 parts of silane-functionalized resin.

As noted above, in some embodiments, the described compositions comprise additives particularly suitable for a specific end-use application. For example, if the adhesive is intended to serve as a hot melt packaging adhesive, as noted above, then in this embodiment, the composition will further comprise a wax. In some embodiments, the adhesive composition comprises at least 1, 2, 5, 8, or 10 and/or not more than 40, 30, 25, or 20 weight percent of at least one wax. In another embodiment, the compositions described herein comprise about 1 to about 40, about 5 to about 30, about 8 to about 25, or about 10 to about 20 weight percent of at least one wax. Suitable waxes include, without limitation, microcrystalline wax, paraffin wax, waxes produced by Fischer-Tropsch processes, vegetable wax, functionalized waxes (maleated, fumerated, or wax with functional groups), and the like. In such embodiments, a wax is included in the composition in an amount of between about 10 and about 100 parts wax per 100 parts of the polymer component.

In pressure sensitive adhesive (PSA) composition embodiments, such as adhesives used in tapes, mastics, and labels, and in nonwoven applications of the described adhesive compositions, various oils are added to the adhesive compositions. In one embodiment, the adhesive composition comprises at least about 1, 2, 5, 8, or about 10 and/or not more than about 40, 30, 25, or about 20 weight percent of at least one processing oil. In another embodiment of pressure sensitive adhesive compositions, the adhesive compositions comprise about 2 to about 40, about 5 to about 30, about 8 to about 25, or about 10 to about 20 weight percent of at least one processing oil. Processing oils include, but are not limited to, mineral oils, naphthenic oils, paraffinic oils, aromatic oils, castor oils, rape seed oil, triglyceride oils, and combinations thereof. Processing oils also include extender oils that are commonly used in various pressure-sensitive adhesive compositions. In another embodiment, the described adhesive composition comprises no processing oils.

In another embodiment of the compositions, one or more plasticizers are added to the adhesive compositions, such as, but not limited to, phthalate esters such as, for example, dibutyl phthalate and dioctyl phthalate, benzoates, terephthalates, and chlorinated paraffins. In one embodiment, the described adhesive compositions comprise at least about 0.5, 1, 2, or about 3 and/or not more than about 20, 10, 8, or about 5 weight percent of at least one plasticizer. In another embodiment, the adhesive compositions comprise about 0.5 to about 20, about 1 to about 10, about 2 to about 8, or about 3 to about 5 weight percent of at least one plasticizer. Other exemplary plasticizers include Benzoflex™ and Eastman 168™ (Eastman Chemical Company, Kingsport, Tenn., US).

In other embodiments, the compositions that incorporate one or more silane-functionalized resins further comprise at least about 0.1, 0.5, 1, 2, or about 3 and/or not more than about 20, 10, 8, or about 5 weight percent of at least one antioxidant. Any antioxidant known to a person of ordinary skill in the art may be used in the adhesion compositions disclosed herein. Non-limiting examples of suitable antioxidants include amine-based antioxidants such as alkyl diphenyl amines, phenyl-naphthylamine, alkyl or aralkyl substituted phenyl-naphthylamine, alkylated p-phenylene diamines, tetramethyl-diaminodiphenylamine and the like; and hindered phenol compounds such as 2,6-di-t-butyl-4-methylphenol; trimethyl-2,4,6-tris(3',5'-di-t-butyl-4'-hydroxybenzyl)benzene; tetrakis [(methylene(3,5-di-t-butyl-4-hydroxyhydrocinnamate)] methane, such as IRGANOX® 1010 (BASF Corp., LA, US); octadecyl-3,5-di-t-butyl-4-hydroxycinnamate, such as IRGANOX® 1076 (BASF Corp., LA, US) and combinations thereof. Where used, the amount of the antioxidant in the composition can be from about greater than 0 to about 1 wt %, from about 0.05 to about 0.75 wt %, or from about 0.1 to about 0.5 wt % of the total weight of the composition. In another such embodiment, the adhesive compositions comprise about 0.1 to about 20, about 1 to about 10, about 2 to about 8, or about 3 to about 5 weight percent of at least one antioxidant.

In another embodiment of the compositions, the composition comprises one or more fillers, such as, but not limited to, carbon black, calcium carbonate, clay and other silicates, titanium oxide, and zinc oxide. In another embodiment of the described compositions, the compositions comprise at least about 10, 20, 30, or about 40 and/or not more than about 90, 80, 70, or about 55 weight percent of at least one filler. In a further embodiment, the compositions comprise about 1 to about 90, about 20 to about 80, about 30 to about 70, or about 40 to about 55 weight percent of at least one filler. In some embodiments, silica is added as a filler, in addition to, or in lieu of, silicates found present in clay and fly ash. That is, silica, i.e. a combination of silica and oxygen ($SiO_2$) is manufactured by known methods and are commercially available in pure or relative pure form as a white powder. Silica, commonly formed by precipitate, are a synthetic crystalline amorphous form of silicon dioxide, derived from quartz sand. Such silica and silicates are in some embodiments added to the compositions as fillers. Silica, apart from organosilanes used as coupling agents, is commonly incorporated into rubber compositions that are used to manufacture goods such as seals, cables, profiles, belts, and hoses. When used together, both synthetic (pure) silica as a filler, and organosilanes present as coupling agents, a silica-silane system is created that is commonly employed or incorporated into industrial rubber goods that require high reinforcement combined with the possibility to manufacture white or colored products. In such contexts and embodiments, silica is incorporated as a filler to improve tear resistance, and in some embodiments, the silica-silane systems reduce heat buildup. (See, Uhrland, S., "Silica," in Encyclopedia of Chemical Technology, Kirk-Othmer, John Wiley & Sons, Inc., 2006). In contrast, clays are composed of clay minerals of a fine particle size and are essentially combinations of silica, alumina, and water to create hydrated aluminum silicates with associated alkali and alkaline earth elements. Such clays are a raw material found in clay deposits of varying composition and grain size. Clays are used commonly as fillers in sealants and adhesives. For instance, sodium bentonites are incorporated into sealants as fillers that impart water impedance due to high swelling capacity and to impede movement of water. Clays incorporated into adhesives are in some instances in the form of attapulgite that improves viscosity under shear. In other embodiments, incorporation of kaolin filler can impact viscosity of the composition. Thus, clays have present within them various hydrated aluminum silicates that are different and distinguishable from silica that is synthetic, and in some embodiments also incorporated into the described compositions as a filler. (See, Id., Murray, H. H., "Clays, Uses" and "Clays, Survey").

Additionally, other tackifier resins are present in various embodiments of the described compositions, which are optionally present in the form of physical blends. Tackifier resins added to the described compositions in this embodiment include, without limitation, cycloaliphatic hydrocarbon resins, C5 hydrocarbon resins, C5/C9 hydrocarbon resins, aromatically modified C5 resins, C9 hydrocarbon resins, pure monomer resins, e.g., copolymers of styrene with alpha-methyl styrene, vinyl toluene, para-methyl styrene, indene, and methyl indene, DCPD resins, dicyclopentadiene based/containing resins, cyclo-pentadiene based/containing resins, terpene resins, terpene phenolic resins, terpene styrene resins, esters of rosin, esters of modified rosins, liquid resins of fully or partially hydrogenated rosins, fully or partially hydrogenated rosin esters, fully or partially hydrogenated modified rosins resins, fully or partially rosin alcohols, fully or partially hydrogenated C5 resins, fully or partially hydrogenated C5/C9 resins, fully or partially hydrogenated DCPD resins, fully or partially hydrogenated dicyclopentadiene based/containing resins, fully or partially hydrogenated cyclo-pentadiene based/containing resins, fully or partially hydrogenated aromatically modified C5 resins, fully or partially hydrogenated C9 resins, fully or partially hydrogenated pure monomer resins, e.g., copolymers or styrene with alpha-methyl styrene, vinyl toluene, para-methyl styrene, indene, and methyl indene, fully or partially hydrogenated C5/cycloaliphatic resins, fully or partially hydrogenated C5/cycloaliphatic/styrene/C9 resins, fully or partially hydrogenated cycloaliphatic resins, and mixtures thereof.

In some embodiments, the compositions described herein include other conventional plastic additives in an amount that is sufficient to obtain a desired processing or performance property for the adhesive. The amount should not be wasteful of the additive nor detrimental to the processing or performance of the adhesive. Those skilled in the art of thermoplastics compounding, without undue experimentation but with reference to such treatises as Plastics Additives Database (2004) from Plastics Design Library (www.elsevier.com) can select from many different types of additives for inclusion into the compounds described herein. Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; oils and plasticizers; processing aids; release agents; silanes, titanates and zirconates; slip and anti-blocking agents; stabilizers (for example, Irganox® 1010 and Irganox® 1076, BASF Corporation, LA, US); stearates; ultraviolet light absorbers; viscosity regulators; waxes; and combinations thereof. Antioxidants are particularly useful for these compounds to provide additional durability.

Such compositions are manufactured in one embodiment by blending the silane-functionalized resin with an elastomer (at least one polymer) to form the adhesive. That is, the adhesive compositions described herein are in one embodiment prepared by combining the silane-functionalized resin, the elastomer, and the additives using conventional techniques and equipment. As a non-limiting exemplary embodiment, the components of the compositions described herein are blended in a mixer such as a Sigma blade mixer, a plasticorder, a Brabender mixer, a twin-screw extruder, and/or an in-can blend can (pint-cans). In another embodiment, the compositions are shaped into a desired form, such as a tape or sheet, by an appropriate technique including, for example, extrusion, compression molding, calendaring, or roll coating techniques (gravure, reverse roll, and the like). In some embodiments, the compositions described herein are applied using curtain coating, slot-die coating, or sprayed through different nozzle configurations at different speeds using typical application equipment.

In another embodiment, the compositions described herein are applied to a substrate by melting the composition and then using conventional hot melt adhesive application equipment recognized in the art to coat the substrate with the composition. Substrates include, for example, textile, fabric, paper, glass, plastic, and metal materials. Typically, about 0.1 to about 100 g/m2 of adhesive composition is applied to a substrate.

The silane-functionalized resins described herein, in some embodiments, are incorporated into various types of compositions including, but not limited to, hot melt or solvent based pressure sensitive adhesives, e.g., tapes, labels, mastics, HVACs, and the like, hot melt nonwoven adhesives, e.g., those for use in the construction industry, for elastic attachment, or for stretching, and hot melt packaging adhesives. Furthermore, the silane-functionalized resins described herein in another embodiment are incorporated into different polymer systems as explained above to provide excellent physical and chemical properties in terms of processability, stability, thermal properties, barrier properties, viscoelasticity, vibration damping, rheology, volatility, fogging profiles, and/or adhesion and mechanical properties of such polymer systems. Moreover, the silane-functionalized resins described herein enhance various physical and chemical properties in thermoplastic elastomer applications such as roofing applications (construction), adhesives, sealant applications, cable flooding/filling applications, and tire elastomer applications, e.g., tread compositions, side walls, inner liners, inner-tubes, and various other pneumatic tire components, for example.

While the preceding discussion is primarily directed to adhesive applications incorporating the silane-functionalized resins described herein, these principals can be generally expanded and applied to other polymer compositions comprising the silane-functionalized resins for use in a myriad number of end products. For instance, polymer modification applications incorporating the silane-functionalized resins described herein include, but are not limited to, roofing applications (such as asphalt modifiers in modified bitumen roofing), water proofing membranes/compounds, underlayments, cable flooding/filling compounds, caulks and sealants, structural adhesives, polymer compounds/blends, films, e.g., cling films, TPE films, Biaxially Oriented PolyPropylene (BOPP) films, and the like, molded articles, rubber additive/processing aids, carpet backing, e.g., high performance precoat, thermoplastic compound, and the like, wire and cables, power and hand tools, pen grips, airbag covers, grips and handles, seals, and laminated articles, e.g., paper lamination, water activated, hot melt gummed, scrim reinforced tape, and the like. When incorporated into these various end use applications, the described silane-functionalized resins in some embodiments are the sole resin in the compositions. In other embodiments, the silane-functionalized resins are combined with other resins, elastomers/polymers, and/or additives. In such combined resin applications, the aforementioned compositions comprise at least about 1, 2, 3, 4, 5, 10, 15, 20, 25, 30, 35, 40, 45, 50, 55, or about 60 and/or not more than about 99, 95, 90, 85, 80, 75, 70, or about 65 weight percent of at least one silane functionalized resin.

Thus, in various embodiments, one or more of the silane-functionalized resins described herein are incorporated into hot melt adhesive compositions. According to one or more embodiments, the adhesives therefore comprise at least about 1, 5, 10, 20, 30, 40, 50, or 60 and/or not more than about 95, 90, 80, 70, or 60 weight percent (wt %) of the silane-functionalized resins, or mixtures thereof. Moreover, the adhesives in other embodiments comprise in the range of about 1 to 95, 5 to 90, 10 to 80, 20 to 70, 30 to 60, or 40 to 60 weight percent of the modified thermoplastic resins described herein, or mixtures thereof. In certain additional embodiments, the adhesives are entirely comprised of one or more the silane-functionalized resins described herein. Furthermore, depending on the desired end use, these hot melt adhesives also comprise, in certain embodiments, various additives such as, for example, polymers, tackifiers, processing oils, waxes, antioxidants, plasticizers, pigments, and/or fillers.

In various embodiments, the adhesives comprise at least about 5, 10, 20, 30, or 40 and/or not more than about 95, 90, 80, 70, or 55 weight percent of at least one thermoplastic tackifier resin that is different from the silane functionalized resins described herein. Moreover, the adhesives comprise, in other embodiments, in the range of about 10 to 90, 20 to 80, 30 to 70, or 40 to 55 weight percent of at least one resin that is different from the silane-functionalized resins described herein. Contemplated thermoplastic tackifier resins include pure monomer thermoplastic resin (PMR), C5 thermoplastic resin, C5/C9 thermoplastic resin, C9 thermoplastic resin, terpene thermoplastic resin, indene-coumarone (IC) thermoplastic resin, dicyclopentadiene (DCPD) thermoplastic resin, hydrogenated or partially hydrogenated pure monomer (PMR) thermoplastic resin, hydrogenated or partially hydrogenated C5 thermoplastic resin, hydrogenated or partially hydrogenated C5/C9 thermoplastic resin, hydrogenated or partially hydrogenated C9 thermoplastic resin, hydrogenated or partially hydrogenated dicyclopentadiene (DCPD) thermoplastic resin, terpene thermoplastic resin, modified indene-coumarone (IC) thermoplastic resin, or a mixture thereof.

In various embodiments, the adhesives comprise at least about 10, 20, 30, 40, 50, or 60 and/or not more than about 90, 80, 70, or 60 weight percent of at least one tackifier. Moreover, the adhesives comprise in such embodiments in the range of about 10 to 90, 20 to 80, 30 to 70, or about 40 to 60 weight percent of at least one tackifier. Suitable tackifiers contemplated herein include, for example, cycloaliphatic hydrocarbon resins, C5 hydrocarbon resins; C5/C9 hydrocarbon resins; aromatically-modified C5 resins; C9 hydrocarbon resins; pure monomer resins such as copolymers of styrene with alpha-methyl styrene, vinyl toluene, para-methyl styrene, indene, methyl indene, C5 resins, and C9 resins; terpene resins; terpene phenolic resins; terpene styrene resins; rosin esters; modified rosin esters; liquid resins of fully or partially hydrogenated rosins; fully or partially hydrogenated rosin esters; fully or partially hydrogenated modified rosin resins; fully or partially hydrogenated rosin alcohols; indene-coumarone (IC) thermoplastic resin, dicyclopentadiene (DCPD) thermoplastic resin, hydrogenated or partially hydrogenated dicyclopentadiene (DCPD) thermoplastic resin, fully or partially hydrogenated C5 resins; fully or partially hydrogenated C5/C9 resins; fully or partially hydrogenated aromatically-modified C5 resins; fully or partially hydrogenated C9 resins; fully or partially hydrogenated pure monomer resins; fully or partially hydrogenated C5/cycloaliphatic resins; fully or partially hydrogenated C5/cycloaliphatic/styrene/C9 resins; fully or partially hydrogenated cycloaliphatic resins; and combinations thereof. Exemplary commercial hydrocarbon resins include Regalite™ hydrocarbon resins (Eastman Chemical Co., Kingsport, Tenn., US).

In various embodiments, the adhesives comprise at least about 1, 2, 5, 8, or 10 and/or not more than about 40, 30, 25, or 20 weight percent of at least one processing oil. Moreover, in such embodiments, the adhesives comprise in the range of about 2 to 40, 5 to 30, 8 to 25, or about 10 to 20 weight percent of at least one processing oil. Suitable processing oils are those known in the art, and include, for example, mineral oils, naphthenic oils, paraffinic oils, aromatic oils, castor oils, rape seed oil, triglyceride oils, or combinations thereof. As one skilled in the art would appreciate, processing oils may also include extender oils, which are commonly used in adhesives. The use of oils in the adhesives are in some instances desirable if the adhesive is to be used as a pressure-sensitive adhesive (PSA) to produce tapes or labels or as an adhesive to adhere nonwoven articles. In certain additional embodiments, the adhesive comprises no processing oils.

In various embodiments, the adhesives comprise at least about 1, 2, 5, 8, or 10 and/or not more than about 40, 30, 25, or 20 weight percent of at least one wax. Moreover, in such embodiments, the adhesives comprise in the range of about 1 to 40, 5 to 30, 8 to 25, or 10 to 20 weight percent of at least one wax. Suitable waxes can include those known in the art, for example, microcrystalline wax, paraffin wax, waxes produced by Fischer-Tropsch processes, functionalized waxes (maleated, fumerated, or wax with functional groups etc.) and vegetable wax. The use of waxes in the adhesives are desirable in certain instances if the adhesive is to be used as a hot melt packaging adhesive. In certain embodiments, the adhesive comprises no wax.

In various embodiments, the adhesives comprise at least about 0.1, 0.5, 1, 2, or 3 and/or not more than about 20, 10, 8, or 5 weight percent of at least one antioxidant. Moreover, in such embodiments, the adhesives comprise in the range of about 0.1 to 20, 1 to 10, 2 to 8, or 3 to 5 weight percent of at least one antioxidant. In other embodiments, the adhesive contains no antioxidant.

In various embodiments, the adhesives comprise at least about 0.5, 1, 2, or 3 and/or not more than about 20, 10, 8, or 5 weight percent of at least one plasticizer. Moreover, in such embodiments, the adhesives comprise in the range of about 0.5 to 20, 1 to 10, 2 to 8, or 3 to 5 weight percent of at least one plasticizer. Suitable plasticizers are those known in the art, and include, for example, dibutyl phthalate, dioctyl phthalate, chlorinated paraffins, and phthalate-free plasticizers. Commercial plasticizers include, for example, Benzoflex™ and Eastman 168™ plasticizers (Eastman Chemical Co., Kingsport, Tenn., US).

In various additional embodiments, the adhesives comprise at least about 10, 20, 30, or 40 and/or not more than about 90, 80, 70, or 55 weight percent of at least one filler. Moreover, in such embodiments, the adhesives comprise in the range of about 1 to 90, 20 to 80, 30 to 70, or 40 to 55 weight percent of at least one filler. Suitable fillers are those known in the art and include, for example, carbon black, clay and other silicates, calcium carbonate, titanium oxide, zinc oxide, or combinations thereof.

Rubber Compositions Comprising Silane-Functionalized Resins

Figure 2A:
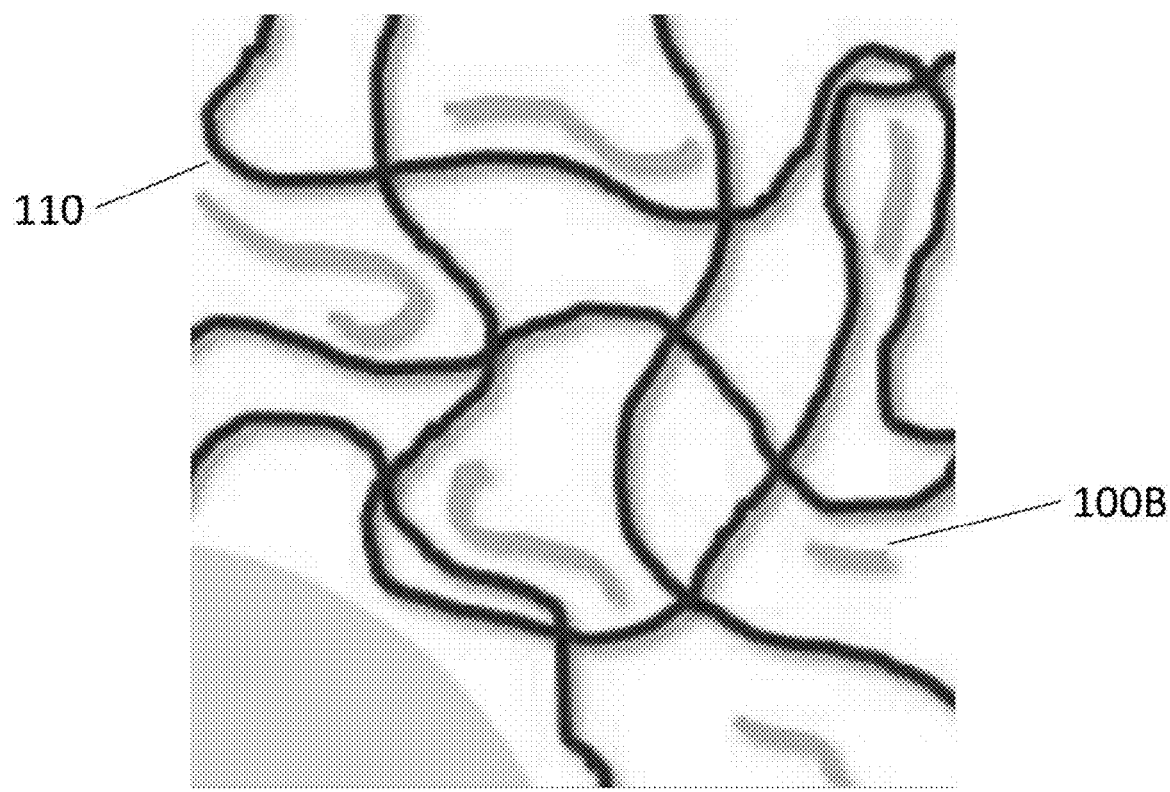
FIG. 2A shows schematically prior art resin that simply intercalates into polymer matrix.
Figure 2B:
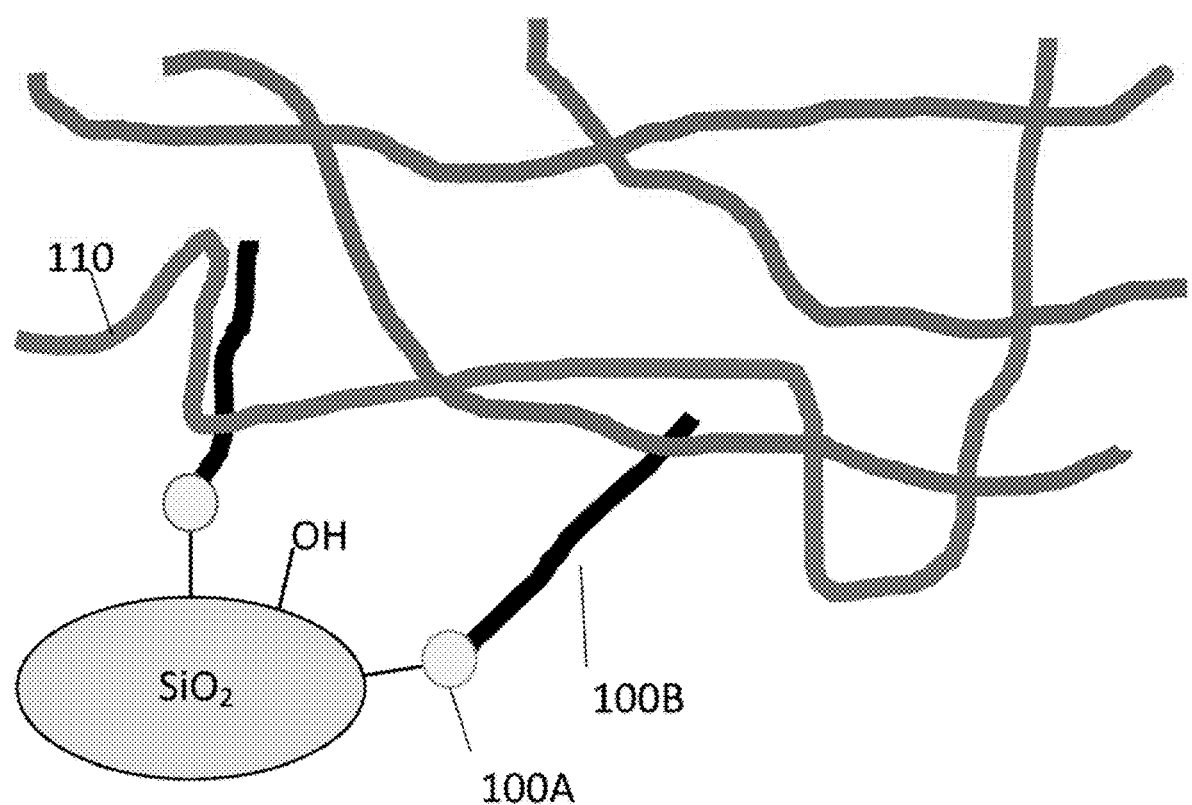
FIG. 2B shows schematically the binding of a functionalized resin to the surface of a silica particle $SiO_2$.

Disclosed are also various rubber compositions for use in, for example, automotive components, such as, but not limited to, tires and tire components, automotive belts, hoses, brakes, and the like, as well as non-automotive and/or mechanical devices including technical rubber articles such as, for example, belts, as in conveyor belts, for instance, straps, brakes, and hoses or tubing, and the like, as well as clothing articles, such as, but not limited to, shoes, boots, slippers, and the like, that incorporate the disclosed functionalized resins. The disclosed silane-functionalized resins can act as a processing aid during mixing of rubber Formulations by associating with the silica surface. The functionalization of the silica surface can be compared with other commercially available silanes for rubber compounding (FIG. 2A) except that the embodiment described involves one to many silane functionalities covalently attached to a polymer or resin structure through polar group containing linkages (FIG. 2B). In FIG. 2A, the element 110 corresponds to polymers and 100B corresponds to resin. This is a theoretical depiction of the normal arrangement found in such compositions using non-functionalized resins. In FIG. 2B, there is shown again element 110 corresponding to the polymer, and element 100B corresponding to the resin, as well as element 100A corresponding to a linker, as contemplated herein. That is, in FIG. 2B, elements 100A and 100B together are equivalent in the schematic diagram to Formula I, wherein "resin" in Formula I corresponds to part 100B and the remainder of the Formula I equation, i.e. $-[Z_k-X_n-R^1-(CH_2)_m-Si(R^2)_p]_q$, corresponds to element 100A in FIG. 2B.

Thus, rubber compositions are disclosed that comprise elastomers, fillers, and the silica-functionalized resins disclosed herein. The elastomer can be one or more of a natural rubber, a polyisoprene, a styrene-butadiene rubber, a polybutadiene, a halobutyl rubber, and a nitrile rubber, or a functionalized rubber grade, or a rubber mixture thereof. In another particular embodiment, the halobutyl rubber is bromobutyl rubber, chlorobutyl rubber, a functionalized rubber grade, or a mixture thereof. When used in tires, the main rubber component comprises various polymers such as, but not limited to, polyisoprene (synthetic or natural), styrene-butadiene copolymer, or butadiene polymer, and the like. Such rubber polymer(s) can contain various modifications and/or functionalizations at the end of chains or at pendant positions along the polymer chain. These modifications can contain various standard moieties such as, but not limited to, hydroxyl- and/or ethoxy- and/or epoxy- and/or siloxane- and/or amine- and/or aminesiloxane- and/or carboxy- and/or phthalocyanine- and/or silane-sulfide-groups, and/or combinations thereof. Additional modifications known to one of skill, such as metal atoms, can also be included in the rubber polymers used to make the disclosed tires and other rubber-containing components disclosed herein.

The rubber mixture according to the disclosure also contains 5 to 80 phr, preferably 5 to 49 phr, particularly preferably 5 to 30 phr, and more particularly preferably 5 to 20 phr of at least one further diene rubber.

The at least one further rubber is in this case one or more of natural polyisoprene and/or synthetic polyisoprene and/or butadiene rubber and/or solution-polymerized styrene-butadiene rubber and/or emulsion-polymerized styrene-butadiene rubber and/or liquid rubbers with a molecular weight Mw greater than 20,000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluorine rubber and/or silicone rubber and/or polysulfide rubber and/or epichlorohydrin rubber and/or styrene-isoprene-butadiene terpolymer and/or hydrated acrylonitrile butadiene rubber and/or isoprene-butadiene copolymer and/or hydrated styrene-butadiene rubber.

In particular, nitrile rubber, hydrated acrylonitrile butadiene rubber, chloroprene rubber, butyl rubber, halobutyl rubber, or ethylene-propylene-diene rubber are used in the production of technical rubber articles such as straps, belts, and hoses.

In another embodiment, the further diene rubber is one or more of synthetic polyisoprene and natural polyisoprene and polybutadiene. Preferably, the further diene rubber is at least natural polyisoprene. This allows to achieve particularly favorable processability (extrudability, miscibility, et cetera) of the rubber mixture.

According to a further embodiment of the disclosure, the rubber mixture contains 10 to 70 phr of a conventional solution-polymerized styrene-butadiene rubber having a glass transition temperature of −40 to +10° C. (high-Tg SSBR) and 10 to 70 phr of the styrene-butadiene rubber having a Tg of −120 to −75° C., preferably −110 to −75° C., particularly preferably −110 to −80° C., and most particularly preferably −87 to −80° C., with the rubber in this embodiment preferably having a styrene content of 1 to 12 wt %, particularly preferably 9 to 11 wt %, and most particularly preferably 10 to 11 wt %.

The rubber mixture can also contain at least one further diene rubber, in particular natural and/or synthetic polyisoprene.

When used in tire mixtures a resin as described above can be used as the base resin to be functionalized. The polar linker has an increased bonding strength to the reactive sites of the filler material, i.e., to the hydroxyl groups of silica or to the reactive surface sites of other filler by providing corresponding functional groups that are compatible to the reaction centers of the other fillers. Thus, the disclosure is not limited to silica as a filler material and other fillers, such as carbon black.

The disclosed silane functionalized resins can be incorporated into the rubber mixtures by various methods known to one of skill. For instance, 1 to 100 mol % of monomers, 2 to 70 mol % of monomers, 5 to 50 mol % of monomers bearing the described functional groups as end capped and/or pendant functionalization can be incorporated into the rubber mixtures. The amount of functionalized resin in the rubber mixture can be from 5 to 400 phr, 10 to 375 phr, 10 to 350 phr, 10 to 325 phr, 10 to 300 phr, 10 to 275 phr, 10 to 250 phr, 10 to 225 phr, 10 to 200 phr, 10 to 175 phr, 10 to 150 phr, 10 to 125 phr, or 10 to 100 phr. The rubber mixture can additionally comprise unfunctionalized resins. Further, mixtures of functionalized and unfunctionalized resins can be incorporated into the rubber mixtures. The total resin content, including unfunctionalized resin and functionalized resin, can be from 5 to 400 phr, 5 to 350 phr, 10 to 300 phr, 10 to 275 phr, 10 to 250 phr, 10 to 225 phr, 10 to 200 phr, 10 to 175 phr, 10 to 150 phr, 10 to 125 phr, or 10 to 100 phr, i.e. a highly pendant-functionalized resin can be incorporated into the rubber mixtures to achieve a phr value of 5 to 50 by dilution. Likewise, mixtures of end-capped and pendant functionalized resins can be incorporated into the rubber mixtures by adding the desired amount to the rubber mixture to achieve the desired phr.

According to another embodiment, the amount of the solution-polymerized styrene-butadiene rubber present in the rubber mixture can be from 5 to 50 phr, 20 to 50 phr, or even 30 to 40 phr. The rubber mixture of the disclosure comprises 20 to 250 phr, preferably 30 to 150 phr, particularly preferably 30 to 85 phr, of at least one filler. The filler can be one or more of a polar or non-polar filler, such as silica, carbon black, alumino-silicates, chalk, starch, magnesium oxide, titanium dioxide, and/or rubber gels, or mixtures thereof. Further, carbon nanotubes (CNTs) including hollow carbon fibers (HCF) and modified CNTs, including one or more functional groups such as, for example, hydroxy, carboxy, or carbonyl groups, can also be used as filler materials. Additionally, graphite and graphene, as well as "carbon-silica dual-phase filler" can be used as filler materials. It is possible here to use any of the types of carbon black known to the person skilled in the art.

In some embodiments, the rubber mixture comprises carbon black as sole filler or as main filler, that is, the amount of carbon black is markedly greater than the amount of any other fillers present. If another filler is present in addition to carbon black, it is preferable that the additional filler is silica. It is therefore also conceivable that the rubber mixture of the invention comprises similar amounts of carbon black and silica, for example 20 to 100 phr of carbon black combined with 20 to 100 phr of silica. For example, the ratio of carbon black to silica can be anywhere from about 1:150 to 100:20.

In some embodiments, the rubber mixture comprises silica as sole filler or as main filler, that is, the amount of silica is markedly greater than the amount of any other fillers present.

Particularly good rolling resistance indicators (rebound resilience at 70° C.) and tear properties are thus achieved for the application in vehicle tires.

When carbon black is present as the filler, preferably the amount of carbon black in the rubber mixture is from 1 to 150 phr, 2 to 100 phr, 2 to 90 phr, 2 to 80 phr, 2 to 70 phr, 2 to 60 phr, 2 to 50 phr, 2 to 40 phr, 2 to 30 phr, or more preferably from 2 to 20 phr. However, it is preferable to use a carbon black which has an iodine adsorption number according to ASTM D 1510 of 30 to 180 g/kg, preferably 40 to 180 g/kg, particularly preferably 40 to 130 g/kg, and a DBP number according to ASTM D 2414 of 80 to 200 ml/100 g, preferably 90 to 200 ml/100 g, particularly preferably 90 to 150 ml/100 g.

The silicas can be silicas known to the person skilled in the art that are suitable as fillers for tire rubber mixtures. For instance, one non-limiting embodiment includes a finely dispersed, precipitated silica having a nitrogen surface area (BET surface area) (according to DIN ISO 9277 and DIN 66132) of 35 to 350 $m^2/g$, preferably 35 to 260 $m^2/g$, particularly preferably 100 to 260 $m^2/g$, and most particularly preferably 130 to 235 m2/g and a CTAB surface area (according to ASTM D 3765) of 30 to 400 $m^2/g$, preferably 30 to 250 $m^2/g$, particularly preferably 100 to 250 $m^2/g$, and most particularly preferably 125 to 230 $m^2/g$. Such silicas, when used, for example, in rubber mixtures for tire treads, produce particularly favorable physical properties of the vulcanizate. This can also provide advantages in mixture processing by reducing mixing time while retaining the same product properties, which leads to improved productivity. As silicas, one can both use, for example, those of the Ultrasil® VN3 type (Evonik Industries AG, Essen, Germany) and highly-dispersible silicas such as the aforementioned HD silicas (for example, Zeosil® 1165 MP Rhodia—Solvay International Chemical Group, Brussels, Belgium).

To improve processability and to bind the silica and other polar fillers that are in some embodiments present to the diene rubber, silane coupling agents are used in various embodiments of the described rubber mixtures. In such embodiments, one or a plurality of different silane coupling agents in combination with one another are used. The rubber mixture in some embodiments therefore contain a mixture of various silanes. The silane coupling agents react with the superficial silanol groups of the silica or other filler polar groups, such as the polar fillers disclosed above, during the mixing of the rubber or of the rubber mixture (in situ), or even before adding the filler to the rubber as a pretreatment (pre-modification). In such embodiments, the silane coupling agents are any of those known to the person skilled in the art as suitable for use in the disclosed rubber mixtures. Non-limiting examples of conventional coupling agents are bifunctional organosilanes possessing at least one alkoxy, cycloalkoxy, or phenoxy group on the silicon atom as a leaving group, and as the other functionality, having a group that can optionally undergo a chemical reaction with the double bonds of the polymer after splitting. The latter group, in some embodiments, for example, constitute the following chemical groups: SCN, —SH, —NH$_2$ or —Sγ- (where γ is from 2 to 8).

Contemplated silane coupling agents for use in such embodiments include for example, 3-mercaptopropyltriethoxysilane, 3-thiocyanato-propyl-trimethoxysilane, or 3,3'-bis(triethoxysilylpropyl)-polysulfide with 2 to 8 sulfur atoms such as, for example, 3,3'-bis(triethoxysilylpropyl) tetrasulfide (TESPT), the corresponding disulfide (TESPD), or mixtures of the sulfides with 1 to 8 sulfur atoms having a differing content of the various sulfides. For example, TESPT can also be added as a mixture with industrial carbon black (X50S®, Evonik Industries AG, Essen, Germany).

In another embodiment, a silane mixture is used that contains up to 40 to 100 wt % of disulfides, particularly preferably 55 to 85 wt % of disulfides, and most particularly preferably 60 to 80 wt % of disulfides. This type of mixture, described by way of example in U.S. Pat. No. 8,252,863, is obtainable by way of example with Si 261® (Evonik Industries AG, Essen, Germany). Blocked mercaptosilanes such as those known from WO 99/09036 can also be used as silane coupling agents. Silanes such as those described in U.S. Pat. Nos. 7,968,633; 7,968,634; 7,968,635; and, 7,968,636, as well as U.S. Pat. App. Pub. Nos U.S. Pat. App. Pub. Nos. 20080161486; 20080161462; and 20080161452, or any combination thereof, may also be used. Suitable silanes are also, for example, the silanes marketed under the name NXT in different variants by the firm Momentive, USA, or those marketed under the name VP Si 363® by the firm Evonik Industries.

Moreover, it is possible for the rubber mixture to contain carbon nanotubes (CNTs), including discrete CNTs, so-called hollow carbon fibers (HCFs), and modified CNT containing one or a plurality of functional groups such as hydroxy, carboxy, and carbonyl groups.

Graphite, graphene, and so-called "carbon-silica dual-phase fillers" are also suitable as fillers.

Moreover, the rubber mixture can contain other polar fillers, such as, for example, aluminosilicates, chalk, starch, magnesium oxide, titanium dioxide, or rubber gels.

In one embodiment, the rubber mixture is free from other fillers, that is, in this embodiment the rubber mixture comprises 0 phr of any other filler. In this embodiment, it is therefore not necessary to add any second filler.

For the purposes of the present disclosure, zinc oxide is not considered to be a filler.

In one embodiment, the rubber mixture contains 0 to 70 phr, 0.1 to 60 phr, or 0.1 to 50 phr of at least one plasticizer. These include one or more of all plasticizers known to the person skilled in the art, such as aromatic, naphthenic, or paraffinic mineral oil plasticizers, for example, IVIES (mild extraction solvate) or TDAE (treated distillated aromatic extract), rubber-to-liquid (RTL) oils or biomass-to-liquid (BTL) oils, factices, plasticizing resins, or liquid polymers (such as liquid BR), whose average molecular weight (determined by gel permeation chromatography (GPC), based on BS ISO 11344:2004), is between 500 and 20 000 g/mol. If liquid polymers are used in the rubber mixture according to the invention as plasticizers, these are not included as rubber in calculating the composition of the polymer matrix.

In embodiments in which a mineral oil is used, the mineral oil is selected from one or more of DAE (di stillated aromatic extracts) and/or RAE (residual aromatic extracts) and/or TDAE (treated distillated aromatic extracts) and/or MES (mild extracted solvents) and/or naphthenic oils and/or paraffinic oils.

Moreover, the rubber mixtures disclosed herein can contain common additives in the common number of parts by weight. These additives include:
  a) antioxidants such as, for example, N-phenyl-N'-(1,3-dimethylbutyl)-p-phenylene diamine (6PPD), N,N'-Diphenyl-p-phenylene diamine (DPPD), N,N'-ditolyl-p-phenylene diamine (DTPD), N-Isopropyl-N'-phenyl-p-phenylene diamine (IPPD), N,N'-Bis(1,4-dimethylpentyl)-p-phenylenediamine (77PD), and 2,2, 4-trimethyl-1,2-dihydroquinoline (TMQ),
  b) activators such as, for example, zinc oxide and fatty acids (for example, stearic acid), c) waxes,
  d) functionalized and non-functionalized resins, in particular adhesive tackifier resins, such as rosin, and the like,
  e) mastication auxiliaries such as, for example, 2,2'-dibenzamidodiphenyldisulfide (DBD), and
  f) processing auxiliaries, for example, fatty acid salts such as, for example, zinc soaps, fatty acid esters and derivatives thereof.

In particular, in the use of the rubber mixtures disclosed herein for the internal components of a tire or a technical rubber article that are in direct contact with the reinforcing supports present, a suitable adhesive system, often in the form of adhesive tackifier resins, is also generally added to the rubber.

The proportion of further additives contained in the entire amount is 3 to 150 phr, preferably 3 to 100 phr, and particularly preferably 5 to 80 phr.

The proportion of further additives contained in the entire amount also includes 0.1 to 10 phr, preferably 0.2 to 8 phr, and particularly preferably 0.2 to 4 phr of zinc oxide (ZnO).

This zinc oxide can be of any type known to the person skilled in the art, such as, for example, ZnO granulate or powder. Generally speaking, conventionally used zinc oxide shows a BET surface area of less than 10 m$^2$/g. However, so-called nano zinc oxide having a BET surface area of 10 to 60 m$^2$/g can also be used.

Vulcanization is performed in the presence of sulfur or sulfur donors using vulcanization accelerators, with some vulcanization accelerators also being capable of acting as sulfur donors. Sulfur, or sulfur donors, and one or a plurality of accelerators, are added in the last mixing step in the aforementioned amounts to the rubber mixture. Here, the accelerator is one or more of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

A sulfenamide accelerator selected from N-cyclohexyl-2-benzothiazole sulfenamide (CBS) and/or N,N-dicyclohexylbenzothiazole-2-sulfenamide (DCBS) and/or N-tert-butyl-2-benzothiazyl sulfenamide (TBBS) can be used.

Suitable accelerators include, for instance those selected from N-cyclohexyl-2-benzothiazole sulfenamide (CBS) and/or N,N-dicyclohexylbenzothiazole-2-sulfenamide (DCBS), N-tert-butyl-2-benzothiazyl sulfenamide (TBBS), mercapto benzothiazole, tetramethyl thiuram disulfide, benzothiazole disulfide, diphenyl guanidine, zinc dithiocarbamate, alkylphenol disulfide, zinc butyl xanthate, N-dicyclohexyl-2-benzothiazolesulfenamide, N-cyclohexyl-2-benzothiazole sulfenamide, N-oxydiethylene benzothiazole-2-sulfenamide, N,N-diphenyl thiourea, dithiocarbamyl sulfenamide, N,N-diisopropylbenzothiozole-2-sulfenamide, zinc-2-mercapto toluimidazole, dithio bis(N-methyl piperazine), dithio bis(N-beta-hydroxy ethyl piperazine), dithio bis(dibenzyl amine), and combinations thereof. Other vulcanizing accelerators include, for example, thiuram, and/or morpholine derivatives.

In one embodiment of the disclosed rubber mixtures, the mixture comprises CBS as the accelerator. Particularly good tear properties are thus achieved for such rubber mixtures.

Further, network-forming systems such as for example those available under the brand names Vulkuren® (Lanxess, Shanghai, PRC), Duralink® (ChemLink, Schoolcraft, Mich., US), and Perkalink® (Lanxess, Shanghai, PRC), or network-forming systems such as those described in WO 2010/059402, can also be used in the rubber mixture. This system contains a vulcanizing agent that crosslinks with a functionality greater than four and at least one vulcanization accelerator. The vulcanizing agent that crosslinks with a functionality greater than four has, for example, General Formula A:

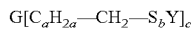

$$G[C_aH_{2a}-CH_2-S_bY]_c \qquad A$$

where G is a polyvalent cyclic hydrocarbon group and/or a polyvalent heterohydrocarbon group and/or a polyvalent siloxane group that contains 1 to 100 atoms; where each Y contains sulfur-containing functionalities independently selected from a rubber-active group; and where a, b, and c are whole numbers each of which are independently selected from the following: a equals 0 to 6; b equals 0 to 8; and c equals 3 to 5.

The rubber-active group is one or more of a thiosulfonate group, a dithiocarbamate group, a thiocarbonyl group, a mercapto group, a hydrocarbon group, and a sodium thiosulfonate group (colored salt group). This allows achievement of highly favorable abrasion and tear properties of the rubber mixture according to the invention.

Within the scope of the present disclosure, sulfur and sulfur donors, including sulfur-donating silanes such as TESPT, curing agents and cures such as those described in EP 2288653, vulcanization accelerators as described above, and vulcanizing agents that crosslink with a functionality of greater than 4 as described in WO 2010/059402, such as, for example, a vulcanizing agent of Formula A), and the aforementioned systems Vulkuren® (Lanxess, Shanghai, PRC), Duralink® (ChemLink, Schoolcraft, Mich., US), and Perkalink® (Lanxess, Shanghai, PRC), are combined under the term vulcanizing agents.

The rubber mixture according to the disclosure can include at least one of these vulcanizing agents. This makes it possible to produce vulcanizates, in particular for use in vehicle tires, from the rubber mixture according to the disclosure.

In some embodiments, vulcanization retarders are also present in the rubber mixture. As known in the art, there is typically a "trade off" between rolling resistance and wet braking in tire technology. Often when one of these two elements is improved, the other is worsened. Thus, an improvement in rolling resistance (RR) is often accompanied by a worsened performance of wet braking, and vice versa. This is the RR-wet braking target conflict. Embodiments encompassed by this disclosure therefore include tires that possess surprisingly improved rolling resistance with no change in wet braking. Thus, an object of the disclosed rubber compositions is to provide a vehicle tire that exhibits improved rolling resistance behavior, as well as snow performance. This object is achieved in that the vehicle tire contains the rubber mixtures according to this disclosure in at least one component as described above. In this context, all of the aforementioned embodiments of the constituents and properties thereof apply.

A further object of the disclosed rubber compositions is to provide a vehicle tire that exhibits improved rolling resistance behavior and improved tear properties, in particular increased tear propagation resistance. This object is achieved in that the vehicle tire contains the rubber mixtures according to this disclosure in at least one component as described above. In this context, all of the aforementioned embodiments of the constituents and properties thereof apply.

In one embodiment, the component is a tread. As known to the person skilled in the art, the tread contributes to a relatively high degree to overall rolling resistance of the tire. In particular, high resistance to cracking and crack propagation in the tread is also advantageous. In one embodiment, the rubber compositions described herein are useful in other parts of the tire as well and can comprise various tire components and various tire component compounds. The tires can be built, shaped, molded and cured by various methods that are known and will be readily apparent to those having skill in such art.

Another object of the present disclosure is improving the rolling resistance performance and the tear properties of vehicle tires. According to the disclosure, this object is achieved through the use of the rubber mixtures described above with all embodiments and features in vehicle tires, in particular in the tread of a vehicle tire, and/or a body mixture of a vehicle tire.

A further object of the disclosure is to optimize the abrasion behavior and the tear properties of technical rubber articles such as, for example, belts, straps, brakes, and hoses without having a significant negative effect on other properties that are relevant for the respective use.

This object is achieved by using the above-described rubber mixtures for the production of technical rubber articles such as, for example, belts (for instance, conveyor belts, automobile engine belts such as timing belts, driving belts, and the like), straps, seals, tubes, and hoses. Another such technical rubber article is a shoe sole, for instance for walking shoes, running shoes, cross-training shoes, boots, slippers, etc., items that are to be worn on the feet to protect the feet and associated bones and joints from damage caused by jarring or pounding motions associated with walking, running, jumping, etc. and to provide excellent resistant to slipping in wet and/or dry conditions. Various methods are known in the art for incorporation of rubber mixtures into footwear. See, for example, U.S. Pat. App. Pub. Nos.: 2013/0291409, 2011/0252671, and U.S. Pat. No. 8,689,381 (all of which are incorporated herein by reference in their entirety for all purposes).

The term body mixture as used here refers to rubber mixtures for the internal components of a tire. Internal tire components essentially include the squeegee, side wall, inner liner (inner layer), core profile, belt, shoulder, belt profile, carcass ply, bead wire, cable profile, horn profile, and bandage.

Manufacturing of these disclosed rubber mixtures is performed by the methods commonly used in the rubber industry, in which a basic mixture with all of the constituents except the vulcanization system (sulfur and vulcanization-affecting substances) is first produced in one or a plurality of mixing stages. The finished mixture is produced by adding the vulcanization system in a last mixing stage. The finished mixture is further processed, for example, by means of an extrusion process, and given the corresponding form.

For use in vehicle tires, the mixture is preferably made into a tread and applied in the known manner in production of the vehicle tire blank. However, the tread can also be wound onto a tire blank in the form of a narrow rubber mixture strip. In two-part treads (upper part: cap and lower part: base), the rubber mixture according to the disclosure can be used both for the cap and for the base.

Manufacturing of the rubber mixture according to the disclosure for use as a body mixture in vehicle tires is performed as described above for the tread. The difference lies in the molding after the extrusion process. The forms of the rubber mixture according to the disclosure obtained in this manner for one or a plurality of various body mixtures are then used to produce a tire blank. To use the rubber mixture according to the disclosure in belts and straps, in particular in conveyor belts, the extruded mixture is made into the corresponding form and, at the same time or thereafter, often provided with reinforcing supports, for example, synthetic fibers or steel cords. In most cases, one obtains a multilayer structure composed of one and/or a plurality of layers of the rubber mixture, one and/or a plurality of layers of the same and/or different reinforcing supports, and one and/or a plurality of further layers of the same and/or another rubber mixture.

Unless otherwise defined, all technical and scientific terms used herein have the same meaning as commonly understood by one of ordinary skill in the art. Although methods and materials similar or equivalent to those described herein can be used in the practice or testing of the present invention, suitable methods and materials are described below. All publications, patent applications, patents, and other references mentioned herein are incorporated by reference in their entirety for all purposes. In case of conflict, the present specification, including definitions, will control. In addition, the materials, methods, and examples are illustrative only and not intended to be limiting.

EXAMPLES

A variety of functionalized resins have been prepared and tested in rubber mixtures for vehicle tires and prepared and tested in other compositions, such as adhesives and the like. The synthetic routes and the experimental data are provided below.

Example 1: Silane Resin Functionalization by Modification of Polar Linkers

In the following examples, various resins are functionalized with silane moieties as described below. The functionalized resins can be synthesized using the different methodologies provided hereinbelow, as well as other methodologies apparent to one of skill in the art upon reading the methods provided below. All chemical reagents were from Sigma-Aldrich (St. Louis, Mo., US), unless otherwise noted.

Example 1.1—Synthesis of Pendant Silane-Containing Resin Via Acetoxystyrene Functionalization Steps 1A through 1C show the synthesis of pendant silane-containing resin by functionalization of acetoxystyrene. Particularly, Scheme 1 shows an embodiment of the ether route for deprotection of acetoxystyrene-based resin to phenol, followed by ether formation, and silane functionalization at an internal, pendant position within the resin. Note that in the following Schemes 1 through 5, where the variables "r" and "q" appear, the representation on the left is of the functionalization moiety, not the entire resin backbone. In other words, the starting materials represented in these schemes are representative of the many points at which the resin backbone is derivatized, the resin backbone not being present or depicted in the Schemes themselves, but are implied. The derivatization occurs randomly throughout the entire resin backbone. The starting material representations do not indicate a block copolymer, or that block copolymer methods were used in these strategies, though such strategies are known and can be employed in these Examples instead of the methodologies set forth below. Exemplary starting reagent and end product embodiments of this synthetic route are also depicted in FIG. 1A.

Scheme 1

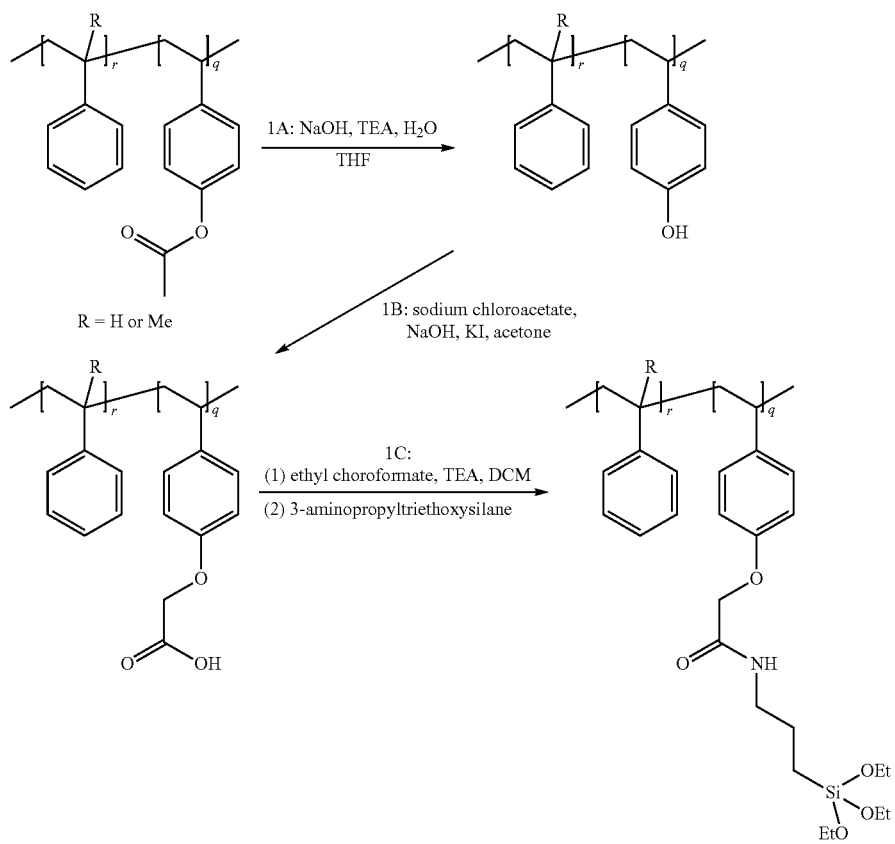

Figure 3:
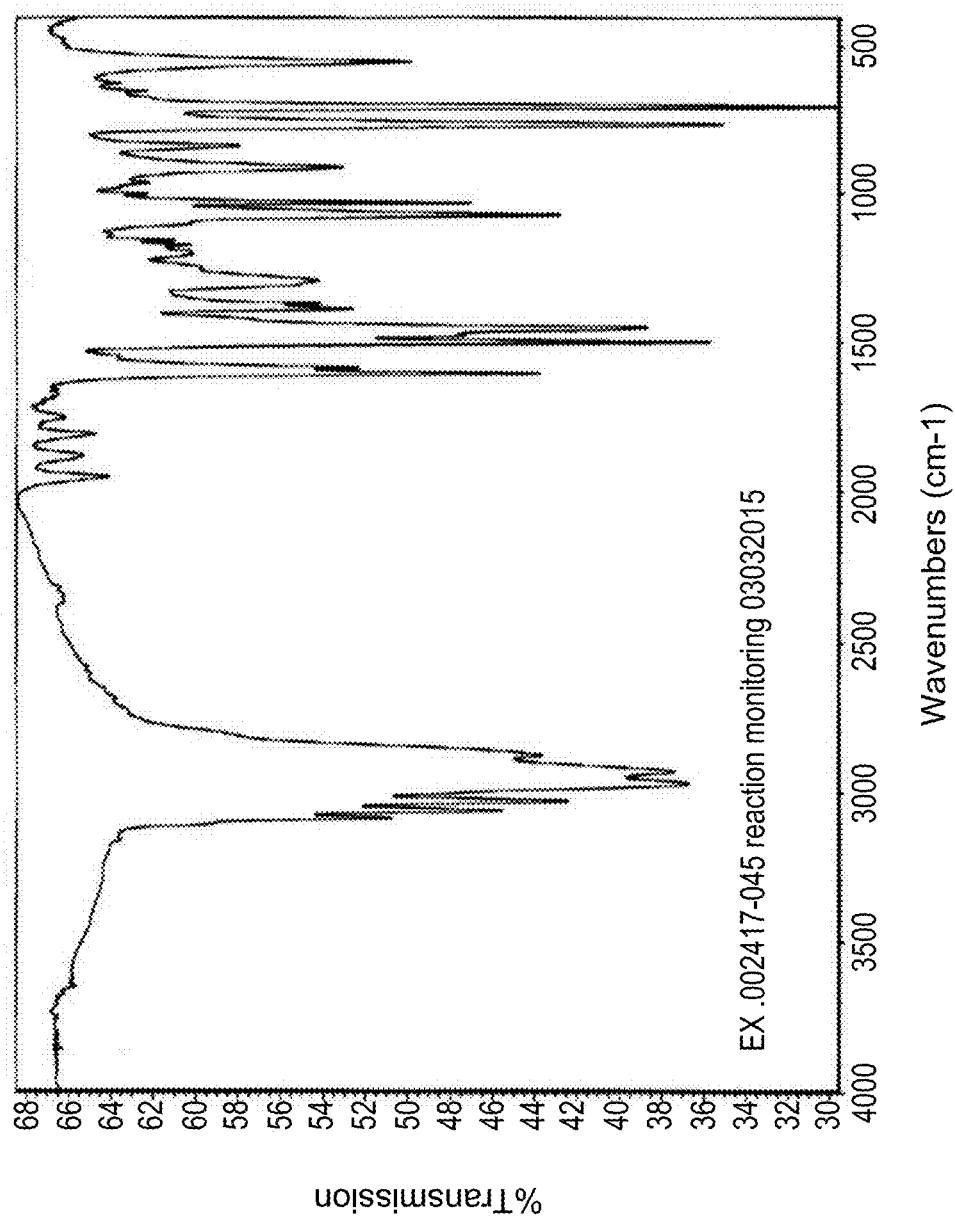
FIG. 3 shows a representative Fourier transform-infrared (FT-IR) spectrum for the functionalized resin synthesis product of Step 1A, the synthesis of a pendant phenol-functionalized resin from acetoxystyrene deprotection as described in Example 1.1.
Figure 4:
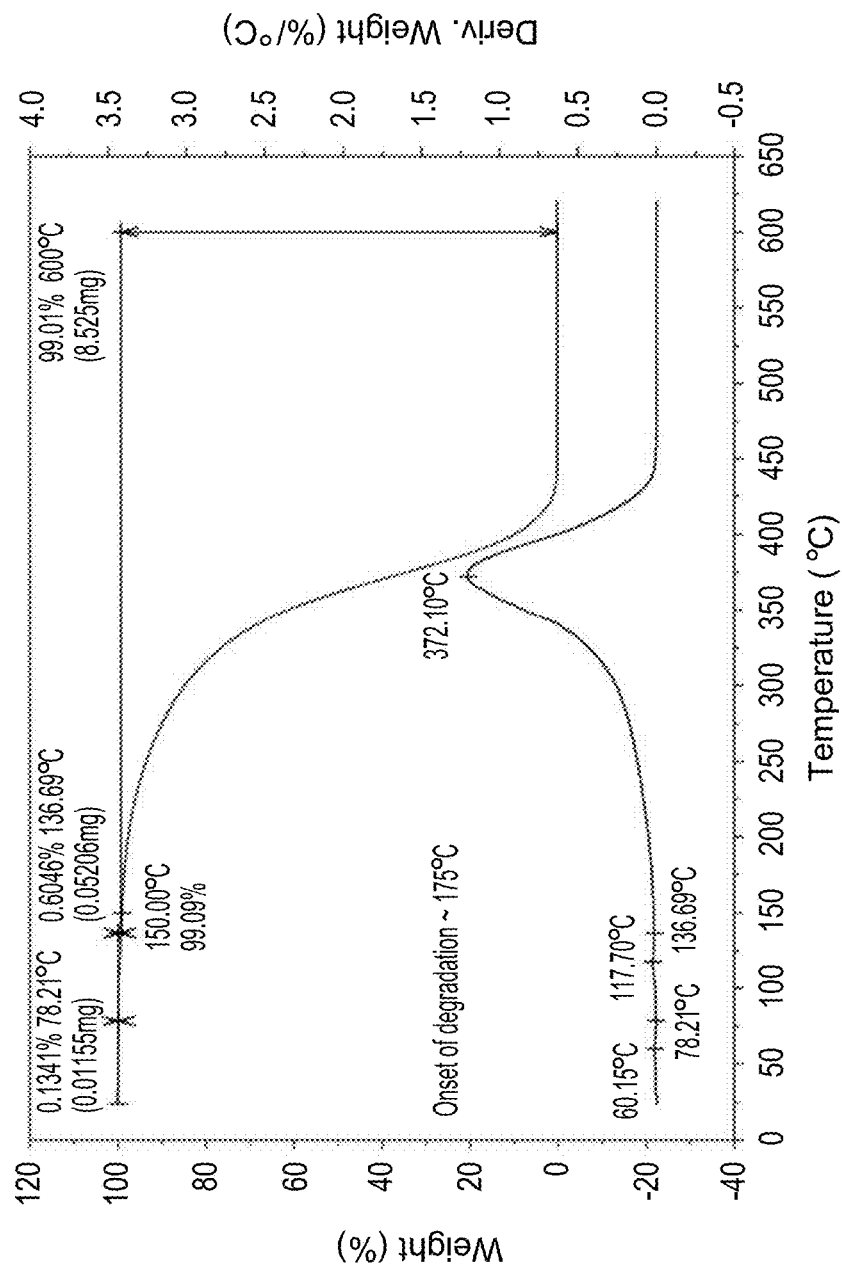
FIG. 4 shows a representative thermogravimetric analysis (TGA) trace for the functionalized resin synthesis product of Step 1A, the synthesis of a pendant phenol-functionalized resin from acetoxystyrene deprotection as described in Example 1.1.
Figure 5:
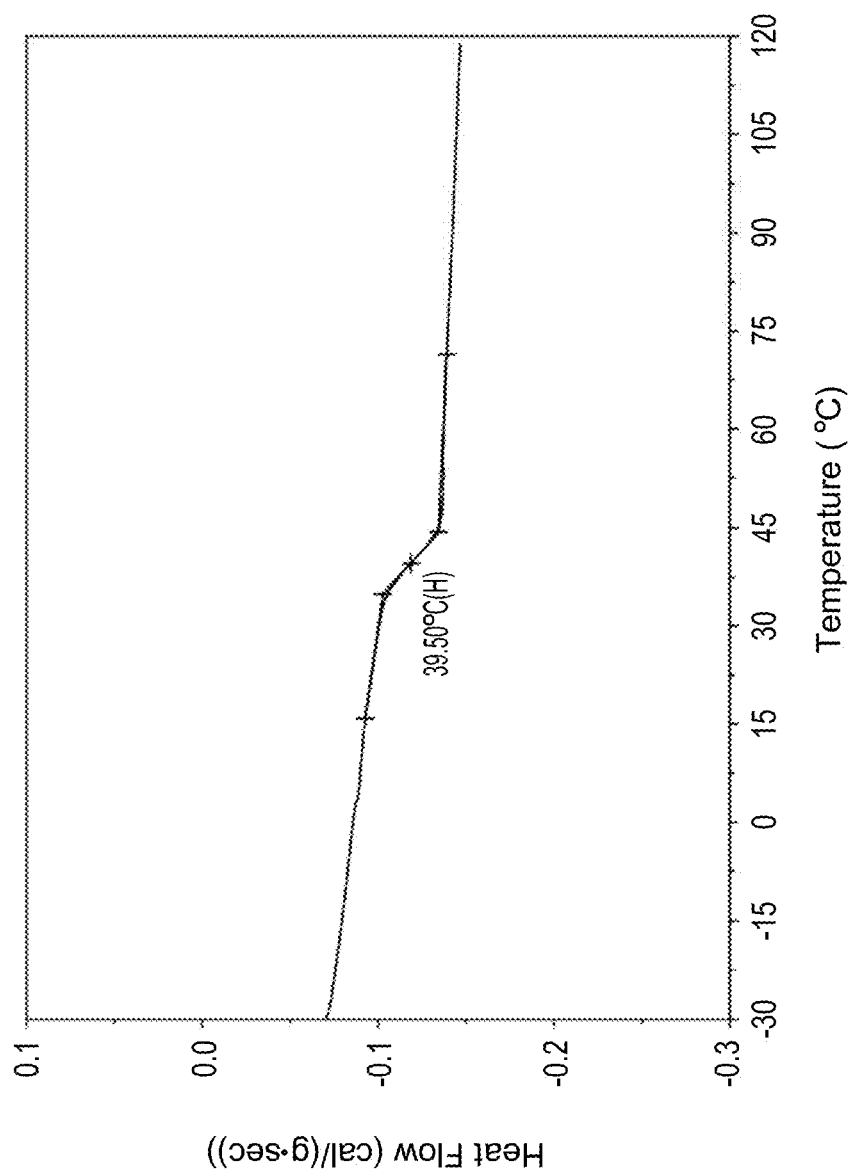
FIG. 5 shows a representative differential scanning calorimetry (DSC) trace for the functionalized resin synthesis product of Step 1A, the synthesis of a pendant phenol-functionalized resin from acetoxystyrene deprotection as described in Example 1.1.

Step 1A: Synthesis of Pendant Phenol-Functionalized Resin from Acetoxystyrene Deprotection To modify acetoxystyrene-containing resins in Step A, phenol deprotection of acetoxystyrene-modified resin was achieved by using base to remove the acetoxy groups. In a one-necked, 1 L round-bottom flask (RBF), a stir bar and 110.3 g of 3.4 mol % acetoxystyrene-containing resin (0.957 mol containing 0.0324 mol of acetoxystyrene units) were charged. Tetrahydrofuran (THF, 600 mL) was added. The solution was stirred at 500 rpm. A solution of 3.9 g of sodium hydroxide (0.0975 mol) was prepared in 20.4 mL of deionized water. When the starting material resin fully dissolved, the solution of sodium hydroxide was added. Triethylamine (TEA, 16.4 g, 0.162 mol) was added, and the RBF was fitted with a condenser. The solution was heated to reflux for 4 to 5 hours. The reaction was monitored by FT-IR. The reaction was considered complete when the carbonyl band (1750 cm$^{-1}$) fully disappeared. Heating was stopped. The flask was allowed to cool to room temperature. THF was evaporated. Dichloromethane (DCM, 600 mL) was added to the RBF, and the solution was stirred vigorously. The solution was then transferred into a separatory funnel. The organic layer was washed with 2×600 mL of aqueous HCl (1 mol/L) and then 4×600 mL of deionized water. The organic layer was dried over magnesium sulfate. The solid was filtered, and the filtrate was kept. The DCM was evaporated, and the product was dried at 40° C. under reduced pressure until constant weight. The final yield was 102.2 g (94% of the theoretical yield). Sample Fourier transform—infrared spectra (FT-IR) of the resultant product is shown in FIG. 3. Sample TGA and DSC spectra of Step 1A deprotection product are provided in FIG. 4 and FIG. 5, respectively.

Step 1B: Synthesis of Pendant Carboxylic Acid-Functionalized Resin from Phenol Group Functionalization.

Figure 6:
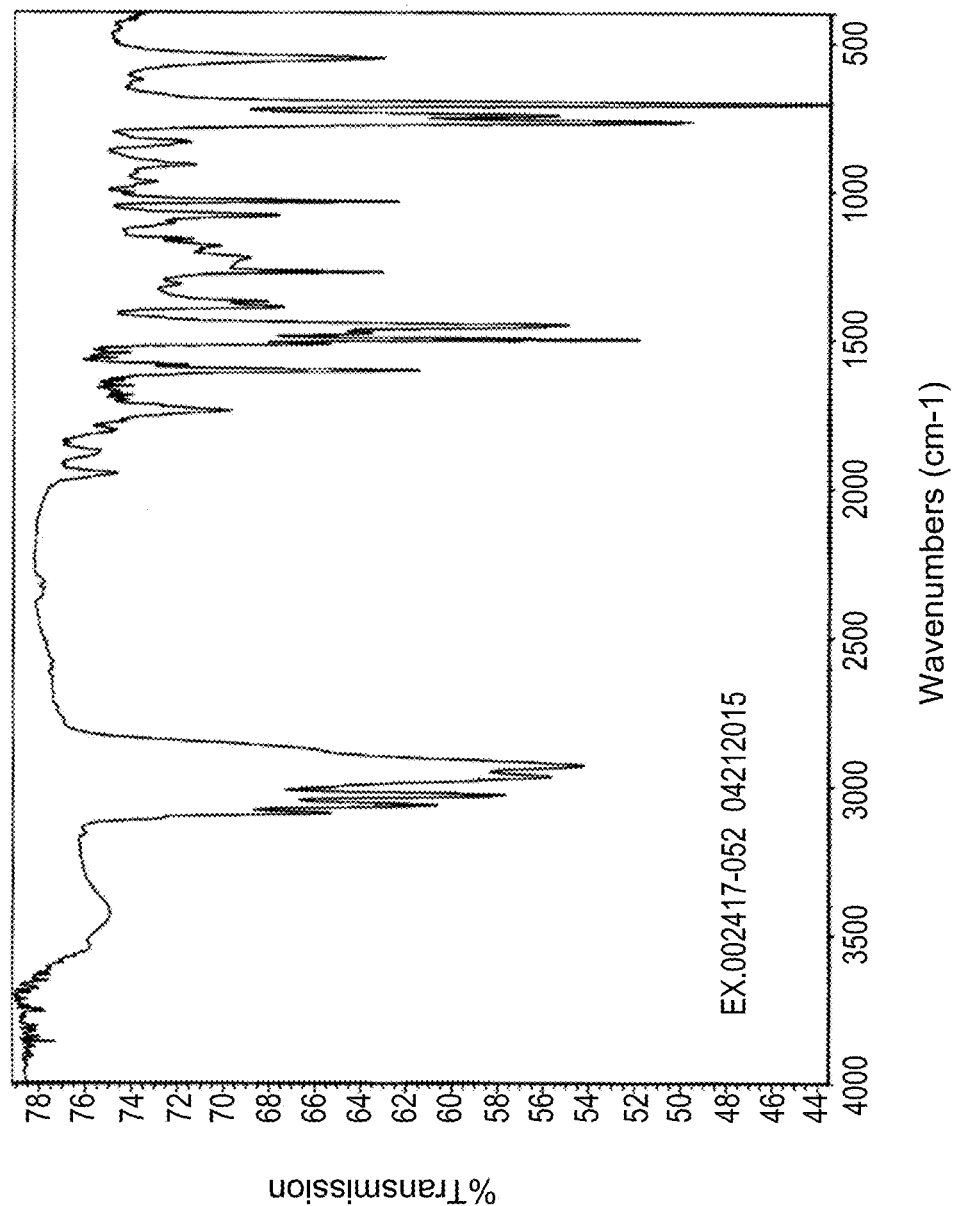
FIG. 6 shows a representative FT-IR spectrum for the functionalized resin synthesis product of Step 1B, the synthesis of a pendant carboxylic acid-functionalized resin from phenol group functionalization as described in Example 1.1.
Figure 7:
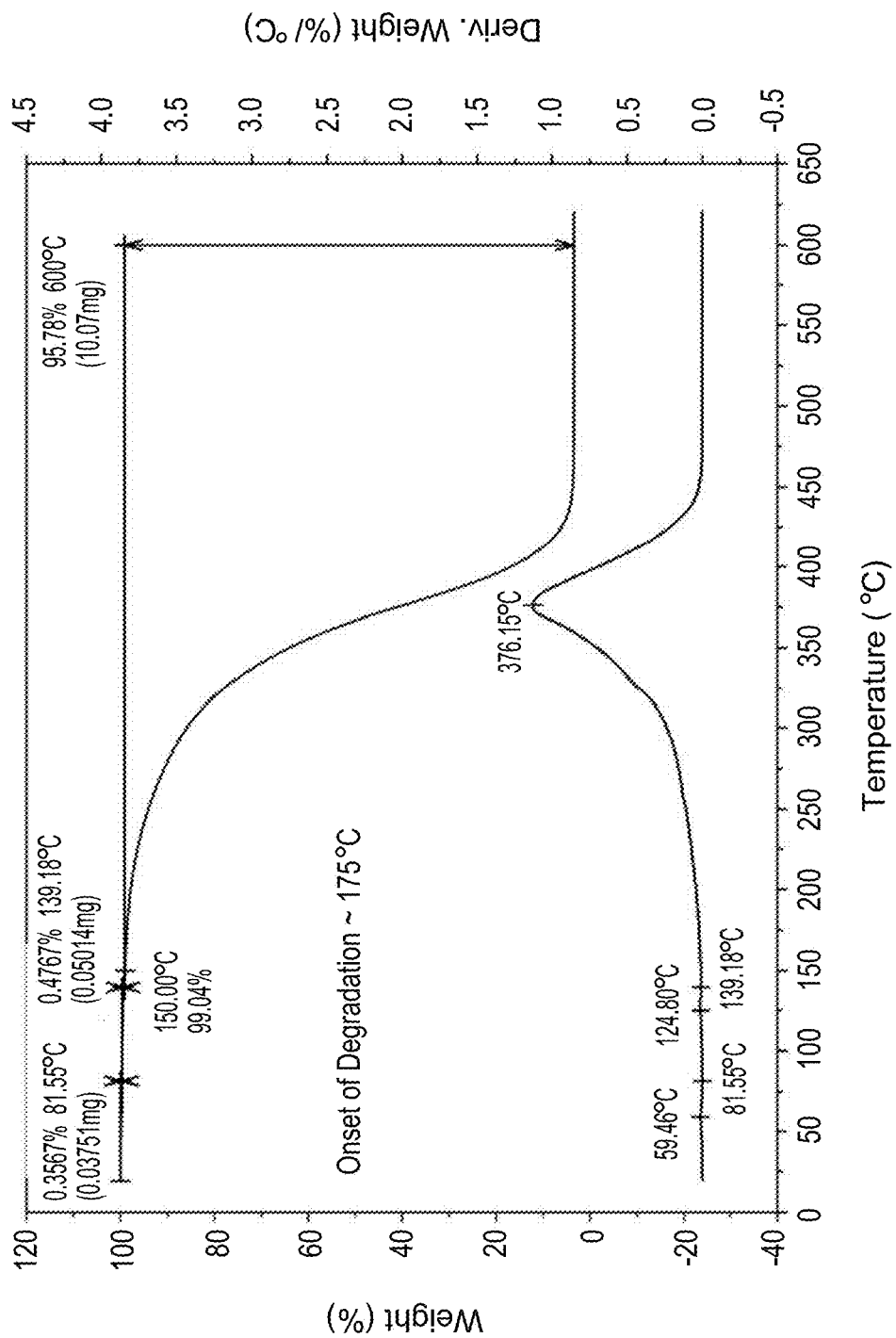
FIG. 7 shows a representative TGA trace for the functionalized resin synthesis product of Step 1B, the synthesis of a pendant carboxylic acid-functionalized resin from phenol group functionalization as described in Example 1.1.
Figure 8:
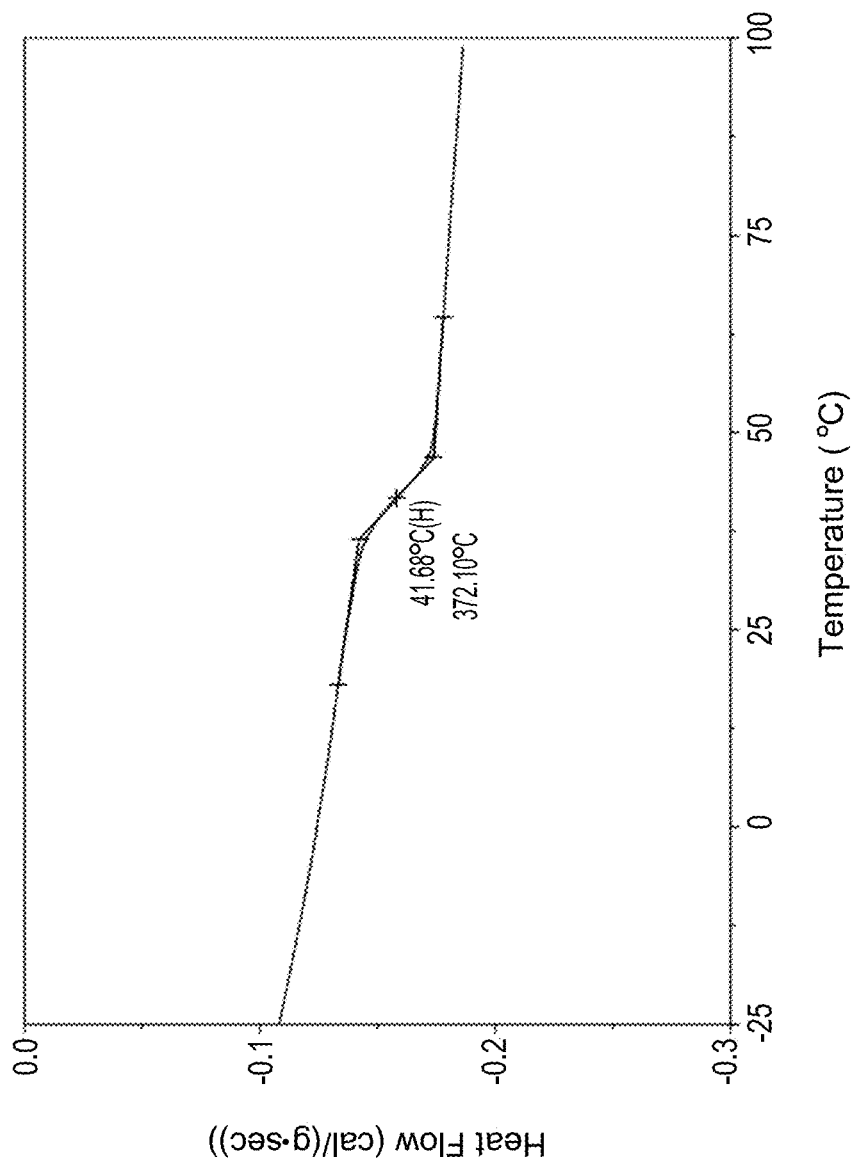
FIG. 8 shows a representative DSC trace for the functionalized resin synthesis product of Step 1B, the synthesis of a pendant carboxylic acid-functionalized resin from phenol group functionalization as described in Example 1.1.

In a 1-necked, 2 L round-bottom flask, 95.2 g of 3.38 mol % phenol-functionalized resin (836.5 mmol containing 28.3 mmol of phenol units) and 839 mL of acetone were charged. The mixture was stirred until the resin fully dissolved. Then, 4.58 g of potassium iodide (27.6 mmol), 2.27 g of sodium hydroxide (56.8 mmol), and 16.7 g of sodium chloroacetate (143.4 mmol) were added. The flask was fitted with a reflux condenser and heated with an oil bath to 58° C. for 18 hours. The solvent was removed. The viscous material was dissolved in 700 mL of DCM. The obtained slurry was added to 700 mL of aqueous HCl 1M solution. The two-phase system was stirred until complete dissolution of the solid materials, and the aqueous layer was discarded. The organic phase was washed with aqueous HCl 1M solution, followed by aq NaOH 1M solution, and then washed a last time with aqueous HCl 1M solution. The procedure was repeated, and the aqueous layer was discarded each time. Then, the organic phase was washed an additional 4 times as needed with aqueous HCl 1M solution. The organic layer was separated and dried over anhydrous MgSO$_4$. MgSO$_4$ was removed by gravimetric filtration over filter paper, and the filtrate was kept. Solvent was removed, and the product was dried under reduced pressure at room temperature overnight. The obtained solid weighed 86.7 g (90% of the theoretical yield). Sample FT-IR of the resultant product is shown in FIG. 6. Sample TGA and DSC spectra of Step 1B product are provided in FIG. 7 and FIG. 8, respectively.

Step 1C: Synthesis of Pendant Silane-Functionalized Resin from Carboxylic Acid Group Functionalization.

Figure 9:
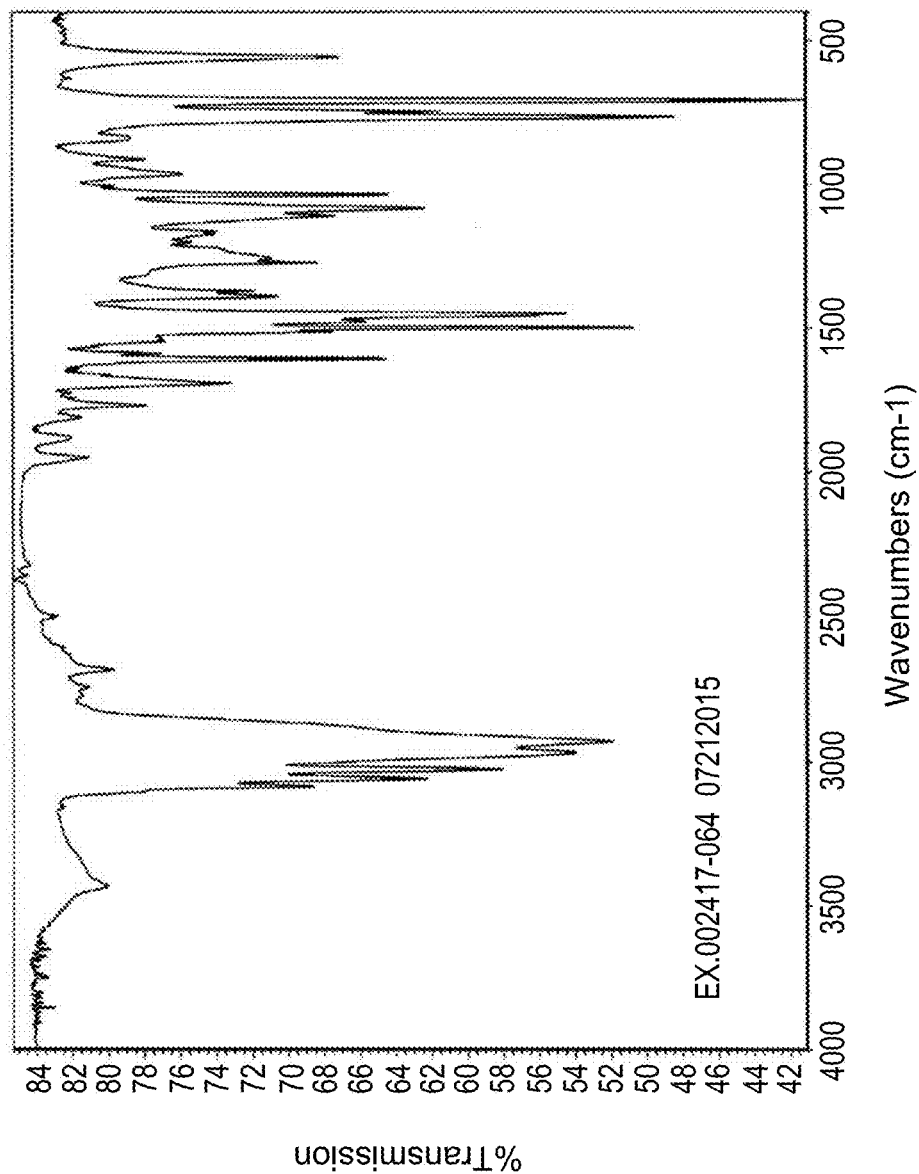
FIG. 9 shows a representative FT-IR spectrum for the functionalized resin synthesis product of Step 1C, the synthesis of a pendant silane-functionalized resin from a carboxylic acid group functionalization as described in Example 1.1.
Figure 10:
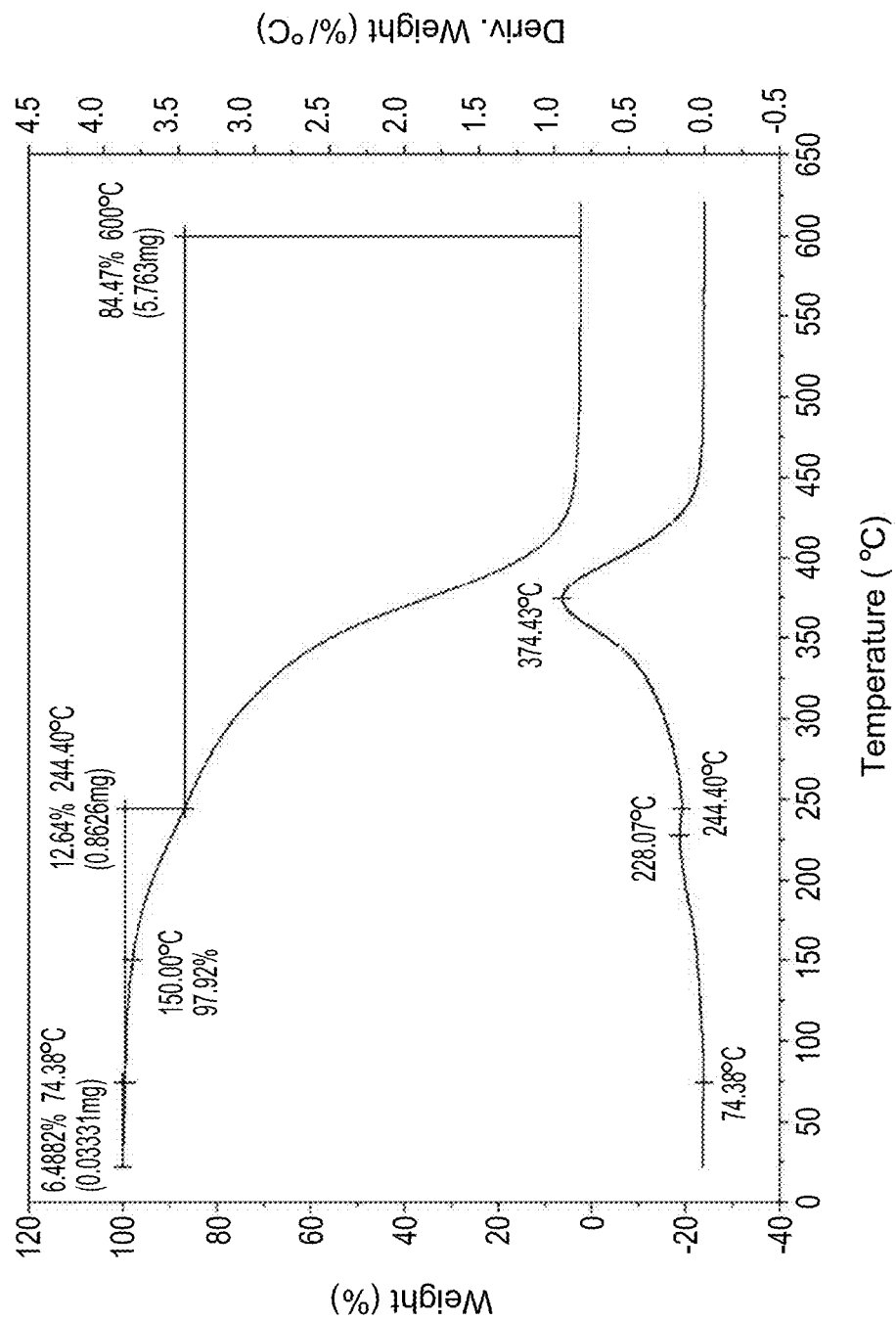
FIG. 10 shows a representative TGA trace for the functionalized resin synthesis product of Step 1C, the synthesis of a pendant silane-functionalized resin from a carboxylic acid group functionalization as described in Example 1.1.
Figure 11:
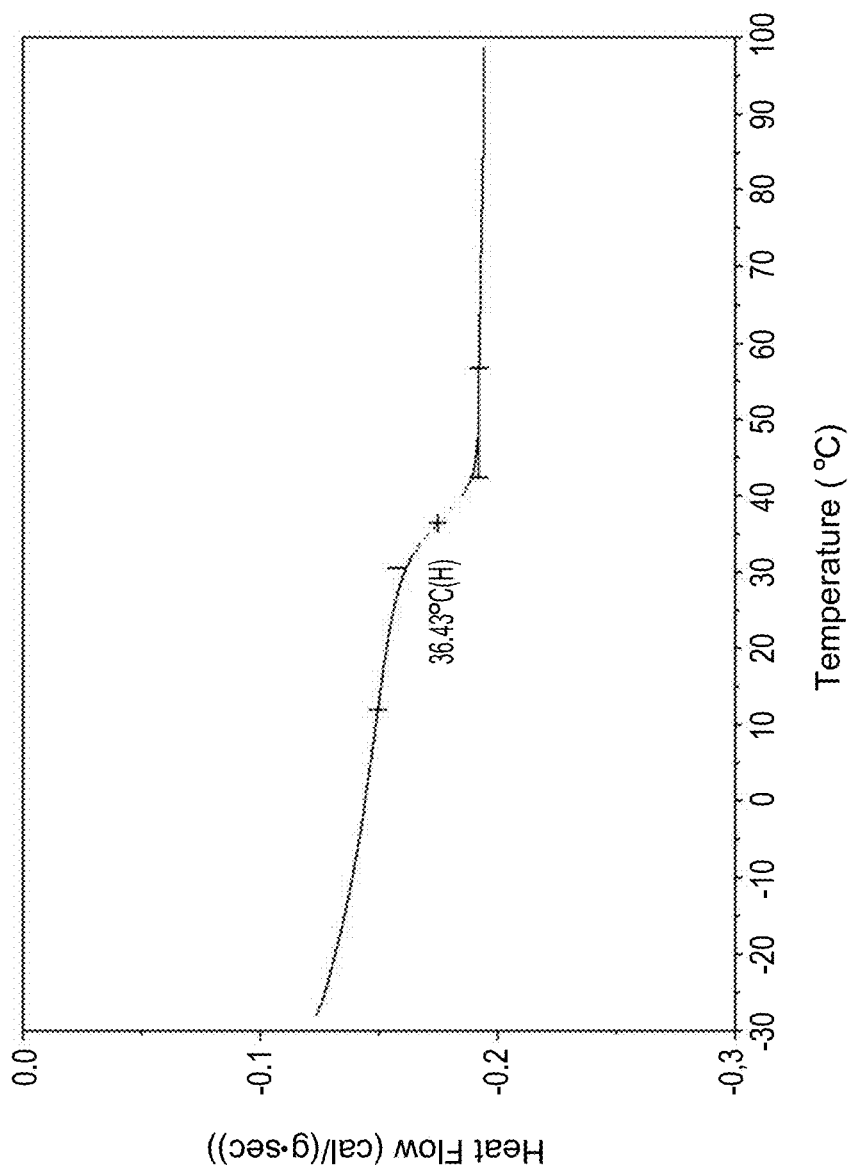
FIG. 11 shows a representative DSC trace for the functionalized resin synthesis product of Step 1C, the synthesis of a pendant silane-functionalized resin from a carboxylic acid group functionalization as described in Example 1.1.
Figure 12:
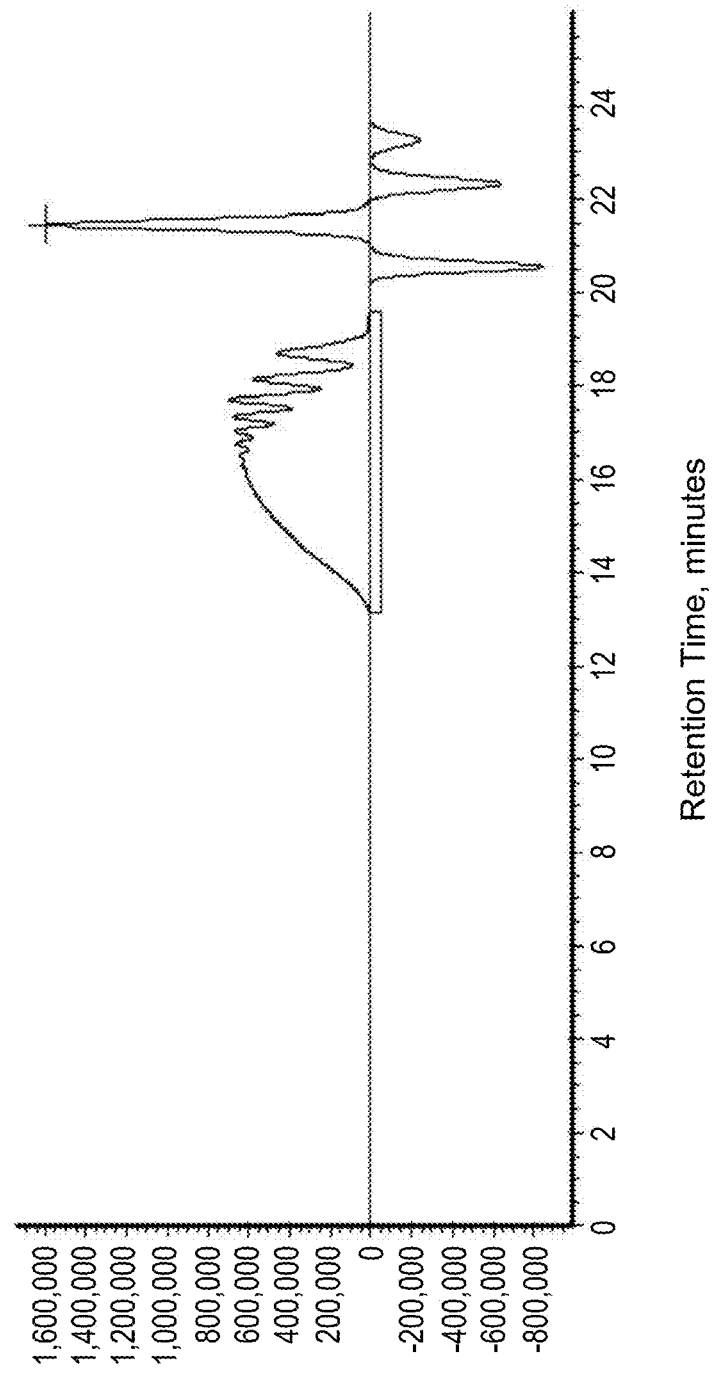
FIG. 12 shows a representative gel permeation chromatography (GPC) trace for the functionalized resin synthesis product of Step 1C, the synthesis of a pendant silane-functionalized resin from a carboxylic acid group functionalization as described in Example 1.1.

In a 3-necked, 2 L round-bottom flask fitted with a thermometer and a stir bar, 83.0 g of 3.38 mol % carboxylic acid containing resin (717 mmol containing 24.2 mmol of carboxyl units) and 715 mL of DCM were charged. The solution was placed under a $N_2$ blanket and magnetically stirred. When the resin was fully dissolved, the flask was chilled with an ice/NaCl/water bath. When the temperature reached 2.5±2.5° C., 2.69 g of ethyl chloroformate (24.8 mmol) followed by 2.46 g of TEA (24.3 mmol) were added. The activation time (formation of mixed anhydride) was 30 min at 5±3° C. Then, 5.38 g of 3-aminopropyltriethoxysilane (24.3 mmol) was charged. The chilling bath was removed, and the solution was allowed to warm to room temperature and continue reaction for 23 hours. The reaction solution was dried over anhydrous $MgSO_4$. The solid was removed by gravimetric filtration over Whatman® #1 filter paper. The solvent was removed, and 50 mL of anhydrous reagent alcohol was added to the flask. The solvent was decanted, and the waxy product was washed one more time with 50 mL of anhydrous reagent alcohol. The product was dried under reduced pressure at room temperature for over 48 hours. The product weighed 81.0 g (92% of the theoretical yield). Silica incorporation was confirmed as 5500 parts per million (ppm) using a xylenes inductively-coupled plasma (ICP) digestion method. Sample FT-IR of the resultant product is shown in FIG. 9. Sample TGA, DSC, and GPC spectra of Step 1C product are provided in FIGS. 10, 11, and 12, respectively.

Figure 1B:
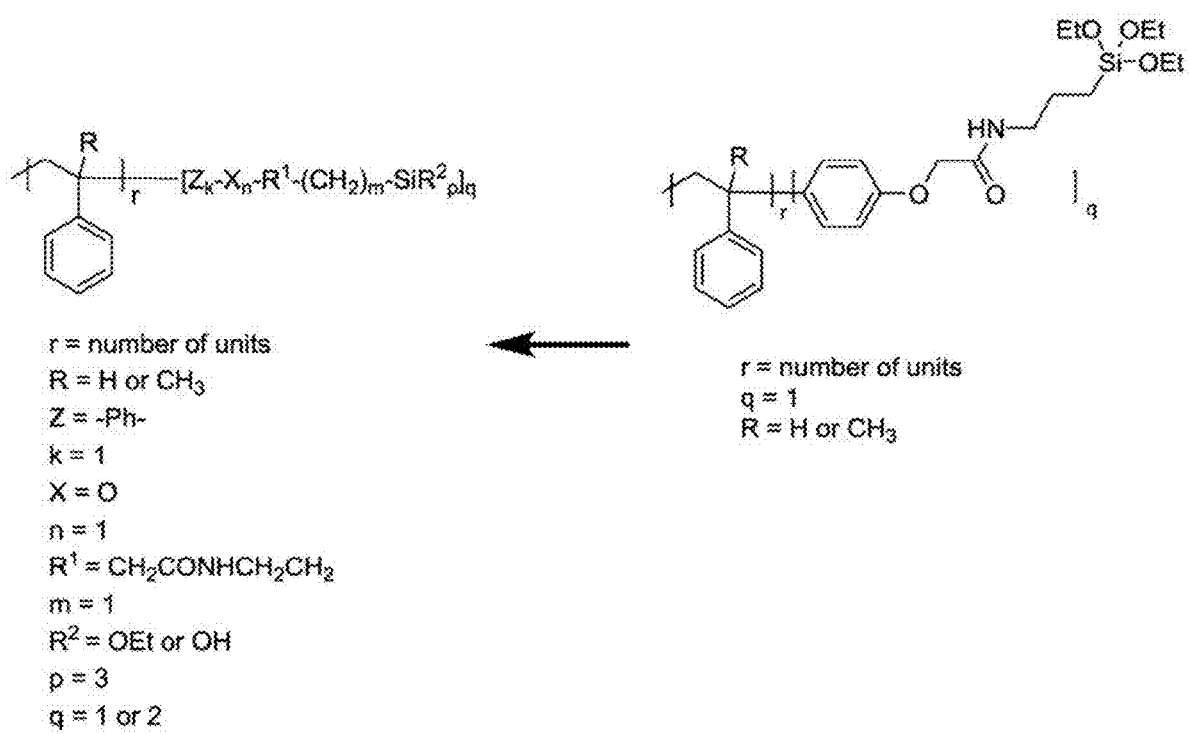

Example 1.2: Synthesis of End-Capped Silane-Containing Resin Via Phenol Functionalization Scheme 2 shows a similar embodiment of the ether route for deprotection of acetoxystyrene-based resin to phenol, followed by ether formation, and silane functionalization, but instead of the functionalization occurring at an internal, pendant position within the resin, the silane functionalization is added to the end cap, terminal, position of the resin. In this embodiment, the phenol groups were functionalized with carboxylic acid groups via reaction of phenol, sodium hydroxide, sodium chloroacetate, and potassium iodide catalyst. Exemplary starting reagent and end product embodiments of this synthetic route are also depicted in FIG. 1B.

Scheme 2

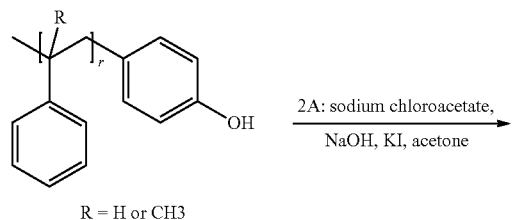

R = H or CH3

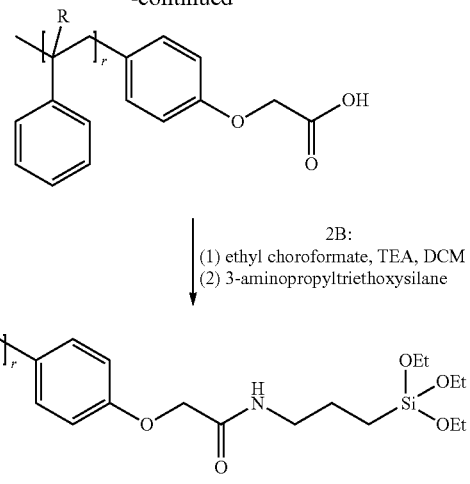

Step 2A: Synthesis of End-Capped COOH-Functionalized Resin from Phenol Group Functionalization.

Figure 13:
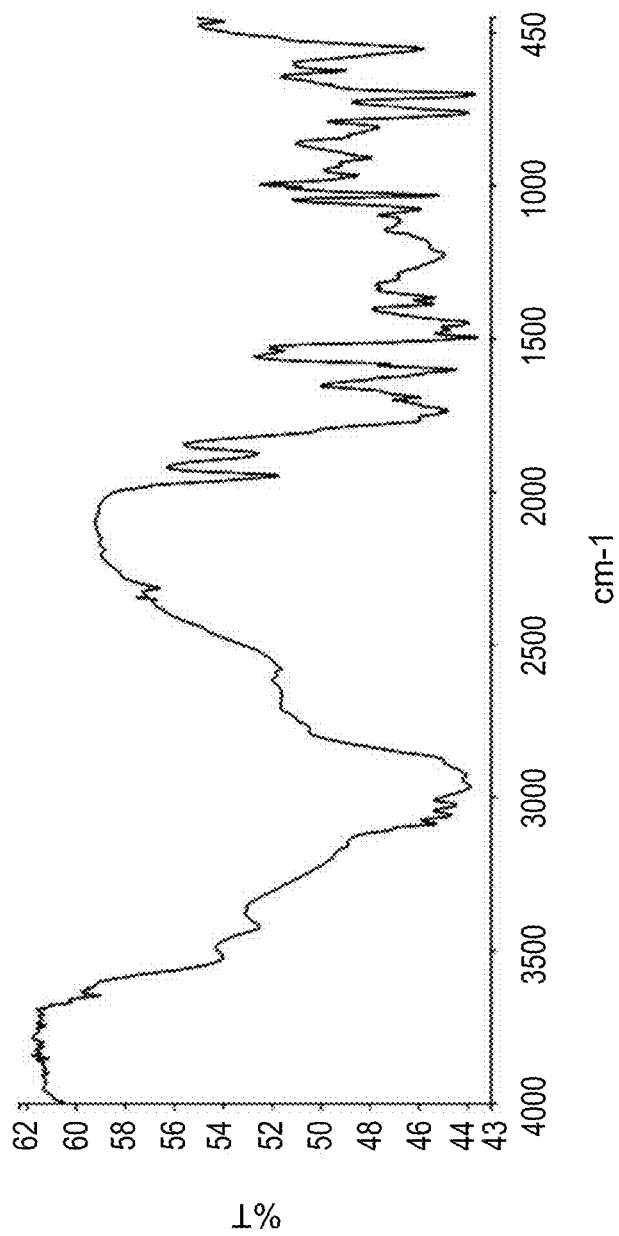
FIG. 13 shows a representative FT-IR spectrum for the functionalized resin synthesis product of Step 2A, the synthesis of an end-capped carboxylic acid-functionalized resin from the phenol group functionalization as described in Example 1.2.
Figure 14:
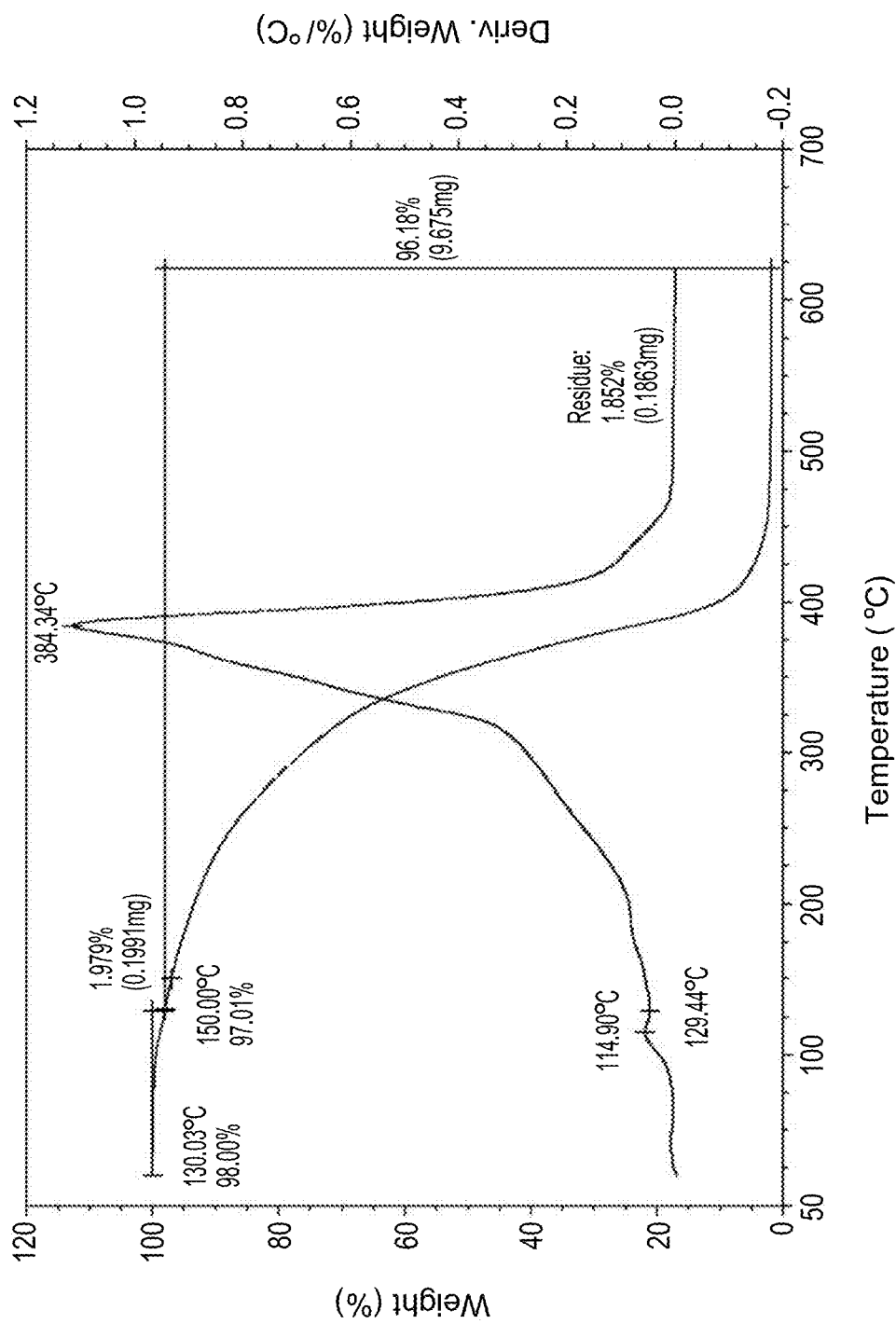
FIG. 14 shows a representative TGA trace for the functionalized resin synthesis product of Step 2A, the synthesis of an end-capped carboxylic acid-functionalized resin from the phenol group functionalization as described in Example 1.2.
Figure 15:
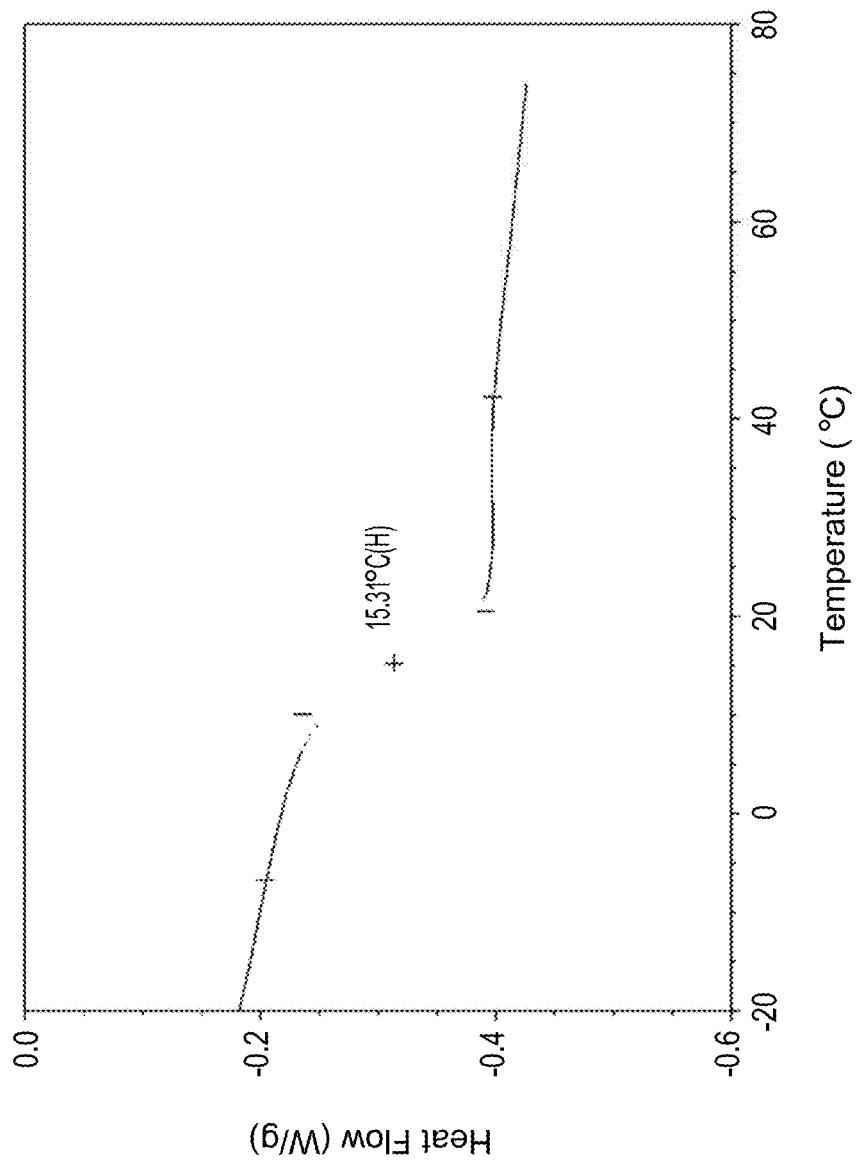
FIG. 15 shows a representative DSC trace for the functionalized resin synthesis product of Step 2A, the synthesis of an end-capped carboxylic acid-functionalized resin from the phenol group functionalization as described in Example 1.2.

In a 3-necked, 2 L round-bottom flask fitted with a mechanical stirrer and reflux condenser, 100.6 g of 10.8 mol % phenol-functionalized resin (902 mmol containing 97.2 mmol of phenol units) and 1.50 L of acetone were charged. When the resin was fully dissolved with stirring, 10.55 g of potassium iodide, 6.48 g of sodium hydroxide, and 101.1 g of sodium chloroacetate were added. The reaction solution was heated to 57° C. for 18 hours. Solvent was removed, and the product was dissolved in 3 L of DCM and washed with 1.2 L of 1M aqueous HCl. The two-phase solution was stirred until complete dissolution of all solids. The aqueous layer was discarded. The solution was washed with 1M aqueous HCl, 1M aqueous NaOH, and then 1M aqueous HCl. The procedure was repeated and washed with 1M aqueous HCl four more times as needed. The organic phase was dried over anhydrous $MgSO_4$. $MgSO_4$ was removed by gravimetric filtration over filter paper. Solvent was removed, and the product was dried in under reduced pressure at room temperature overnight. The product weighed 103.8 g (98% of the theoretical yield). Sample FT-IR of the resultant product is shown in FIG. 13. Sample TGA and DSC spectra of Step 2A product are provided in FIGS. 14 and 15, respectively.

Step 2B: Synthesis of End-Capped Silane-Functionalized Resin from COOH Group Functionalization.

Figure 16:
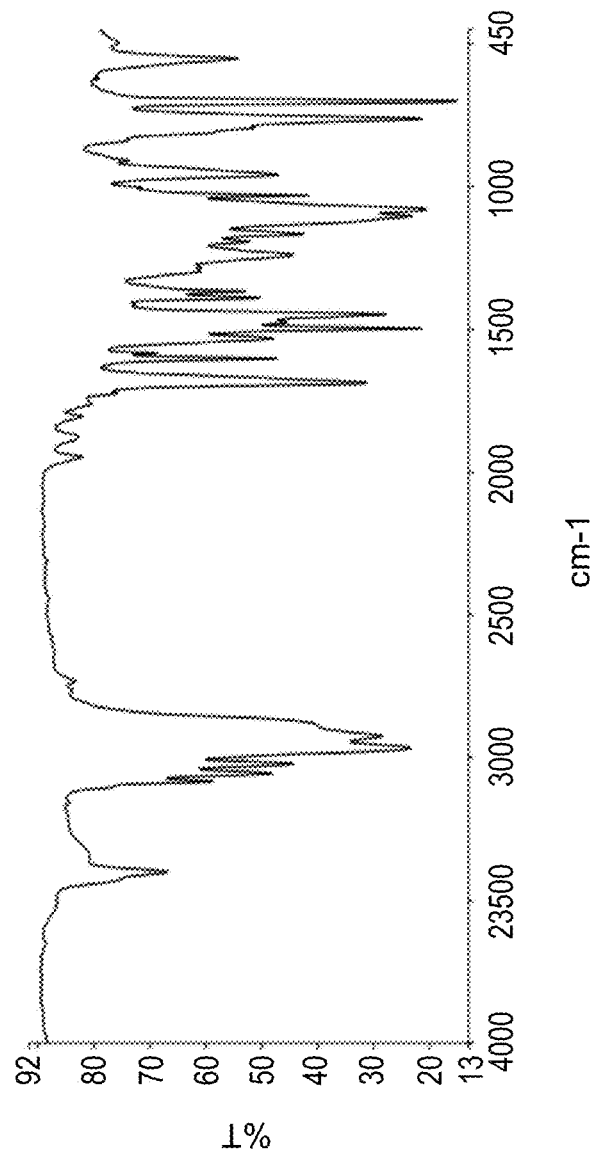
FIG. 16 shows a representative FT-IR spectrum for the functionalized resin synthesis product of Step 2B, the synthesis of an end-capped silane-functionalized resin from the carboxylic acid group functionalization as described in Example 1.2.
Figure 17:
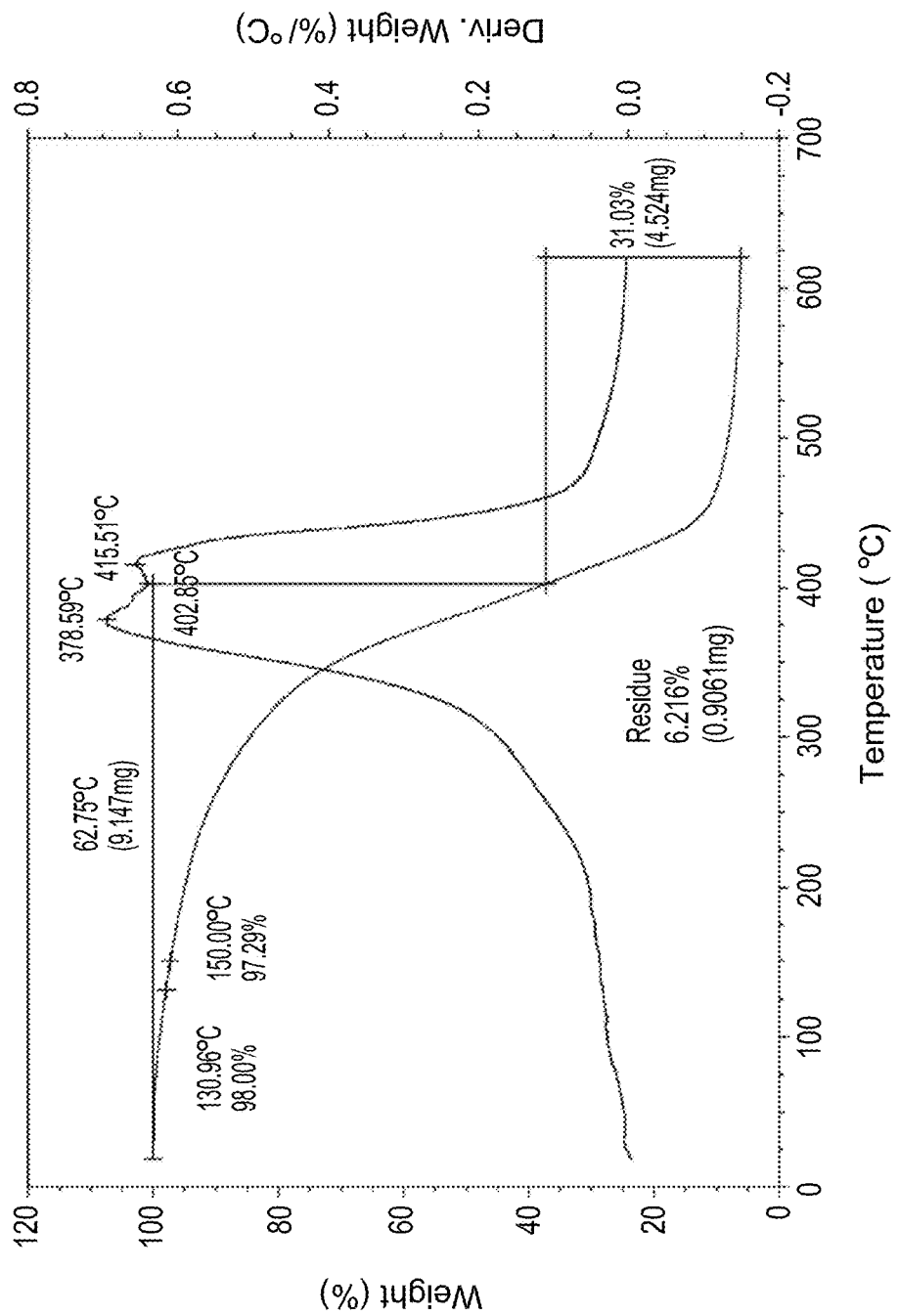
FIG. 17 shows a representative TGA trace for the functionalized resin synthesis product of Step 2B, the synthesis of an end-capped silane-functionalized resin from the carboxylic acid group functionalization as described in Example 1.2.
Figure 18:
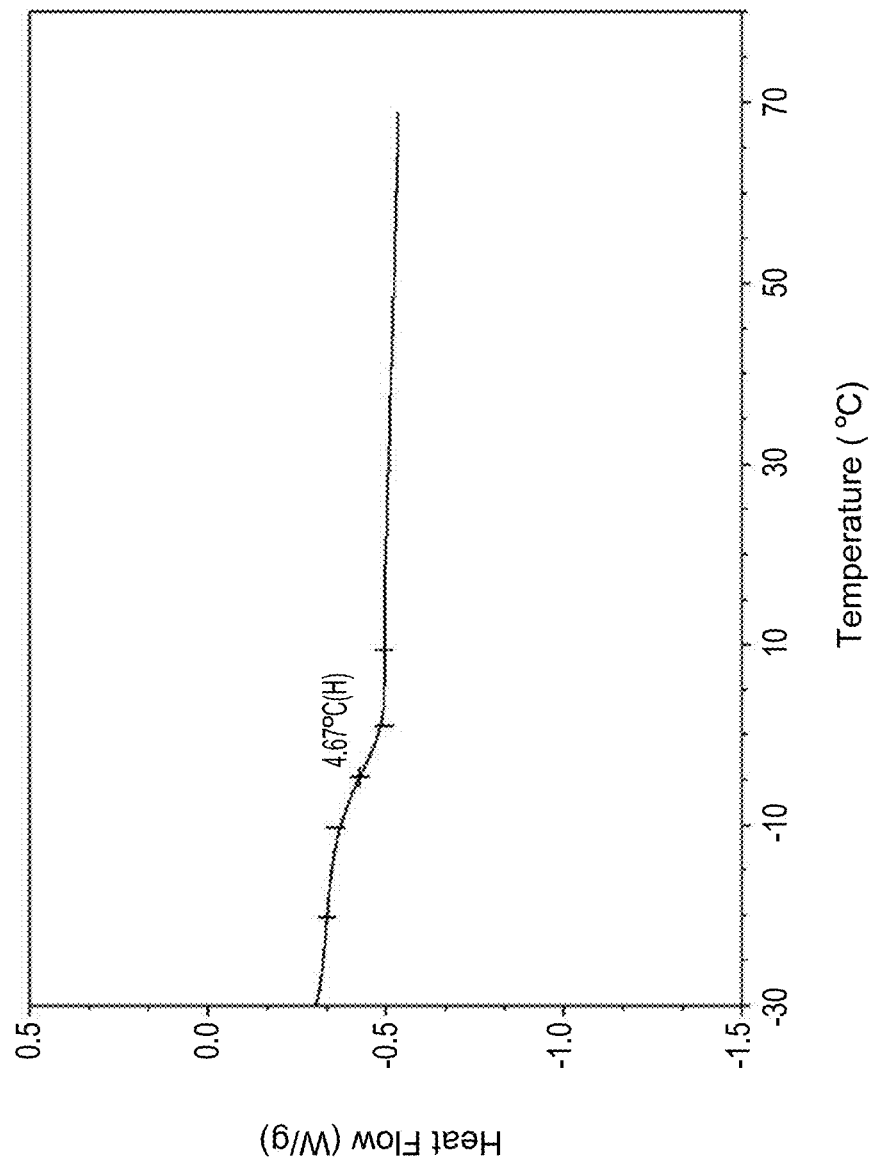
FIG. 18 shows a representative DSC trace for the functionalized resin synthesis product of Step 2B, the synthesis of an end-capped silane-functionalized resin from the carboxylic acid group functionalization as described in Example 1.2.
Figure 19:
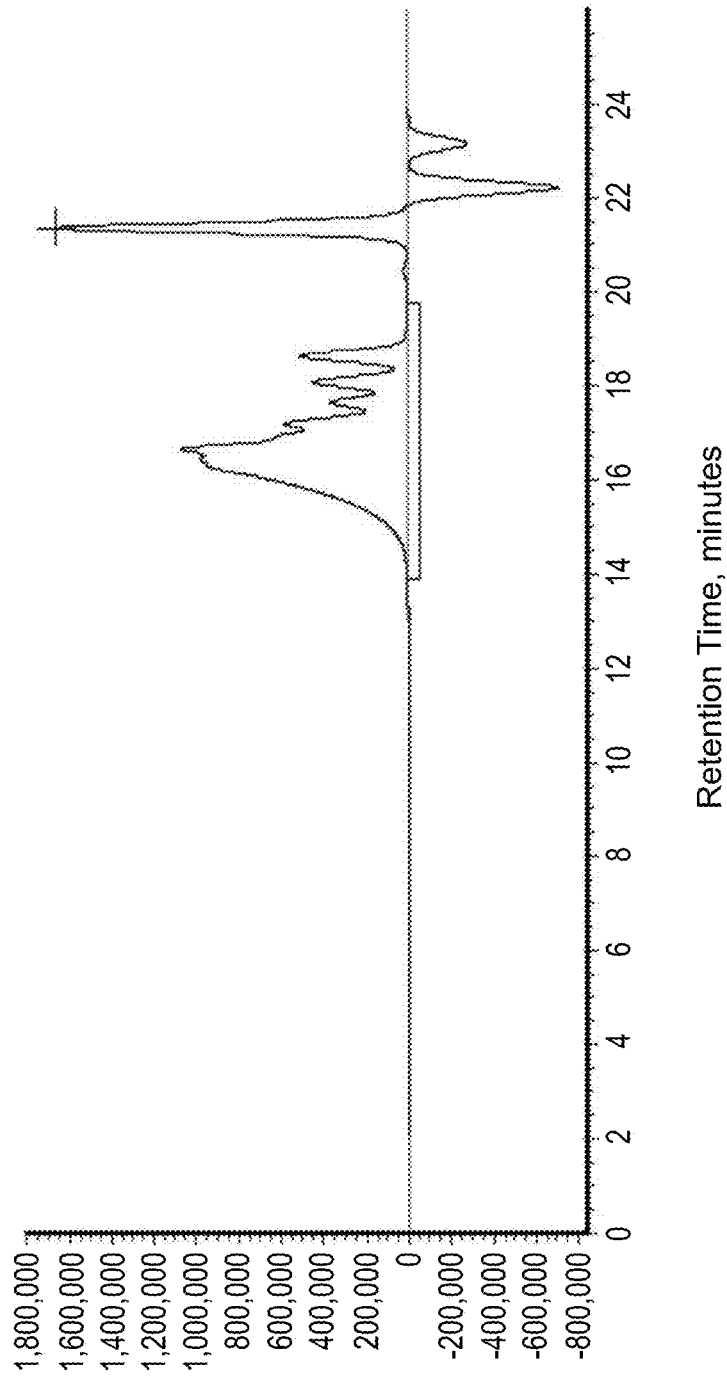
FIG. 19 shows a representative GPC trace for the functionalized resin synthesis product of Step 2B, the synthesis of an end-capped silane-functionalized resin from the carboxylic acid group functionalization as described in Example 1.2.
Figure 20:
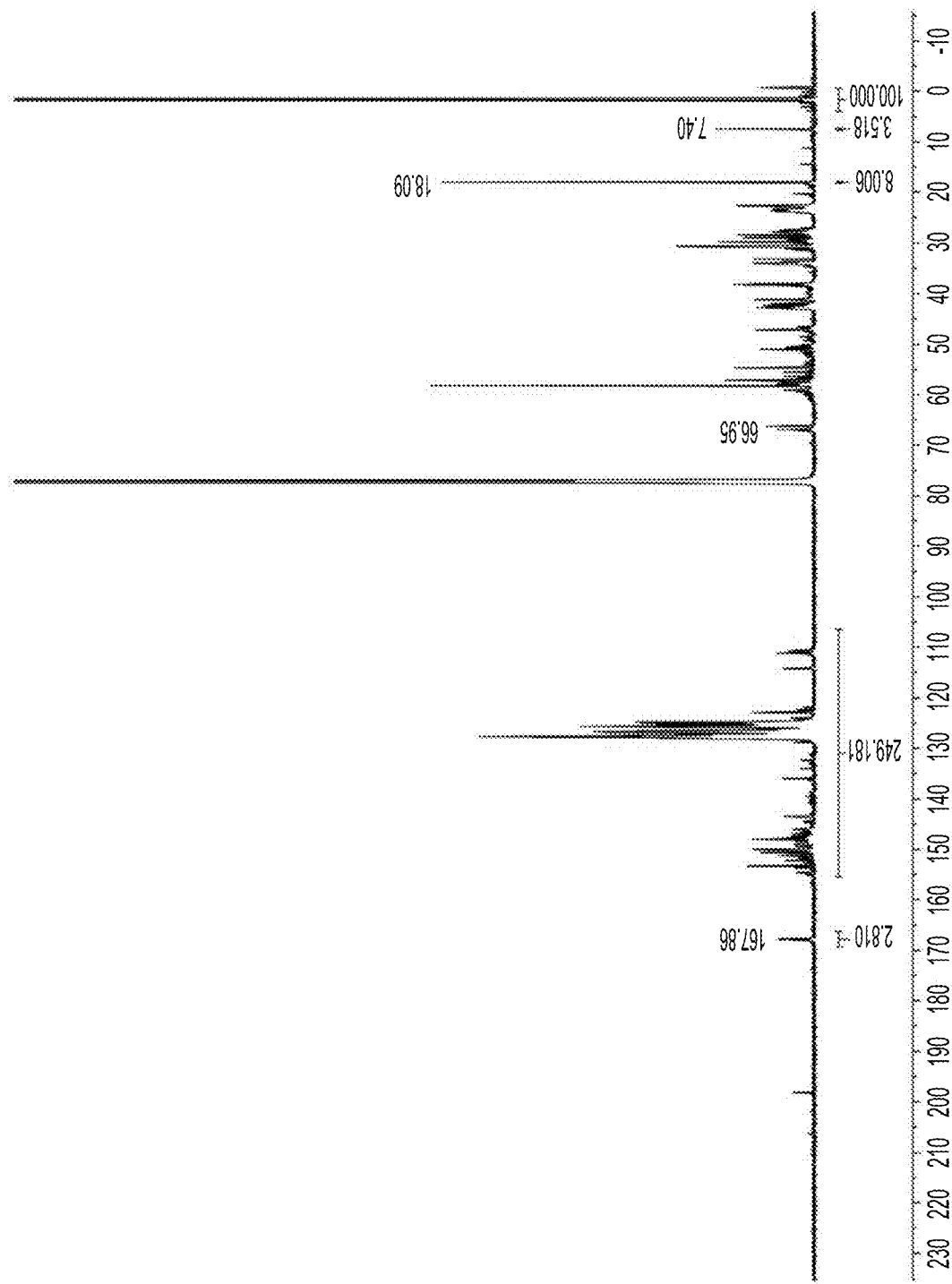
FIG. 20 shows a representative $^{13}C$ nuclear magnetic resonance (NMR) trace for the functionalized resin synthesis product of Step 2B, the synthesis of an end-capped silane-functionalized resin from the carboxylic acid group functionalization as described in Example 1.2.
Figure 21:
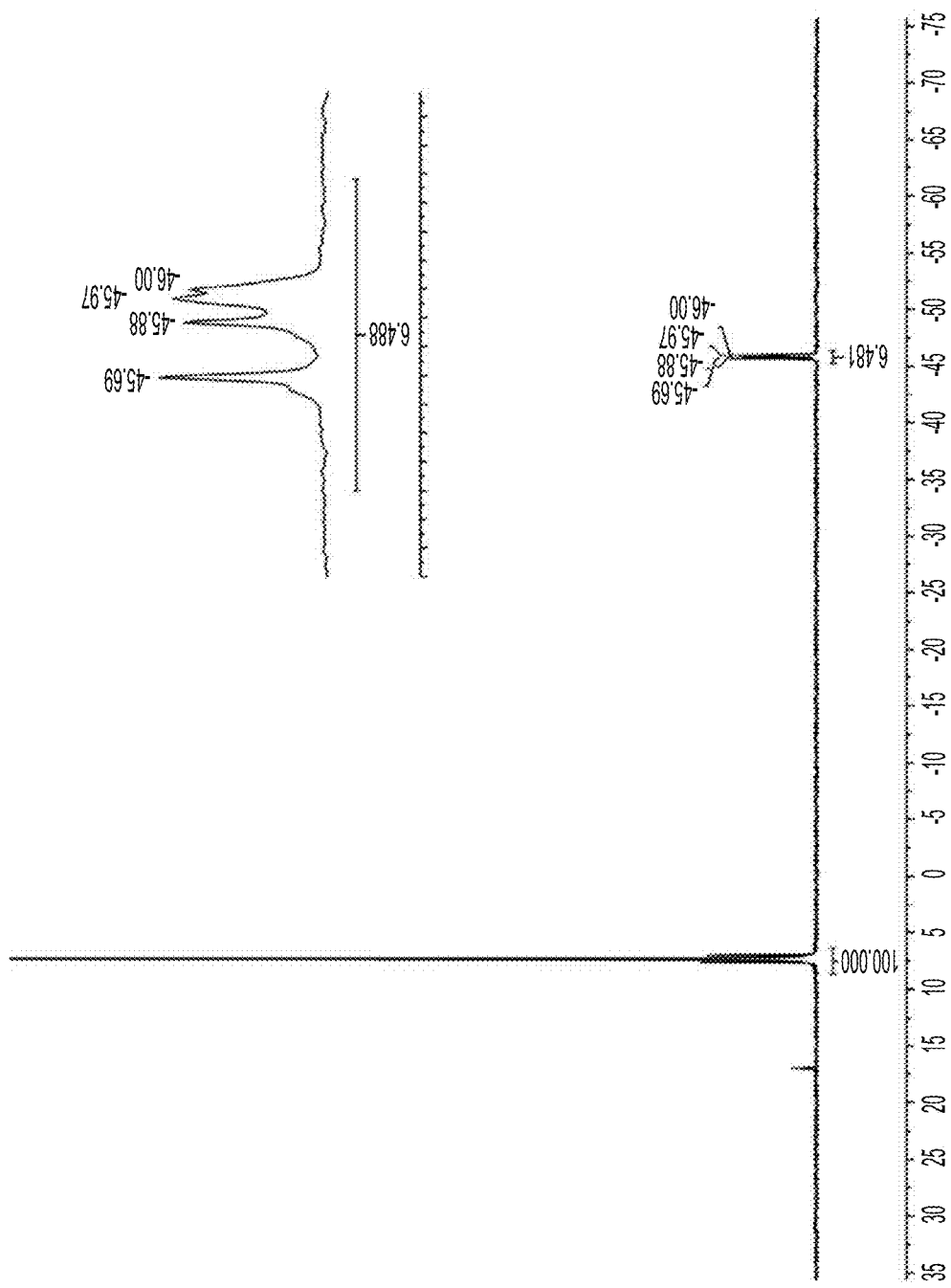
FIG. 21 shows a representative $^{29}Si$ NMR trace for the functionalized resin synthesis product of Step 2B, the synthesis of an end-capped silane-functionalized resin from the carboxylic acid group functionalization as described in Example 1.2.

In a 3-necked, 3 L round-bottom flask fitted with a thermometer and a stir bar, 106.0 g of 10.8 mol % carboxylic acid containing resin (900 mmol containing 97.0 mmol of carboxyl units), and 2.70 L of DCM were charged. The solution was placed under a $N_2$ blanket and magnetically stirred. When the resin was fully dissolved, the flask was chilled with an ice/NaCl/water bath. When the temperature reached 2.5±2.5° C., 10.75 g of ethyl chloroformate (99.1 mmol) followed by 9.97 g of TEA (98.5 mmol) were added. The activation time (formation of mixed anhydride) was 32 min at 5±3° C. Then, 21.58 g of 3-aminopropyltriethoxysilane (97.5 mmol) was charged. The chilling bath was removed, and the reaction was allowed to warm to room temperature. The reaction was allowed to continue 25 hours at room temperature. Insoluble (triethylamine hydrochloride) was removed by gravimetric filtration over Whatman® #1 filter paper. Then, 300 mL of hexanes was added. The mixture was stirred for 30 minutes and stored in the freezer for 48 hours. The two-phase system was allowed to warm to room temperature. The top hexanes layer was isolated, and solvent was removed. The product was dried under reduced pressure at room temperature for 2 to 3 days. Dry ethanol was used to help remove hexanes. The waxy product weighed about 80 g (63-64% of the theoretical yield). An alternative workup is to remove all solvent under reduced pressure after the reaction is complete and dissolve the product in diethyl ether or methyl tertiary butyl ether (MTBE). The solution is then filtered over filter paper to remove triethylamine hydrochloride byproduct, and the solvent is slowly evaporated. The product is dried at room temperature under reduced pressure. ICP Si product content was 19820 ppm. $^{13}$C and $^{29}$Si nuclear magnetic resonance (NMR) confirmed 6.4 to 6.8 mol % silane functionalization. Sample FT-IR of the resultant product is shown in FIG. 16. Sample TGA, DSC, and GPC spectra of Step 2B product are provided in FIGS. 17, 18, and 19, respectively. Spectra corresponding to $^{13}$C NMR and $^{29}$Si NMR for the Step 2B product are also provided in FIGS. 20 and 21, respectively.

Figure 1C:
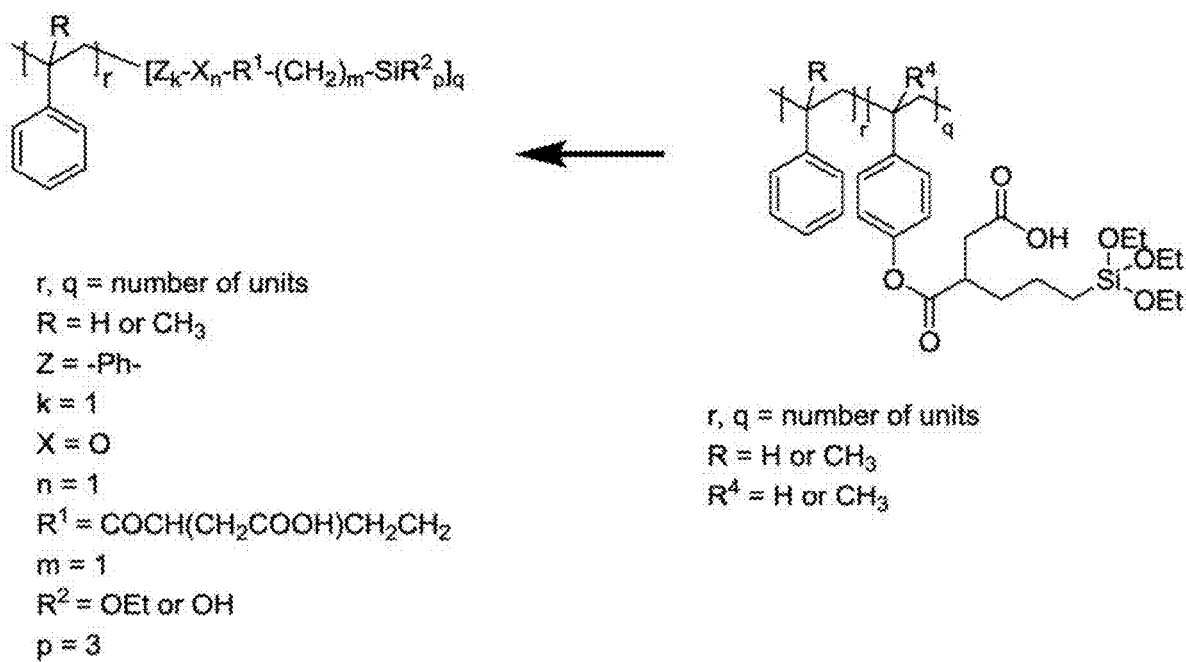

Example 1.3: Synthesis of Pendant Silane-Containing Resin Via Phenol Functionalization with Anhydride Silane The following is an example of the synthesis of a silane-containing/ester modified resin using an acetoxystyrene-modified starting material, as depicted in Scheme 3. In this embodiment, phenol groups of resins were formed by hydrolysis of acetoxy functions, then reacted with 3-(triethoxysilyl)propylsuccinic anhydride to provide the formation of ester linkage to form a functionalized resin having the Formula: resin-OCO—CH(CH$_2$COOH)((CH$_2$)$_3$—Si(OCH$_2$CH$_3$)$_3$). Exemplary starting reagent and end product embodiments of this synthetic route are also depicted in FIG. 1C.

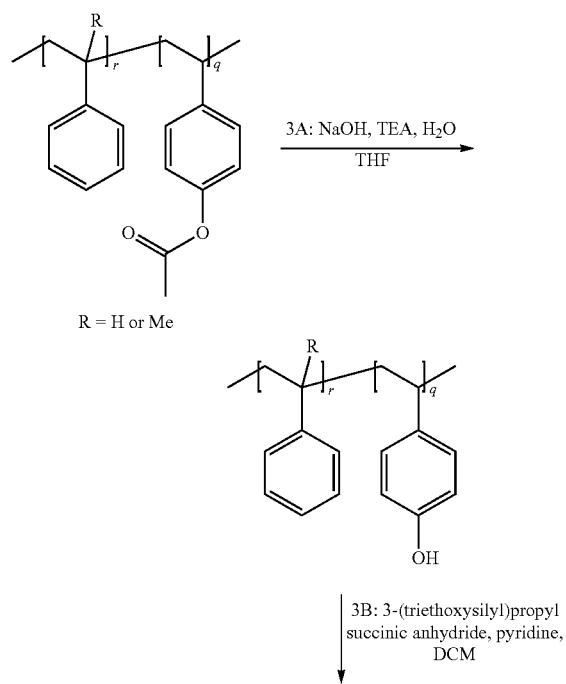

Scheme 3

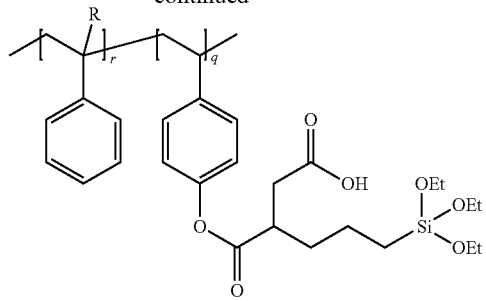

Step 3A: Synthesis of Pendant Phenol-Functionalized Resin from Acetoxystyrene Deprotection.

In a one-necked, round-bottom flask (RBF), a stir bar and 50.0 g of 3.4 mol % acetoxystyrene-containing resin were charged. Tetrahydrofuran (279 mL) was added. The solution was stirred. A solution of 1.76 g of sodium hydroxide was prepared in 9.25 mL of deionized water. When the starting material resin fully dissolved, the solution of sodium hydroxide was added. Triethylamine (TEA, 7.43 g) was added, and the RBF was fitted with a condenser. The solution was heated to reflux for 4 hours. The reaction was monitored by FT-IR. The reaction was considered complete when the carbonyl band (1750 cm-1) fully disappeared. Heating was stopped. The flask was allowed to cool to room temperature. THF was evaporated. Dichloromethane (DCM, 280 mL) was added to the RBF, and the solution was stirred vigorously. The solution was then transferred into a separatory funnel. The organic layer was washed with 2×280 mL of aqueous HCl (1 mol/L) and then 4×280 mL of DI water. The organic layer was dried over magnesium sulfate. The solid was filtered, and the filtrate was kept. The DCM was removed, and the solid product was dried at 30° C. under reduced pressure until constant weight.

Step 3B: Synthesis of Pendant Silane-Functionalized Resin from Phenol Modification with Anhydride Silane.

Figure 22:
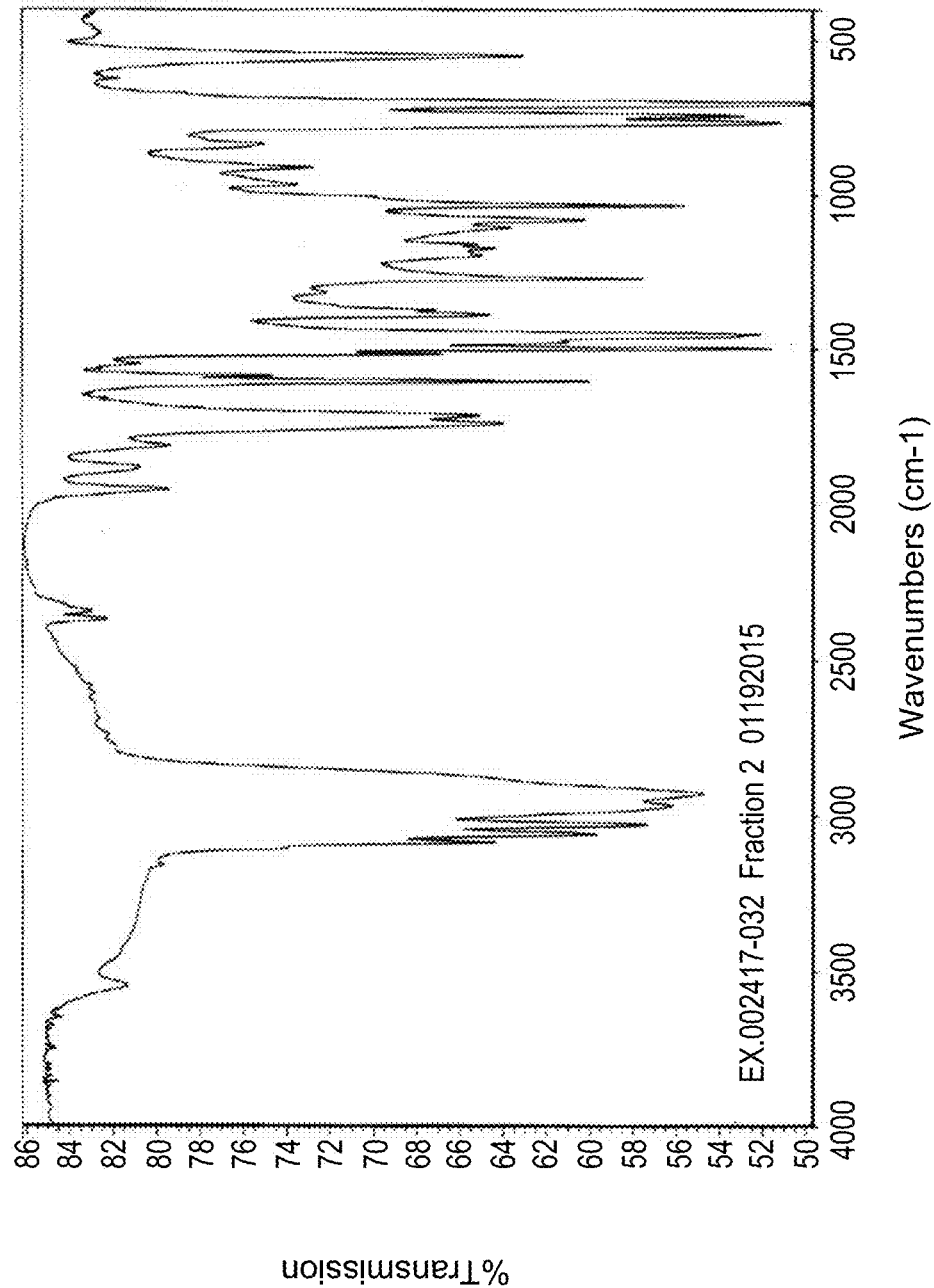
FIG. 22 shows a representative FT-IR spectrum for the functionalized resin synthesis product of Step 3B, the synthesis of a pendant silane-functionalized resin from acetoxystyrene deprotection as described in Example 1.3.
Figure 23:
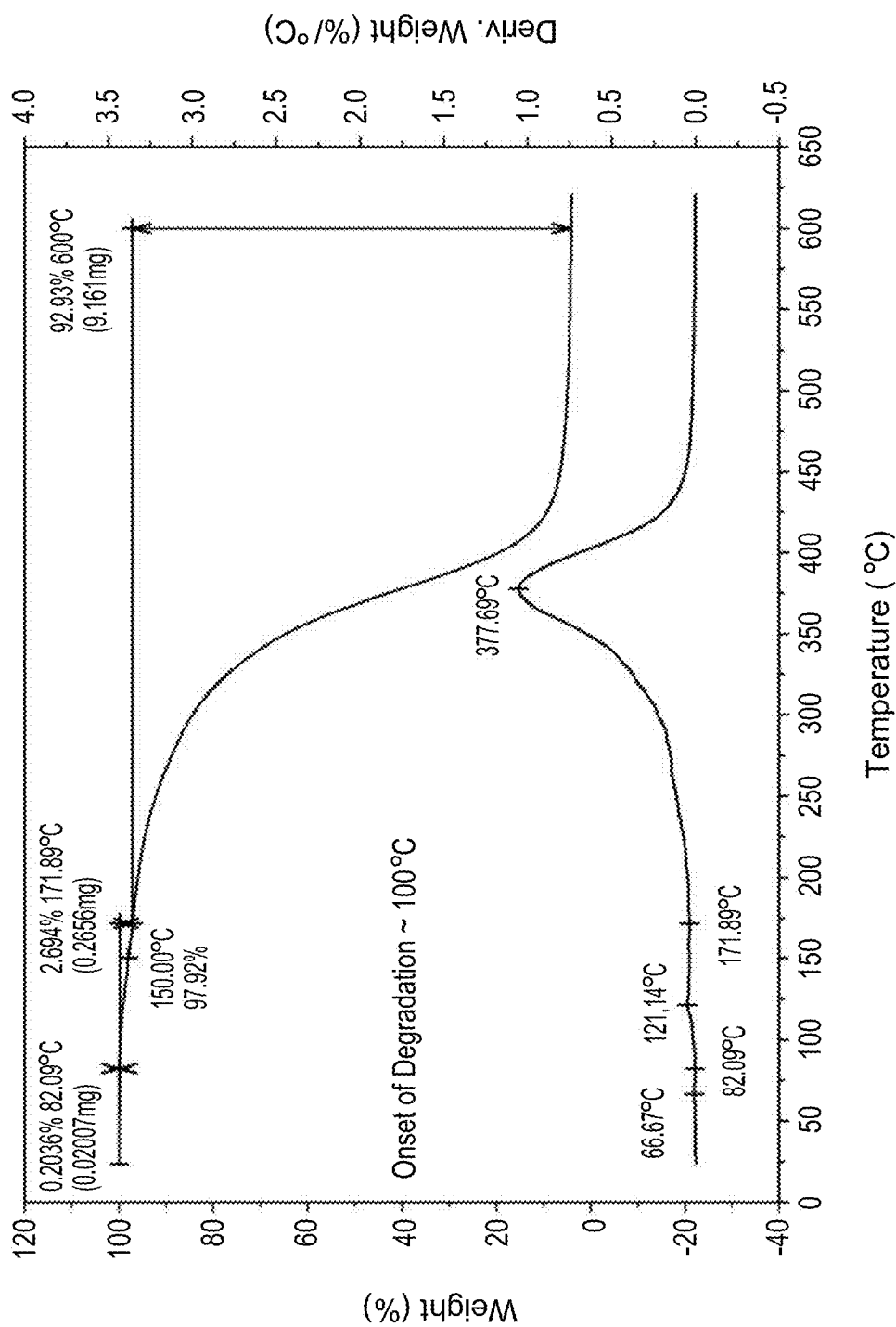
FIG. 23 shows a representative TGA trace for the functionalized resin synthesis product of Step 3B, the synthesis of a pendant silane-functionalized resin from acetoxystyrene deprotection as described in Example 1.3.
Figure 24:
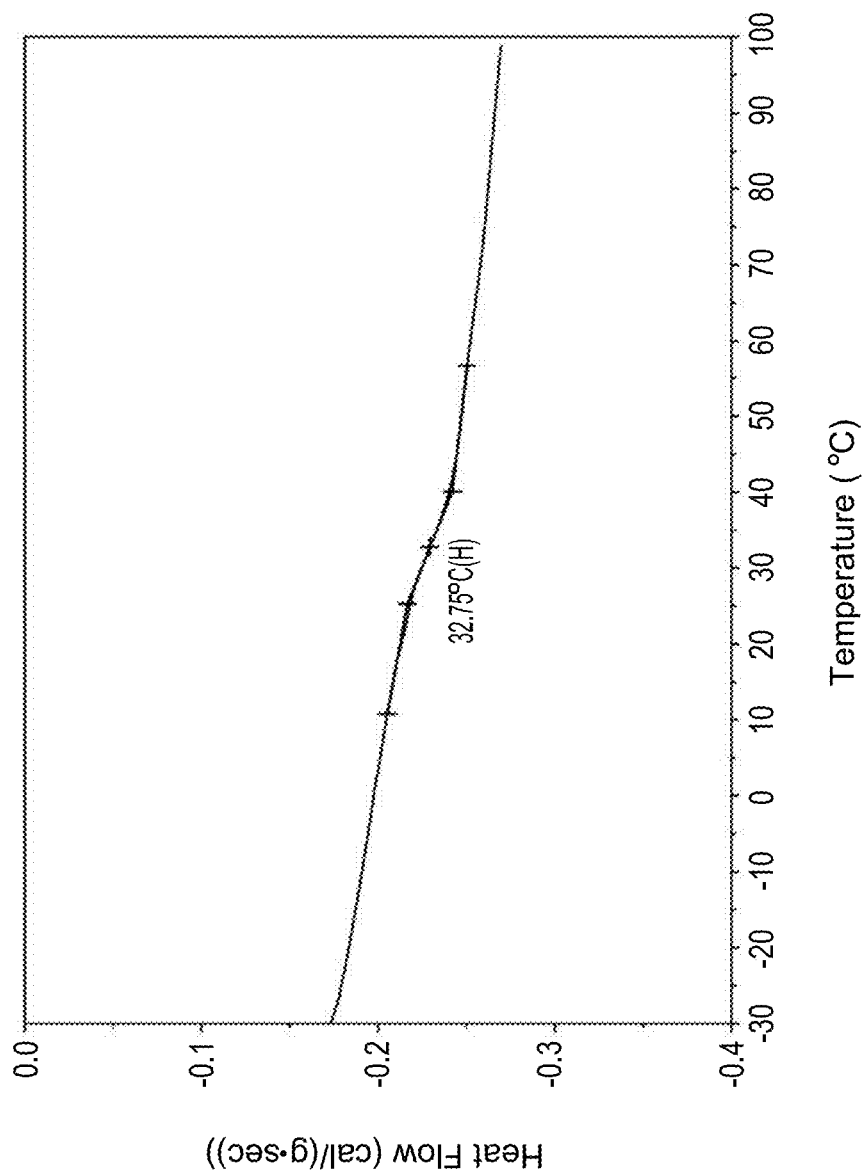
FIG. 24 shows a representative DSC trace for the functionalized resin synthesis product of Step 3B, the synthesis of a pendant silane-functionalized resin from acetoxystyrene deprotection as described in Example 1.3.

In a 100 mL one-necked round bottom flask, a stir bar and 5.00 g of 3.4 mol % hydroxystyrene-containing resin (0.0423 mol containing 0.0015 mol of hydroxystyrene units) were charged. DCM (42 mL, 0.04 mol/L in hydroxystyrene units) was added. When the reaction solution was transparent, the solution was flushed with nitrogen. The flask was fitted with a reflux condenser, and 0.150 g of anhydrous pyridine (0.0019 mol) was added followed by 0.907 g of 3-(triethoxysilyl)propyl succinic anhydride (0.0030 mol). The reaction continued at 38 to 40° C. for about 46 hours. DCM was removed under reduced pressure. The product was washed with 50 mL of anhydrous ethanol (twice) and dried under reduced pressure at 30° C. until constant weight. The yield was 2.6 g (48% of the theoretical yield). Sample FT-IR of the resultant product is shown in FIG. 22. Sample TGA and DSC spectra of Step 3B product are provided in FIGS. 23 and 24, respectively.

Example 1.4: Synthesis of Pendant Silane-Containing Resin Via Succinic Anhydride Grafting onto Kristalex™ 3085

Figure 1D:
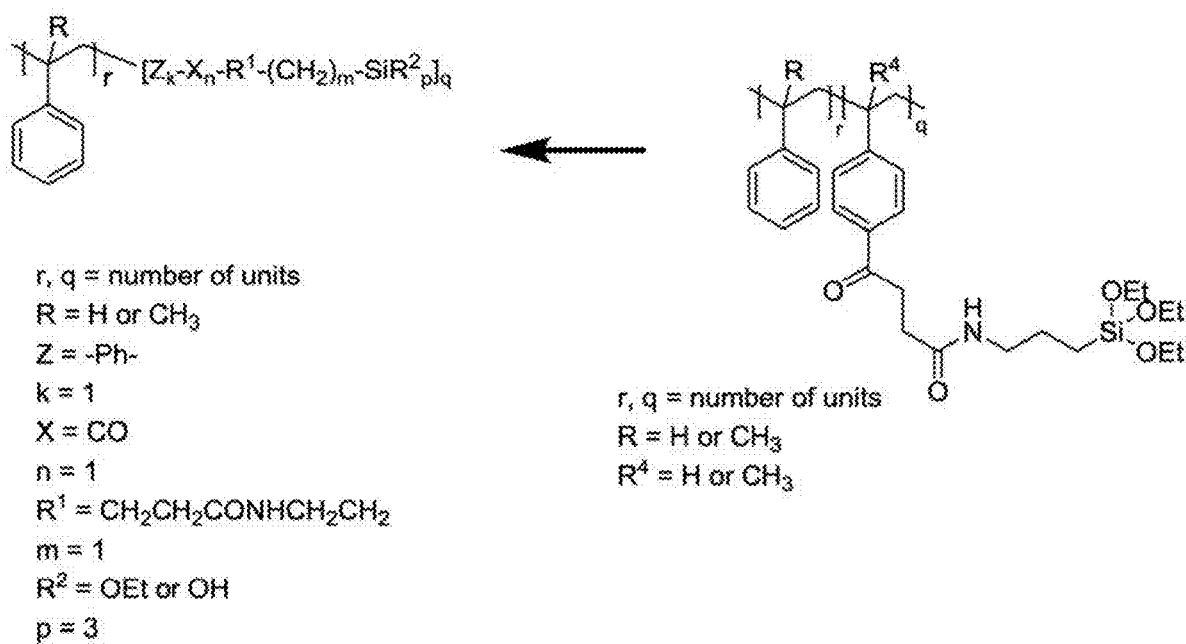

In this embodiment, styrene or poly(alpha-methyl)styrene (AMS) resins were reacted with anhydrides, such as succinic anhydride, to create a carboxylic acid moiety onto which the silane moiety is added, as depicted in Scheme 4. Exemplary starting reagent and end product embodiments of this synthetic route are also depicted in FIG. 1D.

Scheme 4

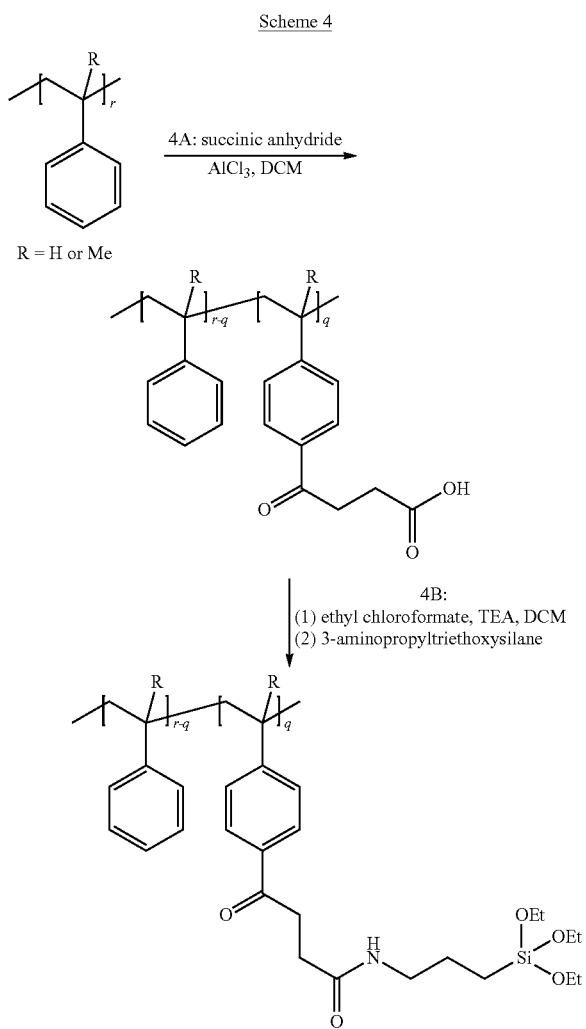

Step 4A: Synthesis of Pendant COOH-Functionalized Resin from Grafting Succinic Anhydride onto Kristalex™ 3085.

Figure 25:
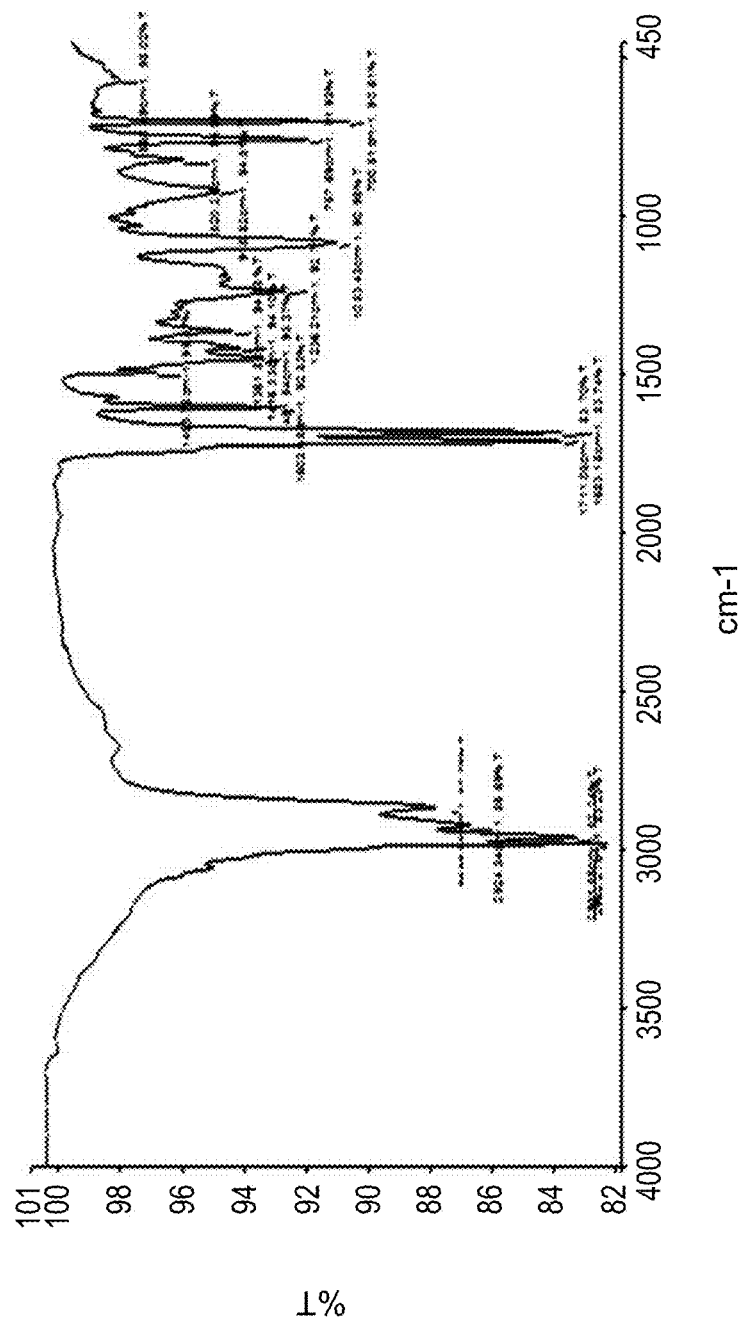
FIG. 25 shows a representative FT-IR spectrum for the functionalized resin synthesis product of Step 4A, the synthesis of a pendant carboxylic acid-functionalized resin from a phenol modification with anhydride silane as described in Example 1.4.
Figure 26:
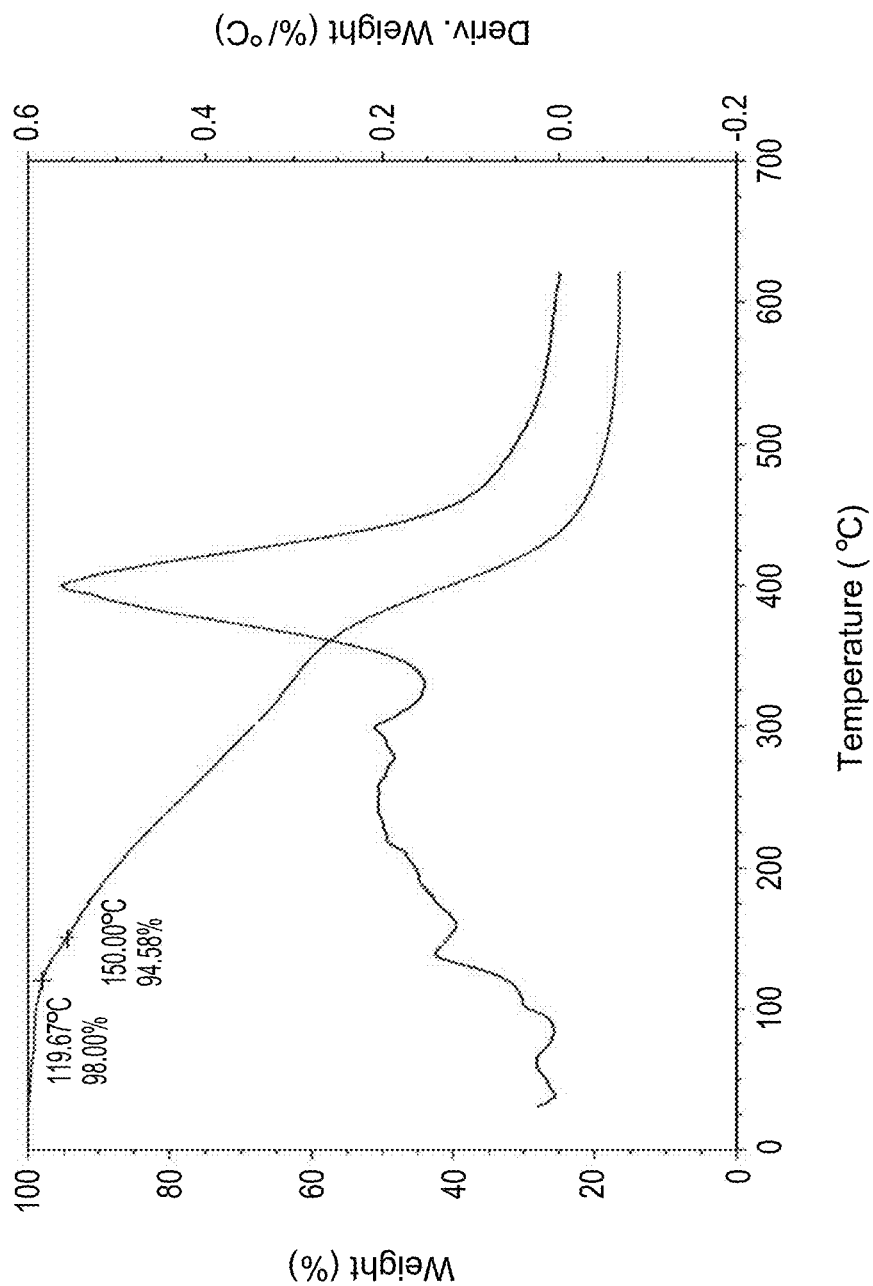
FIG. 26 shows a representative TGA trace for the functionalized resin synthesis product of Step 4A, the synthesis of a pendant carboxylic acid-functionalized resin from a phenol modification with anhydride silane as described in Example 1.4.
Figure 27:
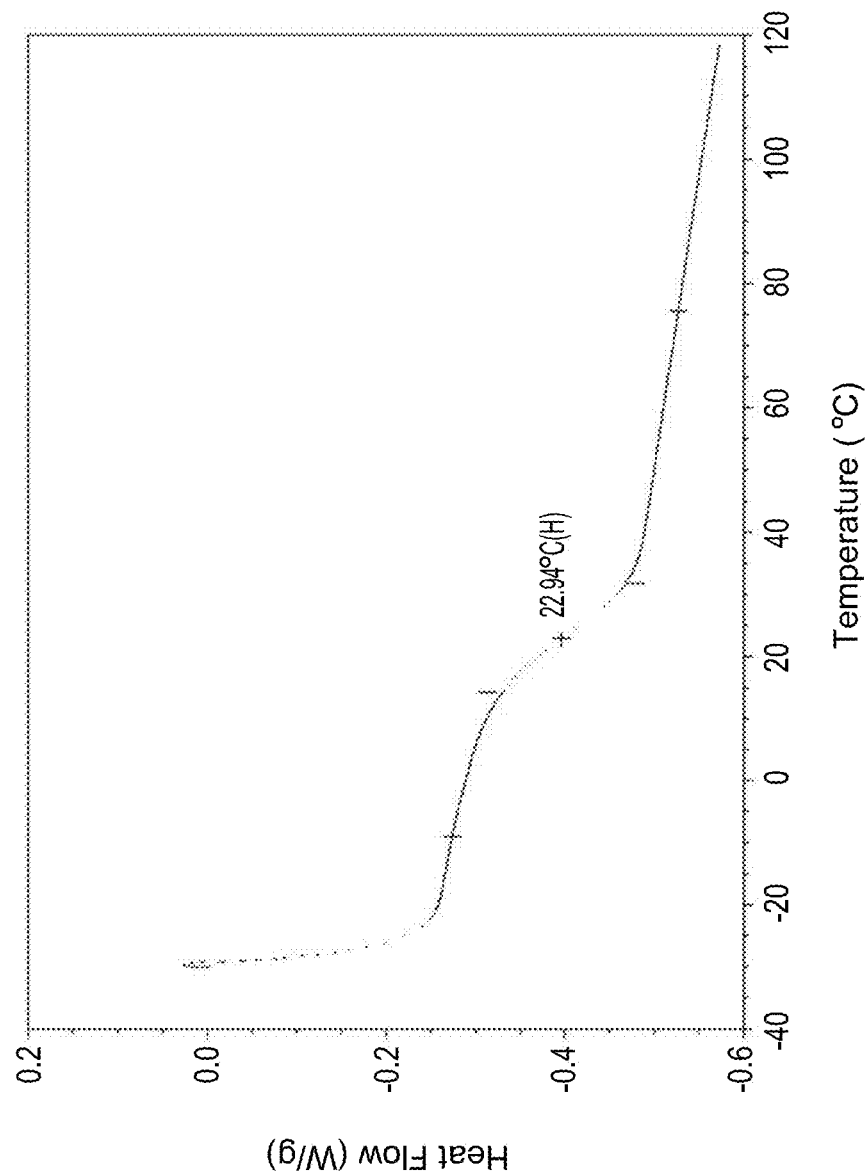
FIG. 27 shows a representative DSC trace for the functionalized resin synthesis product of Step 4A, the synthesis of a pendant carboxylic acid-functionalized resin from a phenol modification with anhydride silane as described in Example 1.4.
Figure 28:
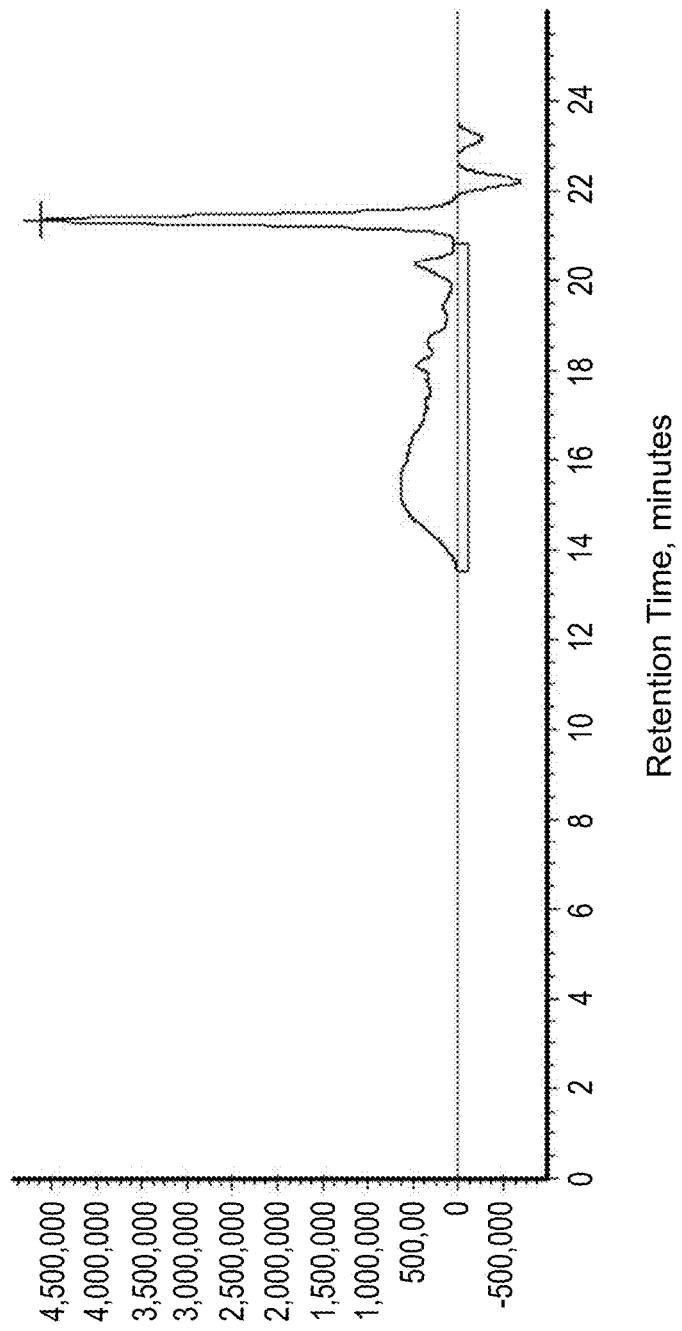
FIG. 28 shows a representative GPC trace for the functionalized resin synthesis product of Step 4A, the synthesis of a pendant carboxylic acid-functionalized resin from a phenol modification with anhydride silane as described in Example 1.4.

A 3-necked, 2 L round-bottom, 2 L flask was fitted with a thermometer, a pressure-equalized addition funnel, and a magnetic stirrer and placed under $N_2$. Then, 77.5 g of anhydrous $AlCl_3$ (581.2 mmol) was made into a slurry with 260 mL of DCM and charged into the bottom of the round-bottom flask with stirring. A separate 1 L round-bottom flask was charged with 100.0 g of Kristalex 3085 (880.4 mmol), 800 mL of DCM, and 26.4 g of succinic anhydride (263.8 mmol) under nitrogen and magnetically stirred until complete dissolution of the solids. The solution was transferred into the pressure-equalized addition funnel for dropwise addition. The solution of $AlCl_3$ and DCM was chilled with an ice/NaCl/water bath. The temperature of the reaction mixture was maintained between −3 and 5° C. during the slow addition of resin/anhydride solution (over 160 min). The reaction was allowed to continue for 3 hours after the addition was completed, maintaining the temperature at 0-15° C. Then, 600 mL of aq HCl 2.5 M solution was cautiously added. The two-phase system was stirred at room temperature overnight. The aqueous phase was discarded. DCM was added to the organic phase to reach a total volume of 1.8 L. The obtained solution was divided into two equal portions. Each portion was washed with aqueous HCl 1M (6 times), then with aqueous NaCl 200 g/L (once). The two portions were combined and dried over anhydrous $MgSO_4$. The solid was removed by filtration over a filter paper. The solvent was removed, and the product was dried under reduced pressure at room temperature for about 20 hours. The yellowish solid weighed 90.2 g (71% of the theoretical yield). Sample FT-IR of the resultant product is shown in FIG. 25. Sample TGA, DSC, and GPC spectra of Step 4A product are provided in FIGS. 26, 27, and 28, respectively. Acid titration data is provided below in Table 2.

TABLE 2

| Acid Titration of Step 4A Product | | | | |
|---|---|---|---|---|
| Trial | sample weight | ml [OH] | Acid # (mg KOH/g) | wt % total acid |
| 1 | 0.0476 | 10.2 | 114.34 | 35.94 |
| 2 | 0.0444 | 10 | 120.06 | 37.72 |
| | | | Average = 117.20 mg KOH/g | |
| | | | Average = 2.09 mmol acid/g | |

Step 4B: Synthesis of Pendant Silane-Functionalized Resin from COOH Group Functionalization.

Figure 29:
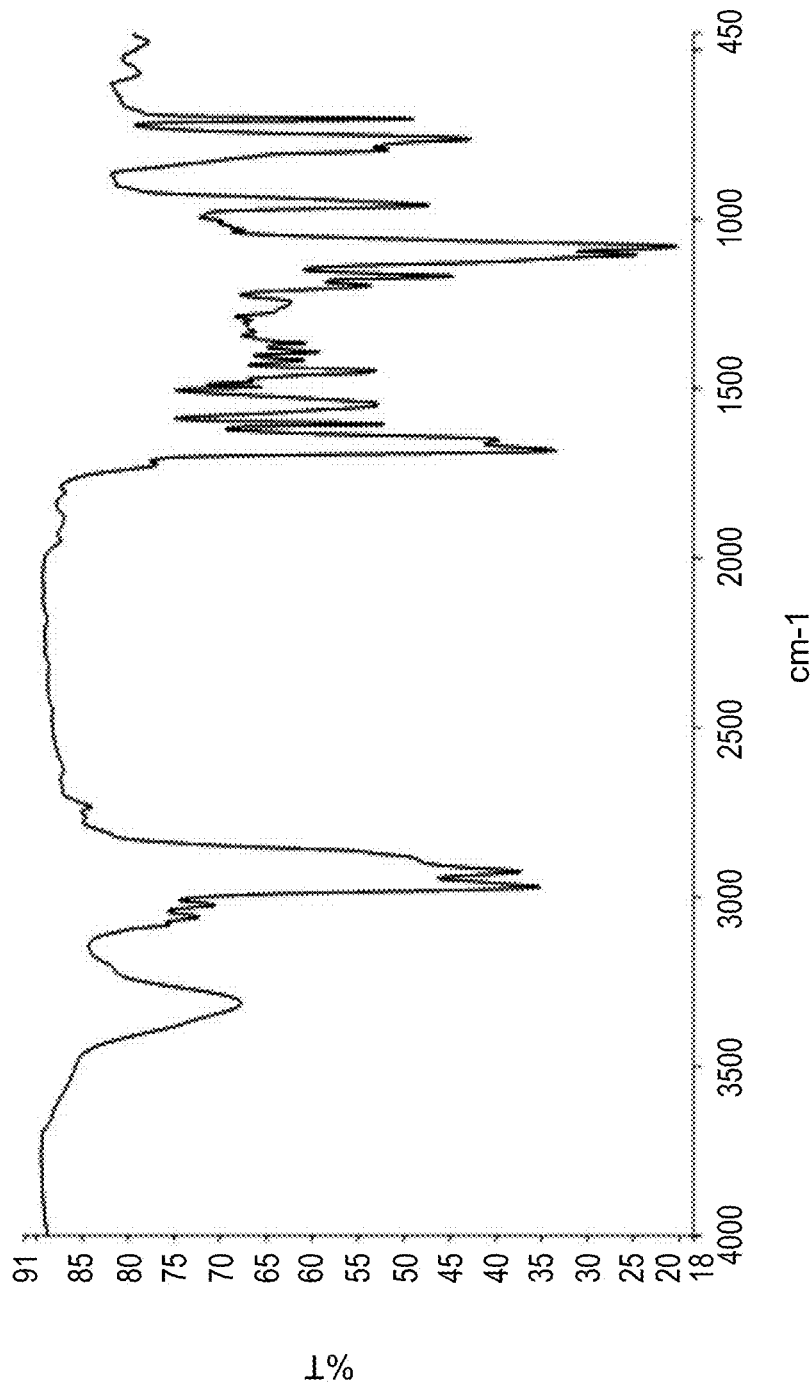
FIG. 29 shows a representative FT-IR spectrum for the functionalized resin synthesis product of Step 4B, the synthesis of a pendant silane-functionalized resin derived from grafting succinic anhydride onto Kristalex™ 3085 as described in Example 1.4.
Figure 30:
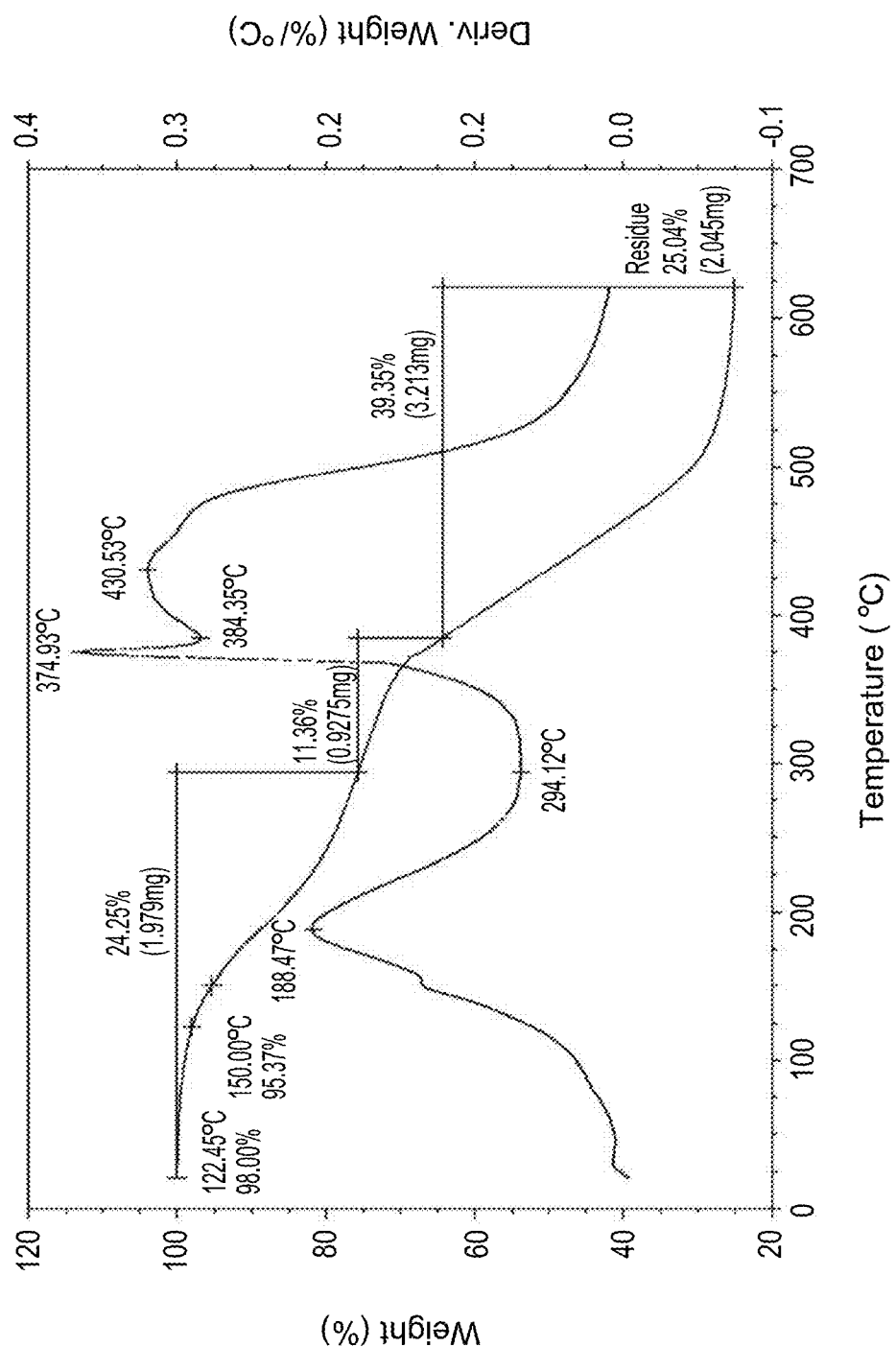
FIG. 30 shows a representative TGA trace for the functionalized resin synthesis product of Step 4B, the synthesis of a pendant silane-functionalized resin derived from grafting succinic anhydride onto Kristalex™ 3085 as described in Example 1.4.
Figure 31:
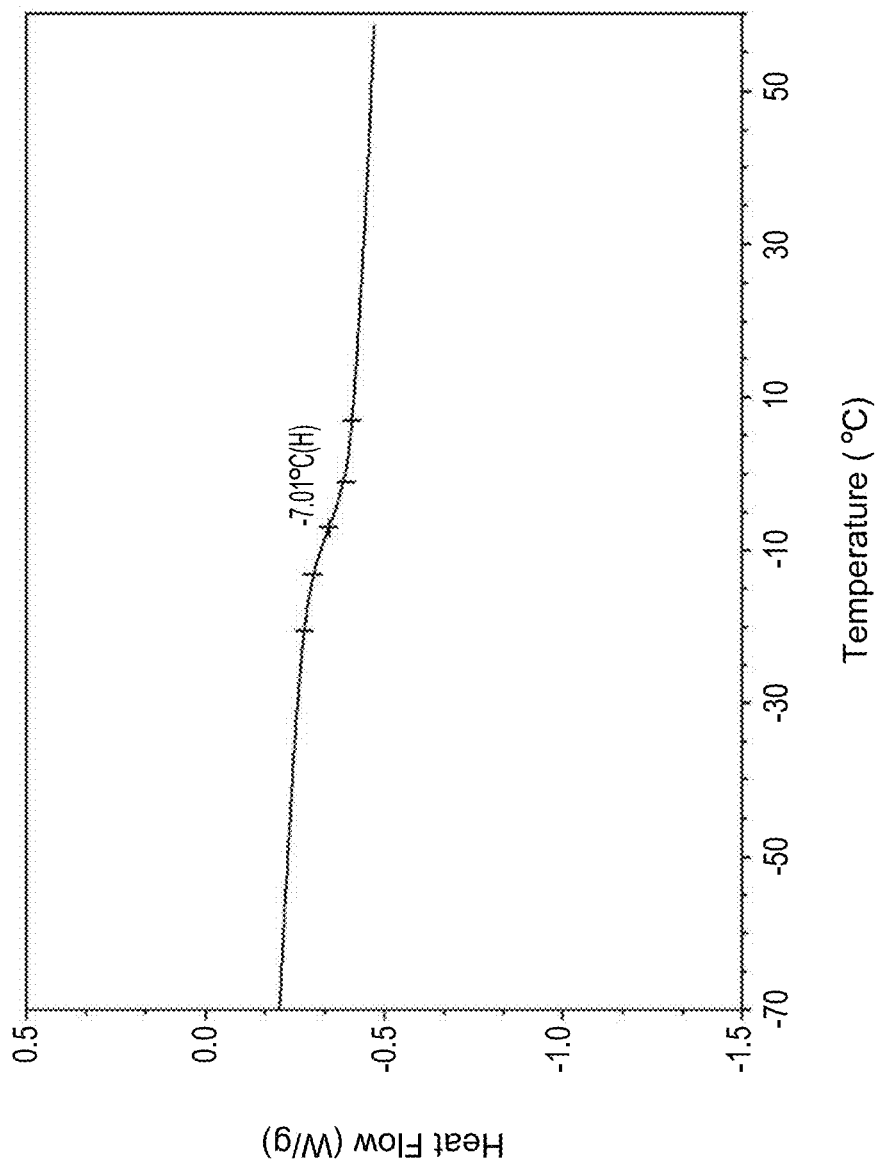
FIG. 31 shows a representative DSC trace for the functionalized resin synthesis product of Step 4B, the synthesis of a pendant silane-functionalized resin derived from grafting succinic anhydride onto Kristalex™ 3085 as described in Example 1.4.
Figure 32:
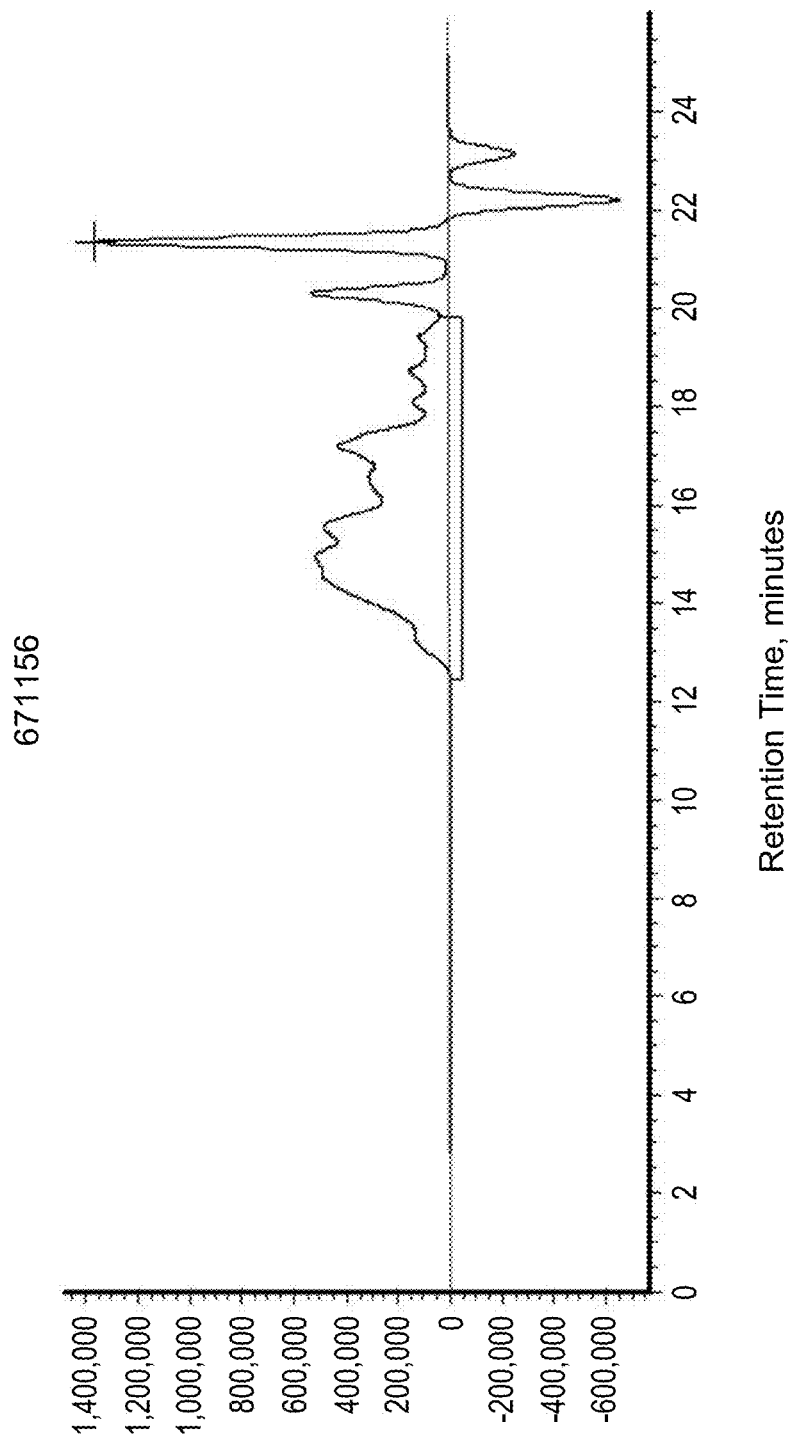
FIG. 32 shows a representative GPC trace for the functionalized resin synthesis product of Step 4B, the synthesis of a pendant silane-functionalized resin derived from grafting succinic anhydride onto Kristalex™ 3085 as described in Example 1.4.
Figure 33:
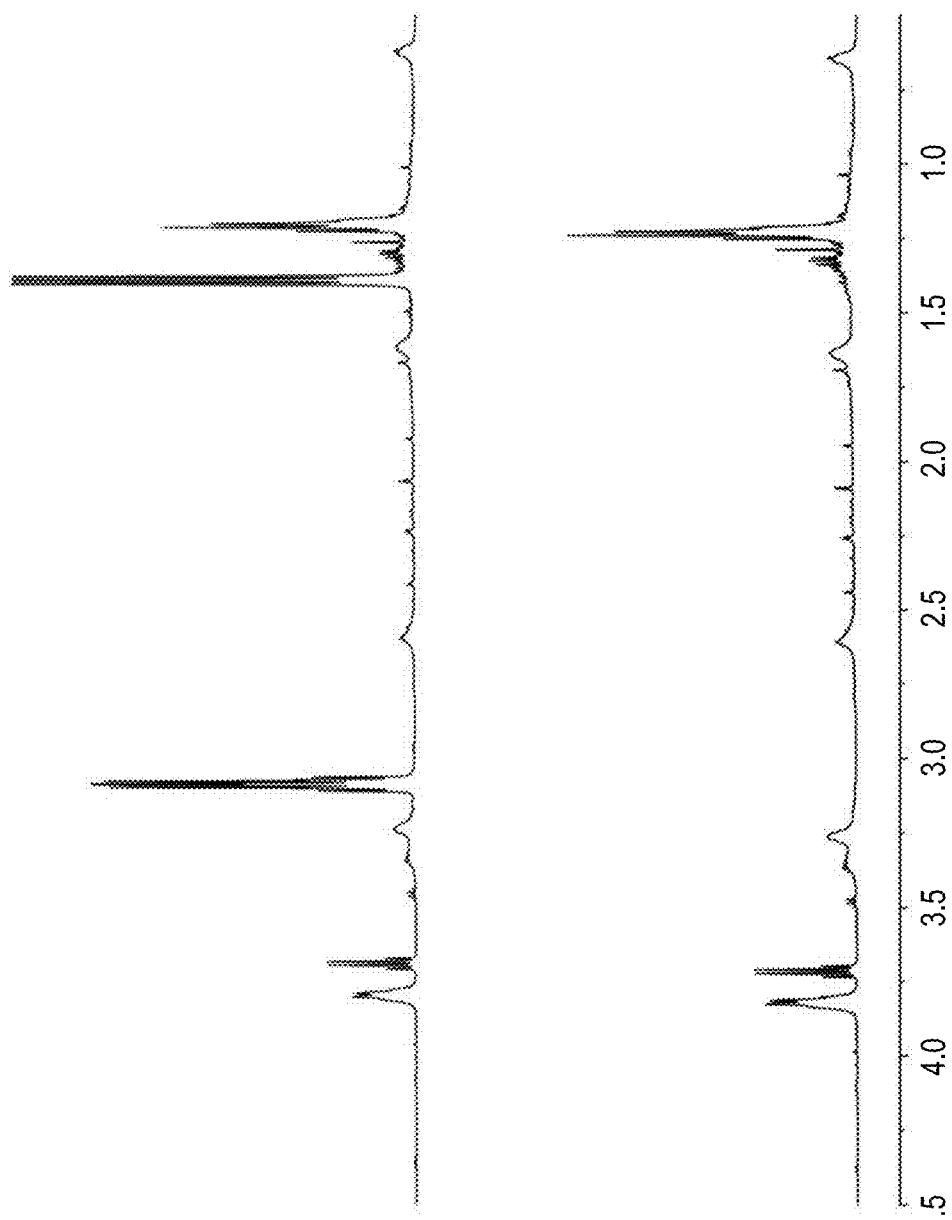
FIG. 33 shows a representative $^1$H NMR trace for the functionalized resin synthesis product of Step 4B, the synthesis of a pendant silane-functionalized resin derived from grafting succinic anhydride onto Kristalex™ 3085 as described in Example 1.4.
Figure 34:
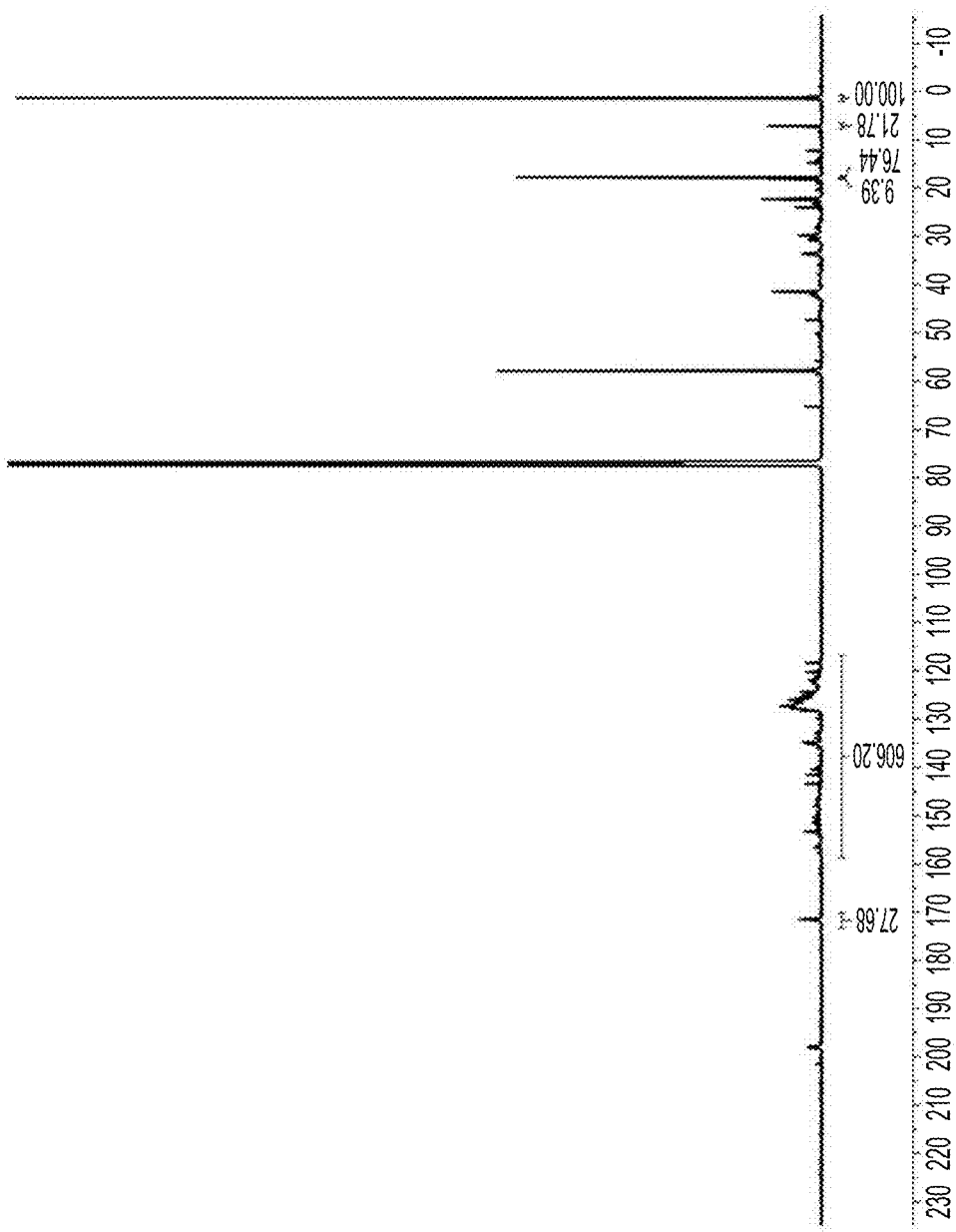
FIG. 34 shows a representative $^{13}$C NMR trace for the functionalized resin synthesis product of Step 4B, the synthesis of a pendant silane-functionalized resin derived from grafting succinic anhydride onto Kristalex™ 3085 (Eastman Chemical, Ltd., Kingsport, Tenn., US) as described in Example 1.4.
Figure 35:
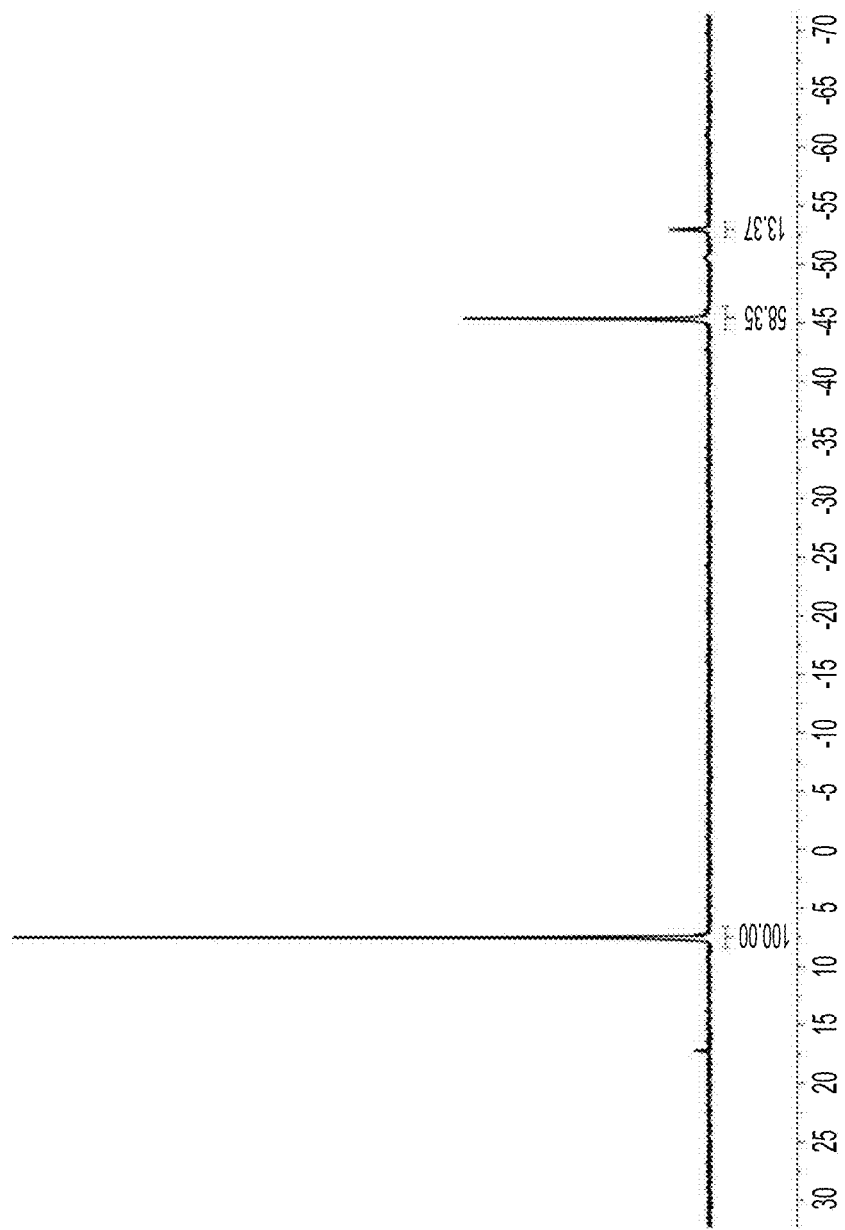
FIG. 35 shows a representative $^{29}$Si NMR trace for the functionalized resin synthesis product of Step 4B, the synthesis of a pendant silane-functionalized resin derived from grafting succinic anhydride onto Kristalex™ 3085 as described in Example 1.4.

A 3-necked, 1 L round-bottom flask was fitted with a thermometer and charged with 72.9 g of 27.87 mol %-Carboxyl-Kristalex™-3085 (515.3 mmol containing 143.6 mmol of carboxyl units) and 450 mL of DCM with magnetic stirring under nitrogen. When the resin was fully dissolved, the round-bottom flask was chilled with an ice/NaCl/water bath. When the temperature reached 2.5±2.5° C., 15.6 g of ethyl chloroformate (143.8 mmol) followed by 14.6 g of TEA (144.3 mmol) were added. The activation time (formation of mixed anhydride) was 12 min at 5±3° C. Then, 30.3 g of 3-aminopropyltriethoxysilane (136.9 mmol) was charged. The chilling bath was removed, and the reaction was allowed to warm to room temperature. The reaction time was about 15 hours at room temperature. Solvent was removed, and the product was dried under reduced pressure at room temperature overnight. Then, 500 mL of anhydrous diethyl ether was added under nitrogen. The mixture was magnetically stirred until complete dissolution of the resin versus the insoluble byproduct (triethylamine hydrochloride). The byproduct was removed by gravimetric filtration over Whatman® #1 filter paper. Dry $N_2$ was bubbled through the filtrate to evaporate most of the ether. The product was dried under reduced pressure at room temperature overnight. The waxy product weighed 92.2 g (90% of the theoretical yield). ICP measured value for Si was 35700 ppm. $^{29}Si$ and $^{13}C$ NMR images indicated 13 to 21 mol % functionalization. Sample FT-IR of the resultant product is shown in FIG. 29. Sample TGA, DSC, and GPC spectra of Step 4B product are provided in FIGS. 30, 31, and 32, respectively. Spectra corresponding to $^{1}H$ NMR, $^{13}C$ NMR, and $^{29}Si$ NMR for the Step 4B product are also provided in FIGS. 33, 34, and 35, respectively.

Figure 1E:
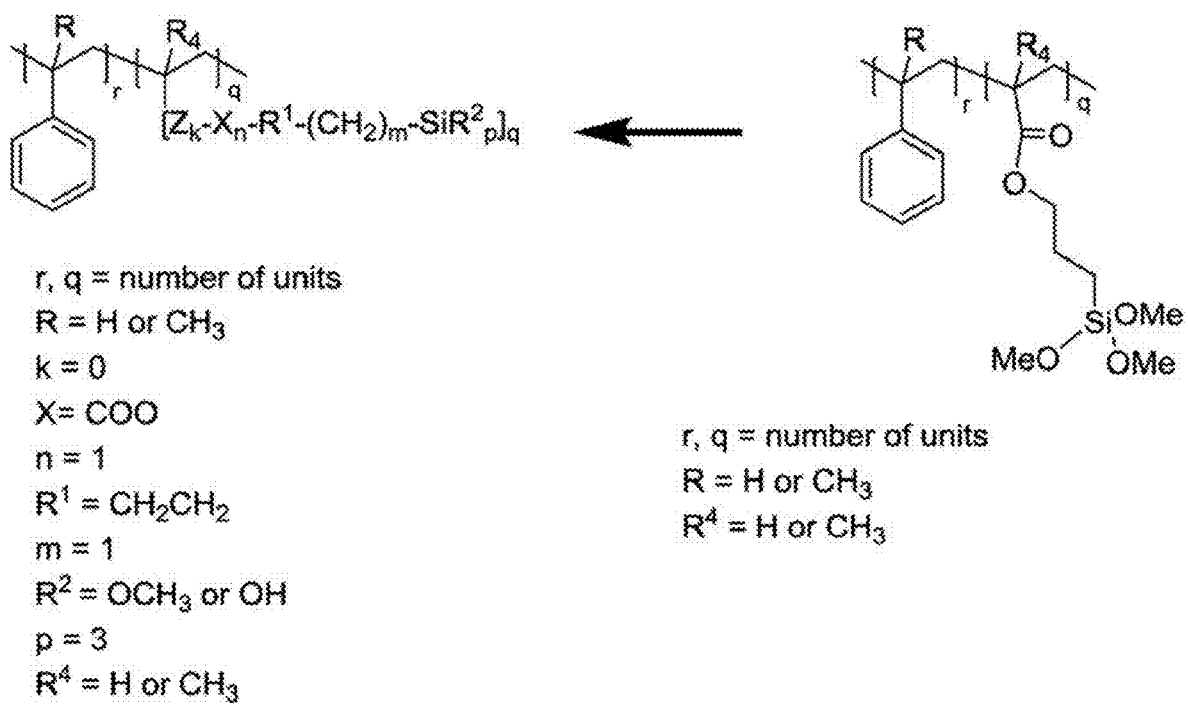
Figure 1F:
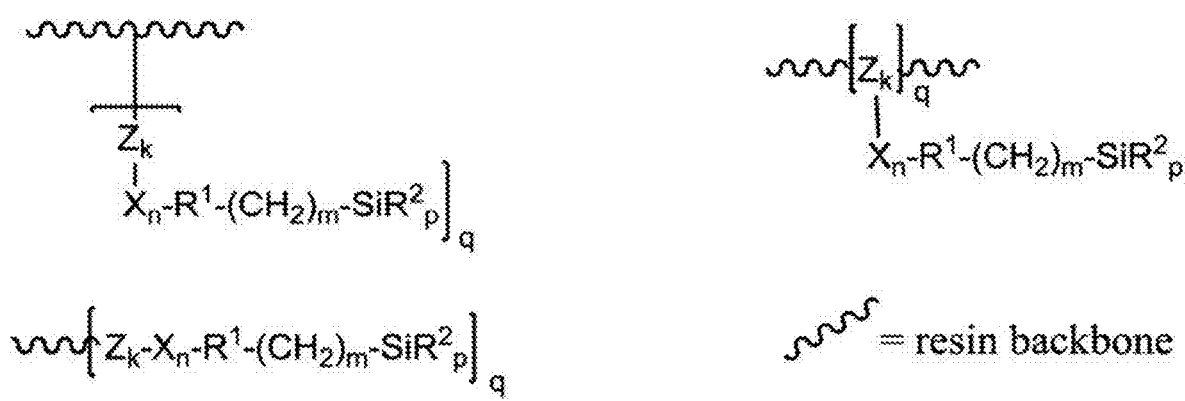

Example 1.5: Synthesis of Pendant Silane-Containing Resin Via Free Radical Copolymerization In this embodiment, the synthesis of functionalized resin proceeds from an earlier starting point, where the resin polymer monomers are reacted with silane moieties directly to form functionalized resin in one step, as depicted in Scheme 5. Exemplary starting reagent and end product embodiments of this synthetic route are also depicted in FIG. 1E.

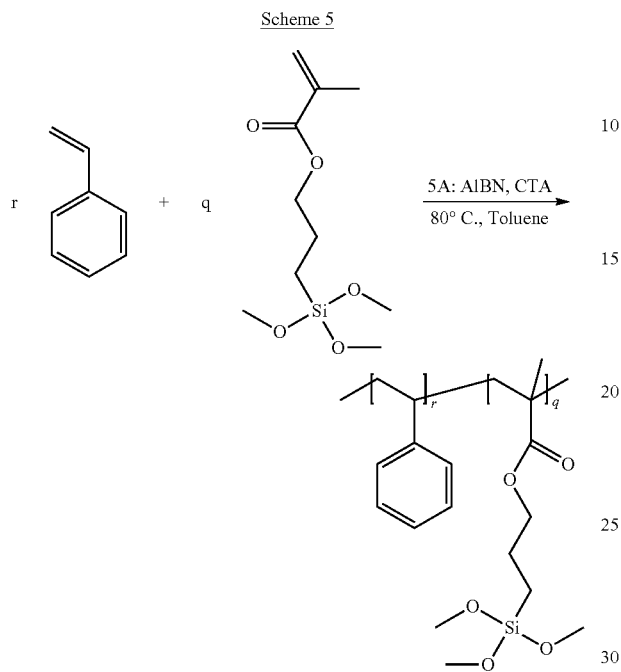

Step 5A: Synthesis of Pendant Silane-Functionalized Resin from Free Radical Copolymerization with Methacrylate Silane.

To a 500 mL three-necked round-bottom flask equipped with an overhead paddle-blade stirrer, thermocouple probe, water-cooled reflux condenser, and 250 mL addition funnel was charged 200 mL reagent-grade toluene, 2 g vinylsilane, 160 g styrene and 60 g 2,4-diphenyl-4-methyl-1-pentene (Sigma-Aldrich, St. Louis, Mo., US) as the chain transfer agent (CTA) and the charge stirred for 20 minutes. To this mixture was then added 40 g 3-(trimethoxysilyl) propylmethacrylate (CAS #2530-85-0) and the entire mixture heated to 80° C. while applying a slow nitrogen sparge to preserve an inert atmosphere.

Figure 36:
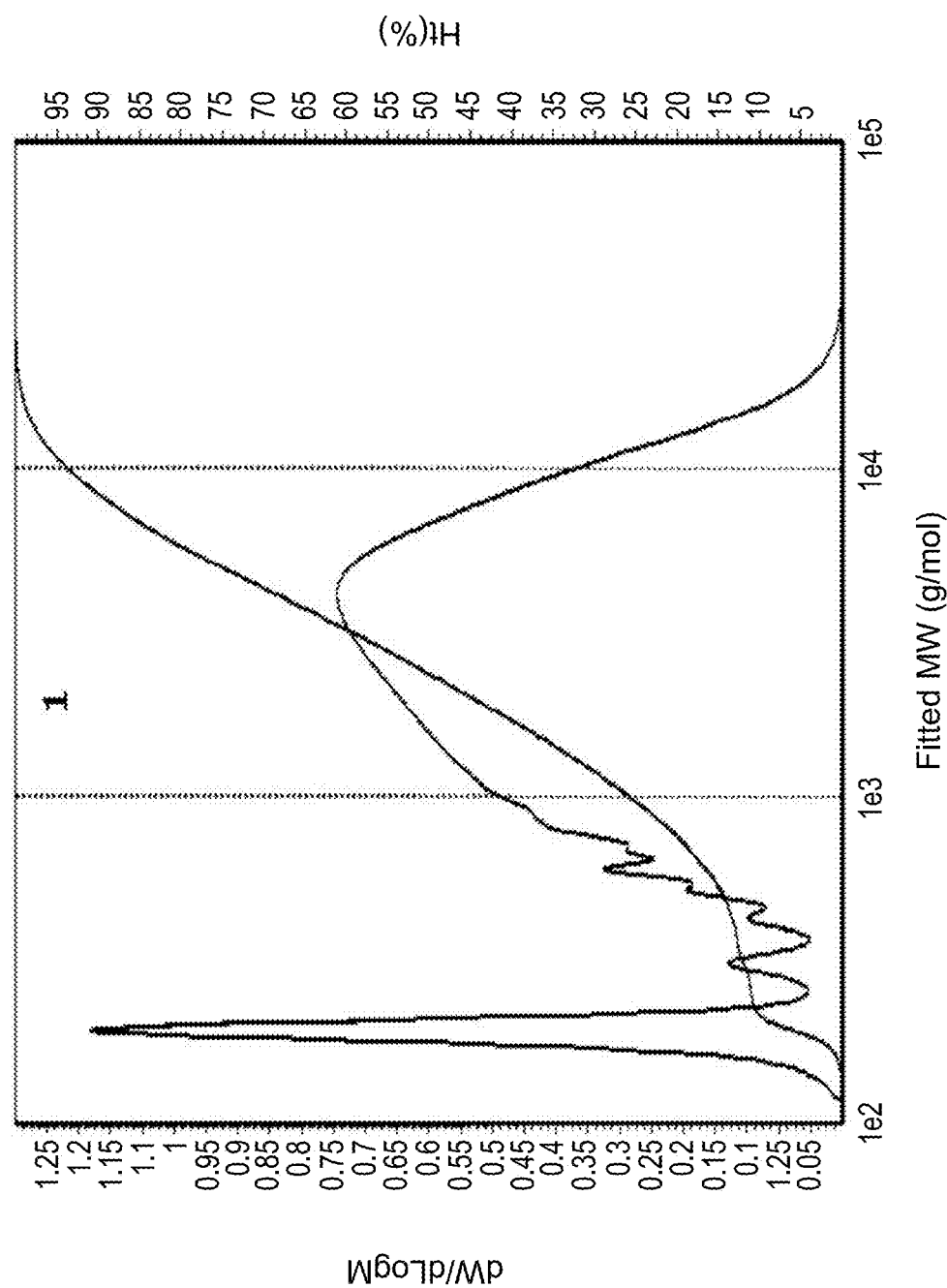
FIG. 36 shows a representative GPC trace for the functionalized resin synthesis product of Step 5A, the synthesis of a pendant silane-functionalized resin from a free radical copolymerization with methacrylate silane as described in Example 1.5.

To the addition funnel was charged a solution of 4 g azobisisobutyronitrile (AIBN) dissolved in 100 mL 50/50 ethyl acetate/toluene and then added over about 4 hours to the reaction mixture while maintaining the nitrogen sparge and the reaction temperature of 80° C. This condition was held for a further 4 hours before the mixture was allowed to cool and the reactor contents discharged to a wiped-film evaporator apparatus. Solvent, CTA, and any unreacted monomers were then removed under reduced pressure of about 2 torr at a temperature of up to about 200° C. The product was a sticky solid containing some residual CTA and having a molecular weight (gas-phase chromatography (GPC), right, polystyrene standards, FIG. 36) of 900 ($M_n$), 3,530 ($M_w$), and 7,140 ($M_z$).

Figure 37:
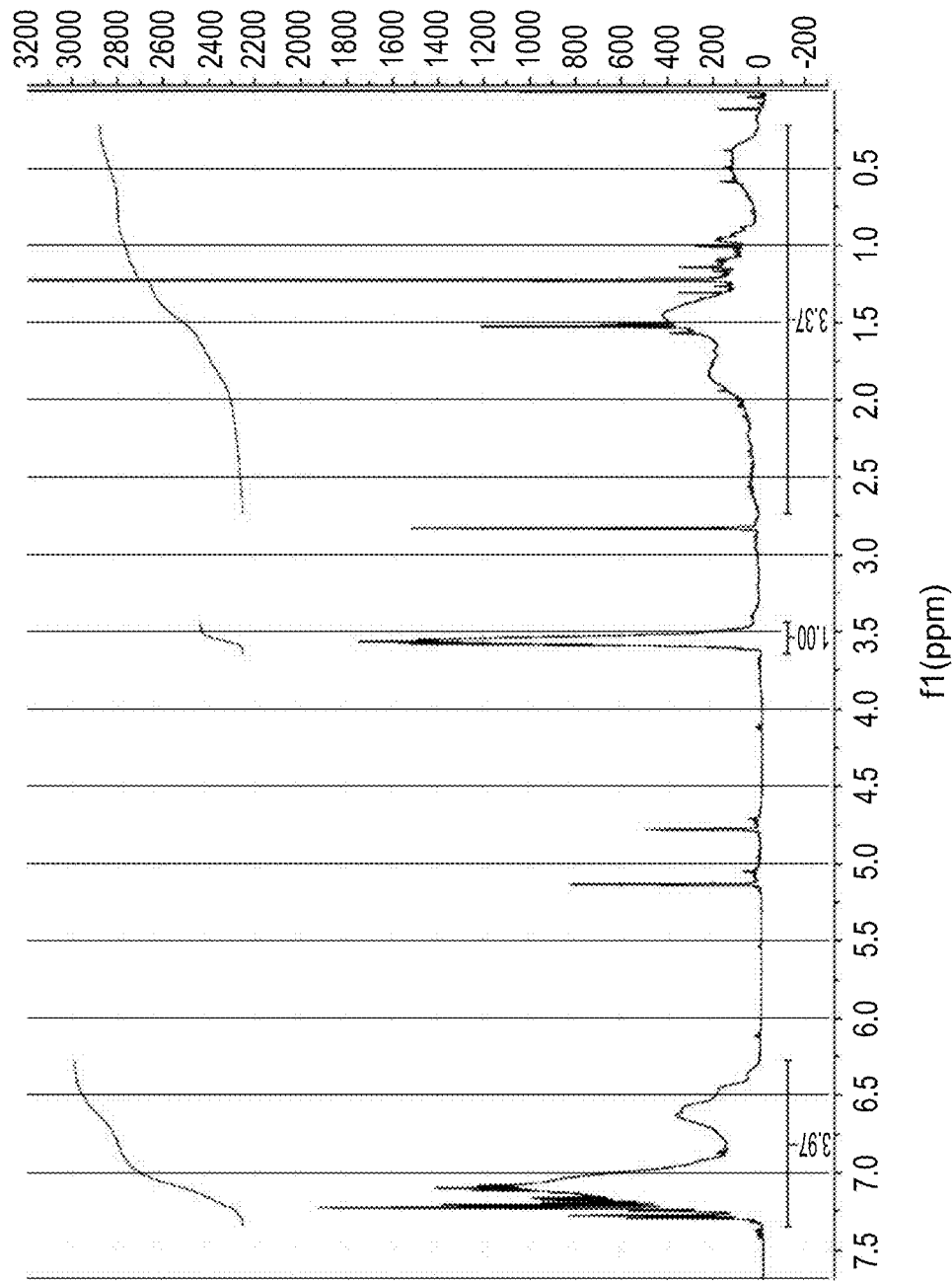
FIG. 37 shows a representative $^1$H NMR trace for the functionalized resin synthesis product of Step 5A, the synthesis of a pendant silane-functionalized resin from a free radical copolymerization with methacrylate silane as described in Example 1.5.
Figure 38:
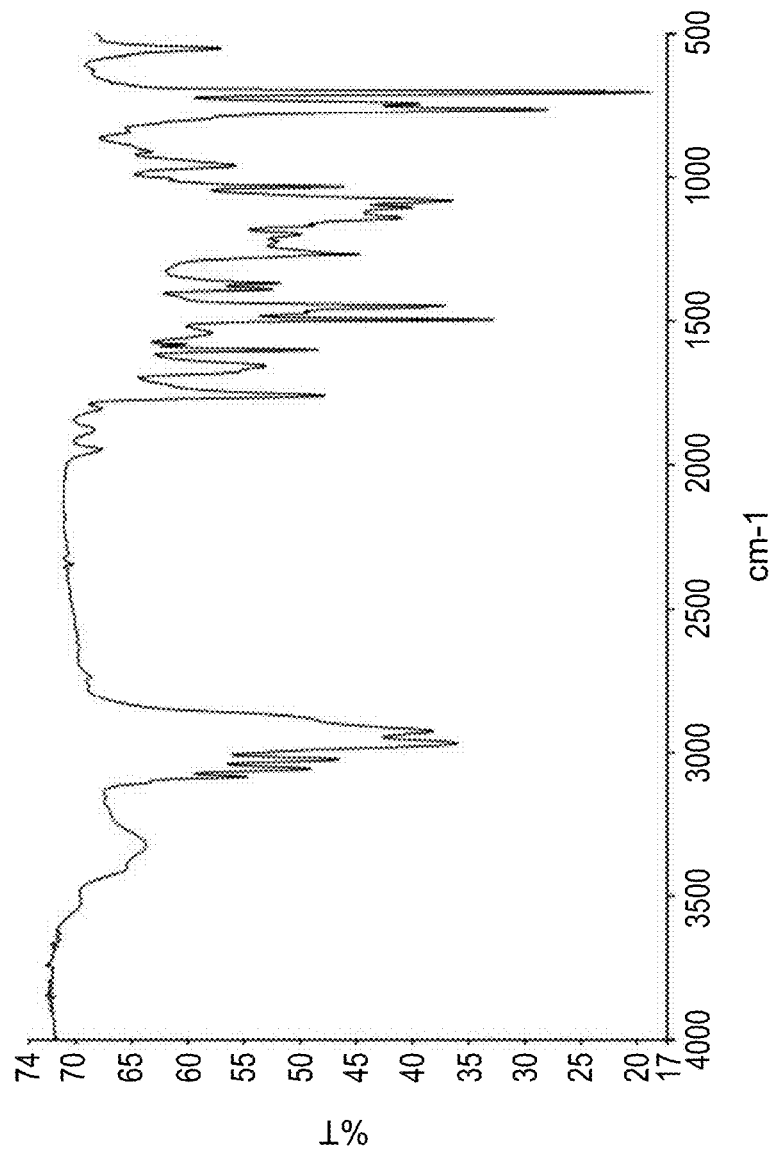
FIG. 38 shows a representative FT-IR spectrum for the functionalized resin synthesis product achieved by phenol functionalization through succinic anhydride, as described in Example 1.6.
Figure 39:
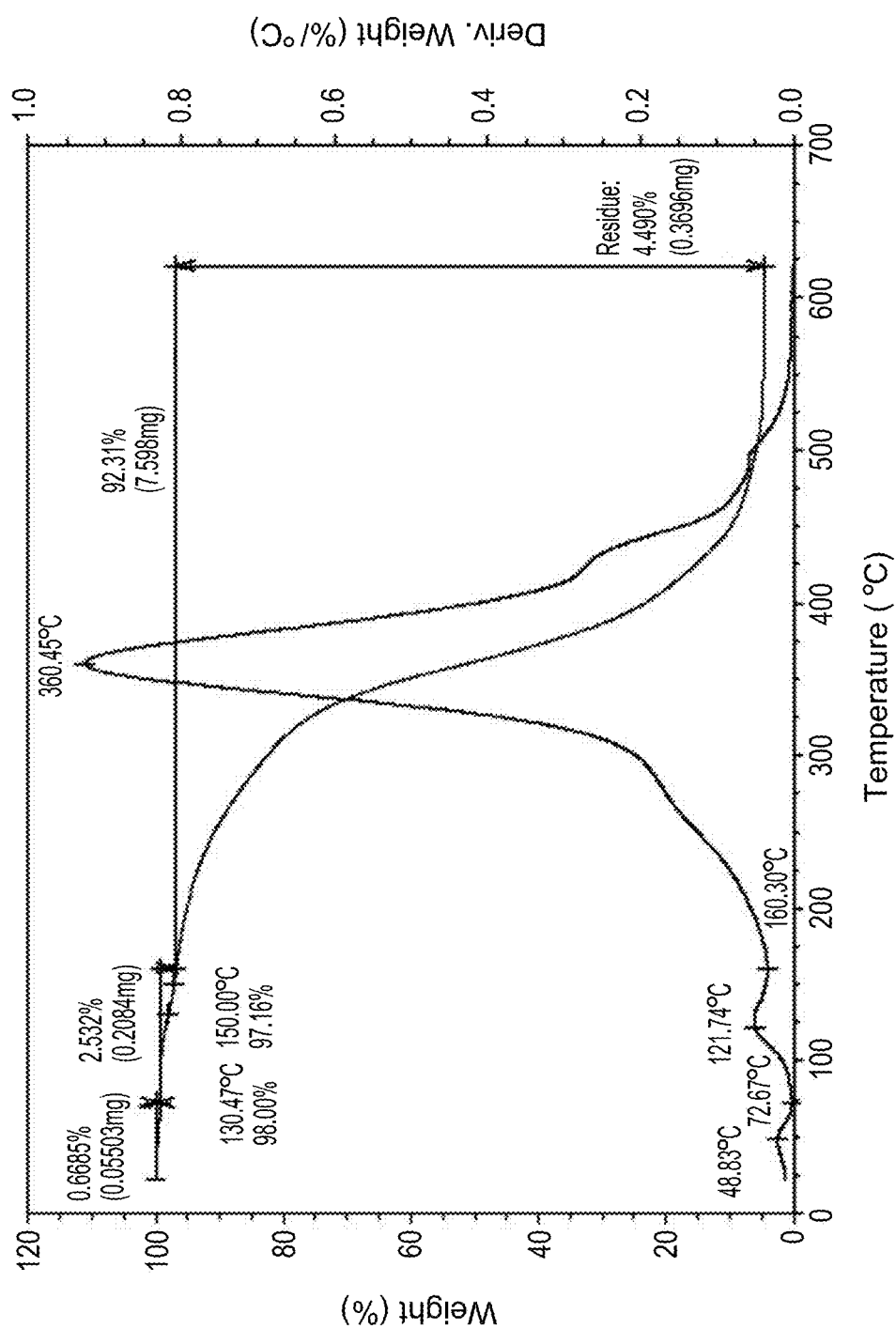
FIG. 39 shows a representative TGA trace for the functionalized resin synthesis product achieved by phenol functionalization through succinic anhydride as described in Example 1.6.
Figure 40:
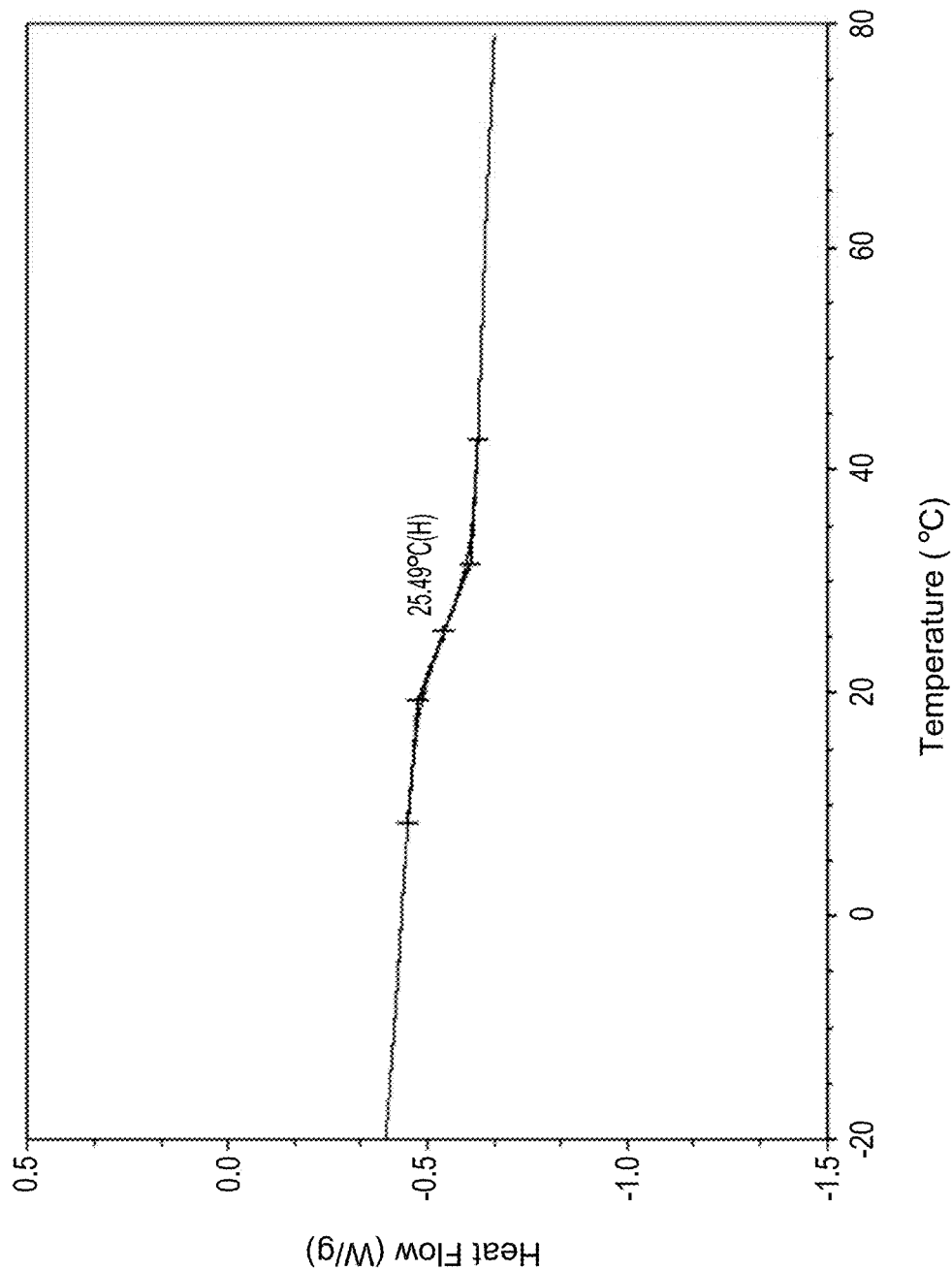
FIG. 40 shows a representative DSC trace for the functionalized resin synthesis product achieved by phenol functionalization through succinic anhydride as described in Example 1.6.
Figure 41:
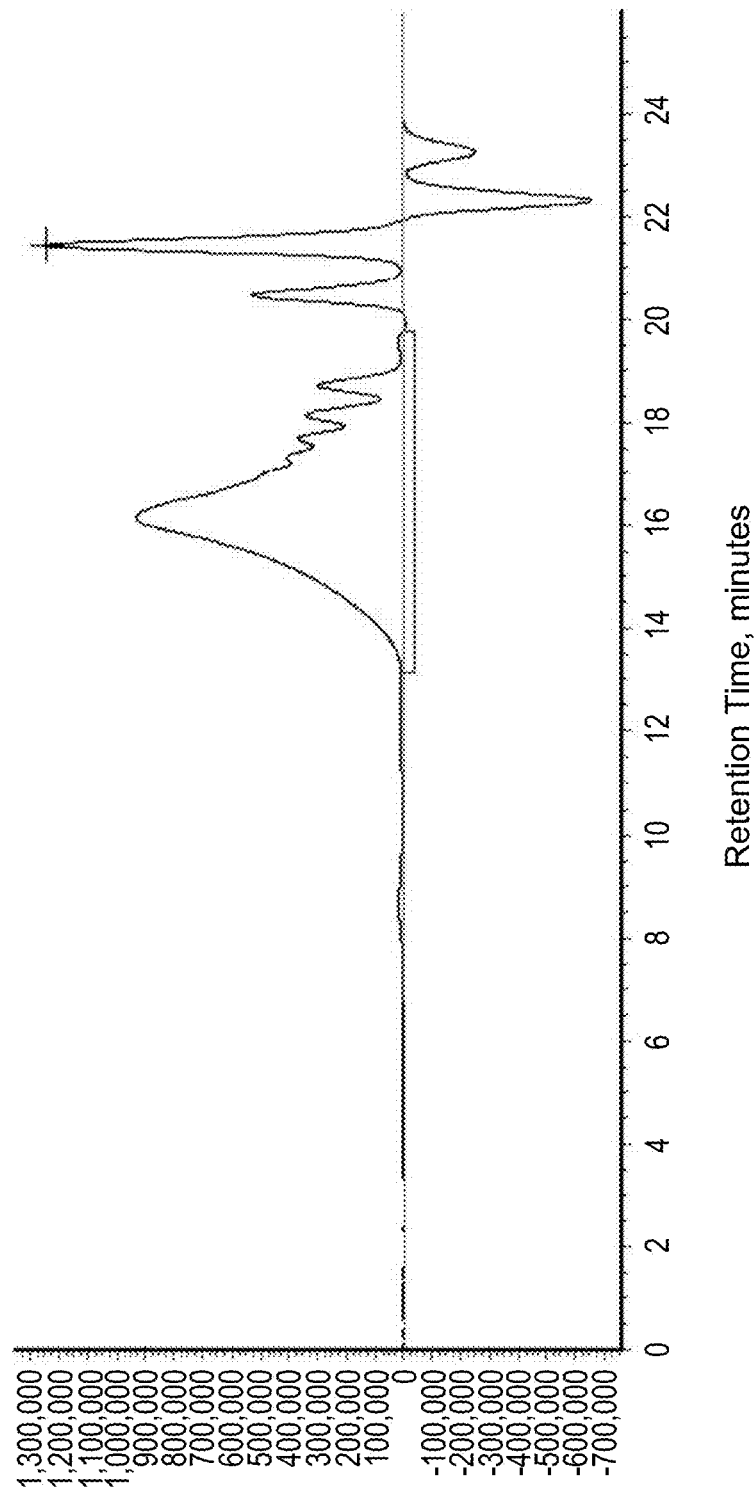
FIG. 41 shows a representative GPC trace for the functionalized resin synthesis product achieved by phenol functionalization through succinic anhydride as described in Example 1.6.

The nuclear magnetic resonance spectrum (FIG. 37) was generally consistent with a polystyrene structure and exhibited a strong broad peak at about 3.55 ppm for the (trimethoxy)silyl moiety whose integrated area was also consistent with the amount charged, indicting essentially complete incorporation of the silicon-bearing monomer into the polymer chain.

Figure 1G:
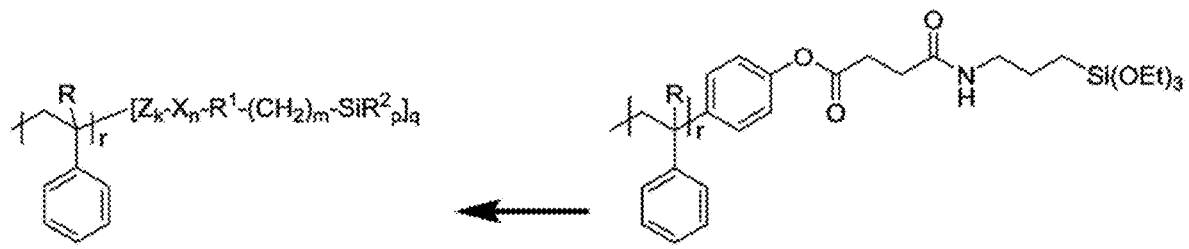

Example 1.6: Synthesis of End-Capped Silane-Containing Resin Via Phenol Functionalization Through Succinic Anhydride In this embodiment, the synthesis of functionalized resin proceeds by phenol functionalization using succinic anhydride to form an end-capped derivative, as depicted in Scheme 6. Exemplary starting reagent and end product embodiments of this synthetic route are also depicted in FIG. 1G.

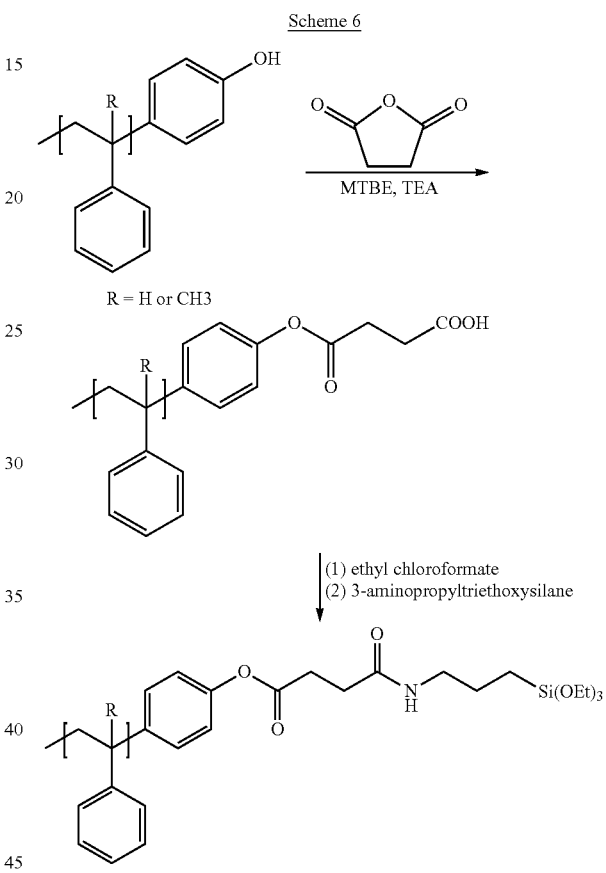

To a 1L round bottom flask fitted with a stir-bar and a reflux condenser were charged phenol-functionalized resin (56.7 g; containing 38.4 mmol of phenol unit), anhydrous MTBE (380 mL), and triethylamine (5.4 mL; 38.74 mmol). The mixture was stirred under $N_2$ blanket. When the resin was fully dissolved, succinic anhydride (3.85 g; 38.47 mmol) was added at once. The flask was heated to 57° C. (oil bath) for 17 hours, then room temperature for one half hour. The mixture was then chilled with an ice-water-NaCl bath. Ethyl chloroformate (3.7 mL; 38.7 mmol) was added over 4 min. The activation time was 30 min. 3-Aminopropyltriethoxysilane (9.0 mL; 38.5 mmol) was charged and the chilling bath was removed. The reaction time (amide formation) was 6 hours at room temperature. The solid byproduct was removed by filtration. The volatiles were stripped under reduced pressure and the residue was dried under vacuum at room temperature for 3 days. The resulting white powder product weighed 58.2 g (85% of the theoretical). Spectrographs including IR, TGA, DSC, and GPC are set forth in FIGS. 38 to 41, respectively.

Figure 1H:
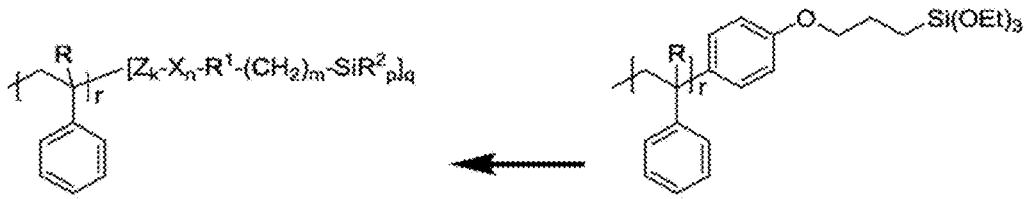

Example 1.7: Synthesis of End-Capped Silane-Containing Resin Via Phenol Functionalization with Chloro-Silane In this embodiment, the synthesis of functionalized resin proceeds in this embodiment by (3-chloropropy)triethoxysilane reaction with sodium ethoxide, sodium iodide, and acetone to yield the end-capped silane derivative, as depicted in Scheme 7. Exemplary starting reagent and end product embodiments of this synthetic route are also depicted in FIG. 1H.

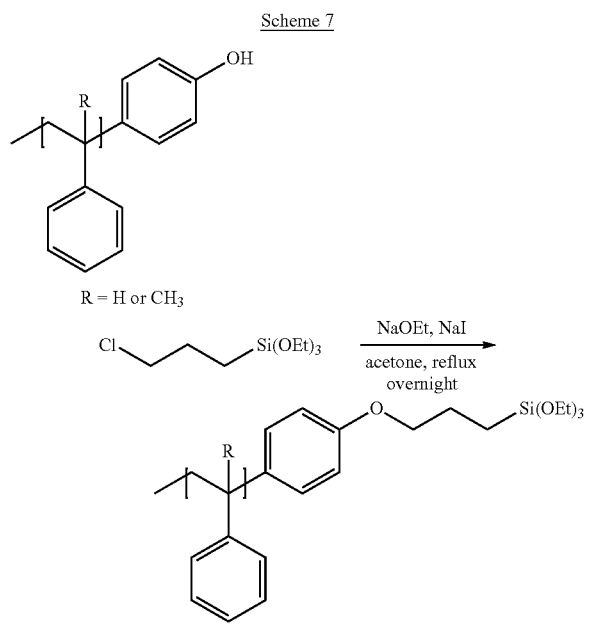

Figure 42:
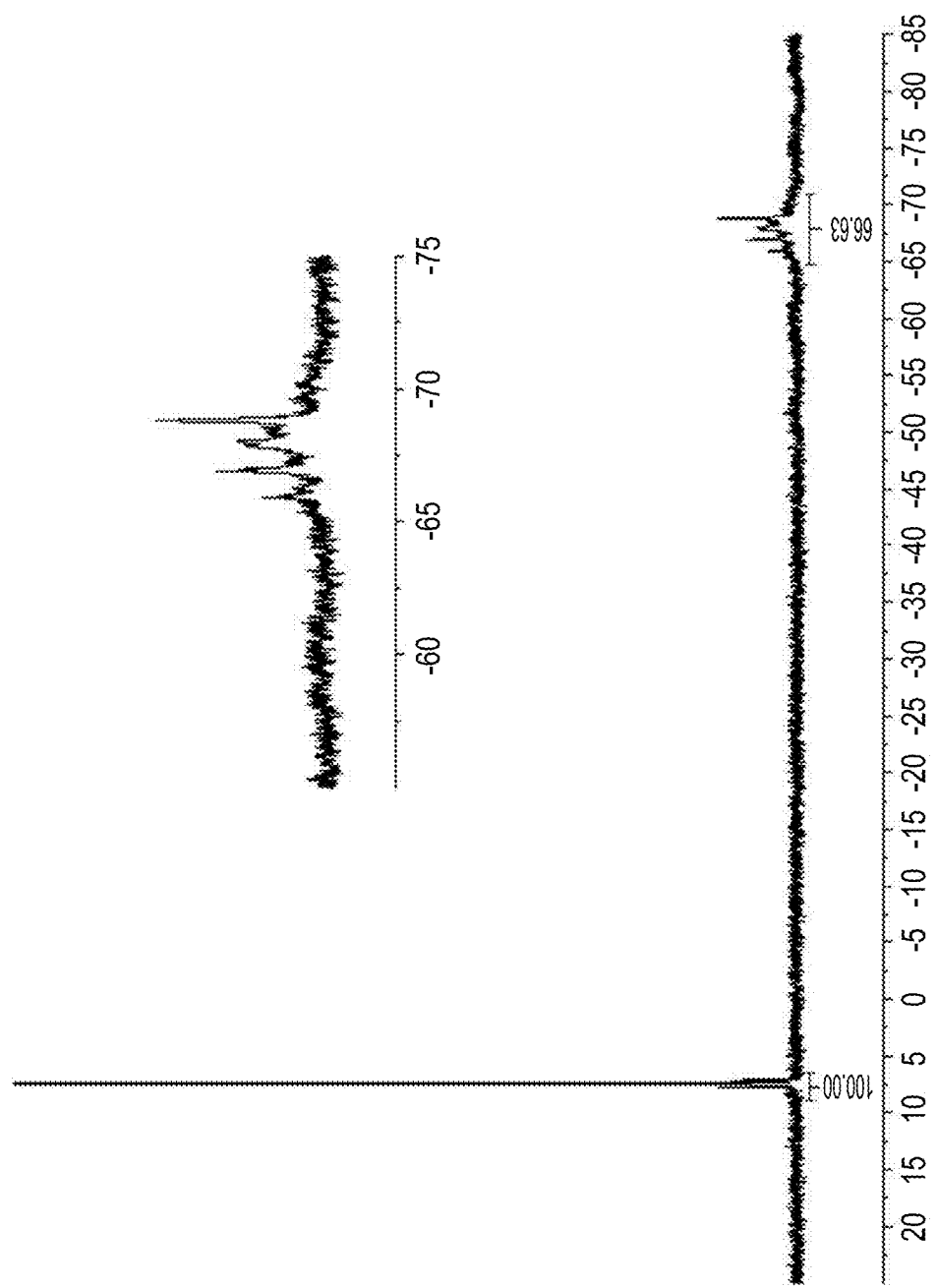
FIG. 42 shows a representative $^{29}$Si NMR trace for end-capped silane-containing resins produced by phenol functionalization with chloro-silane, as described in Example 1.7.

In a 3-neck round bottom flask fitted with a thermometer, overhead stirrer, and nitrogen atmosphere were charged 3 g phenol-functionalized resin (0.677 mmol phenol per 1 gram of resin) and 6 mL acetone (dried over magnesium sulfate). The reaction mixture was placed under a nitrogen blanket and agitated with a mechanical overhead stirrer. The reaction mixture was heated to 20 to 25° C. to dissolve the resin. After dissolving the resin in acetone, sodium ethoxide (0.191 g) was added to the reaction mixture and stirred for 15 minutes. Subsequently sodium iodide (0.42 g) was added at 45 to 50° C. Then (3-chloropropy)triethoxysilane (0.848 g) was added and the reaction temperature adjusted to 55° C. The reaction mixture was stirred for 24 hours at 55° C. After 24 hours reaction time, n-heptane was added to the reaction mixture to precipitate salts. The salts were removed via filtration on a Buchner funnel by filtering through a Celite pad. The reaction mixture was stripped using a Rotary evaporator. The amorphous product weighed 3.1 g (88% of theory). The end-product was analyzed by $^{29}$Si NMR yielding the graph provided in FIG. 42.

Figure 1I:
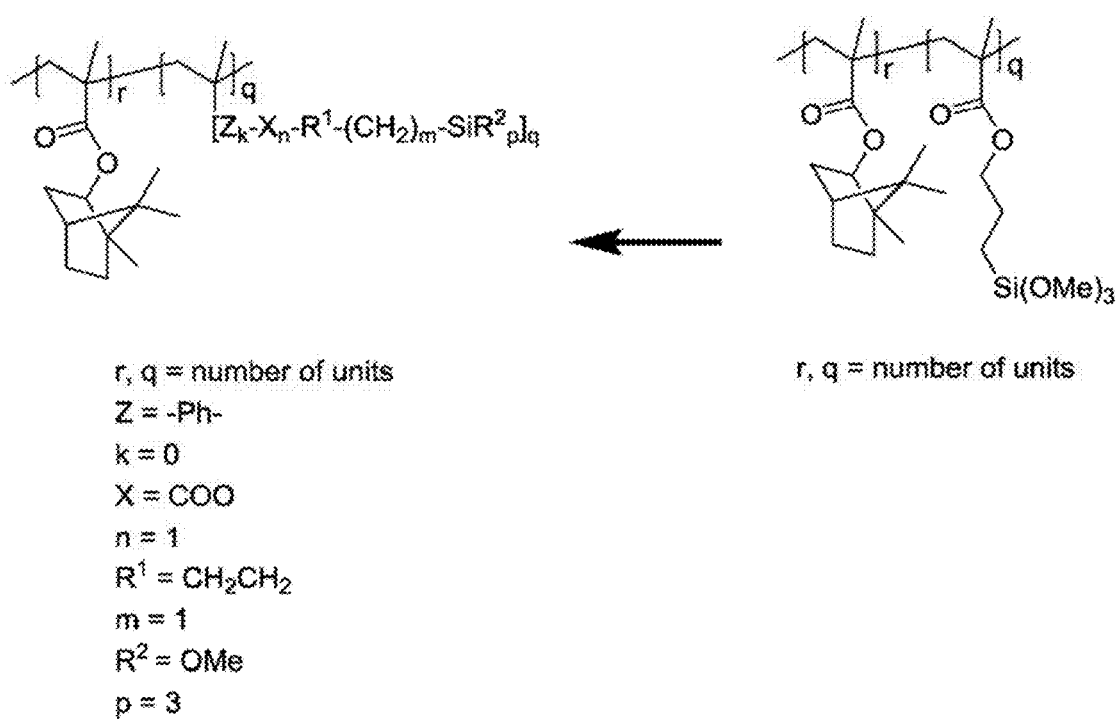

Example 1.8: Synthesis of Pendant Silane-Containing Resin Via Copolymerization of Isobornylmethacrylate and 3-(Trimethoxysilyl)Propylmethacrylate In this embodiment, the synthesis of pendant functionalized resin in this embodiment is achieved by reaction of isobornylmethacrylate with 3-(trimethoxysilyl) propylmethacrylate under the conditions set forth in Scheme 8. Exemplary starting reagent and end product embodiments of this synthetic route are also depicted in FIG. 1I.

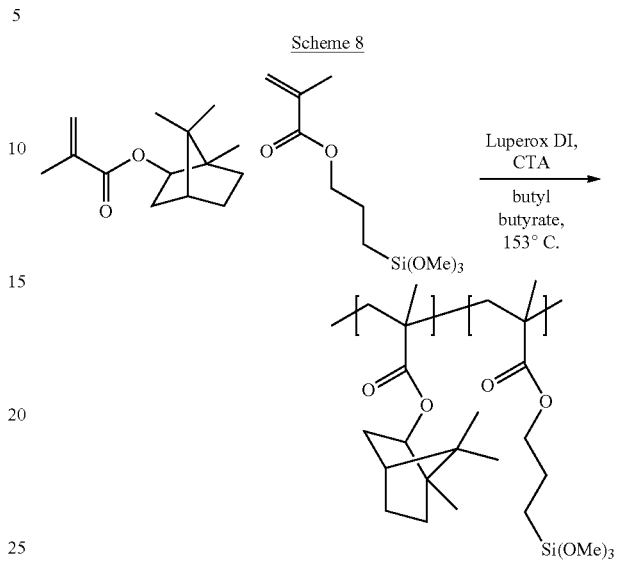

Figure 43:
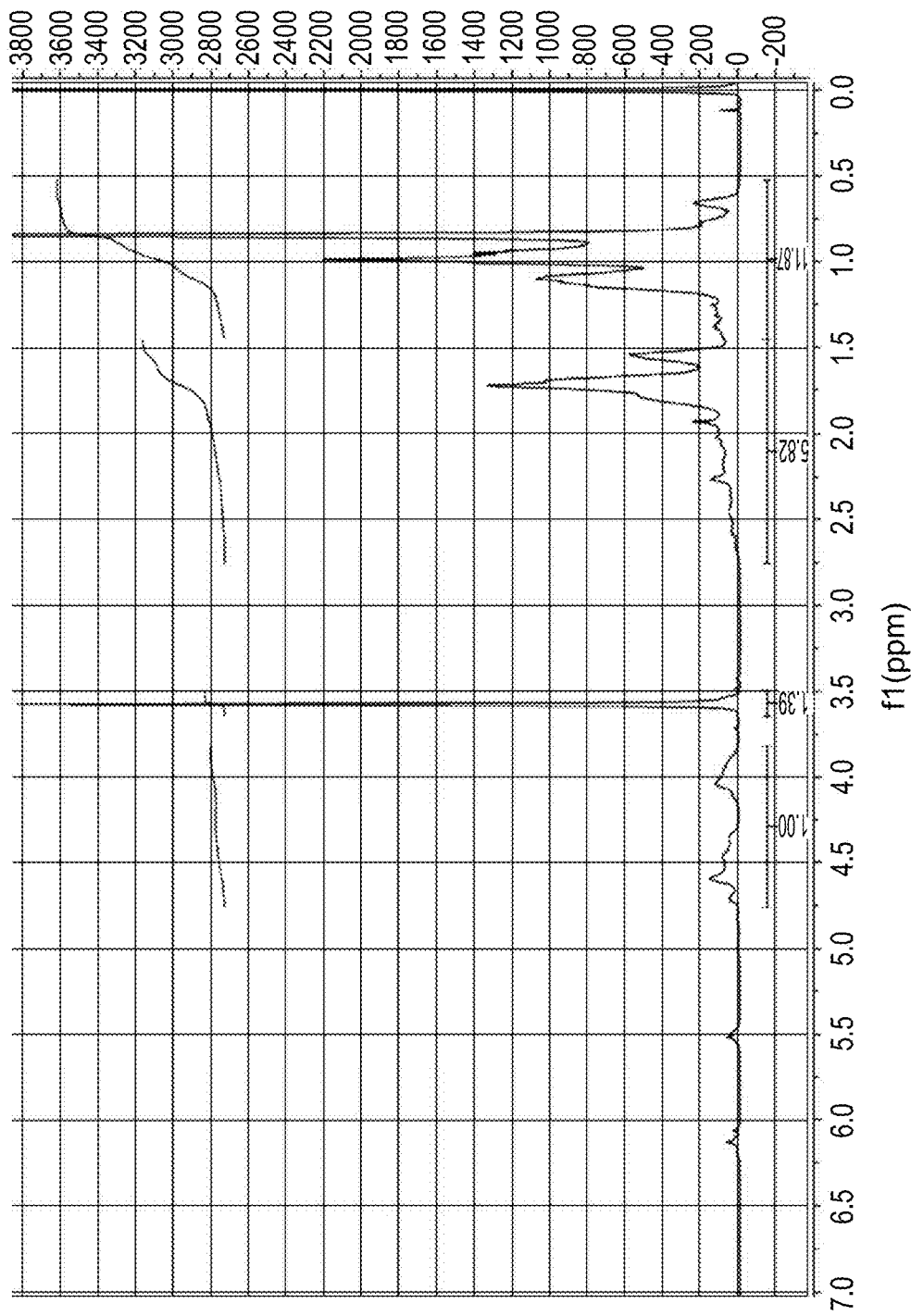
FIG. 43 shows a representative $^1$H-NMR trace for pendant silane-containing resins synthesized by copolymerization of isobornylmethacrylate and 3-(trimethoxysilyl)propyl-methacrylate, as described in Example 1.8.
Figure 44:
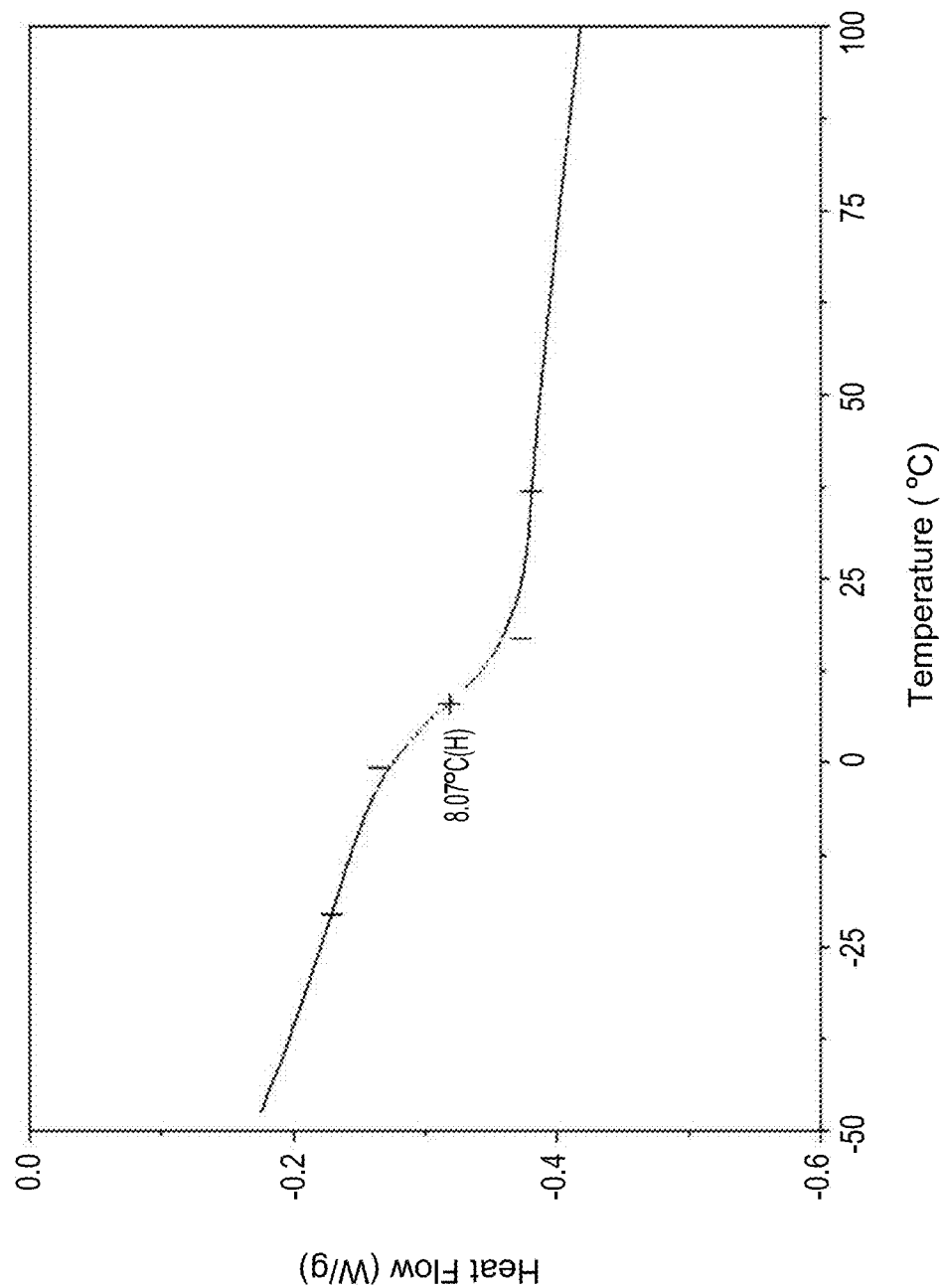
FIG. 44 shows a representative DSC trace for pendant silane-containing resins synthesized by copolymerization of isobornylmethacrylate and 3-(trimethoxysilyl)propyl-methacrylate, as described in Example 1.8.
Figure 45:
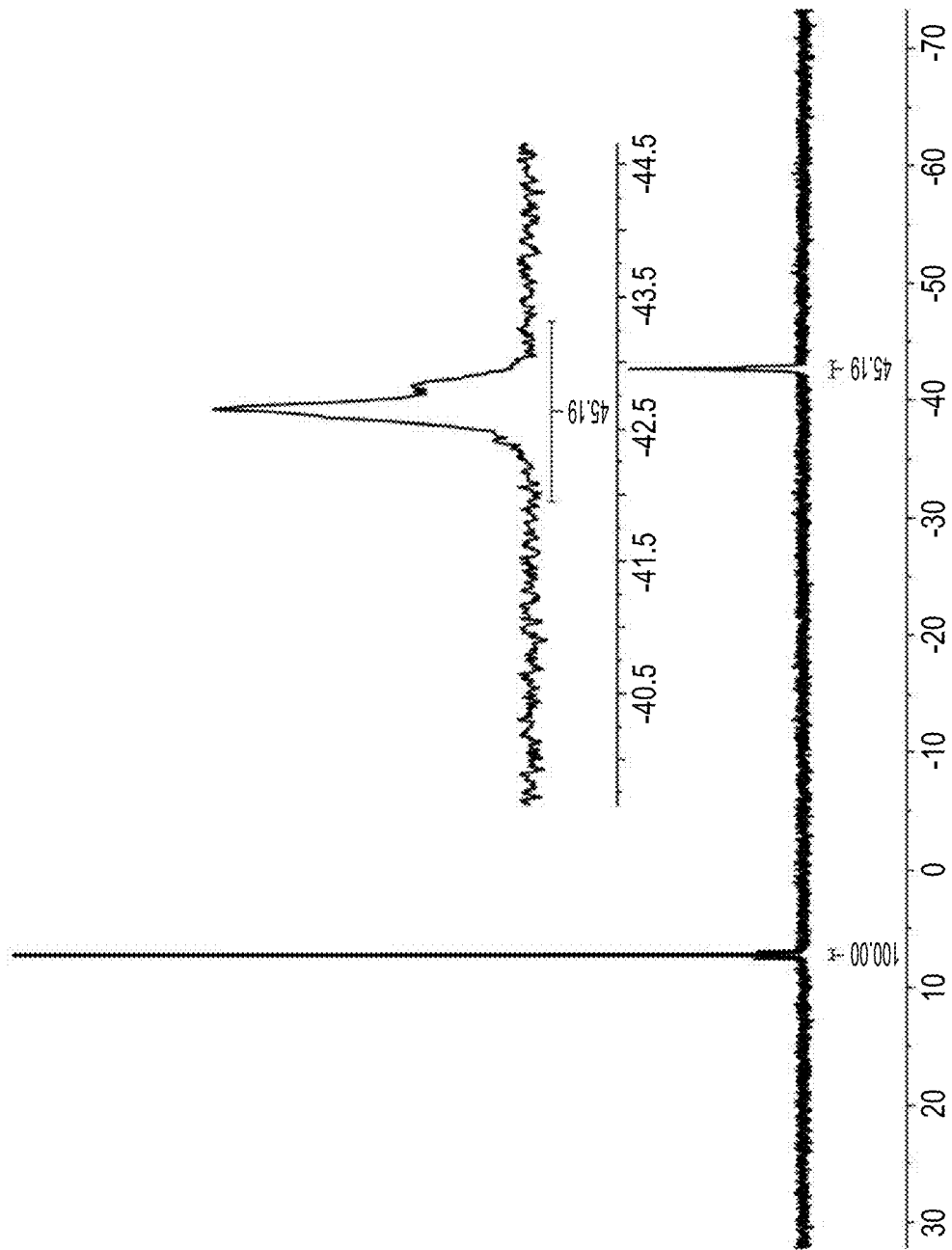
FIG. 45 shows a representative $^{29}$Si-NMR trace for pendant silane-containing resins synthesized by copolymerization of isobornylmethacrylate and 3-(trimethoxysilyl)propyl-methacrylate, as described in Example 1.8.
Figure 46:
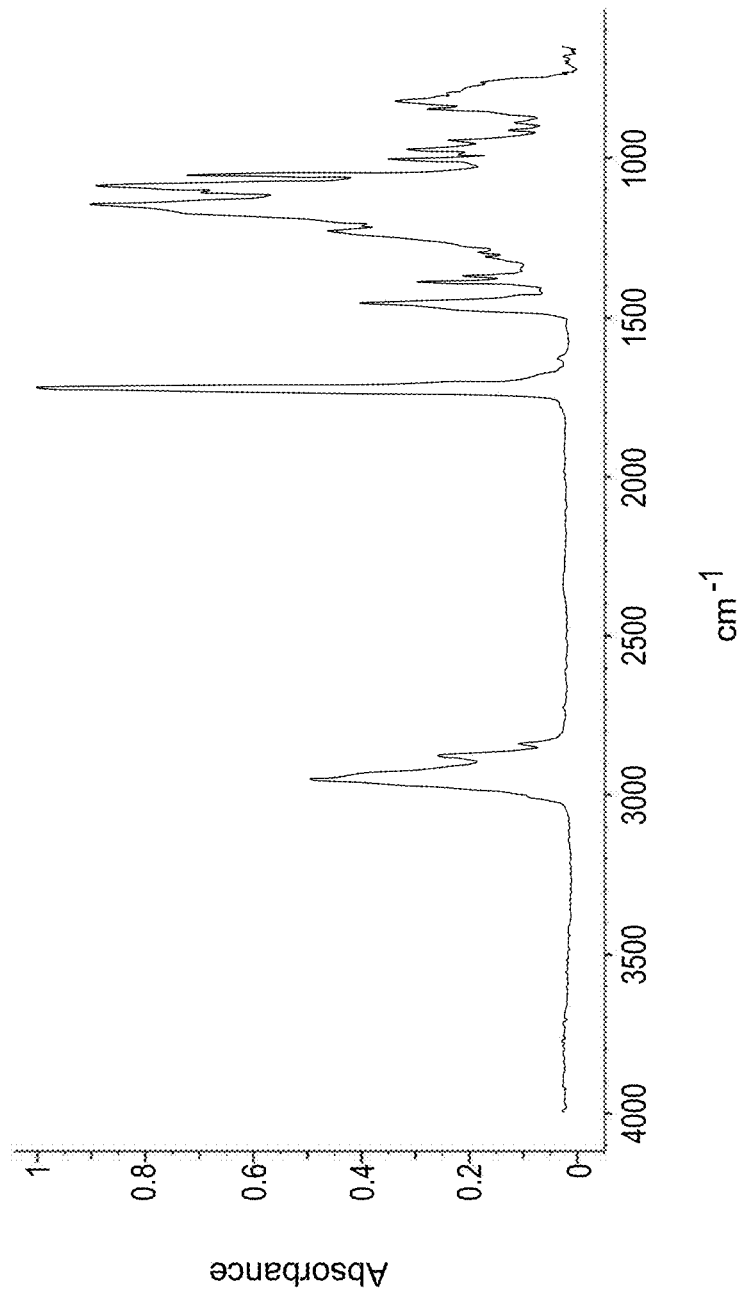
FIG. 46 shows a representative IR trace for pendant silane-containing resins synthesized by copolymerization of isobornylmethacrylate and 3-(trimethoxysilyl)propyl-methacrylate, as described in Example 1.8.

A 1L 3-necked round-bottom flask equipped with nitrogen inlet, overhead stirrer, thermocouple probe, reflux condenser, and port fitted with a 500 mL addition funnel was charged with 250 mL butylbutyrate process solvent. The addition funnel was charged with a solution of 16 g Luperox DI (di-tert-butylperoxide, 8 wt % on total monomers), 40 g 3-(trimethoxysilyl)propylmethacrylate (20 wt % or 18.3% molar on total monomers), 160 g isobornylmethacrylate, and 50 mL butylbutyrate. The reactor was heated under a gentle stream of nitrogen with agitation to 153° C. and held at this temperature for the course of the reaction. The monomers and initiator solution was then added slowly, dropwise, to the reactor, over 2 hours. After addition was completed, the reaction mixture was held at 153° C. an additional 3 hours then cooled to room temperature under a continued gentle stream of nitrogen. Product polymer is obtained by stripping the solvent under vacuum up to about 200° C. Appearance: Slightly hazy, water-white amorphous solid. The $^1$H-NMR spectra of the end product provided in FIG. 43 exhibits a prominent singlet for the trimethoxysilyl functionality at 3.57 ppm, where molar loading calculated from its integration (vs. area of all aliphatic protons) is ~17% (vs. 18.3% charged). GPC analysis provides a molecular weight, GPC vs. polystyrene standards, of Mn 900/Mw 1,280/Mz 2,220/MWD of 1.42. The glass transition temperature (Tg) determined by DSC was 8° C., as shown in FIG. 44. FIG. 45 provides the $^{29}$Si-NMR data, yielding 1.87% Si (theoretical Si level was 2.26%). FIG. 46 sets forth the IR spectrum of the product. ICP analysis of the product indicated an Si level of 1.59%.

Figure 1J:
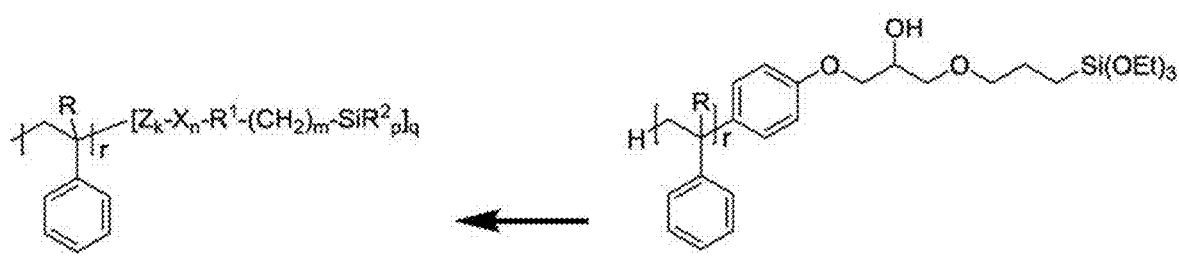

Example 1.9: Synthesis of End-Capped Silane-Containing Resin Via Phenol Functionalization with Glycidoxy Silane In this embodiment, the synthesis of end-capped functionalized resin is achieved by PPh$_3$ reaction with glycidoxypropyltriethoxysilane, as depicted in Scheme 9. Exemplary starting reagent and end product embodiments of this synthetic route are also depicted in FIG. 1J.

Scheme 9

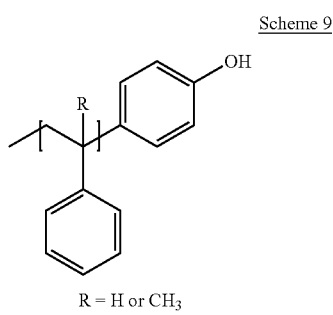

Figure 47:
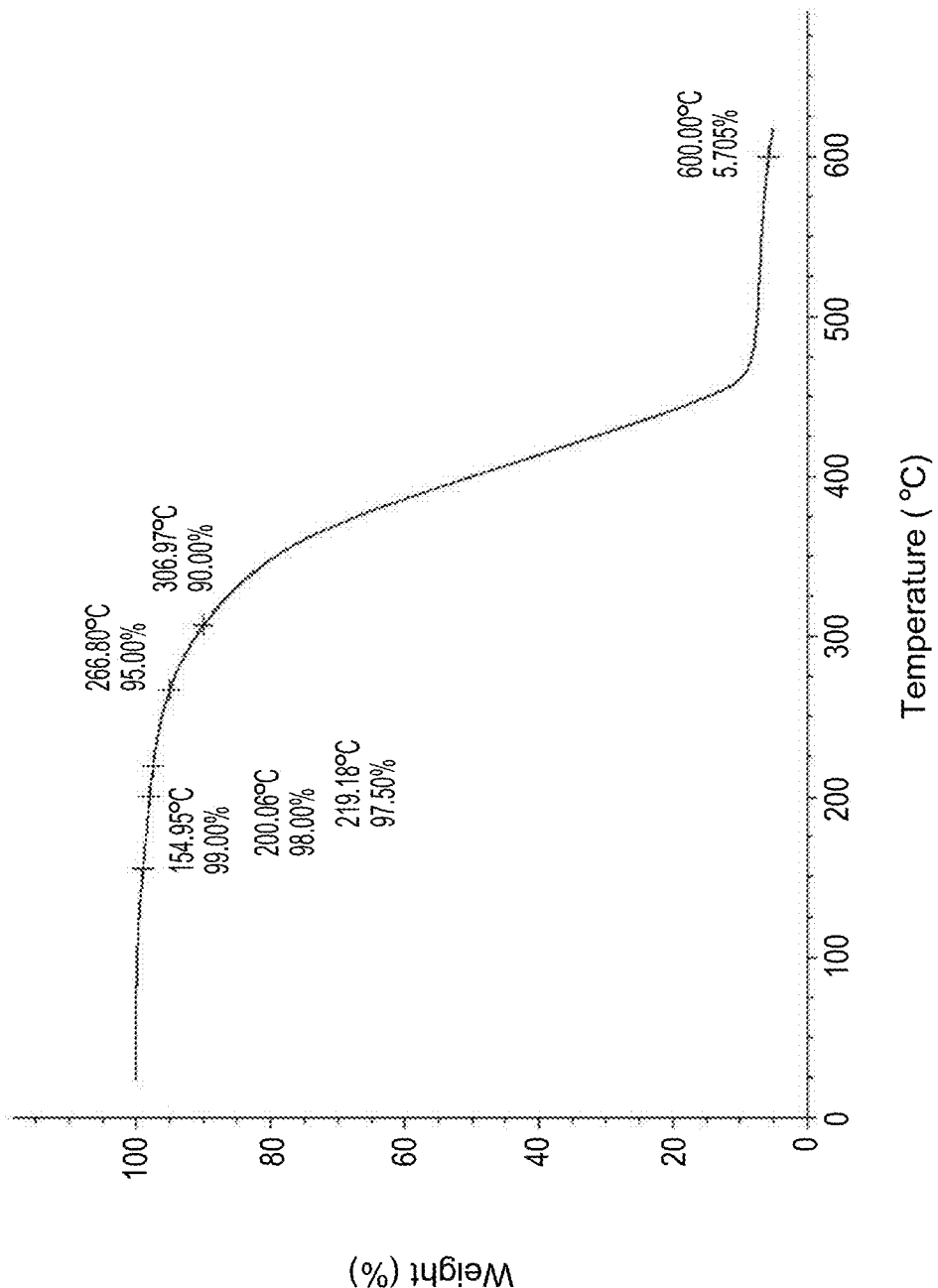
FIG. 47 shows a representative TGA trace obtained of an end-capped silane-containing resin end product obtained by phenol functionalization with glycidoxy silane, as described in Example 1.9.
Figure 48:
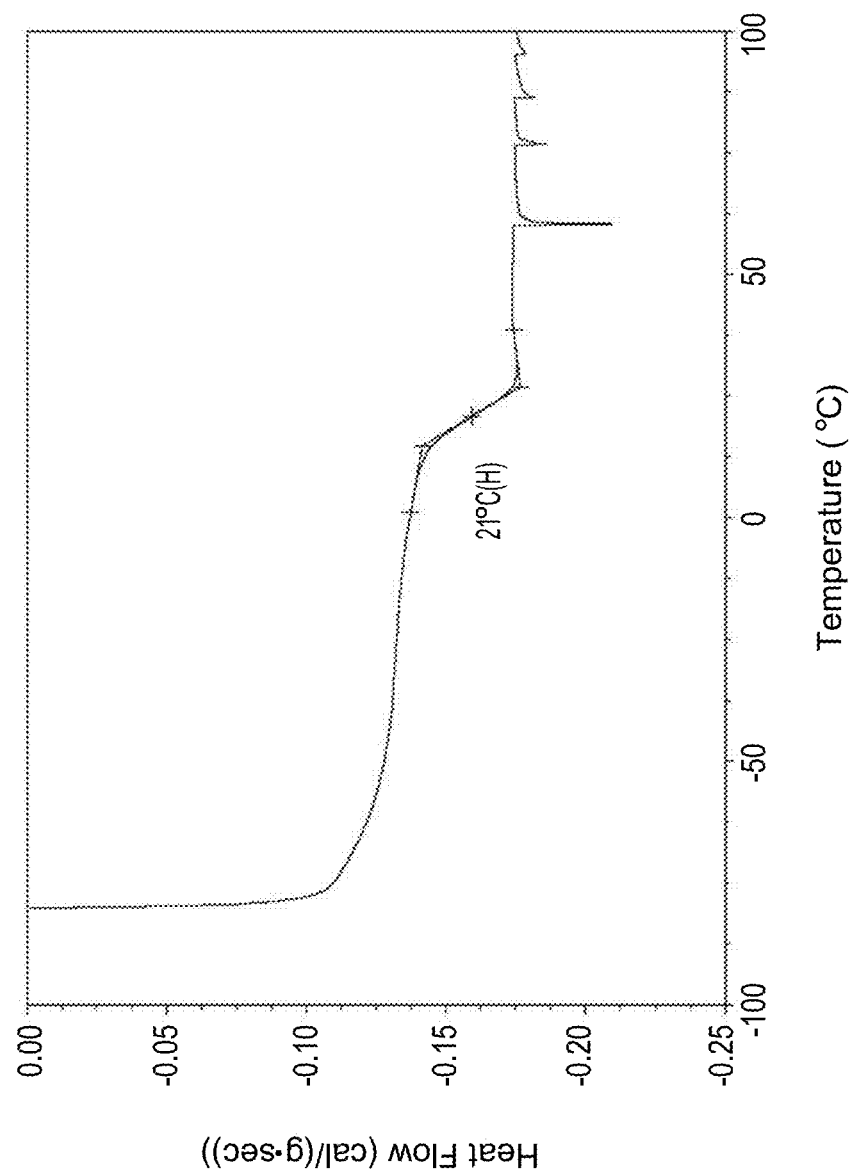
FIG. 48 shows a representative DSC trace obtained of an end-capped silane-containing resin end product obtained by phenol functionalization with glycidoxy silane, as described in Example 1.9.
Figure 49:
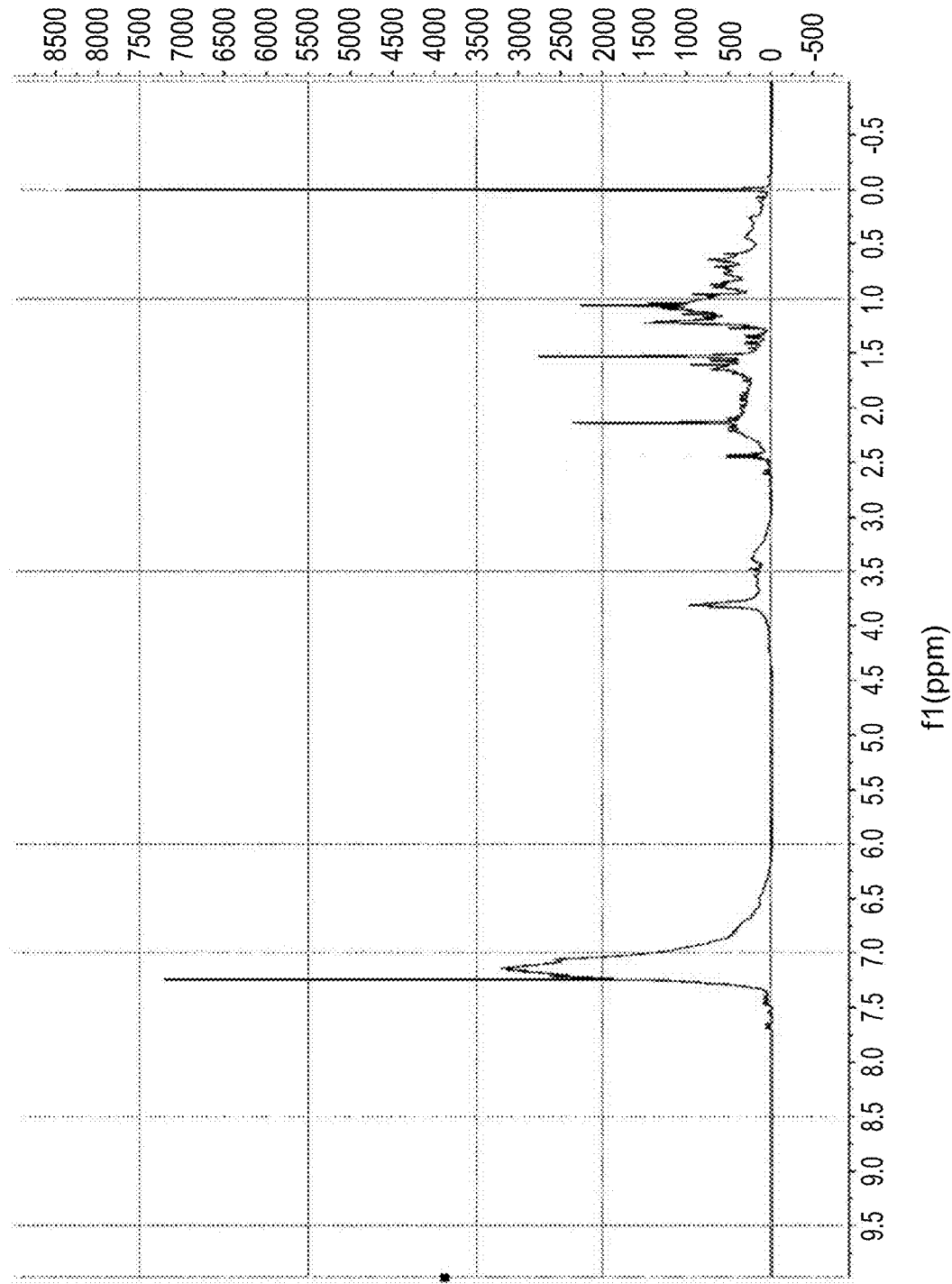
FIG. 49 shows a representative $^1$H-NMR trace obtained of an end-capped silane-containing resin end product obtained by phenol functionalization with glycidoxy silane, as described in Example 1.9.
Figure 50:
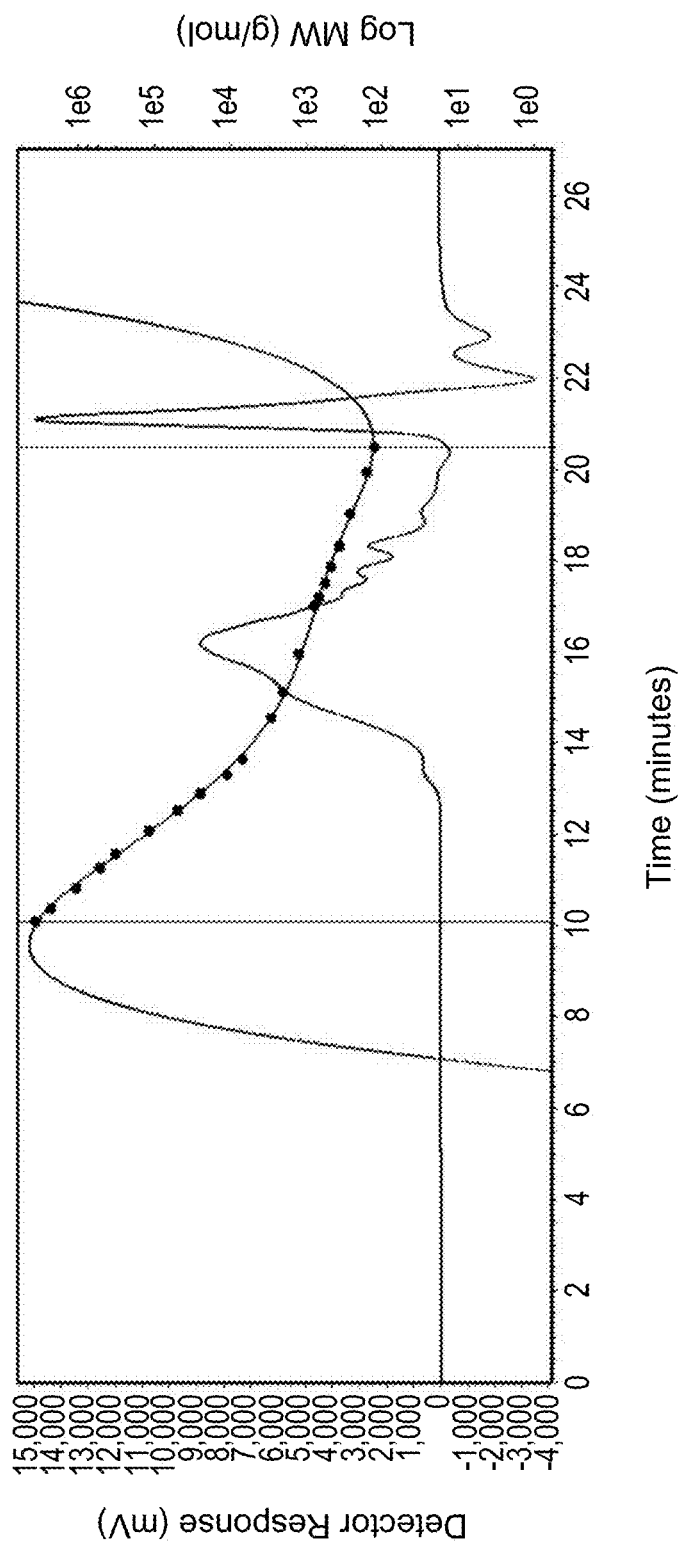
FIG. 50 shows a representative GPC trace obtained of an end-capped silane-containing resin end product obtained by phenol functionalization with glycidoxy silane, as described in Example 1.9.

R = H or CH₃ dried under reduced pressure with N₂ purge at 80° C. Sample TGA (FIG. 47) and DSC (FIG. 48) spectra of the product are provided. Analysis by ¹H-NMR of the product is set forth in FIG. 49. FIG. 50 provides the GPC chromatogram and distribution curve of the end product.

Figure 1K:
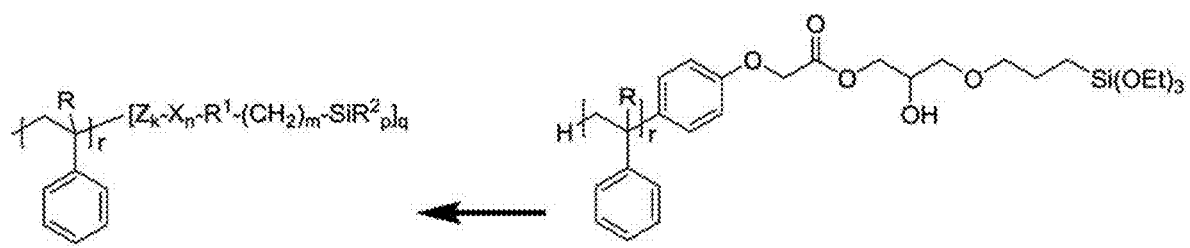

Example 1.10: Synthesis of End-Capped Silane-Containing Resin Via Acid Functionalization with Glycidoxy Silane In this embodiment, the synthesis of end-capped functionalized resin proceeded by use of an acid-functionalized hydrocarbon resin incubated with 3-glycidoxypropyltriethoxysilane, as depicted in Scheme 10. Exemplary starting reagent and end product embodiments of this synthetic route are also depicted in FIG. 1K.

Scheme 10

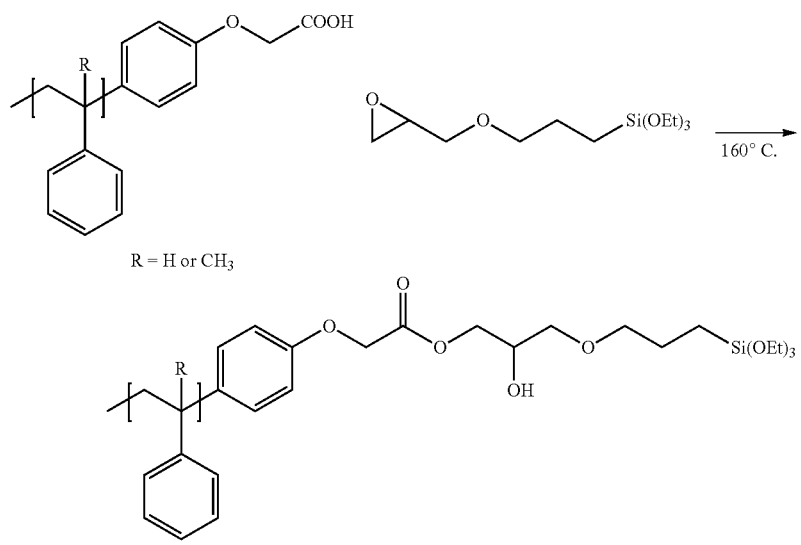

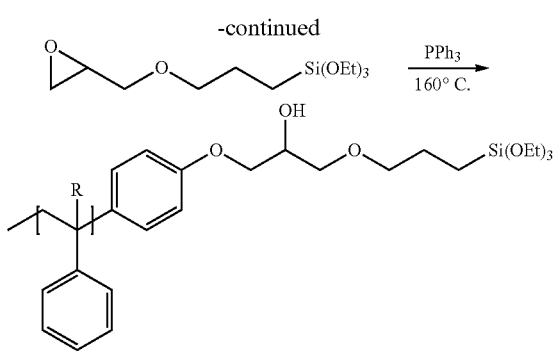

Figure 51:
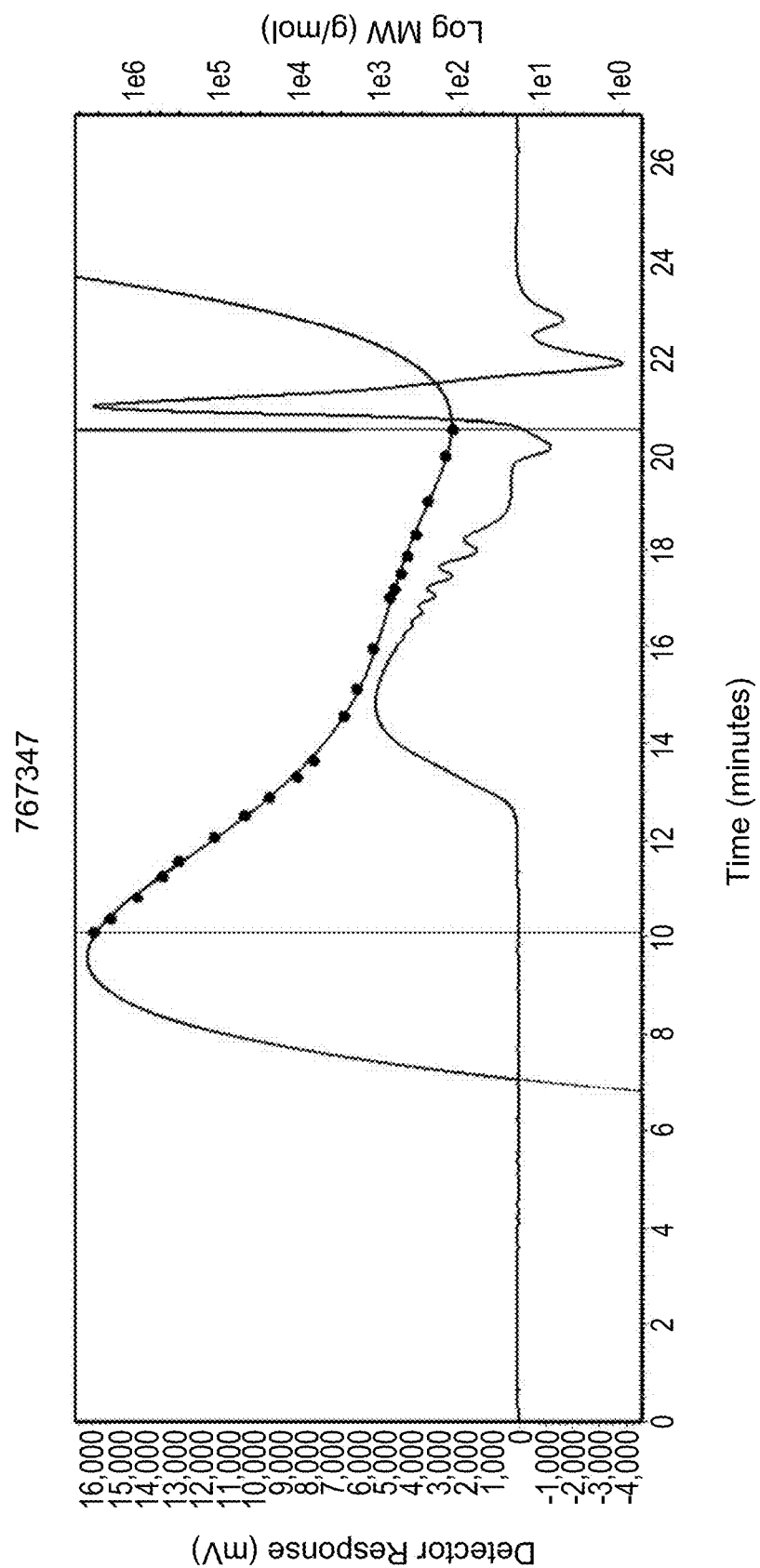
FIG. 51 shows a representative GPC trace obtained of an end-capped silane-containing resin obtained by acid functionalization with glycidoxy silane, as described in Example 1.10.
Figure 52:
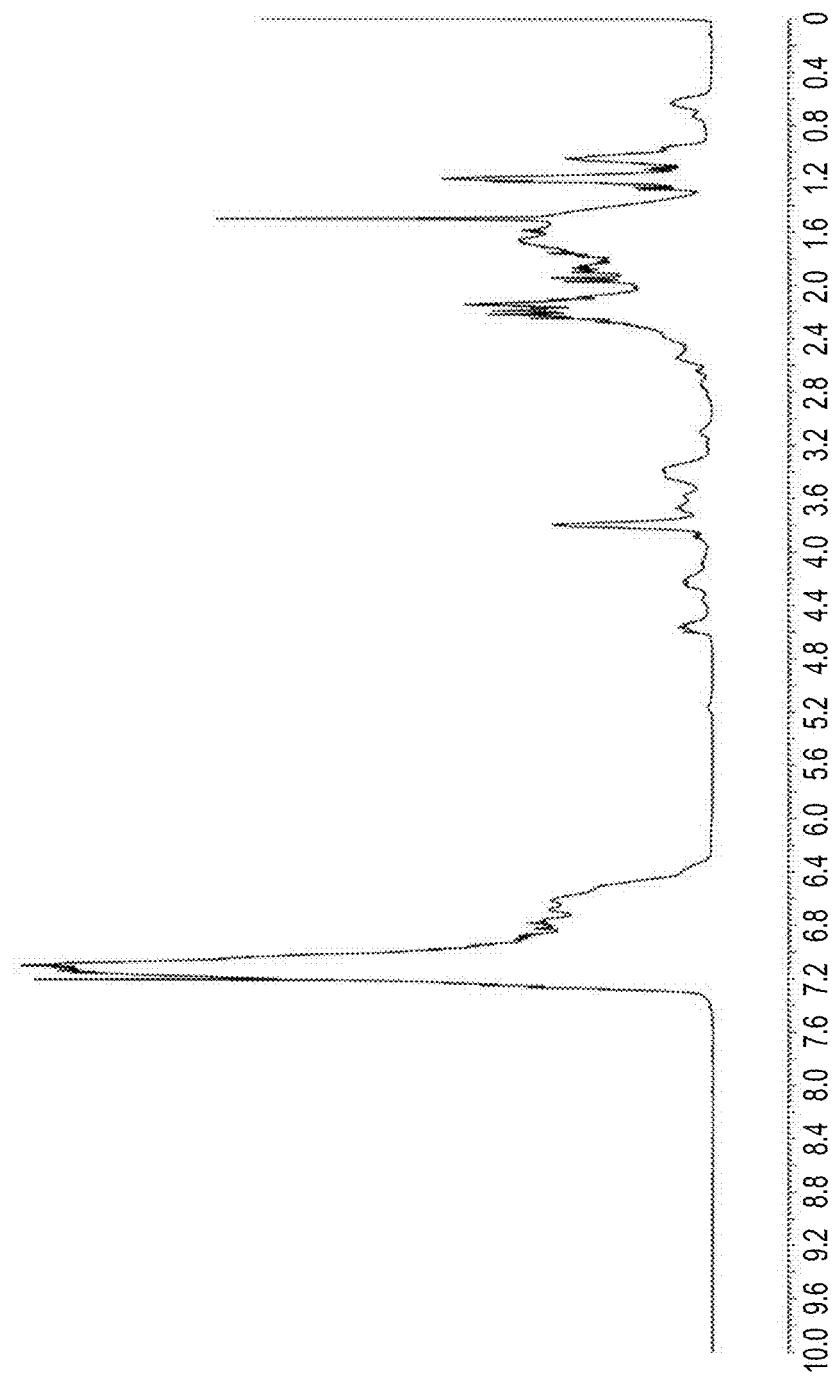
FIG. 52 shows a representative $^1$H-NMR trace obtained of an end-capped silane-containing resin obtained by acid functionalization with glycidoxy silane, as described in Example 1.10.
Figure 53:
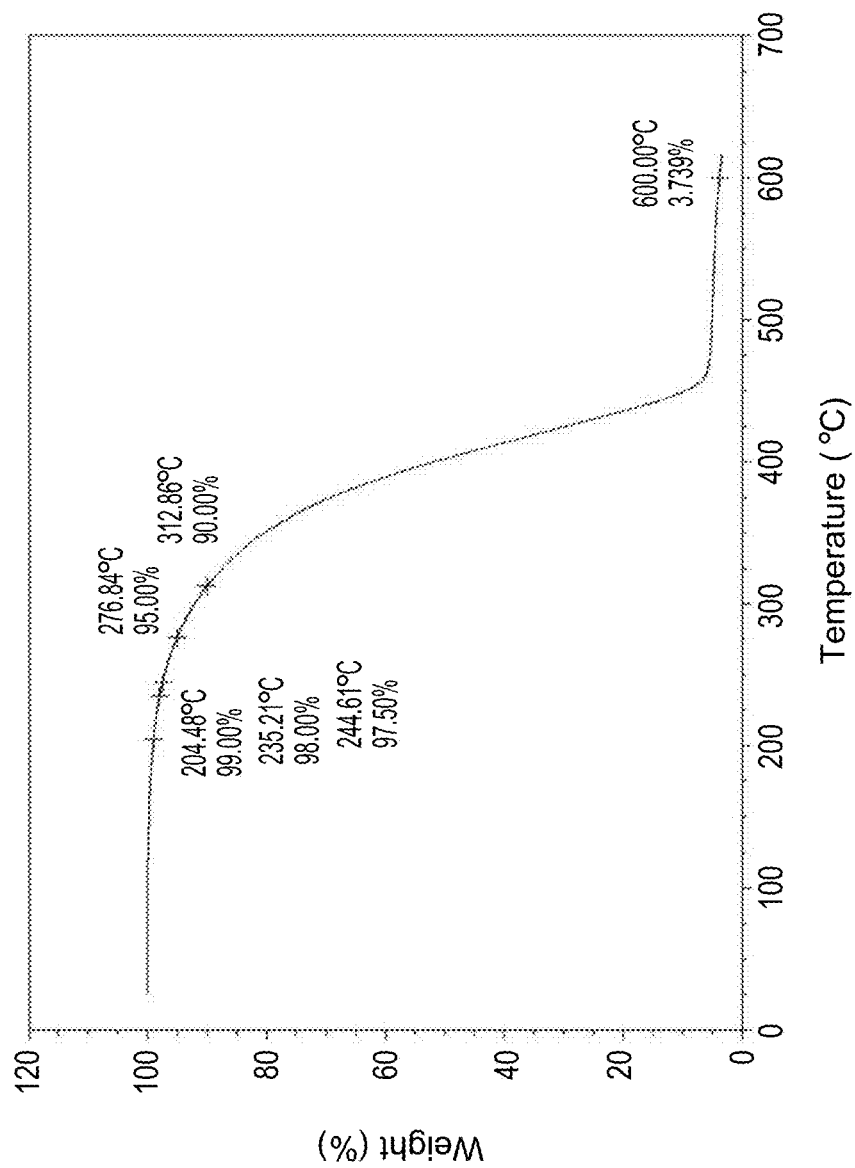
FIG. 53 shows a representative TGA trace obtained of an end-capped silane-containing resin obtained by acid functionalization with glycidoxy silane, as described in Example 1.10.
Figure 54:
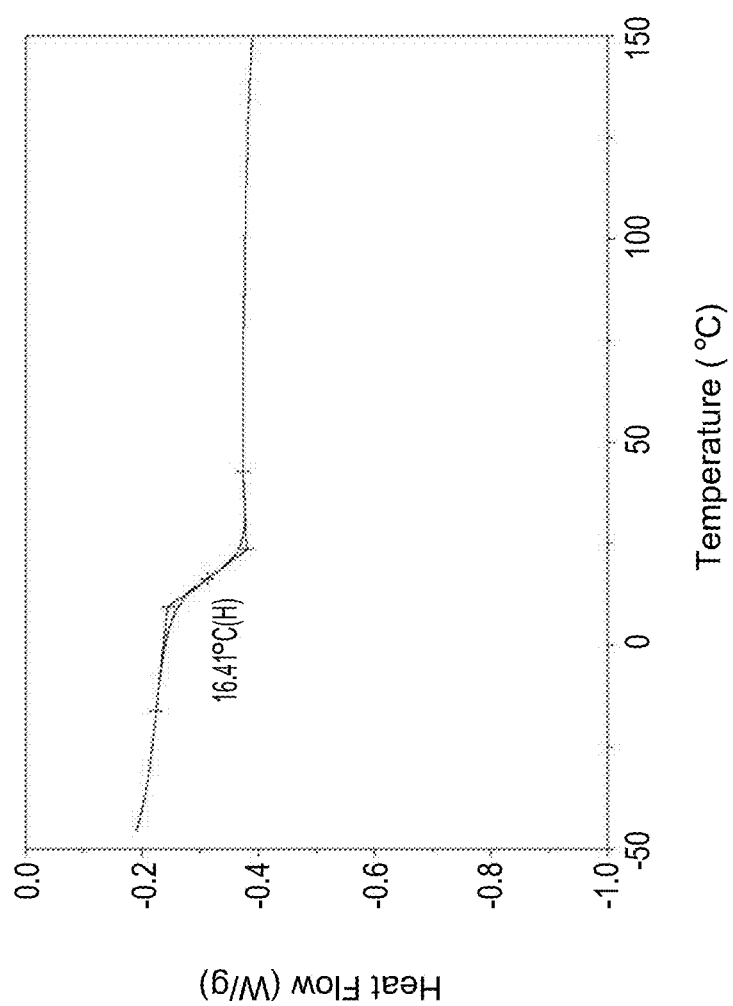
FIG. 54 shows a representative DSC trace of an end-capped silane-containing resin obtained by phenol functionalization with glycidoxy silane, as described in Example 1.11.
Figure 55:
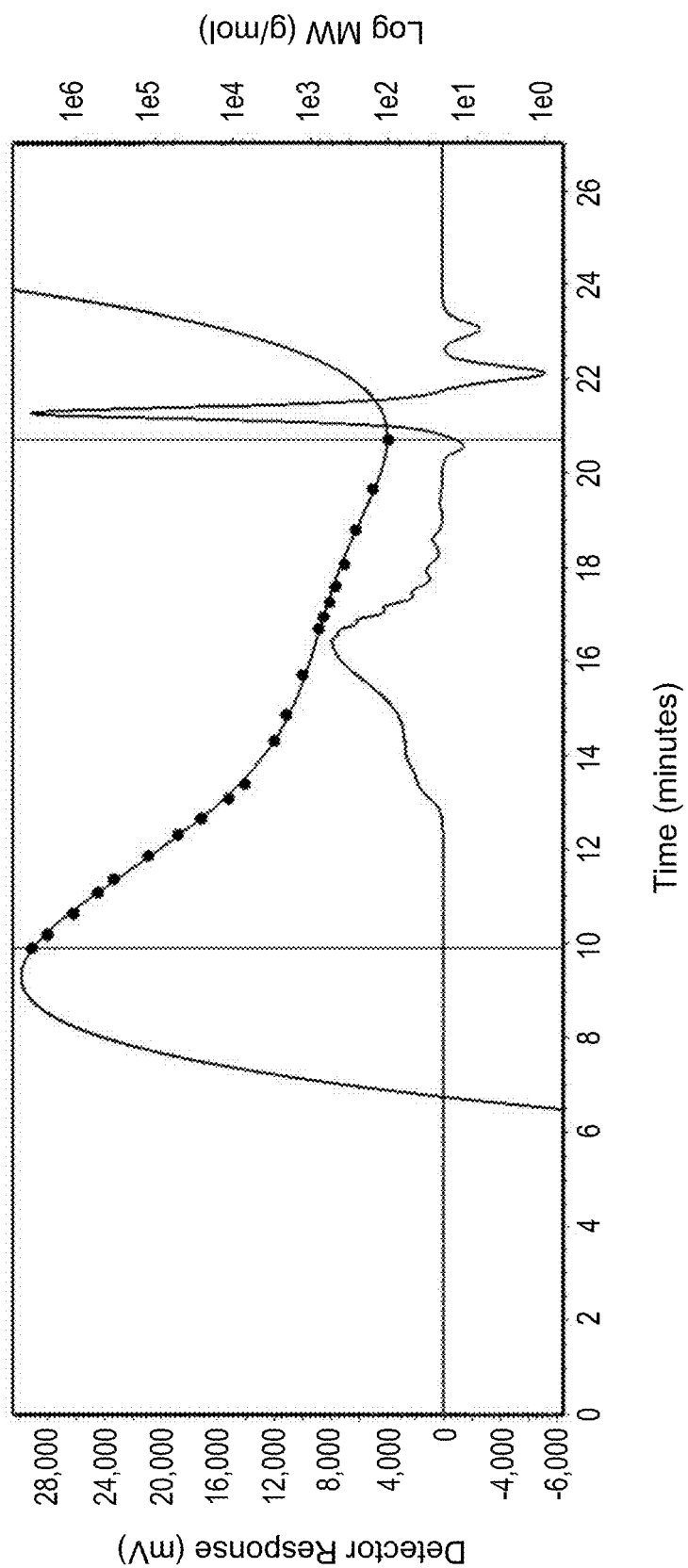
FIG. 55 shows a representative GPC trace of an end-capped silane-containing resin obtained by phenol functionalization with glycidoxy silane, as described in Example 1.11.
Figure 56:
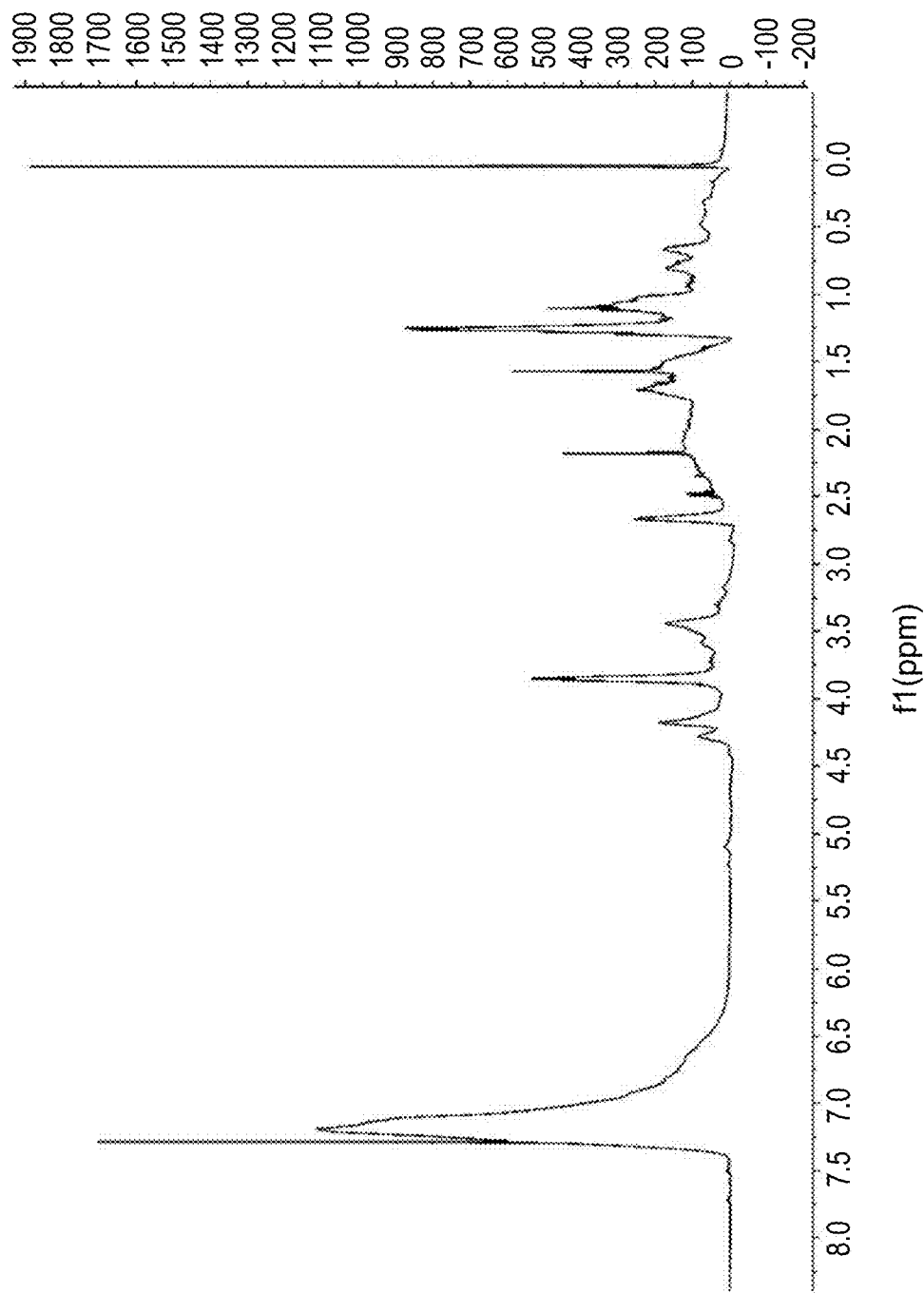
FIG. 56 shows a representative $^1$H-NMR trace of an end-capped silane-containing resin obtained by phenol functionalization with glycidoxy silane, as described in Example 1.11.
Figure 57:
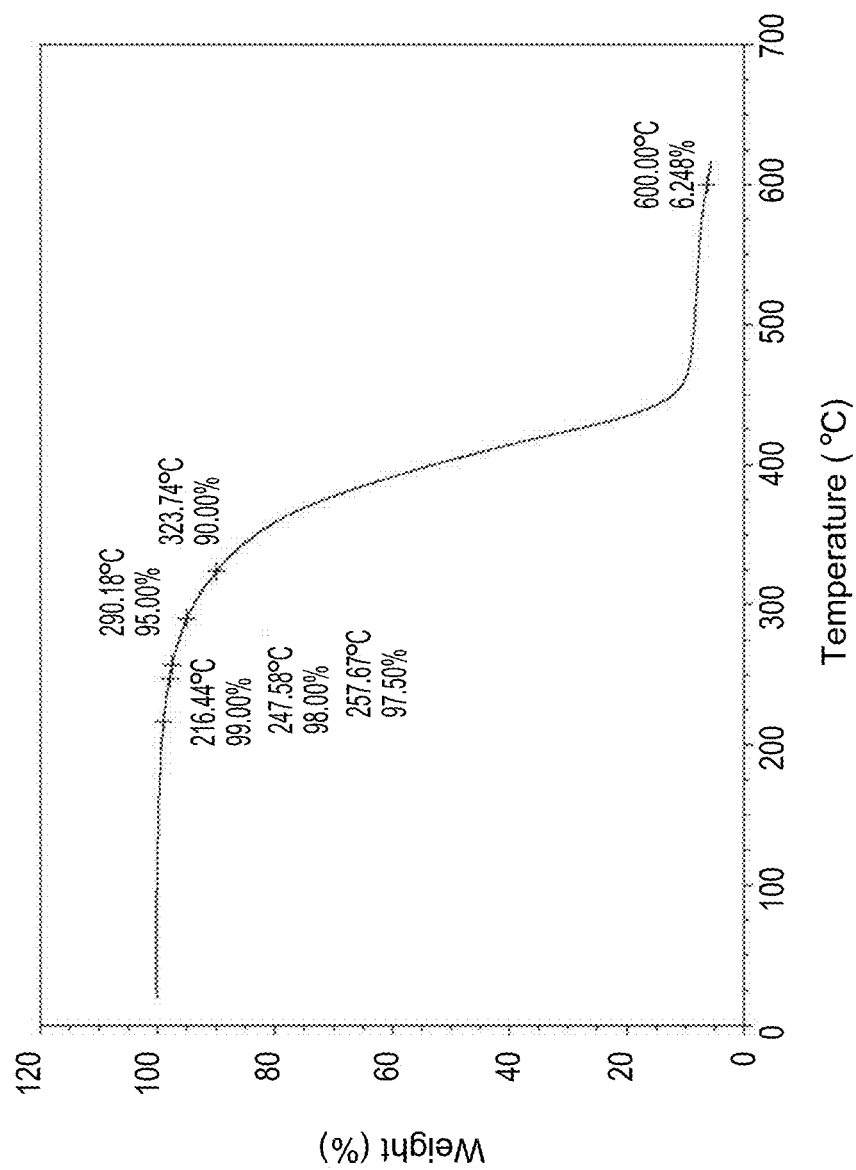
FIG. 57 shows a representative TGA trace of an end-capped silane-containing resin obtained by phenol functionalization with glycidoxy silane, as described in Example 1.11.

To a 3-neck, 500 mL round bottom flask equipped with a magnetic stir bar and a reflux condenser with N₂ gas overflow was charged 150 g of phenol-functionalized resin (0.677 mmol phenol per 1 gram of resin). The resin was heated to 160° C. using a silicon oil bath. Then 1.5 g triphenylphosphine was added to the flask. After complete dissolution, 27.5 g of 3-glycidoxypropyltriethoxysilane was added to the flask using a syringe. The reaction mixture was then stirred for 6 hours at 160° C. The reaction mixture was thereafter cooled to room temperature. The crude product was dissolved in methyl ethyl ketone and then precipitated into methanol. The precipitated solid was collected and then To a 100 mL round bottom flask was charged 10 g of an acid-functionalized hydrocarbon resin (0.31 mmol of acid function per one gram of resin). The resin was heated to 160° C. in an oil bath with magnetic stirring under N₂ gas. To this was added 1.84 g of 3-glycidoxypropyltriethoxysilane in one portion. This mixture was then stirred at 160° C. under nitrogen for six hours before it was cooled down to room temperature to afford the described product. The crude product was dissolved in methyl ethyl ketone and then precipitated into methanol. The precipitated solid was collected and then dried under reduced pressure with N₂ purge at 80° C. Analyses of the end-product by GPC, ¹H-NMR, TGA are provided in FIGS. 51 to 53, respectively.

Figure 1L:
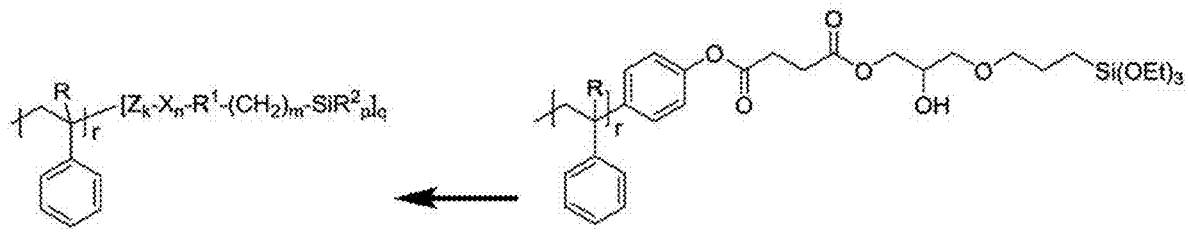

Example 1.11: Synthesis of End-Capped Silane-Containing Resin Via Phenol Functionalization with Glycidoxy Silane In this embodiment, the synthesis of end-capped functionalized resin was achieved by incubation of 3-glycidoxypropyltriethoxysilane and acid-modified resin with triphenylphosphine, as depicted in Scheme 11. Exemplary starting reagent and end product embodiments of this synthetic route are also depicted in FIG. 1L.

Scheme 11

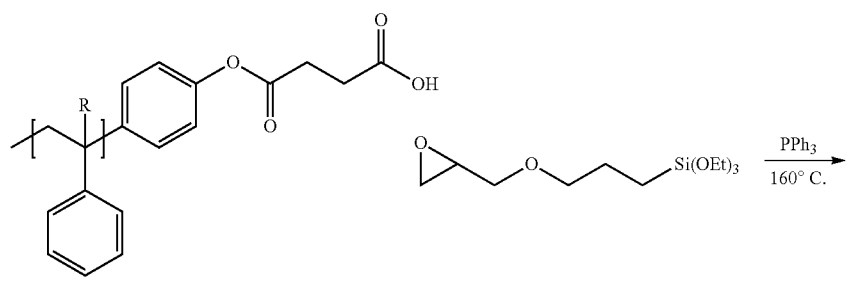

R = H or CH₃

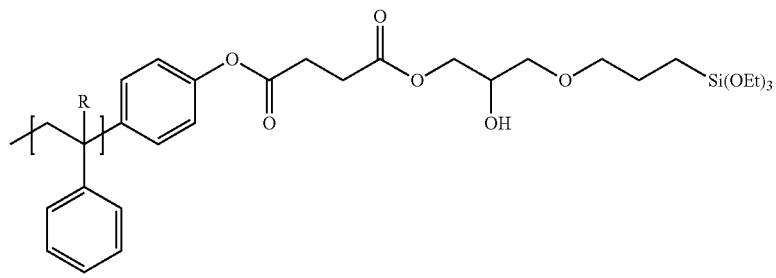

Into a 3-neck, 500 mL round bottom flask equipped with a magnetic stir bar, reflux condenser, and septum was added 60 grams of an acid modified resin (acid number 53 mg KOH/g) under an $N_2$ blanket. The resin then was heated to 180° C. after which 0.3 g triphenylphosphine was added to the flask. Upon complete dissolution, 15.76 g of 3-glycidoxypropyltriethoxysilane was added to the flask in one portion. This mixture was then stirred at 180° C. under nitrogen for six hours before it was cooled down to room temperature. The crude product was dissolved in methyl ethyl ketone then precipitated into methanol. The precipitated solid was collected then dried under reduced pressure with $N_2$ purge at 80° C. FIGS. 54 to 57 provide DSC, GPC, ¹H-NMR, and TGA analysis of the end product, respectively.

Figure 1M:
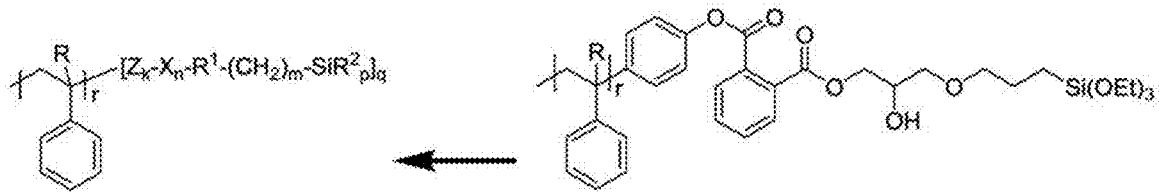

Example 1.12: Synthesis of End-Capped Silane-Containing Resin Via Phenol Functionalization with Phthalic Anhydride and Glycidoxy Silane In this embodiment, the synthesis of functionalized resin is performed by incubation of the functionalization unit with phthalic anhydride and 3-glycidoxypropyltriethoxysilane to create an end-capped functionalized resin, as depicted in Scheme 12. Exemplary starting reagent and end product embodiments of this synthetic route are also depicted in FIG. 1M.

Scheme 12

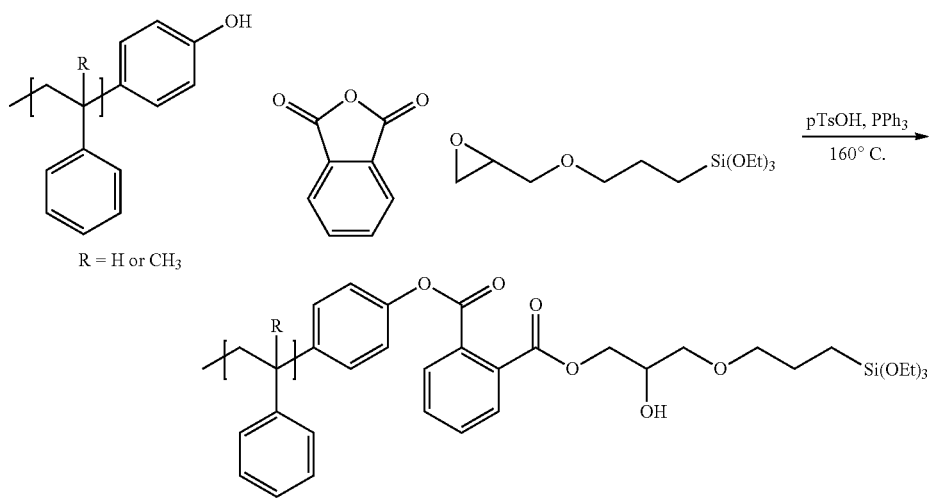

Figure 58:
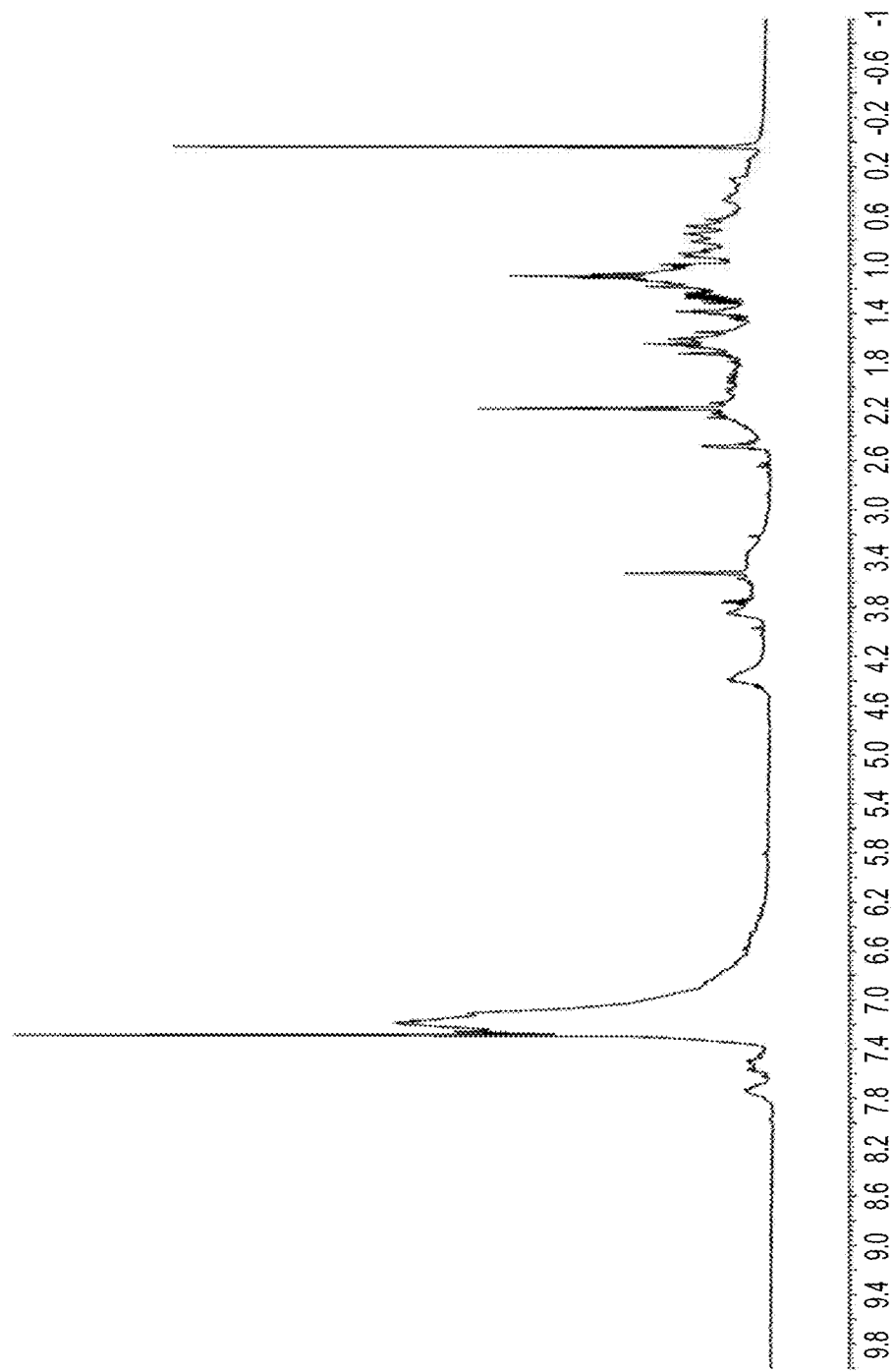
FIG. 58 shows a representative $^1$H-NMR trace of an end-capped silane-containing resin obtained by phenol functionalization with phthalic anhydride and glycidoxy silane, as described in Example 1.12.
Figure 59:
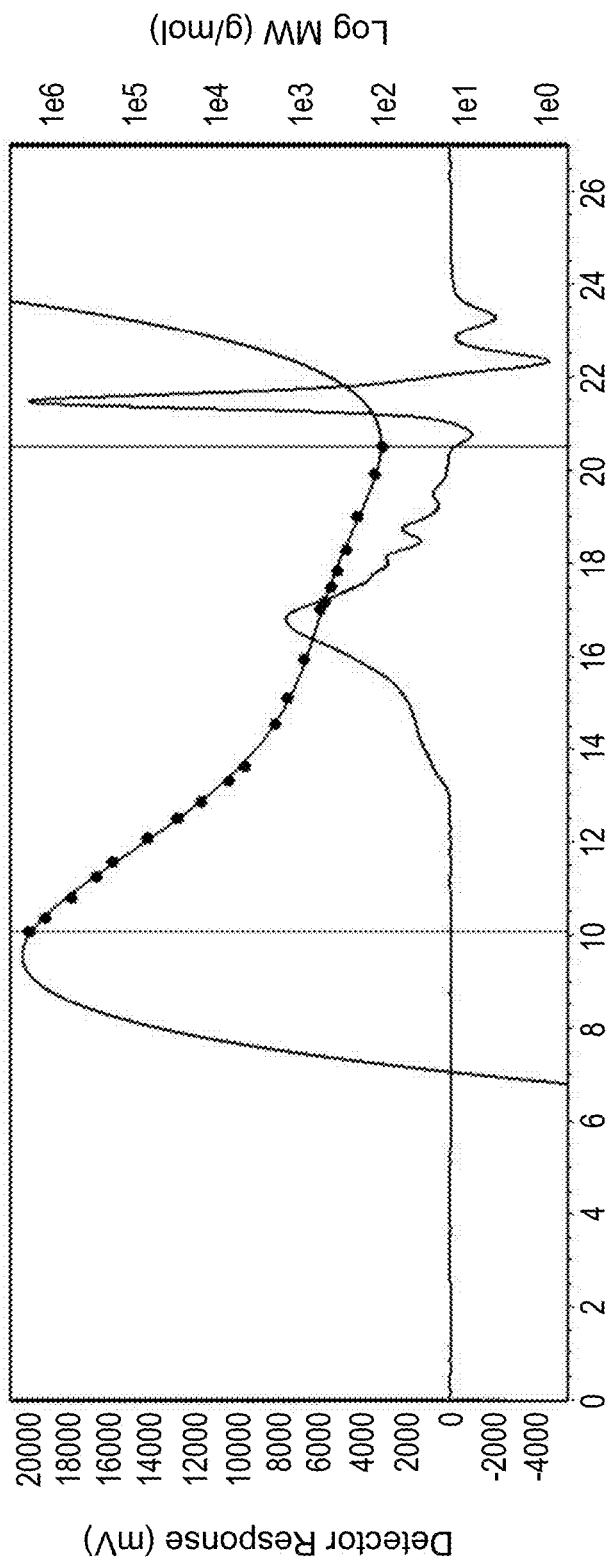
FIG. 59 shows a representative GPC trace of an end-capped silane-containing resin obtained by phenol functionalization with phthalic anhydride and glycidoxy silane, as described in Example 1.12.

To a 100 mL round bottom flask equipped with a magnetic stir bar was charged 10 g of phenol-functionalized resin (0.677 mmol phenol per 1 gram of resin). The resin was heated to 160° C. using a silicon oil bath. P-toluenesulfonic acid, 0.074 g, was then added to the flask. After 15 min, 0.98 g phthalic anhydride was added to the flask. The mixture was stirred for 2 hours at 160° C. followed by addition of 0.1 g triphenylphosphine and 1.84 g 3-glycidoxypropyltriethoxysilane. The mixture was then stirred for an additional 4 hours before it was cooled to room temperature. The crude product was dissolved in methyl ethyl ketone and then precipitated into methanol. The precipitated solid was collected and then dried under reduced pressure with $N_2$ purge at 80° C. The end-product analyzed by $^1$H-NMR is provided in FIG. 58. The GPC chromatogram and distribution curve of the end-product is shown in FIG. 59.

The above methods described in Examples 1.1 to 1.12 yield various functionalized resin compositions obtained through different routes of synthesis. Each route can be varied according to known procedures to yield resins possessing different properties, i.e. different degrees of functionalization, different molecular weights, different Tg values, etc. While many hundreds of such samples were made, provided in Table 3 are chemical and physical properties of several examples of silane resins functionalized by modification of polar linkers synthesized as described the above in Examples 1.1 to 1.5 gravimetric analysis (TGA) were used to evaluate thermal stability. GPC was used to determine any molecular weight changes.

Fourier transform—infrared spectroscopy (FT-IR) was conducted using a PerkinElmer® spectrometer with a resolution derived from 8 scans (PerkinElmer, Waltham, Mass., US). The samples were prepared by dissolving about 10 mg of material in 0.1 mL of DCM. One to two drops of the obtained solution were placed on an KBr card and dried under $N_2$ flow for a few min.

Generally, $^{29}$Si and $^{13}$C NMR analysis involved dissolving resin (100-300 mg, depending on sample availability) and chromium(III) acetylacetonate (16 to 36 mg) in 1 mL of deuterated chloroform. The samples were stirred at ambient temperature until all materials were fully dissolved. Hexamethyldisiloxane (40 to 100 microliters) was added to each solution as an internal standard, and the samples were stirred again briefly. The sample solutions were then transferred to 5 mm NMR tubes. Spectra were acquired at 26° C. at 125 or 150 MHz for carbon NMR and 99 or 119 MHz for silicon NMR. The relaxation delay was 1 to 2 seconds for carbon NMR and 5 seconds for silicon NMR. The number of scans was typically 12500 for carbon NMR and 1250 for silicon

TABLE 3

Exemplary Properties of Functionalized Resins

| Sample Type | $M_n$ | $M_w$ | $M_z$ | PDI | $T_g$ | Measured Si via ICP or XRF (ppm) | Silane via $^{13}$C NMR Si—CH$_2$— (mol %) | Silane via $^{13}$C NMR amide (mol %) | Silane via $^{13}$C NMR —Si—(O—CH$_2$—CH$_3$)$_3$ (mol %) | Silane via $^{29}$Si NMR (mol %) |
|---|---|---|---|---|---|---|---|---|---|---|
| 1 | 688 | 5499 | 24523 | 5.45 | 16 | 273 | — | — | — | — |
| 1 | 740 | 1209 | 2316 | 1.63 | 36 | 5500 | — | — | — | — |
| 2 | 629 | 787 | 1083 | 1.25 | 34 | 9590* | — | — | — | — |
| 2 | 642 | 772 | 927 | 1.20 | −5 | 19820 | — | 6.8 | 6.4 | 6.7 |
| 2 | 688 | 902 | 1706 | 1.31 | −5 | 26500 | — | 5.7 | 7.2 | 6.6 |
| 3 | 647 | 888 | 1541 | 1.37 | 28 | 394 | — | — | — | — |
| 4 | 534 | 1133 | 2439 | 2.12 | −7 | 16200 | 7.7 | 5.9 | 6.4 | 6.4 |
| 4 | 733 | 1452 | 2699 | 1.98 | −13 | 29000 | 18 | 19 | 12 | 12 |
| 4 | 816 | 2019 | 5282 | 2.47 | −7 | 35700 | 21 | 27 | 15 | 13 |
| 2 | 932 | 2065 | 3988 | 2.22 | 32 | 8440 | 1.4 | — | 1.7 | 1.5 |
| 2 | 920 | 2064 | 4009 | 2.24 | 30 | 5910 | 4.4 | 2.7 | 4.5 | 4.0 |
| 6 | 761 | 1086 | 1822 | 1.43 | 25 | 9550 | — | — | — | — |
| 7 | 698 | 967 | 1624 | 1.39 |  | 30400 | — | — | — | — |
| 8 | 900 | 1280 | 2220 | 1.42 | 8 | 15900 | — | — | — | 1.87 |
| 9 | 743 | 1168 | 2262 | 1.57 | 21 | 10500 | — | — | — | — |
| 10 | 862 | 1905 | 4635 | 2.21 |  | 11000 | — | — | — | — |
| 11 | 979 | 1809 | 4903 | 1.85 | 16 | 14200 | — | — | — | — |
| 12 | 695 | 1234 | 3190 | 1.78 |  | 12700 | — | — | — | — |

*X-Ray Fluorescence (XRF) determined value; all other values determined by ICP
Sample Type:
1 = acetoxy pendant route
2 = phenol end-capped route
3 = silane anhydride grafting route
4 = succinic anhydride grafting route
5 = one pot methacrylate silane copolymerization route
6 = end-capped ester amide route
7 = end-capped phenyl ether route
8 = copolymer of isobornylmethacrylate and 3-(trimethoxysilyl)propylmethacrylate
9 = glycerol ether route
10 = glycerol ester route
11 = glycerol succinate route
12 = glycerol ester ether route

Example 2: Analytical Characterization of Functionalized Resins, General Methods General Methods:

Analytical analysis was completed on each silane-functionalized resin product. IR was used to monitor the reactions. NMR or ICP was used to confirm the presence of silane. Differential scanning calorimetry (DSC) and thermo- NMR up to 24000 for carbon NMR and 7400 for silicon NMR. Calculations of the functionality level were completed using both silicon NMR and carbon NMR. NMR was run on a Bruker 500 MHz Avance II NMR spectrometer (Bruker Corp., Billerica, Mass., US), with a $^1$H frequency of 500 MHz, a $^{13}$C frequency of 125 MHz, and a $^{29}$Si frequency of 99 MHz. An Agilent 600 MHz DD2 spectrometer with a $^1$H frequency of 600 MHz, a $^{13}$C frequency of 150

MHz, and a $^{29}$Si frequency of 119 MHz also was used for some samples (Agilent Technologies, Inc., Santa Clara, Calif., US). All samples were run at 26±1° C. unless specified.

A standard procedure for ICP included preparation of samples either using a digestion method or an alternative preparation in xylenes or a suitable solvent selected for the sample. For digestion, approximately 250 milligrams of sample was weighed into a clean Teflon sample tube. Then, 3 mL of concentrated nitric acid was added to each tube (Trace metal grade, Fisher Chemical, Whippany, N.J., US). The sample tubes were then capped and placed in the microwave. Samples were microwave-digested using a Ultrawave Single Reaction Chamber Digestion System (Milestone, Inc., Shelton, Conn., US, Table 4). Digestion procedure for microwave is listed below in Table 3. Digested samples were diluted to a volume of 25 mL, yielding a final acid concentration of ~10% $HNO_3$ (based on nitric acid added and expected consumption of nitric acid during the digestion). A 1 ppm scandium internal standard was added to each sample. Each sample including the method blanks were then analyzed on a PerkinElmer® Optima 2100 ICP—optical emission spectrometry (OES) instrument (PerkinElmer, Inc., Waltham Mass.) with a cyclonic unbaffled spray chamber and concentric nebulizer. The ICP-OES was calibrated with a matrix matched prepared 1 ppm calibration standard and blank. ICP-OES conditions are provided in Table 5.

TABLE 4

UltraWAVE Sample Preparation Conditions

| Action | Temperature (° C.) | Time(min) |
|---|---|---|
| Ramp | 130 | 15 |
| Hold | 130 | 5 |
| Ramp | 240 | 20 |
| Hold | 240 | 20 |

TABLE 5

ICP Instrument Conditions

| ICP RF Power (Watts) | 1500 |
|---|---|
| Plasma Ar Gas Flow (L/min) | 18 |
| Auxiliary Ar Gas Flow (L/min) | 0.2 |
| Nebulizer Gas Flow (L/min) | 0.6 |
| Pump Flow rate mL/Min | 1.25 |

DSC scans were performed under nitrogen on a TA Instruments Q200 or Q2000 Differential Scanning calorimeter (DSC, TA Instruments, New Castle, Del., US) equipped with a refrigerated cooling system (RCS-90) both using a heating rate of 20° C./min. Glass transition temperatures (Tg) were calculated and reported from the second heating traces. TGA was conducted under nitrogen with a TA Instruments Q500 Thermogravimetric Analyzer (TA Instruments, New Castle, Del., US) at heating rate of 10° C./min with a nitrogen purge of 50 cc/min.

GPC methodologies were as follows: an Agilent 1100 HPLC (Agilent Technologies, Inc., Santa Clara, Calif., US) equipped with refractive index detector (RID) was used for the GPC analysis. The sample was prepared by dissolving 25 mg of material in 10 mL of THF and sonicated for about 5 min. Then, 10 µL of toluene was added and swirled. A portion of this solution was added to a vial. Run Method: Flow: 1 mL/min, Solvent: THF, Runtime: 26 min, RID Temp: 30° C., Column Temp: 30° C., Injection: 50 µL, Calibration Material: EasiCal PS-1 (Agilent Technologies, Inc., Santa Clara, Calif., US, Part Number 2010-0505), Column Type: 1st Column: GPC Guard Column (Agilent Technologies, Inc., Santa Clara, Calif., US, Part Number PL1110-1520), Particle Size—5 µm, Length: 50 mm×7.5 mm, 1st Column: PLGel 5 µm MIXED-C, Part Number—PL1110-6500, Particle Size—5 µm, Length: 300 mm×7.5 mm, 2nd Column: OligoPore (Agilent Technologies, Inc., Santa Clara, Calif., US, Part Number PL1113-6520), Particle Size—6 µm, Pore Type—100A, Length: 300 mm×7.5 mm.

An Agilent 1100 HPLC with an Agilent 1260 Refractive Index detector was used for GPC analysis (Agilent Technologies, Inc., Santa Clara, Calif., US). The mobile phase used was tetrahydrofuran stabilized with BHT preservative (Mollickrodt Pharmaceuticals, Inc., Staines-upon-Thames, England, UK). The stationary phase consisted of three columns from Agilent: PLgel MIXED guard column (5 micron, 7.5×300 mm, Agilent Technologies, Inc., Santa Clara, Calif., US), PLgel Mixed C Column (5 micron, 7.5×300 mm, Agilent Technologies, Inc., Santa Clara, Calif., US), and an OligoPore GPC column (5 micron, 7.5×300 mm, Agilent Technologies, Inc., Santa Clara, Calif., US).

The calibrants used were monodisperse polystyrene standards with a molecular weight (MW) range from 580 to 4,000,000 although peaks for polystyrene dimer, trimer tetramer, and pentamer, were also observed and included in the calibration. Analytical grade toluene was used as flow marker. A fourth-degree polynomial equation was used to find the best fit for the Log MW versus the observed retention time. The instrument parameters used for calibration and sample analysis include a flow rate of 1.0 ml/min, injection volume of 50 microliters while the columns and RI detector were heated at 30° C. Samples were prepared by dissolving 25 mg of the sample into 10 ml of THF with BHT, after which 10 microliters of toluene was added as the flow marker. Samples were analyzed to determine the Mw, Mn, and Mz of the thermoplastic resins. The percent thermoplastic resin below 300 g/mol and below 600 g/mol, including the amount below 300 g/mol, was determined by GPC integration with Agilent GPC/SEC Software Version 1.2.3182.29519.

The instrument parameters used for calibration and sample analysis include a flow rate of 1.0 ml/min, injection volume of 50 microliters while the columns and RI detector were heated at 30° C. Samples were prepared by dissolving 25 mg of the sample into 10 ml of THF with BHT, after which 10 microliters of toluene was added as the flow marker. Samples were analyzed to determine the Mw, Mn, and Mz of the thermoplastic resins.

For acid titration of intermediates, the sample was weighed, and 25 mL of dimethyl formamide (DMF) is added followed by 25 mL of methanol after dissolution with stirring. The solution was allowed to stir for about 1 min, and ten drops of bromothymol blue solution (Fluka Chemie AG, now Sigma-Aldrich, St. Louis, Mo., US), were added. The solution was titrated using 0.01M sodium methylate in methanol until past equivalence point (both visually and using the calculation).

Example 3: Rubber Composition Containing Silane-Functionalized Resin

A functionalized resin with ether linkages to silanol-groups attached to the backbone of the resin was prepared (10 mol % to 11 mol % functionalized, Resin B) and added to a rubber mixture in amounts of 10 phr, 20 phr, and 30 phr to prepare rubber mixtures I1, I2, and I3, respectively, as shown in Table 6 (using styrene-butadiene rubber (SBR)) and rubber mixtures I7, I8, and I9, in Table 7 (using natural rubber (NR)). An additional functionalized resin sample, synthesized by succinyl linkages to silanol-groups attached to the side groups of the resin, was prepared (27 to 30 mol % functionalized, Resin C) and added to a rubber mixture in amounts of 10 phr, 20 phr, and 30 phr to prepare rubber mixtures I4, I5, and I6, respectively, as also shown in Table 6 (SBR) and rubber mixtures I10, I11, and I12 (NR), in Table 7. The rubber mixtures C1 through C6 contained resins without the polar spacer linker disclosed herein and the mixture reference did not contain any resin.

TABLE 6

| Component* | Ref. 1 | C1 | C2 | C3 | I1 | I2 | I3 | I4 | I5 | I6 |
|---|---|---|---|---|---|---|---|---|---|---|
| Rubber$^a$ | 100 | 100 | 100 | 100 | 100 | 100 | 100 | 100 | 100 | 100 |
| Silica$^b$ | 60 | 60 | 60 | 60 | 60 | 60 | 60 | 60 | 60 | 60 |
| Resin a$^c$ | 0 | 10 | 20 | 30 | 0 | 0 | 0 | 0 | 0 | 0 |
| Resin b$^d$ | 0 | 0 | 0 | 0 | 10 | 20 | 30 | 0 | 0 | 0 |
| Resin c$^e$ | 0 | 0 | 0 | 0 | 0 | 0 | 0 | 10 | 20 | 30 |
| Antioxidant$^f$ | 2.0 | 2.0 | 2.0 | 2.0 | 2.0 | 2.0 | 2.0 | 2.0 | 2.0 | 2.0 |
| Wax$^g$ | 2.0 | 2.0 | 2.0 | 2.0 | 2.0 | 2.0 | 2.0 | 2.0 | 2.0 | 2.0 |
| ZnO$^h$ | 2.5 | 2.5 | 2.5 | 2.5 | 2.5 | 2.5 | 2.5 | 2.5 | 2.5 | 2.5 |
| Fatty acid$^i$ | 2.5 | 2.5 | 2.5 | 2.5 | 2.5 | 2.5 | 2.5 | 2.5 | 2.5 | 2.5 |
| Silane coupling agent$^j$ | 4.32 | 4.32 | 4.32 | 4.32 | 4.32 | 4.32 | 4.32 | 4.32 | 4.32 | 4.32 |
| Subtotal | 173.32 | 183.32 | 193.32 | 203.32 | 183.32 | 193.32 | 203.32 | 183.32 | 193.32 | 203.32 |
| Accelerator$^k$ | 1.0 | 1.0 | 1.0 | 1.0 | 1.0 | 1.0 | 1.0 | 1.0 | 1.0 | 1.0 |
| Vulcanizer$^l$ | 2.0 | 2.0 | 2.0 | 2.0 | 2.0 | 2.0 | 2.0 | 2.0 | 2.0 | 2.0 |
| Sulfur$^m$ | 2.0 | 2.0 | 2.0 | 2.0 | 2.0 | 2.0 | 2.0 | 2.0 | 2.0 | 2.0 |
| Total | 178.32 | 188.32 | 198.32 | 208.32 | 188.32 | 198.32 | 208.32 | 188.32 | 198.32 | 208.32 |
| Density (g/cm$^3$) | 1.16 | 1.15 | 1.15 | 1.14 | 1.15 | 1.14 | 1.13 | 1.15 | 1.14 | 1.13 |

*All amounts in parts per hundred of rubber (phr) unless indicated otherwise
$^a$Nipol ® NS 612 (styrene-butadiene rubber (SBR), Zeon Corp., Tokuyama, Japan)
$^b$Ultrasil ® VN 3GR (Evonik, Wesseling, Germany)
$^c$standard resin (Kristalex ™ F-85)
$^d$10% end-capped ether-linked functionalized resin, according to Example 1.2
$^e$30% pendant succinyl functionalized resin, according to Example 1.4
$^f$6PPD (N-(1,3-Dimethylbutyl)-N'-phenyl-p-phenylenediamine)
$^g$Ozone Wax
$^h$ZnO
$^i$Stearic Acid
$^j$TESPD - Bis(3Triethoxysilylpropyl)disulfide
$^k$DPG (1,3-diphenylguanidine)
$^l$CBS (N-cyclohexyl-2-benzothiazolesulfenamide)
$^m$elemental sulfur

TABLE 7

| Component* | Ref. 2 | C4 | C5 | C6 | I7 | I8 | I9 | I10 | I11 | I12 |
|---|---|---|---|---|---|---|---|---|---|---|
| Rubber$^a$ | 100 | 100 | 100 | 100 | 100 | 100 | 100 | 100 | 100 | 100 |
| Silica$^b$ | 60 | 60 | 60 | 60 | 60 | 60 | 60 | 60 | 60 | 60 |
| Resin a$^c$ | 0 | 10 | 20 | 30 | 0 | 0 | 0 | 0 | 0 | 0 |
| Resin b$^d$ | 0 | 0 | 0 | 0 | 10 | 20 | 30 | 0 | 0 | 0 |
| Resin c$^e$ | 0 | 0 | 0 | 0 | 0 | 0 | 0 | 10 | 20 | 30 |
| Antioxidant$^f$ | 2.0 | 2.0 | 2.0 | 2.0 | 2.0 | 2.0 | 2.0 | 2.0 | 2.0 | 2.0 |
| Wax$^g$ | 2.0 | 2.0 | 2.0 | 2.0 | 2.0 | 2.0 | 2.0 | 2.0 | 2.0 | 2.0 |
| ZnO$^h$ | 2.5 | 2.5 | 2.5 | 2.5 | 2.5 | 2.5 | 2.5 | 2.5 | 2.5 | 2.5 |
| Fatty acid$^i$ | 2.5 | 2.5 | 2.5 | 2.5 | 2.5 | 2.5 | 2.5 | 2.5 | 2.5 | 2.5 |
| Silane coupling agent$^j$ | 4.32 | 4.32 | 4.32 | 4.32 | 4.32 | 4.32 | 4.32 | 4.32 | 4.32 | 4.32 |
| Subtotal | 173.32 | 183.32 | 193.32 | 203.32 | 183.32 | 193.32 | 203.32 | 183.32 | 193.32 | 203.32 |
| Accelerator$^k$ | 1.0 | 1.0 | 1.0 | 1.0 | 1.0 | 1.0 | 1.0 | 1.0 | 1.0 | 1.0 |

TABLE 7-continued

| Component* | Ref. 2 | C4 | C5 | C6 | I7 | I8 | I9 | I10 | I11 | I12 |
|---|---|---|---|---|---|---|---|---|---|---|
| Vulcanizer[l] | 2.0 | 2.0 | 2.0 | 2.0 | 2.0 | 2.0 | 2.0 | 2.0 | 2.0 | 2.0 |
| Sulfur[m] | 2.0 | 2.0 | 2.0 | 2.0 | 2.0 | 2.0 | 2.0 | 2.0 | 2.0 | 2.0 |
| Total | 178.32 | 188.32 | 198.32 | 208.32 | 188.32 | 198.32 | 208.32 | 188.32 | 198.32 | 208.32 |
| Density [g/cm$^3$] | 1.16 | 1.15 | 1.15 | 1.14 | 1.15 | 1.14 | 1.13 | 1.15 | 1.14 | 1.13 |

*All amounts in parts per hundred of rubber (phr) unless indicated otherwise
[a]Natural Rubber (NR)
[b]Ultrasil ® VN 3GR (Evonik, Wesseling, Germany)
[c]standard resin (Kristalex ™ F-85)
[d]10% end-capped ether-linked functionalized resin, according to Example 1.2
[e]30% pendant succinyl functionalized resin, according to Example 1.4
[f]Sirantox ® 6PPD (N-(1,3-Dimethylbutyl)-N'-phenyl-p-phenylenediamine) (Jiangsu, Sinorgchem Tech. Co., China)
[g]Okerin ® OK 2124 (Paramelt B.V., The Netherlands)
[h]ZnO Rotsiegel Gran (Grille ZNO GmbH, Goslar, Germany)
[i]Tefacid RG (straight chain aliphatic monocarboxylic acids, mainly palmitic and stearic acid) (Aarhus Karlshamn, Karlshamn, Sweden)
[j]JH-S75 (Bis[3-(triethoxysilyl)propyl]disulfide) (Jingzhou Jianghan Fine Chemical, Shashi, Jingzhou, Hubeui, China)
[k]Denax DPG oil (1,3-diphenylguanidine) (Draslovka A.S., Kolin, Czech Republic)
[l]Vulkacit ® CZ/EG-C (N-cyclohexyl-2-benzothiazolesulfenamide, CBS) (Lanxess GmbH, Cologne, Germany)
[m]elemental sulfur Mixture production was performed under industry standard conditions in two stages in a laboratory 300 mL Brabender mixer with two-wing geometry (CW Brabender GmbH & Co., South Hackensack, N.J., US), as shown in Table 8. Test pieces were produced from all of the mixtures by optimal vulcanization under pressure at 160° C. (Table 9), and these test pieces were used to determine the material properties typical for the rubber industry by using the test methods given below.

TABLE 8

| Mixing for Second Reference Mixture | |
|---|---|
| First Mixing Step | |
| Rotor speed (rpm) | 70 |
| Starting temperature (° C.) | 130 |
| Final temperature (° C.) | 149 |
| Second Mixing Step | |
| Rotor speed | 55 |
| Temperature (° C.) | 80 |

TABLE 9

| Cure Properties | |
|---|---|
| Measurement device | MDR 2000 (Alpha Technologies Services, LLC, OH, US) |
| Cure Temp. | 160° C. |
| Static-Mechanical Properties | |
| Stress-strain analysis | In accordance to ISO 37: 2011 |
| Dynamic Mechanical Properties | |
| Measurement device | Eplexor |
| Temp. | 0° C. and 70° C. |
| Strain | 10% compression |
|  | ±0.2% strain amplitude |
| Frequency | 10 Hz |

The rubber mixtures were tested to determine the resulting tire properties, as noted in Tables 10 and 11 (results for SBR mixtures and NR mixtures, respectively).

TABLE 10

|  | Ref. 1 | C1 | C2 | C3 | I1 | I2 | I3 | I4 | I5 | I6 |
|---|---|---|---|---|---|---|---|---|---|---|
| Hardness Shore A (RT) | 70.1 | 65.4 | 61.1 | 56.8 | 68.8 | 68.1 | 66.9 | 73.2 | 79.4 | 78.5 |
| Hardness Shore A (70° C.) | 69.8 | 64.9 | 59.5 | 55.1 | 67.6 | 64.8 | 62.4 | 71.5 | 76.5 | 75.4 |
| Resilience (RT)/% | 55.6 | 52.8 | 49 | 44.6 | 45.6 | 40.6 | 36.6 | 50.4 | 42.4 | 44.2 |
| Resilience (70° C.)/% | 65 | 65.2 | 63.6 | 63.4 | 64.2 | 61.2 | 55.4 | 64.6 | 57.8 | 58.6 |
| Difference[a]/% | 9.4 | 12.4 | 14.6 | 18.8 | 18.6 | 20.6 | 18.8 | 14.2 | 15.4 | 14.4 |
| T @ tan δ (max) temp, sweep/° C. | −43 | −35 | −33 | −25 | −38 | −30 | −30 | −38 | −41 | −35 |
| Tg shift/° C. | 0 | 8 | 10 | 18 | 5 | 13 | 13 | 5 | 2 | 8 |
| tan δ (0° C.) at constant strain | 0.199 | 0.226 | 0.272 | 0.349 | 0.279 | 0.318 | 0.347 | 0.229 | 0.269 | 0.244 |
| tan δ (70° C.) at constant strain | 0.089 | 0.097 | 0.094 | 0.096 | 0.102 | 0.124 | 0.161 | 0.11 | 0.164 | 0.149 |

[a]Difference (resilience at 70° C. − resilience at room temperature)

TABLE 11

|  | Ref. 2 | C4 | C5 | C6 | I7 | I8 | I9 | I10 | I11 | I12 |
|---|---|---|---|---|---|---|---|---|---|---|
| Hardness Shore A (RT) | 72.0 | 66.1 | 63.3 | 55.6 | 71.3 | 72 | 69.7 | 75 | 78.7 | 82.9 |
| Hardness Shore A (70° C.) | 70.9 | 65.6 | 59.7 | 53 | 63.8 | 61.2 | 55.9 | 69.6 | 73 | 76.3 |
| Resilience (RT)/% | 47.8 | 42.6 | 37.4 | 34.2 | 36.8 | 31.4 | 27.4 | 41.6 | 38 | 36.4 |
| Resilience (70° C.)/% | 59.8 | 56.8 | 55.6 | 58.2 | 53.4 | 45.6 | 38.6 | 56.6 | 51.6 | 46.8 |
| Difference[a]/% | 12 | 14.2 | 18.2 | 24 | 16.6 | 14.2 | 11.2 | 15 | 13.6 | 10.4 |
| T @ tan δ (max) temp. sweep/° C. | −46 | −41 | −38 | −33 | −43 | −40 | −38 | −45 | −42 | −42 |
| Tg shift/° C. | 0 | 5 | 8 | 13 | 3 | 6 | 8 | 1 | 4 | 4 |
| tan δ (0° C.) at constant strain | 0.183 | 0.241 | 0.31 | 0.363 | 0.214 | 0.241 | 0.271 | 0.191 | 0.19 | 0.198 |
| tan δ (70° C.) at constant strain | 0.131 | 0.121 | 0.124 | 0.133 | 0.175 | 0.199 | 0.251 | 0.151 | 0.203 | 0.257 |

[a]Difference (resilience at 70° C. − resilience at room temperature)

As can be seen from Table 10, Table 11, and FIG. 60, the resins comprising the functionalized polar linker resolve the conflicting technical requirements of an improved wet grip with a low rolling resistance at a higher level. Specifically, the addition of 10 (and 20 phr for SSBR) of functionalized resin show an increased value of the difference of the resilience at 70° C. and the resilience at room temperature when compared to the unfunctionalized resin. This difference is mainly due to a decreased resilience at room temperature as the resilience at 70° C. remains almost unaffected. Moreover, the wet grip is improved as demonstrated by the increased values of tan δ at 0° C. Nonetheless, the rolling resistance remains largely unaffected, as shown by the very small changes of the values of tan δ at 70° C. In addition, the Shore A hardness remains almost unaffected by the addition of functionalized resins or even increases as observed for the highly functionalized resin in compound I4-I6 (SBR) and I10-I12 (NR). As can be seen from these data, the effects are comparable for both polymer systems.

The inventive resins were also used in a mixture according WO2015153055 (the disclosure of which is incorporated herein by references for all purposes). The observed higher values of tan δ at 100° C. and 14% strain indicating an improvement in durability, traction and handling at high temperatures occurring during heavy handling were not observed for the inventive resins given here. In contrast the tan δ values at 100° C. and 14% strain were decreased for the resins when used in compounding realized in accordance to WO 2015/153055 (the disclosure of which is incorporated herein by references for all purposes).

Example 4: Ethylene Vinyl Acetate (EVA) Adhesive Compositions Containing Silane-Functionalized Resins As noted above, the functionalized resins described herein impart useful and surprising qualities to a variety of end products and/or end uses. One such end use is adhesive compositions. In this example, two EVA adhesive compositions are prepared and characterized.

Two different adhesive formulations were prepared by thoroughly mixing the specified polymers, resin, and antioxidants, followed by addition of the specified waxes in the ratios shown in Table 12, below (all values are in wt %). Example Resin 1.9, which is functionalized as described herein, and commercial resin Kristalex™ 3085 (Eastman Chemical Company, Kingsport, Tenn., US) were incorporated into adhesive compositions and tested. The formulations were mixed using a mechanical stirrer equipped with a coil impeller for 15 minutes after additions were complete. Formulations VC1 and VE1 were mixed at 150° C. and applied at 130° C. to a cardboard substrate for testing. Formulations VC2 and VE2 were mixed at 180° C. and applied at 180° C. to cardboard substrates for testing.

TABLE 12

| | Resin | | | |
|---|---|---|---|---|
| | Kristalex™ 3085 | Example 1.9 | Kristalex™ 3085 | Example 1.9 |
| | Adhesive | | | |
| | VC1 | VE1 | VC2 | VE2 |
| Evatane™ 28-800 (wt %) | 35 | 35 | 0 | 0 |
| Evatane™ 28-40 (wt %) | 0 | 0 | 19 | 19 |
| Evatane™ 28-420 (wt %) | 0 | 0 | 21 | 21 |
| Permalyn™ 6110 (wt %) | 5 | 5 | 0 | 0 |
| Kristalex™ 3085 (wt %) | 30 | 0 | 40 | 0 |
| Silane-functionalized Example resin 1.9 (wt %) | 0 | 30 | 0 | 40 |
| Paraffin wax (mp 66-69° C.) (wt %) | 29.6 | 29.6 | 0 | 0 |
| Sasolwax™ 3279 microcrystalline wax (wt %) | 0 | 0 | 19.7 | 19.7 |
| Irganox™ 1010 (wt %) | 0.4 | 0.4 | 0.3 | 0.3 |

The adhesives were characterized using the following test methods. The Brookfield viscosity was tested according to ASTM D3236, "Standard Test Method for Apparent Viscosity of Hot Melt Adhesives and Coating Materials" using a Brookfield DV-II+viscometer with Thermosel™ and spindle 27 at the specified temperature (AMETEK Brookfield, Middleborough, Mass., US). The coefficient of variance was 7%.

Ring and ball softening point (RBSP) was determined according to ASTM D6493-11(2015) "Standard Test Methods for Softening Point of Hydrocarbon Resins and Rosin Based Resins by Automated Ring-and-Ball Apparatus" using a Herzog 754 apparatus (PAC, L.P., Houston, Tex., US).

Bonded samples for adhesion/fiber tear testing were prepared using hot melt tester model ASM-15N manufactured by Mitsubishi Electric Corporation (MEC) in Japan according to Japanese Adhesives Industry (JAI) JAI Method JAI-7-B, with cardboard flutes perpendicular. The fiber tear test consists of manually tearing glued cardboard substrates by hand under the specified temperature conditions, and the percent fiber tear was visually estimated to the nearest 10%. The glued cardboard substrates were conditioned at temperature for at least 10 hours before testing. Samples for shear adhesion failure temperature (SAFT) and peel adhesion failure temperature (PAFT) testing were prepared following JAI Method JAI-7-A, and samples for hold power testing (peel mode) were prepared following JAI Method JAI-7—C. PAFT and SAFT testing was conducted with 100 g and 500 g weights, respectively at an oven ramp rate of 0.5° C./min. Hold power samples were tested with a 250 g weight at the specified temperature. A minimum of 5 samples were tested for each test and the average reported. The corrugated cardboard used was flute type B, 220 g/m$^2$ Kraft liner, 220 g/m$^2$ Kraft liner (Rengo Co., Ltd., Japan).

Table 13 provides the formulation test results including viscosity, RBSP, and adhesion results. Compared to adhesive VC1, adhesive VE1 containing the silane functionalized resin provides a markedly lower adhesive viscosity. This lower viscosity allows the use of lower application temperature while maintaining fast set time and excellent adhesion down to −15° C. Adhesive VE2, also containing silane functionalized resin, significantly increased adhesion to corrugated cardboard at −7° C. and −15° C. while maintaining comparable SAFT temperature, viscosity and set times to VC2.

TABLE 13

| | Resin | | | |
|---|---|---|---|---|
| | Kristalex™ 3085 | Example 1.9 | Kristalex™ 3085 | Example 1.9 |
| | Adhesive | | | |
| | VC1 | VE1 | VC2 | VE2 |
| Adhesive RBSP (° C.) | 76 | 75 | 85 | 85 |
| Viscosity at 120° C. (cP) | 1530 | 1403 | 7825 | 8175 |
| Viscosity at 140° C. (cP) | 810 | 760 | 4215 | 4258 |
| Viscosity at 160° C. (cP) | 467 | 450 | 2400 | 2444 |
| open time (sec) | 8 | 5 | 30 | 30 |
| set time (sec) | 6 | 5 | 10 | 10 |
| PAFT (JAI) | 55 ± 3 | 48 ± 3 | 47 ± 2 | 37 ± 2 |
| SAFT (JAI) | 69 ± 3 | 68 ± 5 | 62 ± 3 | 59 ± 8 |

TABLE 13-continued

| | Resin | | | |
|---|---|---|---|---|
| | Kristalex™ 3085 | Example 1.9 | Kristalex™ 3085 | Example 1.9 |
| | Adhesive | | | |
| | VC1 | VE1 | VC2 | VE2 |
| Hold power at 50° C. (JAI peel) (min) | 12 ± 1.4 | 6 ± 1.1 | 8 ± 0.7 | 3 ± 0.7 |
| Adhesion/Fiber Tear (%) | | | | |
| RT | 100 | 100 | 100 | 100 |
| −7° C. | 100 | 100 | 20 | 100 |
| −15° C. | 80 | 80 | 10 | 70 |

Example 5: Hot Melt Pressure Sensitive Adhesive Compositions Containing Silane-Functionalized Resin Styrene-isoprene-styrene (SIS)-based Hot Melt Pressure Sensitive Adhesive (PSA) compositions comprising Piccotac™ 1095 (Eastman Chemical Company, Kingsport, Tenn., US) as a tackifying resin were prepared with silane-functionalized Example Resin 1.9 (above) and with commercially available Kristalex™ 3085 (Eastman Chemical Company, Kingsport, Tenn., US) as end-block modifying resins. A reference PSA was similarly prepared without end-block modifying resin. The composition components are provided in Table 14.

TABLE 14

| Component | Kristalex™ 3085 % | Example Resin 1.9 % | Reference PSA % |
|---|---|---|---|
| Kraton™ D1161 | 41.5 | 41.5 | 45.3 |
| Piccotac™ 1095 | 45.6 | 45.6 | 49.7 |
| Kristalex™ 3085 | 8.3 | 0 | 0 |
| Example Resin 1.9 | 0 | 8.3 | 0 |
| Calsol™ 5550 oil | 4.1 | 4.1 | 4.5 |
| Irganox™ 1010 | 0.4 | 0.4 | 0.5 |
| PSA Tape Properties | | | |
| Temp at Tan-δ max (DMA Tg, ° C.) | 4.4 | 4.4 | 2.4 |
| Value at Tan-δ max | 1.9 | 2.1 | 1.9 |
| G' at 25° C. (dyn/cm$^2$ × 10$^6$) | 1.006 | 0.9446 | 0.9425 |
| DMA 3rd crossover Temp (° C.) | 102 | 102 | 108 |
| Brookfield Viscosity 140° C., spindle 27, ±7% (cP) | 195,500 | 170,300 | 475,000 |
| Brookfield Viscosity 160° C. (cP) | 43,650 | 40,800 | 92130 |
| Brookfield Viscosity 180° C. (cP) | 15,300 | 14,370 | 25940 |
| Loop tack on SS, lbs, avg. load | 8.2 ± 0.7 | 8.4 ± 1 | 8.7 ± 0.6 |
| 180° peel on SS (lbs/in) | 6.6 ± 0.7 | 7.8 ± 1 | 6.4 ± 1.3 |
| 40° C. Hold (min, 0.5" × 0.5", 1000 g) | 43 ± 6 | 46 ± 5 | 25 ± 7 |
| 70° C. Hold (min, 1" × 1", 1000 g) | 51 ± 15 | 25 ± 6 | 0 |
| SAFT (° C., 1" × 1", 1000 g) | 82 ± 3 | 77 ± 3 | 82 ± 4 |

The formulations were prepared and mixed in a Brabender Plasti-Corder Model DR-2072 using sigma-type mixing blades (C.W. Brabender® Instruments, Inc., S.

Hackensack, N.J., US) at 150° C. and 80-100 rpm. The polymer and antioxidant was pre-processed in a full bowl for 10 minutes prior to being used in a formulation. The pre-processed polymer and resin were added to the bowl and mixed for 20 minutes. Oil was added dropwise with mixing for a total mix time of 50 minutes.

The adhesives were coated on 50 μm (2 mil) Mylar film using a hot melt knife coater at 140° C. The coat weights were 26±2 g/m$^2$, and coated tape samples were conditioned in a controlled temperature and humidity climate (25° C. and 50% RH) overnight before testing as pressure sensitive adhesives.

Loop tack tests were performed on an MTS Criterion Universal Tensile Tester model C43-104E in accordance with PSTC-16 (MTS Systems Corporation, Eden Prairie, Minn., US). The crosshead displacement rate was 5 mm/s. A 25 mm×125 mm loop of tape was used in the experiments. The free loop of tape, unrestricted by the grips, was 75 mm long. The maximum force per unit width of the specimen was recorded. The initial height, measured from the bottom of the grips to the substrate surface, was 50 mm. The maximum displacement was 44 mm and the dwell time at maximum displacement was 1 second.

The peel energy or peel force per unit width was measured in accordance with PSTC 101: Peel Adhesion of Pressure Sensitive Tape Test Method A—Single-Coated Tapes, Peel Adhesion at 180° Angle. Rectangular strips of 25 mm×250 mm (1"×10") dimensions were tested using a MTS Criterion Universal Tensile Tester model C43-104E (MTS Systems Corporation, Eden Prairie, Minn., US) at 5 mm/s (12 inch/minute) crosshead displacement rate.

Shear Adhesion Failure Temperature (SAFT) measurement followed PSTC-17 Test Method for Shear Adhesion Failure Temperature (SAFT) of Pressure Sensitive Tape and was measured using a Shear Test Oven equipped with a High Temperature Shear Bank Tester (ChemInstruments, Fairfield, Ohio, US). A 25×25 mm (1"×1") area of tape was adhered to a stainless-steel panel using one complete pass of a standard 2 kg (4.5 lb) hand roller. Samples were prepared and climatized for 30 minutes at 25° C. and 50% RH, then placed in the oven and a static load of 500 g was suspended from the tape. The oven was equilibrated for 20 minutes at 30° C., and then the temperature was increased with a heating rate of 0.5° C./minute. The measured time to failure was recorded and converted to a failure temperature in degrees Celsius (° C.). The minimum number of samples for SAFT testing was four.

Shear holding power at 40° C. and 70° C. were measured using a Shear Test Oven equipped with a High Temperature Shear Bank Tester (ChemInstruments, Fairfield, Ohio, US). A 12.5×12.5 mm (0.5"×0.5") or 25×25 mm (1"×1") area of tape was adhered to a stainless-steel panel using one complete pass of a standard 2 kg (4.5 lb) hand roller. Samples were placed in an oven and samples were climatized to 40° C. or 70° C., respectively. When reaching this temp, the static load of 1000 g was suspended from the tape. The measured time to failure was recorded. The minimum number of samples for sheer hold power testing was five.

Although Example Resin 1.9 comprising silane functionalized resin exhibits a Tg significantly lower than the commercial Kristalex™ 3085 incorporated into the comparative example, Example Resin 1.9 significantly reduced adhesive viscosity and maintained both loop tack and 180° peel adhesion on stainless steel. Surprisingly, Example Resin 1.9 provides shear hold time at 40° C. equal to the comparison commercial resin that has a higher Tg. This combination of performance and physical properties allows the formulator to offer improved processing and lower application temperature compared to a comparable PSA using the comparative resin. Alternatively, the formulator can utilize the modified resin to provide a product with lower viscosity and processing temperature and improved 180° peel adhesion and hold power at 40° C. and at 70° C. compared to the Reference adhesive without an end block modifying resin.

Example 6: Non-Vulcanized Thermoplastic Elastomer (TPE) Binary Blends Containing Silane-Functionalized Resin Thermoplastic elastomer blends were prepared by thoroughly mixing Example Resin 1.9 (above, 20 wt %) and Kraton™ G-1650 (styrene-ethylene/butylene-styrene block copolymer, Kraton Performance Polymers, Kraton Corporation, Houston, Tex., US, 80 wt %). For comparison, commercial resin Kristalex® 3115LV (Eastman Chemical Company, Kingsport, Tenn., US) was incorporated into the composition instead of Example Resin 1.9. The neat, processed polymer was also included as a reference.

The following test methods were utilized in this example. Compounds were prepared by mixing in a Brabender PL-2000 equipped with a Prep-Mixer™ mixing bowl and roller blades (C.W. Brabender® Instruments, Inc., S. Hackensack, N.J., US) at 220° C. for 15 minutes at 75 rpm. The blends were formed into plaques (5"×5"×⅛") and (4"×4"×¼) by compression molding in a heated Carver press at 180° C. and approximately eight tons of pressure for five minutes. The plaques were tested for percent transmittance with a Gardner Haze-Gard Plus No. 4725 instrument (BYK Additives and Instruments, Wesel, Germany) that was calibrated using BYK-Gardner standards Nos. 4732 and 4733. The films were die cut into test articles for various physical tests including tear strength, tensile, and compression set. Remaining material was cut up into pellet sized pieces for melt flow rate measurements.

Tensile samples were die-cut and tested in accordance to ASTM D638 (Type V) and tested on a MTS Criterion Universal Tensile Tester model C43-104E (MTS Systems Corporation, Eden Prairie, Minn., US). Tear samples were die cut to compliance with ASTM D624 (die C).

Tensile strength, modulus and elongation at break were measured as per ASTM D412 using a MTS Criterion Universal Tensile Tester model C43-104E (MTS Systems Corporation, Eden Prairie, Minn., US) at a crosshead speed of 500 mm/min. Tear strength was measured at the same conditions following ASTM D624. The results of the six tests were averaged.

Melt flow rate was measured in a Ceast melt flow modular instrument at 230° C. with a 2.16 kg weight (Instron, Norwood, Mass., US).

For compression set testing, ASTM D395-14 was used. Test specimens were conditioned to ambient temperature and humidity for 24 hours and then cut from 6 mm thick plaques using a punch style cutter with an inner diameter of 13 mm. Three samples of each plaque were loaded into a plate compression device with 4.5 mm spacer bars for constant deflection in accordance to test method B. Samples were then allowed to remain under constant ambient lab conditions or in a 70° C. oven for 22 hours. Thickness measurements were taken before compression and 30 minutes after a conditioning phase after being removed from the device. The calculated results are reported in accordance to ASTM 395-14.

Hardness testing was done in accordance with ASTM D2240-05. Samples were measured from the same 6 mm plaques used for compression testing, but only before compression samples were cut. A "type B" Shore A durometer was used along with a very dense lab bench as a base for testing. Measurements were collected and recorded in compliance with ASTM D2240-05.

Table 15 shows the blend test results, showing the surprising increase in tear strength, % modulus, tensile, and decrease in compression set.

TABLE 15

|  | CC | Comparison Test Resin | Reference Control |
|---|---|---|---|
|  | Example Resin 1.9 | Kristalex™ 3115LV | no resin |
| Tear Strength (lbf/in) | 228 ± 18 | 309 ± 17 | 142 ± 14 |
| 50% modulus (psi, ±20) | 702 | 744 | 259 |
| 100% modulus (psi, ±20) | 708 | 743 | 311 |
| 200% modulus (psi, ±20) | 760 | 819 | 338 |
| 300% modulus (psi, ±20) | 829 | 911 | 364 |
| Tensile Strength at break - (psi) | 1715 ± 278 | 1884 ± 104 | 615 ± 450 |
| % elongation | 3236 ± 333 | 3521 ± 201 | 2195 ± 1184 |
| Young's modulus (ksi) | 4.4 | 5.3 | 0.8 |
| Shore A | 86 | 85 | 68 |
| Shore D | 27 | 27 | 15 |
| MFR 230° C./2.16 kg (g/10 min) | 2.4 | 3.3 | 0.65 |
| Compression set at RT % (±2) | 36 | 36 | 42 |
| Compression set at 70° C. (±2) | 89 | 94 | 84 |

As can be seen from Table 15, the TPE blend comprising the silane-functionalized resin improved room temperature compression set, tear strength, modulus, tensile strength and elongation compared to the neat polymer without the large, unfavorable increase in 70° C. compression set that results when the unmodified resin Kristalex™ 3115LV is used.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

What is claimed is:

1. A composition, comprising:
   about 10 to about 90 weight percent of at least one polymer,
   about 4 to about 70 weight percent of at least one functionalized resin,
   about 0 to about 70 weight percent of at least one thermoplastic tackifying resin,
   about 0 to about 50 weight percent of at least one wax,
   about 0 to about 60 weight percent of at least one oil or plasticizer,
   about 0.5 to about 3 weight percent of at least one stabilizer, and
   about 0 to about 70 weight percent of at least one filler,
   wherein the composition is non-vulcanized,
   wherein the functionalized resin comprises Formula I:
   resin-$[Z_k$-$X_n$—$R^1$-$(CH_2)_m$-$Si(R^2)_p]_q$(I)
   wherein Z is an aromatic group or an aliphatic group, optionally comprising a heteroatom;
   wherein X is a linker comprising a heteroatom selected from sulfur, oxygen, nitrogen, a carbonyl group, or a combination thereof;
   wherein $R^1$ comprises one or more of an aliphatic $C_1$ to $C_{18}$ and/or a linkage group comprising a heteroatom;
   wherein each $R^2$ is the same or different and is independently selected from a $C_1$ to $C_{18}$ alkoxy, aryloxy, alkyl, aryl, or H, or OH, and is optionally branched, and wherein at least one $R^2$ is $C_1$ to $C_{18}$ alkoxy, aryloxy, or H, or OH;
   wherein q is an integer from of at least 1;
   wherein k is an integer of 0 or 1;
   wherein n is an integer from 1 to 10;
   wherein m is an integer from 0 to 10; and,
   wherein p is 1, 2, or 3.

2. The composition of claim 1, wherein the composition exhibits a viscosity at 177° C. of about 50 to about 10,000 cP, and a ring and ball softening point of about 60° C. to about 180° C.

3. The composition of claim 1, wherein the polymer is one or more of natural rubber, polyisoprene, styrene-butadiene copolymer, styrene-butadiene rubber (SBR), butadiene rubber (BR), nitrile rubber, liquid rubbers, polynorbornene copolymer, isoprene-isobutylene copolymer, ethylene-propylene-diene rubber, chloroprene rubber, acrylate rubber, fluorine rubber, silicone rubber, polysulfide rubber, epichlorohydrin rubber, styrene-isoprene-butadiene terpolymer, hydrated acrylonitrile butadiene rubber, isoprene-butadiene copolymer, butyl rubber, hydrogenated styrene-butadiene rubber, butadiene acrylonitrile rubber, a terpolymer formed from ethylene monomers, propylene monomers, and/or ethylene propylene diene monomer (EPDM), isoprene-based block copolymers, butadiene-based block copolymers, styrenic block copolymers, styrene-butadiene-styrene block copolymer (SBS), styrene-ethylene/butylene-styrene block copolymer (SEBS), styrene-[ethylene-(ethylene/propylene)]-styrene block copolymer (SEEPS), styrene-isoprene-styrene block copolymer (SIS), random styrenic copolymers, hydrogenated styrenic block copolymers, styrene butadiene copolymers, polyisobutylene, ethylene vinyl acetate (EVA) polymers, ethylene-butyl-acrylate, polyolefins, amorphous polyolefins, semi-crystalline polyolefins, alpha-polyolefins, reactor-ready polyolefins, acrylates, metallocene-catalyzed polyolefin polymers and elastomers, semi-crystalline single-site catalyzed (metallocene) polyolefin, reactor-made thermoplastic polyolefin elastomers, amorphous poly alpha-olefin, olefin block copolymer, copolyester block copolymer, polyurethane block copolymer, polyamide block copolymer, thermoplastic polyolefins, thermoplastic vulcanizates, ethylene vinyl acetate copolymer, ethylene n-butyl acrylate copolymer, ethylene methyl acrylate copolymer, neoprene, acrylics, urethane, poly(acrylate), ethylene acrylic acid copolymer, polyether ether ketone, polyamide, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, $C_4$-$C_{10}$ alpha-olefin monomers, polypropylene polymers, maleated polyolefins, polyester copolymers, copolyester polymers, ethylene acrylic acid copolymer, and/or polyvinyl acetate, and/or
wherein the polymer optionally comprises a modification and/or functionalization selected from one or more of hydroxyl-, ethoxy-, epoxy-, siloxane-, amine-, amine-siloxane-, carboxy-, phthalocyanine-, and silane-sulfide-groups, at the polymer chain ends or pendant positions within the polymer.

4. The composition of claim 1, wherein q is an integer from 2 to 8, and/or wherein n is an integer from 1 to 4.

5. The composition of claim 1, wherein $-[Z_k\text{-}X_n-R^1\text{-}(CH_2)m\text{-}Si(R^2)_p]_q$ of Formula I is positioned at one or more ends of the functionalized resin, is distributed randomly throughout the functionalized resin, is present in blocks throughout the functionalized resin, is present in segments of the functionalized resin, is present at least once per functionalized resin, is present at least twice per functionalized resin, and/or is present in the middle of each functionalized resin.

6. The composition of claim 1, wherein:
X comprises a phenol, a hydroxyl, an amine, an imidazole, an amide, a polysulfide, a sulfoxide, a sulfone, a sulfonamide, a sulfonium, an ammonium, a carboxylic acid, an ester, a thioester, an ether, a maleimide, a carbamate, cyanate, isocyanate, thiocyanate, a pyridinium, or combinations thereof, $R^1$ is a $C_1$ to $C_{10}$ carbon chain or a $C_1$ to $C_5$ carbon chain,
$R^2$ is a $C_1$ to $C_{10}$ alkoxy, aryloxy, alkyl, or aryl group, or a $C_1$ to $C_5$ alkoxy, aryloxy, alkyl, or aryl group, and is optionally branched, and/or
Z is a 6-membered aromatic group, or a saturated or unsaturated cyclo-aliphatic group.

7. The composition of claim 1, wherein:
X is oxygen or carbonyl,
each $R_2$ is independently selected from a hydroxy, a methoxy, ethoxy, and a propoxy group,
$R^1$ is one or more of $-O-CO-NH-R^{1\text{-}}\text{-}(CH_2)_2-$, $O-CO-R^3\text{-}(CH_2)_2-$, $-O-CH_2-R^3\text{-}(CH_2)_2-$, $-CO-R^3\text{-}(CH_2)_2\text{-}$, and $-CO-NH-R^3\text{-}(CH_2)_2\text{-}$, and/or
$R^3$ is an aliphatic or aromatic $C_1$ to $C_8$ carbon chain, optionally branched, and/or optionally comprises one or more heteroatoms.

8. The composition of claim 1, wherein:
an amount of silane-containing groups grafted onto the functionalized resin is about 0.001 to about 100 mol %, about 0.1 to about 50 mol %, or about 5 to about 50 mol %,
the functionalized resin has a molecular weight of about 200 g/mol to about 200,000 g/mol, about 200 g/mol to about 175,000 g/mol, or about 200 g/mol to about 150,000 g/mol,
the functionalized resin has a polydispersity index (PDI) of about 1 to 10,
the functionalized resin has a glass transition temperature Tg of below about 200° C. or less than about 160° C.,
the amount of silane groups grafted onto the functionalized resin is from about 0.01 to about 30 mol %, and/or
wherein the functionalized resin is present in an amount of from 5 to 400 phr, from 5 to 120 phr, from 5 to 100 phr, from 5 to 40 phr, from 5 to 30 phr, or from 5 to 10 phr.

9. The composition of claim 1, wherein:
the functionalized resin has the molecular weight of from about 400 to about 2,000 g/mol, and/or
the polydispersity index (PDI) of the resin is of about 1 to about 5, or from 1 to 2.

10. The composition of claim 1, wherein:
the functionalized resin is bound to a silicate filler particle by a Si—O—Si moiety following hydrolysis of at least one $-R^2$ group,
a functionalized resin molecule is bound to a second functionalized resin molecule by a Si—O—Si moiety following hydrolysis of at least one $-R^2$ group, or
the functionalized resin covalently attaches to a surface of the silicate filler material through a reactive group, preferably a reactive silane group, which is bound to a polar linker.

11. The composition of claim 1, comprising:
about 30 to about 90 weight percent of the at least one polymer,
about 4 to about 60 weight percent of the at least one functionalized resin,
about 0 to about 70 weight percent of the at least one thermoplastic tackifying resin,
about 0 to about 30 weight percent of the at least one wax, and
about 0 to about 20 weight percent of the at least one oil or plasticizer.

12. The composition of claim 11, wherein the composition exhibits:
a lower Brookfield viscosity at 160° C., equivalent percent fiber tear at −15° C. on corrugated cardboard, and/or shorter set time as compared with an equivalent composition comprising a corresponding non-silane-functionalized resin; and/or
an at least 200% greater percent fiber tear at −7° C. and/or at −15° C. on corrugated cardboard and maintained within one standard deviation the Brookfield viscosity at 160° C. and shear adhesion failure temperature (SAFT) on corrugated cardboard as measured by JAI Method 7-A with 500 g, as compared with the same composition comprising a corresponding non-silane-functionalized resin.

13. The composition of claim 1, which comprises:
about 10 to about 80 weight percent of the at least one polymer, wherein the at least one polymer is an elastomer,
about 5 to about 25 weight percent of the functionalized resin,
about 0 to about 15 weight percent of the at least one thermoplastic tackifying resin,
about 2 to about 60 weight percent of the at least one oil or plasticizer, and
about 10 to about 70 weight percent of the at least one filler, and
further comprising about 5 to about 20 weight percent of at least one thermoplastic polymer, wherein the thermoplastic polymer is a polyolefin polymer or copolymer.

14. The composition of claim 13, wherein the composition exhibits:
a 70° C. compression set value as measured by ASTM D395-14 that is lower than the same composition with equivalent room temperature compression set value that was prepared without silane-functionalized resin; and/or
a lower room temperature compression set as measured by ASTM D395-14, and higher tear strength measured in compliance with ASTM D624 (die C), and a higher melt flow rate at 230° C./2.16 kg as compared to the composition without silane-functionalized resin.

15. The composition of claim 1, wherein the functionalized resin is obtained by polymerizing or co-polymerizing one or more of an unsaturated aliphatic monomer, terpenes, rosin acid, unsaturated cycloaromatic monomers, unsaturated cycloaliphatic monomers, unsaturated fatty acids, methacrylates, unsaturated aromatic monomers, vinyl aromatic monomers, and/or an unsaturated aliphatic/aromatic monomer mixture, and/or wherein the functionalized resin is hydrogenated, partially hydrogenated, or non-hydrogenated.

16. The composition of claim 15, wherein:
the aromatic monomers and/or vinyl aromatic monomer comprises one or more of styrene, vinyl toluene, alpha-methyl styrene, and/or diisopropylbenzene, or
the aliphatic monomer comprises one or more of $C_5$ piperylenes, coumarone, indene, and/or dicyclopentadiene.

17. The composition of claim 1, comprising:
about 15 to about 70 weight percent, or about 40 to about 55 weight percent, of the at least one polymer, wherein greater than about 15 weight percent of the at least one polymer is an elastomeric polymer,
about 4 to about 60 weight percent of the functionalized resin,
about 0 to about 70 weight percent of the at least one thermoplastic tackifying resin,
about 5 to about 35 weight percent of the at least one oil or plasticizer,
about 0.5 to about 3 weight percent of the at least one stabilizer, and
about 0 to about 70 weight percent of the at least one filler,
wherein the composition is a pressure sensitive adhesive (PSA) composition.

18. The composition of claim 17, comprising:
about 20 to about 60 weight percent, or about 20 to about 35 weight percent, of the at least one polymer,
about 4 to about 30 weight percent of the functionalized resin,
about 35 to about 60 weight percent of the at least one thermoplastic tackifying resin, and
about 25 to about 35 weight percent of the at least one oil or plasticizer.

19. The composition of claim 17, wherein the composition exhibits a lower Brookfield viscosity at 160° C. and maintained within one standard deviation the loop tack, 180° peel and 40° C. hold power as tested by PSTC 16, 101 and 17 modified, respectively, as compared with an equivalent composition comprising a corresponding non-silane-functionalized resin.

20. An article comprising the composition of claim 1, wherein the article is an adhesive, a laminate, a tape, a heat seal coating, a heat seal lidding, a disposable hygiene article, a mastic, a caulk, an insulating glass (IG) unit, bridge decking, a water proofing membrane, a waterproofing compound, an underlayment, a cable flooding/filling compound, a low shrinkage sheet molded compound, a dough molded compound, an overmolded compound, a polyester composite, a glass composite, a fiberglass reinforced plastic, a coupling agent for wood-plastic composites, a polyvinyl chloride extruded compound, a polyacrylic blended compound, a lost-wax precision casting, an investment casting wax composition, a candle, a window, a film, a gasket, a seal, an o-ring, a motor vehicle molded part, a motor vehicle extruded part, a sealant, a clothing article, a low profile additive for sheet molding compounds (SMCs) and dough molding compounds (DMCs), a woven textile sizing, a nonwoven textile sizing, a rubber additive/processing aid, and wherein the adhesive is a packaging adhesive, food contact grade adhesive, indirect food contact packaging adhesive, product assembly adhesive, woodworking adhesive, flooring adhesive, automotive assembly adhesive, structural adhesive, pressure sensitive adhesive (PSA), PSA tape, PSA label, PSA protective film, laminating adhesive, flexible packaging adhesive, heat seal adhesive, industrial adhesive, hygiene nonwoven construction adhesive, hygiene core integrity adhesive, or hygiene elastic attachment adhesive.

* * * * *

UNITED STATES PATENT AND TRADEMARK OFFICE
CERTIFICATE OF CORRECTION

PATENT NO. : 10,815,320 B2
APPLICATION NO. : 15/949919
DATED : October 27, 2020
INVENTOR(S) : Emily Baird Anderson et al.

It is certified that error appears in the above-identified patent and that said Letters Patent is hereby corrected as shown below:

In the Specification

In Column 2:
Line 57: delete "resin-$[Z_k-X_n-R^1-(CH_2)_n-Si(R^2)_p]_q$" and insert -- resin-$[Z_k-X_n-R^1-(CH_2)_m-Si(R^2)_p]_q$ -- therefor.

In Column 13:
Line 21: delete "(Mn)" and insert -- (Mw) -- therefor.

In Column 36:
Line 9: delete "IVIES" and insert -- MES -- therefor.
Line 20: delete "(di stillated)" and insert -- (distillated) -- therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*